United States Patent
Ludwig

(10) Patent No.: US 6,570,078 B2
(45) Date of Patent: May 27, 2003

(54) TACTILE, VISUAL, AND ARRAY CONTROLLERS FOR REAL-TIME CONTROL OF MUSIC SIGNAL PROCESSING, MIXING, VIDEO, AND LIGHTING

(76) Inventor: Lester Frank Ludwig, P.O. Box 950, Belmont, CA (US) 94002

( * ) Notice: Subject to any disclaimer, the term of this patent is extended or adjusted under 35 U.S.C. 154(b) by 0 days.

(21) Appl. No.: 09/812,870

(22) Filed: Mar. 19, 2001

(65) Prior Publication Data

US 2002/0005108 A1 Jan. 17, 2002

Related U.S. Application Data

(62) Division of application No. 09/313,533, filed on May 15, 1999
(60) Provisional application No. 60/085,713, filed on May 15, 1998.

(51) Int. Cl.[7] .............. A63J 17/00; G10H 1/00
(52) U.S. Cl. ............ 84/600; 84/464 R; 84/478
(58) Field of Search ............ 84/600, 464 R, 84/464 A, 470 R, 477 R, 478, DIG. 6; 382/100, 253; 348/388.1

(56) References Cited

U.S. PATENT DOCUMENTS

| | | | | |
|---|---|---|---|---|
| 5,159,140 A | * | 10/1992 | Kimpara et al. | 84/600 |
| 6,140,565 A | * | 10/2000 | Yamauchi et al. | 84/600 |
| 6,288,317 B1 | * | 9/2001 | Willis | 84/600 |
| 6,310,279 B1 | * | 10/2001 | Suzuki et al. | 84/600 |
| 6,320,112 B1 | * | 11/2001 | Lotze | 84/600 X |
| 6,360,019 B1 | * | 3/2002 | Chaddha | 382/253 |
| 6,363,159 B1 | * | 3/2002 | Rhoads | 382/100 |
| 6,392,705 B1 | * | 5/2002 | Chaddha | 348/388.1 |
| 6,404,898 B1 | * | 6/2002 | Rhoads | 382/100 |

* cited by examiner

*Primary Examiner*—Stanley J. Witkowski
(74) *Attorney, Agent, or Firm*—The Maxim Firm

(57) ABSTRACT

A system and method for real-time controlling of signal processors, synthesizers, musical instruments, MIDI processors, lighting, video, and special effects in performance, recording, and composition environments using images derived from tactile sensors, pressure sensor arrays, optical transducer arrays, chemical sensor arrays, body sensor arrays, and numerical computation. The invention provides for pressure sensor arrays and body sensor arrays as tactile control interfaces, for video cameras and light sensor arrays as optical transducers, for chemical sensor arrays, and for other numerical image generation from computer processing or numeric simulation. Tactile transducers may be put on instrument keys of conventional instruments, be attached to existing instruments, or be used to create entirely new instrument or controller configurations. Chemical sensor arrays and for other numerical image generation from computer processing or numeric simulation can be used to monitor or simulate natural physical phenomenon such as self-organizing process behavior or environmental conditions. Arrays of scalar or vector values are processed to extract pattern boundaries, geometric properties of pixels within the pattern boundaries (geometric center, weighted moments, etc.), and higher-level derived information (senses of rotation, segmented regions, pattern classification, syntax, grammars, sequences, etc.) which are used to create control signals for external audio, visual, and control equipment or algorithms. The invention also provides for MIDI and non-MIDI control signals.

16 Claims, 72 Drawing Sheets

TACTILE, VISUAL, AND ARRAY CONTROLLERS FOR REAL-TIME CONTROL OF MUSIC SIGNAL PROCESSING, MIXING, VIDEO, AND LIGHTING

RELATED CASES

This application is a division of U.S. application Ser. No. 09/313,533, filed May 15, 1999, which claims benefit of priority of U.S. provisional Ser. No. 60/085,713, filed May 15, 1998.

BACKGROUND OF THE INVENTION

Field of Invention

This invention relates to musical instrument performance systems and environments, and in particular to the combination of novel instrument entities built from synergistic arrangements of traditional and novel instrument elements, and the interconnection of said instrument entities utilizing generalized interface entities to signal routing, processing, and synthesis entities built from synergistic combinations of traditional and novel architectures, processes, and methodologies.

The systems and methods herein are intended to make possible a new generation of musical instrument products with enhanced capabilities and sounds, new semiotic-oriented performance capabilities, and rich composition and recording environments.

Background

There has been considerable advancement in music technology in the last several decades, but recent innovations driven by mass-market forces have narrowed the range of possibilities for commercially available instruments and the ways in which new recorded and performed music are being explored. Audio samples of diverse instruments, advanced signal processing power, improved fidelity, the MIDI control interface, sequencers, and music workstations are important assets but, together with the ways synthesizers, signal processing systems, and instrument controllers have come to be designed, the channel of innovation is focused on a relatively narrow conceptual range that will consume as much rework and refinement energy as can be allotted. A few modern outlier innovations have appeared, such as the Roland COSM signal processing methods, Yahama VL1 model-based synthesis methods, and Buchla's and Starr Switch alternative MIDI controllers, but due to the focused drive of the mainstream these exceptions are largely orphaned in their application.

What is needed is some reach into the souls (rather than make samples) of deep non-Western and Western instruments, a recasting of the now institutionalized signal processing chains, adaptations of new classes of applicable physical phenomenon, extensions as to the types and forms of meaningful human control, and, in the context of performance, a deeper integration of visual and audio environments.

SUMMARY OF THE INVENTION

Based on research and development of this nature, it is possible to create a new-generation framework for expanding the timbral, expressive range, artistic depth, and semiotic aspects of performed and recorded music as well as wide ranges of performance art. Such a framework is particularly advantageous if it were to build on and inter-work with both the existing music technology mainstream and the long established playing techniques of expressively sophisticated, iconic, or significantly adaptable instruments. With such attributes, isolated products and musical directions can be gently folded in to the established mainstream and evolve as the main-stream finds moments of stagnation and boredom within itself. This methodology would permit the current manufacturing and marketing establishments of music technology and content to progressively and profitably shift to a more creatively satisfying and sustainable path.

To these ends, the invention provides methods, apparatus, and example implementations subscribing to a standardized framework which address these needs and opportunities.

1. A key aspect of the invention is a unified architecture involving instrument entities, generalized instrument interfaces, and signal routing, processing, and synthesis elements.
2. A further aspect of the invention is the defining of general instrument elements which instrument entities can be created from.
3. A further aspect of the invention is augmenting existing instruments lending themselves to expansion with said general instrument elements.
4. A further aspect of the invention is the use of miniature keyboards for the attachment to existing instruments.
5. A further aspect of the invention is the expansion of keyboards to include any one or more of proximate, superimposed, programmable tactical feedback, and/or multiple (more than 2) parameter key features.
6. A further aspect of the invention is the sharing of same electronics across multiple keyboards and/or strum-pads.
7. A further aspect of the invention is that of strum-pads with non-repeating contacts along the strum path and flexible assignment of note event control signals to each contact.
8. A further aspect of the invention is that of including standardized arrangements of panel controls, such as switches and sliders, to instruments.
9. A further aspect of the invention is the use of null/contact touch-pads, potentially fitted with impact and/or pressure sensors and with the potential derivation of multiple contact point information, as a musical interface.
10. A further aspect of the invention is that of pressure-sensor array touch-pads as an instrument controller, potentially including image recognition capabilities and the ability to derive and assign control parameters from the way the pad is contacted.
11. A further aspect of the invention is the structuring of associated image processing for a pressure-sensor array touch-pad to capture hand and foot contact postures and gestures.
12. A further aspect of the invention is the structuring of associated image processing for a pressure-sensor array touch-pad to derive parameters from hand and foot contact postures which permit the application of useful metaphors in their operation.
13. A further aspect of the invention is the implementation of pressure-sensor array touch-pads, and potentially related decentralized image processing and networking functions, in a mini-array chip which can be tiled into arbitrary shapes, potentially including instrument keys.
14. A further aspect of the invention is using key displacement together with contact position to derive at least three parameters from a standard Western keyboard key.
15. A further aspect of the invention is a foot controller with buttons and pedals that have associated alphanumeric displays.

16. A further aspect of the invention is a foot controller with any one or more of: hierarchical organization of changeable stored program elements, arbitrary button assignment of hierarchy control functions, and/or multiple interpretation geometric layout of buttons and pedals.
17. A further aspect of the invention is a method for doing one handed drum rolls with acoustic drums or multiple parameter electronic drumpads.
18. A further aspect of the invention is: mallets, beaters, and bows with any one or more of: impact, grip, position, or pressure, strain, and/or motion sensors.
19. A further aspect of the invention is an autoharp adaptation with both strings and strumpads.
20. A further aspect of the invention is: a string autoharp adaptation where chord buttons issue control signals.
21. A further aspect of the invention is an autoharp adaptation where a note-oriented keyboard is used to replay multiple note chord buttons, potentially where the keys are multiple parameter keys.
22. A further aspect of the invention is: autoharp, Pipa, Koto, Harp, Mbira, pedal steel, and Sitar adaptations with separate pickups for each vibrating element, potentially also employing pitch shifting on selected vibrating element.
23. A further aspect of the invention is: Pipa, Koto, Harp, Mbira, pedal steel, and Sitar adaptations with strum-pads.
24. A further aspect of the invention is: guitar, Pipa, Koto, Harp, Mbira, pedal steel, and Sitar adaptations with vibrating element excitation drivers built into the instrument.
25. A further aspect of the invention is: guitar, Pipa, Koto, Harp, Mbira, pedal steel, and Sitar adaptations with additional string arrays and/or one or more miniature keyboards with keys close to the string array.
26. A further aspect of the invention is the use of vowel synthesis in conjunction with a bowed instrument.
27. A further aspect of the invention is attaching a video camera to an instrument.
28. A further aspect of the invention is the use of optical pickups for metalaphones and drum heads.
29. A further aspect of the invention is the use of non-equilibrium chemical reactions as musical controllers or parts of instruments.
30. A further aspect of the invention is the use of photoacoustic phenomena as musical controllers or parts of instruments.
31. A further aspect of the invention is the use of video cameras as musical controllers and/or instruments.
32. A further aspect of the invention is a wide variety of new signal processing innovations, including spatial timbre construction, hysteretic waveshaping, layered signal processing, location modulation of signal pan constellations, cross-product octave chains.
33. A further aspect of the invention is the provision for a wide variety of control signal monoatic and polyadic operations as listed in the disclosure.
34. A further aspect of the invention is the provision for a wide variety of control routing capabilities as listed in the disclosure, including routing at MIDI message index levels.

The system and method herein can be applied to live performance (music, dance, theater, performance works, etc.), recorded audio and video production, and composition.

The invention will be described in greater detail below with reference to the accompanying drawings.

DESCRIPTION OF THE DRAWINGS

FIG. 35 shows an example electric guitar implementation in accordance with the invention based on a Gibson model ES-335 guitar; the invention's enhancements shown can be added on as modules, added collectively, or built-in.

DETAILED DESCRIPTION

1 Overview

The invention relates to a collection of instruments (adapted, electronic, or combined), generalized instrument electrical interfaces, control signal extraction and manipulation systems, musical synthesis modules, layered audio signal processing, lighting control, light sculptures, instrument lighting effects, video control, and video display. The resulting rich sonic and visual environment can be used for live performance, recorded audio and video production, and composition.

Figure 1:
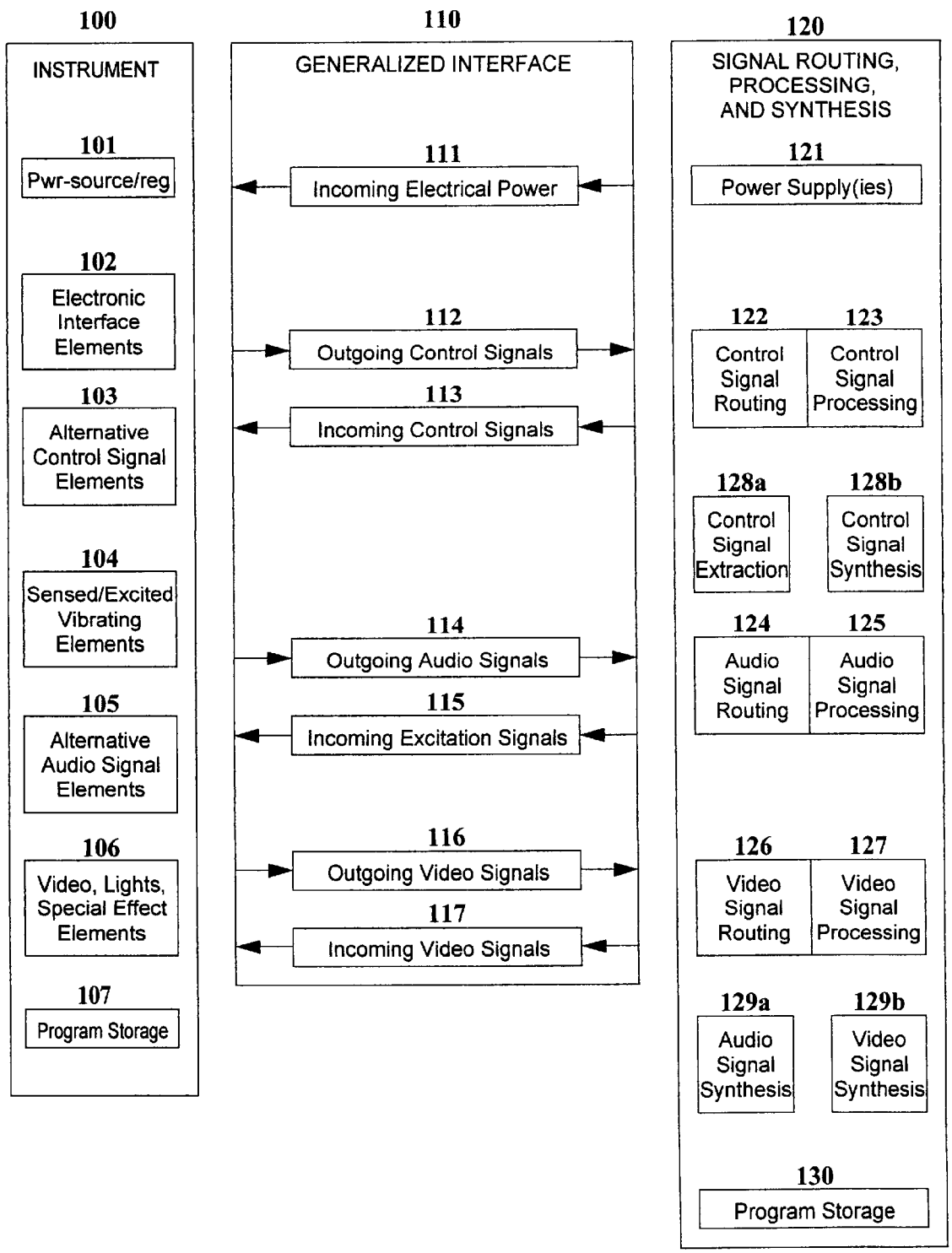
FIG. 1 shows a general overview of the invention.

FIG. 1 shows a general overview of the invention which, at its highest level, consists of one or more instances of instrument entities 100, generalized interface entities 110, and signal routing, processing, and synthesis entities 120. It is understood that the invention provides for the possibility of several instances of each of these entities. For example, several instruments 100 may be supported (adapted guitar, adapted sitar, adapted autoharp, touch-pad/slider/switch controller, etc.) by each 110/120 system; further, for each collection of plurality of instruments 100 and signal routing, processing, and synthesis entities 120, there may be both full-feature interface cables or simplified reduced-feature cables implementing versions of the generalized interface 110; finally, for each collection of instruments 100 and generalized interface entities 110 there may be various versions of signal routing, processing, and synthesis entities 120 (small performance systems, large performance systems, studio recording-oriented or composition-oriented systems, etc.).

1.1 Instrument Overview

In more detail, each instrument entity 100 in general internally consists of one or more elements. The elements fall into two broad categories, namely those that produce audio-frequency signals and those that instead produce only control signals. Of these, it is also possible to derive control signals from the audio-frequency signals (reflecting pitch, amplitude, relative harmonic content, etc.). Control signals, regardless of their origin, in general are used to control the processing, replay, or synthesis of audio-frequency signals; however, the control signals can also be used to control lighting, video, special effects, etc.

Referring to FIG. 1, the instrument 100 may contain internal power sources (such as batteries, large-value capacitors, etc.) and/or power regulation elements 101. Next the control signal sources that may be included within an instrument entity 100 may be of a traditional technology or nature, such as knobs, keys, switches, touch-pads, sliders, buttons, sensors, etc.; these will be termed electronic interface elements 102. In addition, it is also possible to generate control signals from more exotic processes such as chemical oscillators, chemical chaos, photoacoustic, environmental sensors, etc. These will be termed alternative control signal elements 103. The audio-frequency signal sources that may be included within an instrument also broadly fall into two classes. One class is that of traditional vibrating elements (strings, tyhes, surfaces, solid volumes, air columns, etc.) whose mechanical audio-frequency vibrations can be electrically sensed via electromagnetic, photo-electric, piezo, Hall-effect, or other types of sensors or transducers. In many cases it is possible to excite these mechanically vibrating elements by electronic methods (magnetic fields, piezo transducers, etc.) or electronically controlled methods (motorized bowing, solenoid strikers, etc.) This first class of audio-frequency signals sources will be termed sensed/excited vibrating elements 104. In addition, it is also possible to generate audio-frequency signals from more exotic processes such as chemical oscillators, chemical chaos, photoacoustic, environmental sensors, etc. These will be termed alternative control signal elements 105. Finally, the instrument may also contain various additional video, lighting, and special effect elements 106.

1.2 Generalized Interface Overview

Again referring to FIG. 1, the invention provides for both instrument entities 100 and signal routing, processing, and synthesis entities 120 to be fitted with compatible electrical interfaces, termed generalized instrument interfaces or (or more concisely, generalized interfaces) 110, which can exchange any of the following:

incoming electrical power (111)

outgoing control signals from switches, controls, keyboards, sensors, etc., typically in the form of MIDI messages but which may also involve contact closure or other formats (112)

control signals to lights, pyrotechnics, or other special effect elements within and/or attached to the instruments, said signals being either in the form of MIDI messages, contact closure, or other formats (113)

outgoing audio signals from individual audio-frequency elements or groups of audio-frequency elements within the instruments (114)

incoming excitation signals directed to individual audio-frequency elements or groups of audio-frequency elements within the instruments (115)

outgoing video signals (such as NTSC, PAL, SECAM) or image signals sent from the instrument (116)

incoming video signals (such as NTSC, PAL, SECAM) or image signals sent to the instrument for purposes such as display or as part of a visually controlled instrument (117).

The interfaces may be realized by one or more of any of connectors, cables, fibers, radio links, wireless optical links, etc.

1.3 Signal Routing, Processing, and Synthesis Overview

Referring to FIG. 1, the invention provides for one or more signal routing, processing, and synthesis entities 120. These entities first route and process received audio-frequency, control, and video signals. Additionally, these entities 120 may extract control signals from received audio-frequency and video signals, perhaps under the direction of selected control signals. Finally, these entities 120 may also synthesize audio-frequency, control, and video signals, typically under the direction of selected control signals.

Again referring to FIG. 1, the signal routing, processing, and synthesis entities 120 internally may include:

- power supplies 121 for both internal and instrument powering
- control signal routing 122 for interconnecting control signal sources with control signal destinations
- control signal processing 123 for instantaneous control message transformations (such as inversions) and inter-operations (such as averaging, adding, multiplication, etc.)
- audio signal routing 124 for interconnecting audio signal sources with audio signal destinations
- audio signal processing 125 for (typically real-time) transformations, typically under real-time control via selected control signals
- video signal routing 126 for interconnecting video signal sources with audio signal destinations, typically under real-time control via selected control signals
- video signal processing 127 for (typically real-time) video signal transformations, potentially under real-time control via selected control signals
- control signal extraction 128a for the derivation of (typically real-time) control signals from audio or video signals, potentially under real-time control via selected control signals
- control signal synthesis 128b for the internal creation of time-varying control signals (such as low-frequency control oscillators, envelop generators, slew limiters, etc.), potentially under real-time control via selected control signals
- audio signal synthesis 129a, typically under the direction of selected control signals, and typically as per conventional music synthesizer hardware and software
- video signal synthesis 129b, typically under the direction of selected control signals.
- program storage 130 for storing configuration programs and event sequences In FIG. 1 it is understood that the elements 121 through 130 represent functional groupings and not necessarily hardware-centralized or software-centralized sub-systems.

Figure 2:
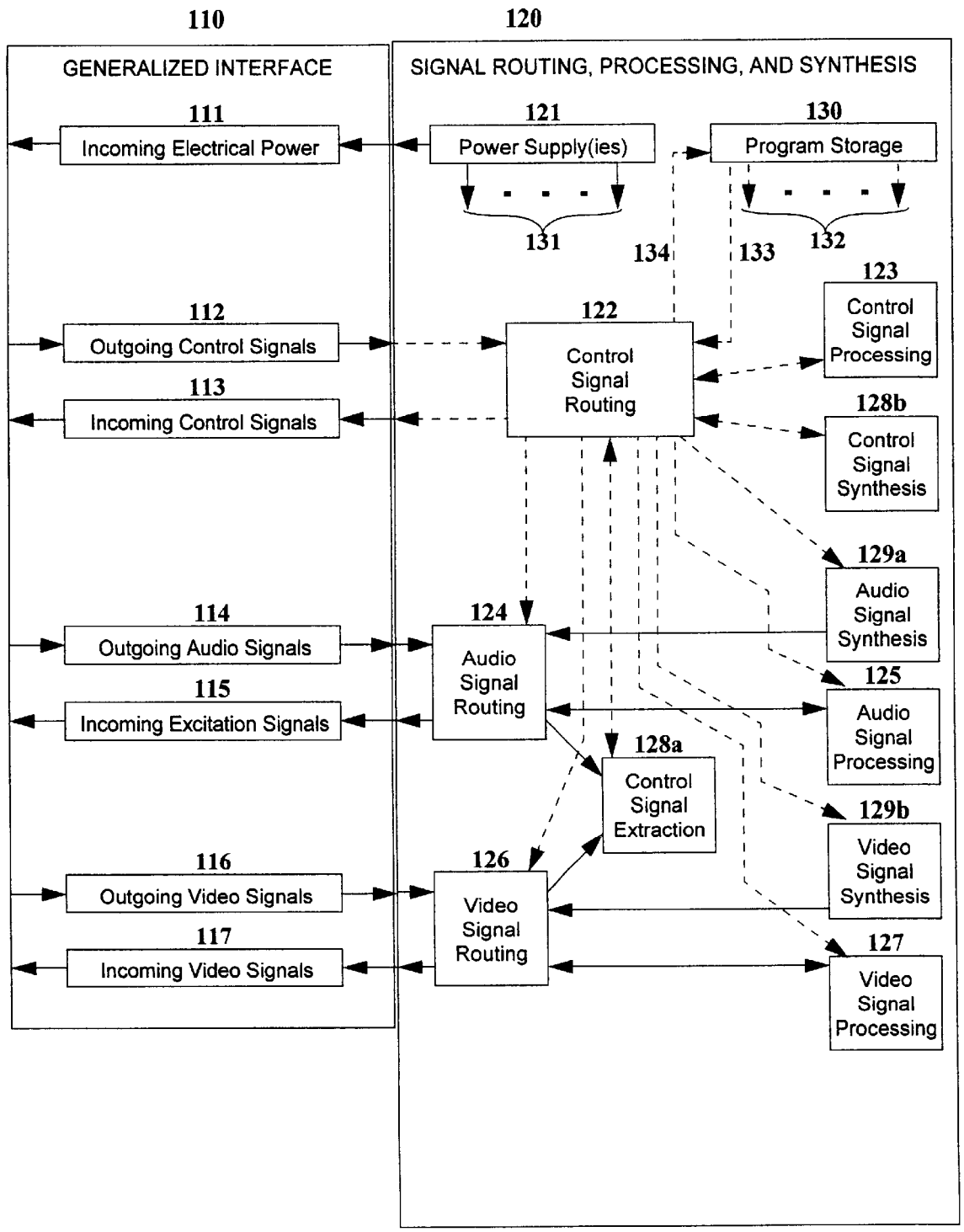
FIG. 2 shows examples of internal interconnections among the functional grouping elements within an instance of a signal routing, processing, and synthesis entity, all shown in FIG. 1.

FIG. 2 shows examples of internal interconnections among the functional grouping elements 121 through 130 within an instance of a signal routing, processing, and synthesis entity 120. In FIG. 2, as before, it is understood that the elements 121 through 130 represent functional groupings and not necessarily hardware-centralized or software-centralized subsystems.

In the example interconnections, power is distributed throughout via functional fanouts 131; here it is understood that there many be many decentralized power supplies for the individual subsystems comprising or implementing elements 122–130. Program store information is also distributed throughout via paths 132 (associated with specific subsystems of elements 122–129) and/or path 133 to the control signal routing element 122; typically both methods are used as portions of the program control may be stored within individual elements 122–129 and portions may reside within one or more centralized program store subsystems (such as MidiTemp model MP-88, Digital Music Corporation model MX-8, controlling PC, etc.), comprising 130.

1.4 Remaining Document Overview

With this overview complete, the remainder of the discussion is organized as follows. The next four Sections concern instruments 100. First, a number of instrument element and instrument subsystems are described. Two subsequent sections then describe a large number of example instruments that are perfected through applicable combinations and arrangements of the aforementioned instrument elements and subsystems of elements; the first of these sections purely electronic controllers while the second addresses adaptations of conventional instruments with special attention paid to specific nuances and opportunities within those instruments. Following this, some alternative audio and control signal sources are then considered.

Next the general instrument interface 110 is then considered in additional detail. A subsequent section then addresses the signal processing, and synthesis entities 120. A final section provides a few example envisioned applications of the invention.

2 Instrument Elements and Instrument Subsystems

The invention includes a number of electronically interfaced instruments used by one or more performers.

These instruments involve either pure electronic interfaces arranged to form an instrument, vibrating elements which typically are in arrangements adapted from existing instruments, exotic electrically-monitored oscillatory elements (such as chemical oscillators), electronic or numerical chaotic models used as sources, or combinations of these laid out in an artistically operative and ergonomic fashion. Vibrating elements within an instrument may also be made to vibrate via electronically controlled or induced excitation from magnetic field, piezo electro-mechanical, or other electronically-driven or electronically-controlled excitation.

In general an instrument consists of one or more instrument elements which may be of one more differing types or classes. These instrument elements may be thought of as subsystems within the instrument. For example, a 6-string guitar has six vibrating strings; each string is an example of a vibrating element. A single electromagnetic or piezo pickup may be used to amplify the entire group of six strings. The guitar may also have separate electromagnetic or piezo pickups for each string, as is commonly done for adding a MIDI interface to an existing electric guitar. This example guitar then simultaneously has six vibrating elements, one group-pickup subsystem, and six single-string pickup subsystems. The guitar may be further enhanced with MIDI-command issuing controls, such as knobs, switches, joysticks, touch-pads, motion/position sensors, etc.; these represent an additional subsystem. A reduced-size musical keyboard may be added to the guitar, representing yet another subsystem.

Specific classes of instrument elements and/or instrument subsystems are described in the subsections that follow.

2.1 Electronic Interface Instrument Elements and Subsystems

This class of instrument elements and instrument subsystems do not create audio frequency phenomenon directly but are rather used to control one or more music synthesizers, audio mixers, and/or signal processing functions.

2.1.1 Proximate, Miniature, and Superimposed Keyboards

Standard western keyboards found on pianos, harpsichords, organs, and synthesizers are widely used as a human interface for electronic musical instruments. Some instruments, such as organs and harpsichords, have traditionally (for centuries) included two or more such keyboards to allow the instrument player to rapidly select among two or more timbres or ranges. The spacing of the keyboards is almost without exception found to be far enough apart that a hand must be committed uniquely to a given keyboard for the moments that the keys are played. This is due to the fact that the bulk of apparatus under the keyboards, keyboard frame, etc. prevented the keyboards from being mounted very close together, re-enforced by the fact that music has been composed for playing at most one keyboard with a given hand (although in virtuoso pieces a given hand may very rapidly jump among keyboards). One aspect of the invention expands the usage of traditional keyboards by removing this limitation via various means.

2.1.1.1 Proximate Keyboard Arrays

One method of implementation is to mount a plurality of keyboards close enough together that one hand can, to degrees determined by mechanical details, simultaneously play notes on two or more traditional keyboards. There are three methods for increasing the workable proximity of groups of keyboards:

- reduce the vertical separation of the keyboards
- overhang the ends of the white keys on a higher keyboard over the backs of the white and black keys of a lower keyboard
- reduce the physical length of the keys Many modern electronic keyboards have very shallow mechanisms and frames. It is therefore quite straightforward to mount two or more commonly available electronic keyboards employing either or both of the first two methods. With some overhang and (vertically or horizontally) shallow enough mechanisms, it becomes possible to play notes on both keyboards simultaneously. In nominal configurations the thumb-to-pinky reach is nearly the same across both keyboards. Clearly some finger configurations are difficult or impossible across the two keyboards, but there are also limitations in conventional keyboards that are incorporated in the development of established fingering technique and respected in keyboard music composition; similar minor technique development and compositional respect extensions can be developed for such proximate keyboard arrays.

Without reducing the size of the keyboards a single hand can even make invaluable use of three keyboards within a confined range; simple example is to add back-up notes of the same pitch or differing octaves. However, two hands may use the two-keyboard playing techniques to make avid use of a three, four, or more proximate keyboard array.

Figure 3A:
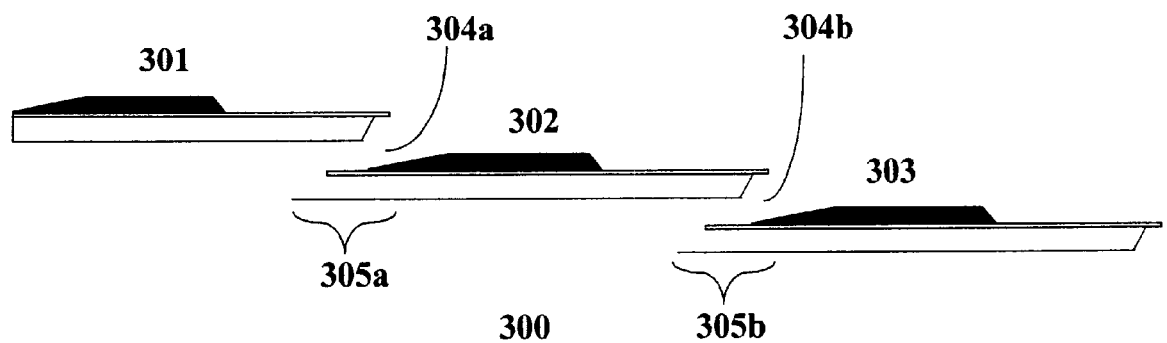
FIGS. 3A–3C show an example of a proximate keyboard array.
Figure 3B:
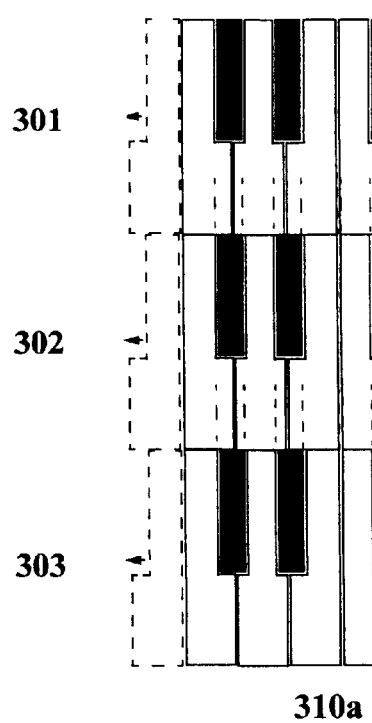
Figure 3C:
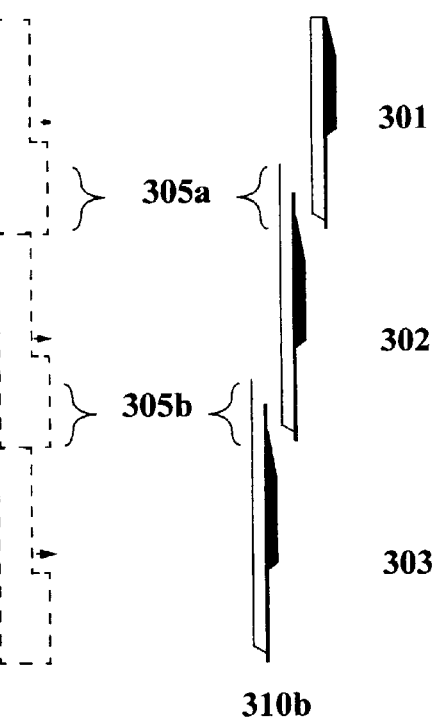

FIGS. 3A–3C show an example of a proximate keyboard array. In this example, three keyboards 301, 302, 303 are arranged in an overhanging staircase arrangement. Three views are shown: a side view 300 (FIG. 3A), a top view with hidden key areas suggested by dashed lines 310a(FIG. 3B), and the side view of 300 reoriented as an orthogonal projection 310b of the top view 310a(FIG. 3C).

The separation distances 305a, 305b between the tops of the keys of a given keyboard and the bottoms of the keys of a keyboard overhanging it should be minimized and in the limit are just slightly larger than the maximum travel distance of the overhanging key. The depth of the overhang 304a, 304b is set in the balance between the trade-off of maximizing desired accessibility to the back of an overhung key and minimizing the separation distance between the edges of the keys of two adjacent proximate keyboards. It is noted that any of the keyboards used here may be either of a standard variety or any of the more advanced keyboards described later (miniature, superimposed, multi-parameter keys, pressure-sensor array, etc.). It is also noted that this technique may be applied to other types of keyboards with applicable types of key geometry.

2.1.1.2 Miniature Keyboards

If the depth of the keyboard is reduced, the span of a given hand is increased further. This may be done by making the keys relatively shorter, forming a stubby keyboard, or by shrinking the size of the entire keyboard in all dimensions. Such miniature keyboards are commonly found on consumer electronic keyboards and keyboard instruments made for children.

Clearly a proximate keyboard array can be created from miniaturized keyboards. The range of the fingers within and across individual component keyboards may be greatly increased in this fashion, albeit with a perhaps somewhat compromised tradition and technique.

An additional, and particularly valuable role for the proximate capabilities of such miniature keyboards is to mount them, as a component, on an instrument with other components so as to form a more complex instrument where free fingers can operate two or more such components simultaneously. As a simple example, a guitarist using a thumb-pick or classical guitar technique can easily use free fingers to play chords, bass lines, melodies, etc. on a miniature keyboard attached to a guitar.

Figure 4:
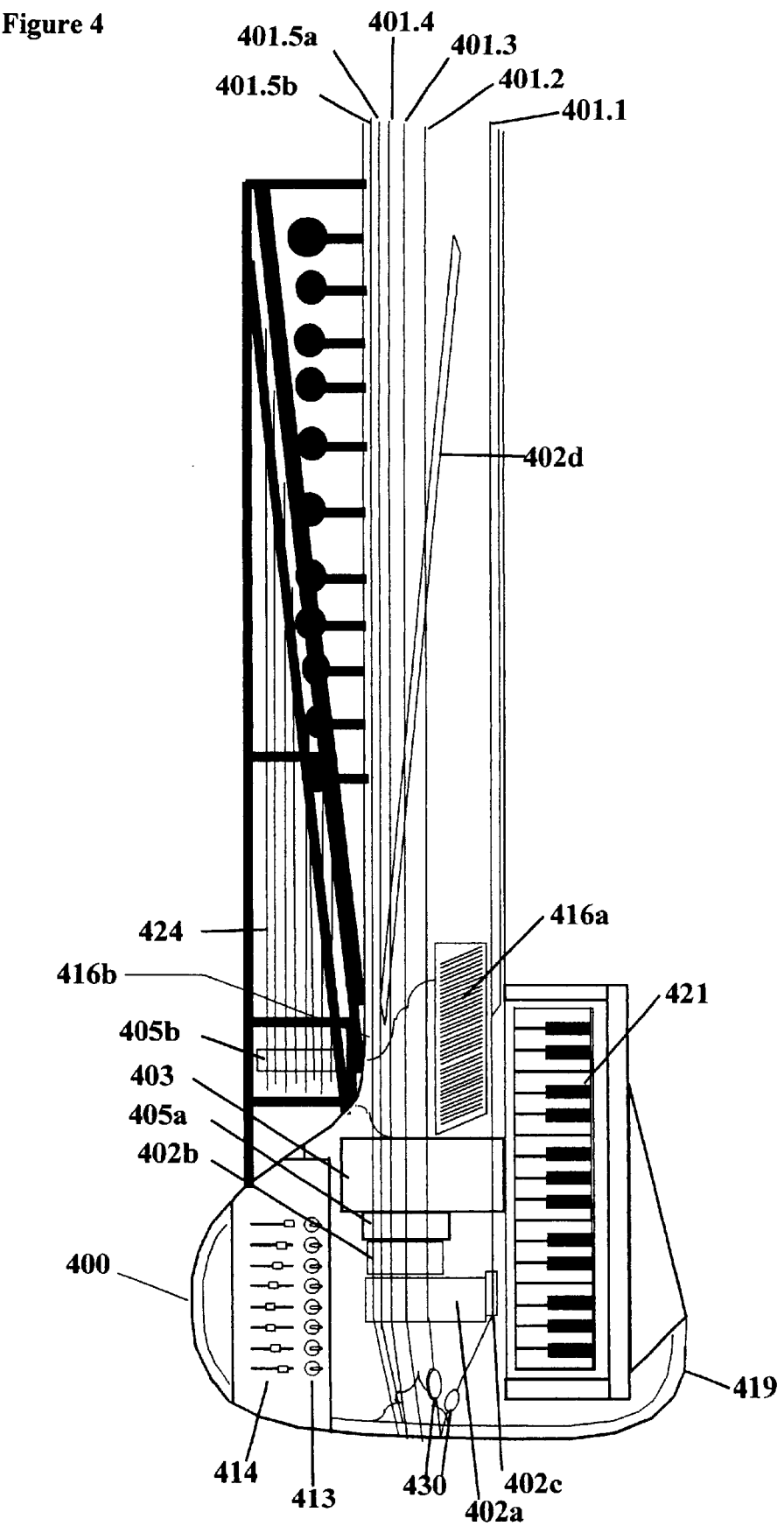
FIG. 4 shows an example of an instrument-mounted miniature keyboard configuration employing one miniature keyboard, in particular an adapted Indian sitar with many additional example instrument elements.

FIG. 4 shows an example of an instrument-mounted miniature keyboard configuration employing one miniature keyboard 421, in particular an adapted Indian Sitar 400 with many additional example instrument elements which will be described later.

Figure 5:
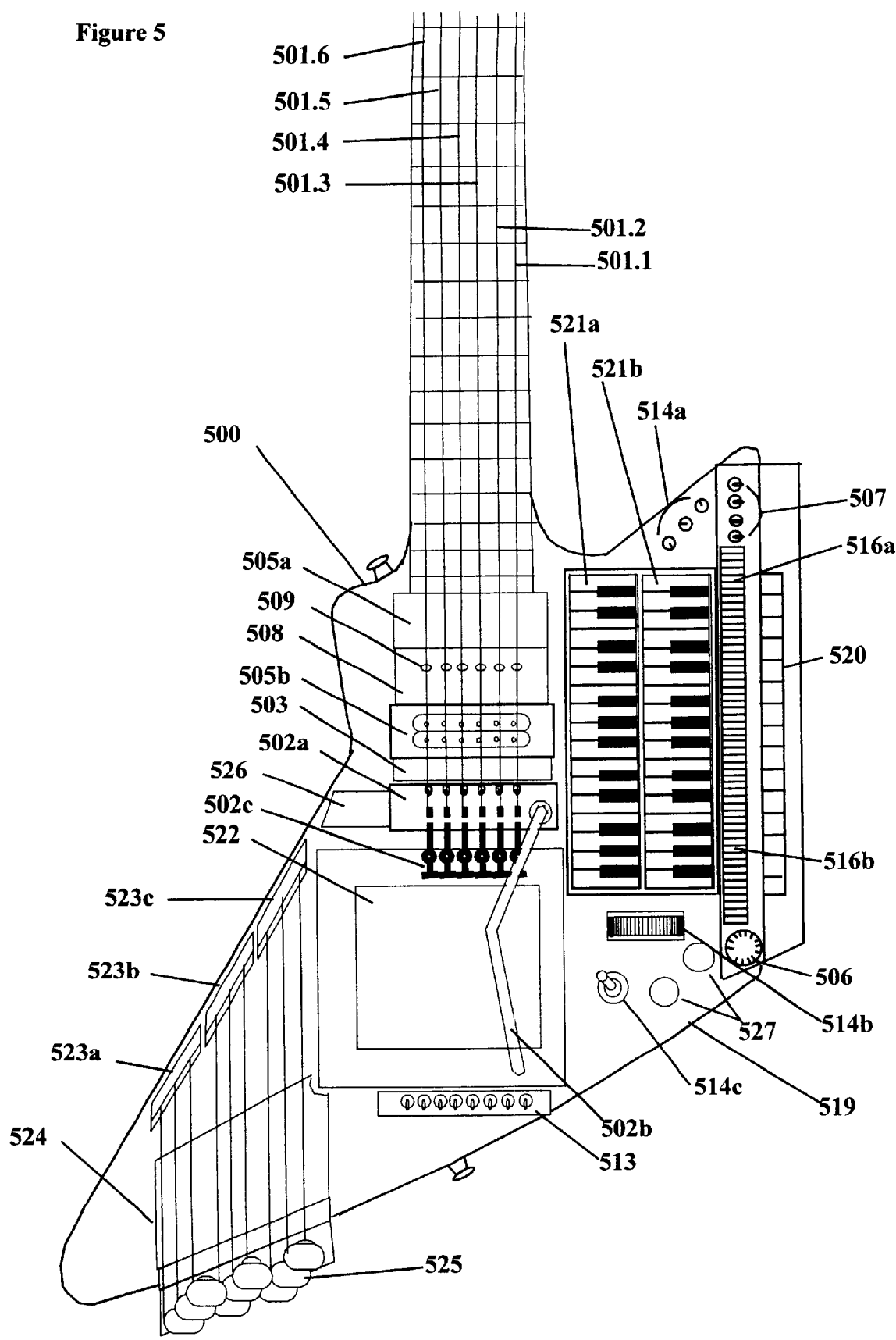
FIG. 5 shows an example of an instrument-mounted miniature keyboard configuration employing two miniature keyboards, in particular an adapted electric guitar with many additional example instrument elements.

FIG. 5 shows an example of an instrument-mounted miniature keyboard configuration employing two miniature keyboards, in particular an adapted electric guitar 500 with many additional example instrument elements which will be described later. Here note the two keyboards 521a, 521b are proximate enough to allow both keyboards and the guitar strings to be played simultaneously.

Clearly these methods of miniature keyboard attachment (s) can be applied to other instruments (Sitar, Pipa, Saz, pedal steel guitar, plucked string bass, etc.) as well as being used to create entirely new types of instruments and controllers as will be discussed herein.

2.1.1.3 Superimposed Keyboards

It is also possible to make contact-closure keyboards with multiple contact sets that actuate at increasing depths of key depression. Such keyboards may or may not have tactile feedback as to each level of actuation. Pratt-Read manufactured a "double-touch" keyboard for use in home console organs which closed one set of contacts with a noticeable restoring pressure at about half of the possible key-displacement which persisted through full key displacement where another contact set closed at the end of key travel. Also, many "velocity sense" keyboards are realized by SPDT switches actuated with each key; here the beginning of key travel opens a pair of contacts and the end of key travel closes a second set of contacts, but with no mid-travel tactile feedback.

In either case, there are one contact closure event at partial key travel and two events at full key travel. These events can be interpreted as superimposed keyboards. One example interpretation is that the first event triggers one synthesizer voice and the second even triggers a second voice; in this manner keys struck with partial displacement sound with only one voice but those struck with full displacement sound both voices. Another example is for a first voice to be triggered at partial displacement but turned off at full displacement. If the first voice has a long attack, it would be drowned out by the second voice, or in short duration serve as acceptable transient ornamentation (for example, mimicing a "key click" or "air turbulence chiff"), this arrangement effectively resulting in a partial key displacement sounding only the first voice and a full key displacement sounding only the second voice. Note in either arrangement, a fluctuation of the applied key pressure can vary which voices continue to sound (in the first arrangement, the second voice will go on and off with the first voice held; in the second arrangement, the first and second voices will alternate being on or off in a mutually exclusive fashion).

Figure 6A:
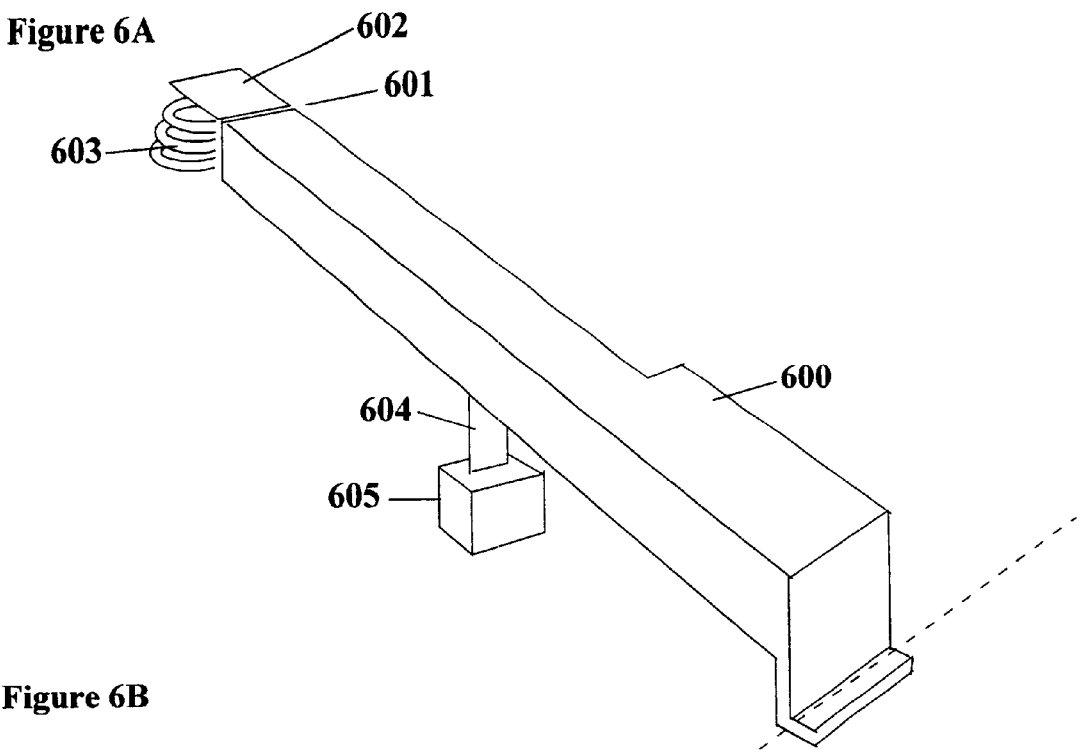
FIGS. 6A–B illustrate an arrangement where a dedicated continuous or near-continuous sensor is attached to each key so as to instantaneously measure the displacement of the attached key.
Figure 6B:
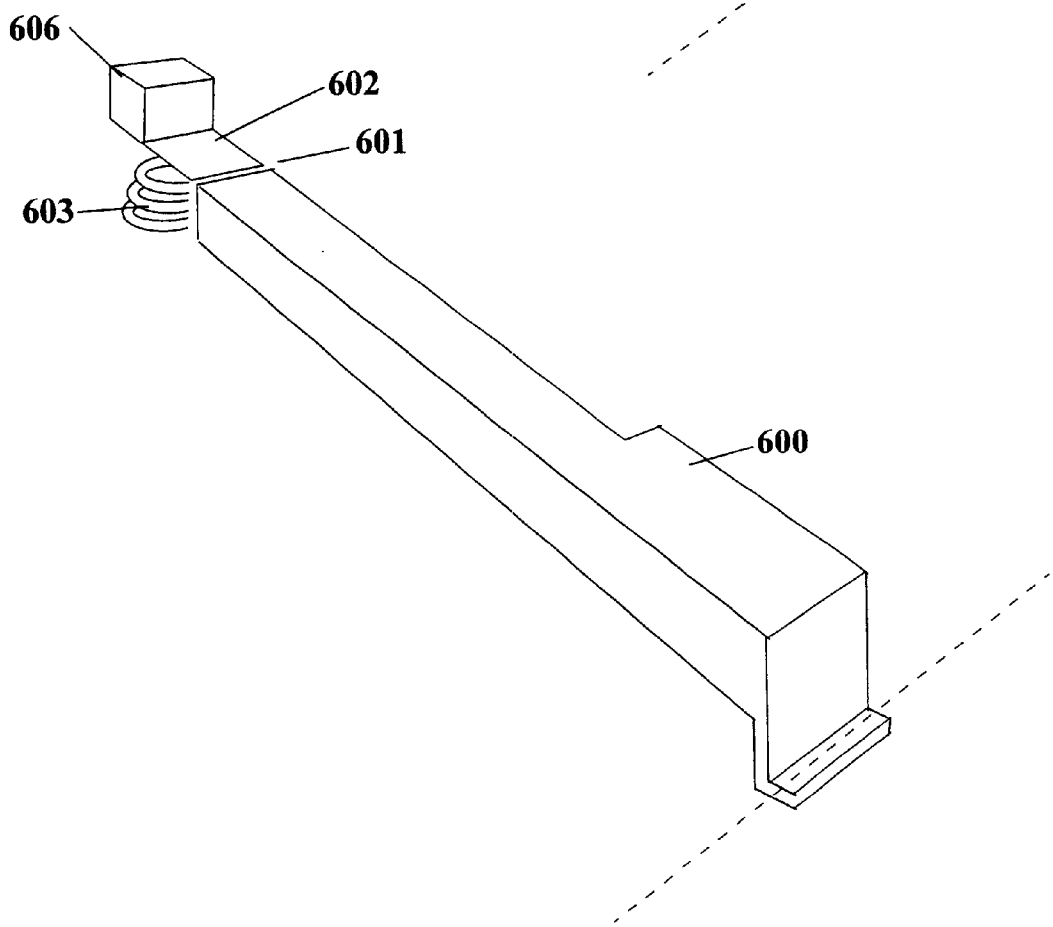

As the superposition of keyboard principal proves useful in this two-level setting, it is natural to consider further extensions of this approach to more levels and additional interpretations. In the limit, a keyboard could have a continuous sensor (such as a potentiometer, magnetic or optical gradient, etc.) or near-continuous sensor (such as a binary encoded control) attached to each key. FIGS. 6A–B illustrate an arrangement where a dedicated continuous or near-continuous sensor is attached to each key so as to instantaneously measure the displacement of the attached key. In such an arrangement external electronics would define quantized displacement thresholds to which various superimposed keyboard interpretations would be assigned.

As a first bonus, it is also noted that this same continuous or near-continuous key-displacement sensor arrangement can be used in other operational modes to provide other very valuable expressive functions, for example volume or timber control or velocity contour tracking, as will as will be described in a later section.

In practice, the two-level superimposed keyboard provides the player with tactile feedback as to what point of travel the key had passed in the form of a noticeable change in resistive restoring pressure. For a more generalized system as described above and illustrated in FIGS. 6A–B, there may be applications where such tactile feedback is not especially necessary, for example in triggering additional synthesizer voices to create an increasing gradient of richness as the key is pressed further and further. In other circumstances, particularly if there are only a few levels implemented, tactile feedback may indeed be desirable, particularly that with discernible discrete steps matching the trigger-level quantization points in key travel.

Figure 7A:
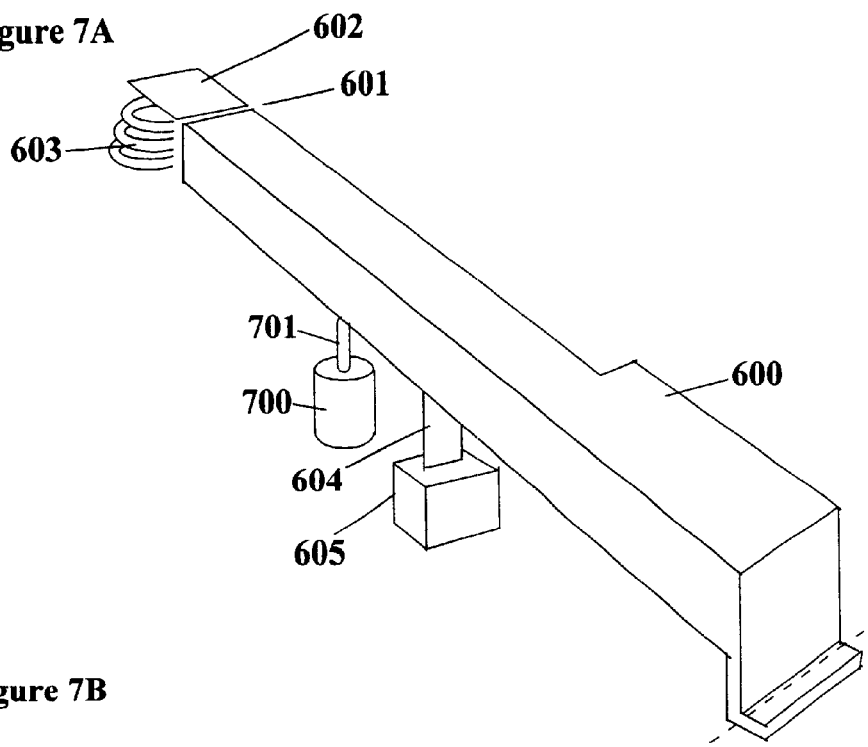
FIGS. 7A–7B illustrate an arrangement by which programmable tactile feedback can be applied to a key, either in conjunction or without a continuous or near-continuous sensor to measure key displacement.
Figure 7B:
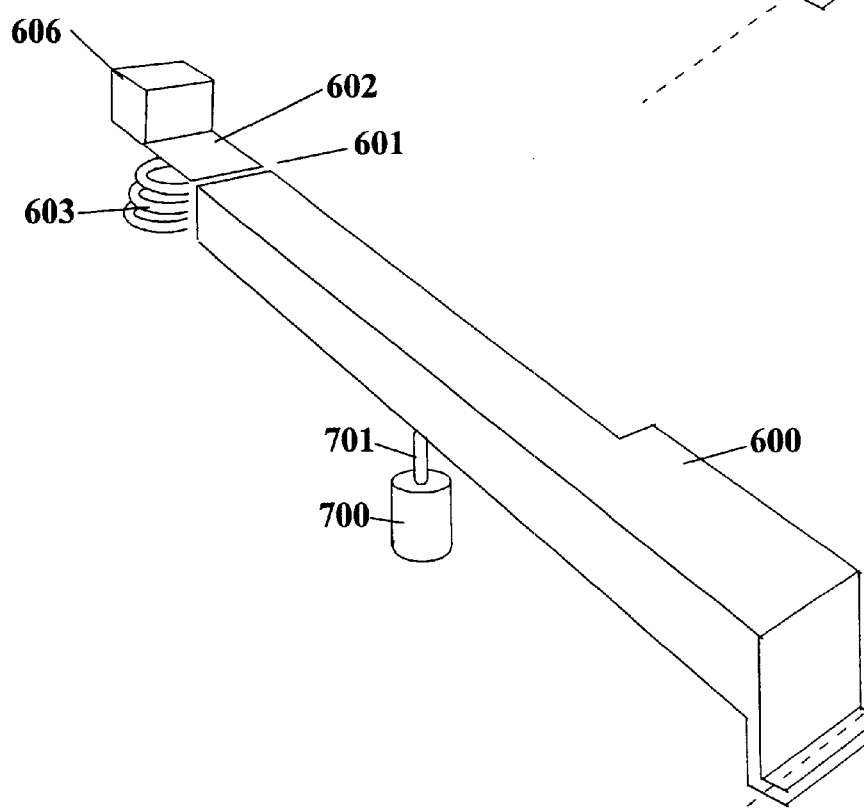

Highly flexible programmable tactile feedback can be imposed separately on each key by a dedicated solenoid, motor, pneumatic, fluid, or other means. Less flexible yet still somewhat programmable tactile feedback could also be had by means of an electrically adjustable global mechanical arrangement serving all keys in a keyboard, for example engaging additional sets of springs or pliable rubber pressure-resisting cones. FIGS. 7A–B illustrate an arrangement by which programmable tactile feedback can be applied to a key, either in conjunction with or without a continuous or near-continuous sensor to measure key displacement. Without key position information, an electrically-controlled restoring force element with built-in levels of key pressure resistance (for example, by means of a sequence of spatially distributed electromagnetic coils that can be switched on at configuration time to create additional levels of force past specific displacement depths) could be used. With key displacement information, a simple dedicated solenoid, motor, pneumatic, fluid, or other means can be made to have its restoring force vary over the key travel in a highly flexible manner. Since key travel can be fast, the transient response of the tactile feedback system must typically have a fast rise time and be free of overshoot. If electromagnetic or electric field means are used to provide key displacement resistance, care must be made to shield these elements to as to not create electromagnetic transients that could leak into nearby electronics or music instrument pickups. Finally, it is pointed out that as an additional bonus, the above arrangement is also capable of synthesizing different types of mechanical so-called keyboard "actions", for example the "feel" of various types of piano manufacture keys versus harpsichord keys, etc. Thus the development of a keyboard with per-key continuous or near-continuous displacement measurements and programmable key-displacement resistance can provide an extraordinary level of enhancements to conventional keyboards. This can be enhanced significantly with the addition of pressure sensing arrays on each key as will be described later.

2.1.1.4 Shared Scanning Electronics

Figure 8:
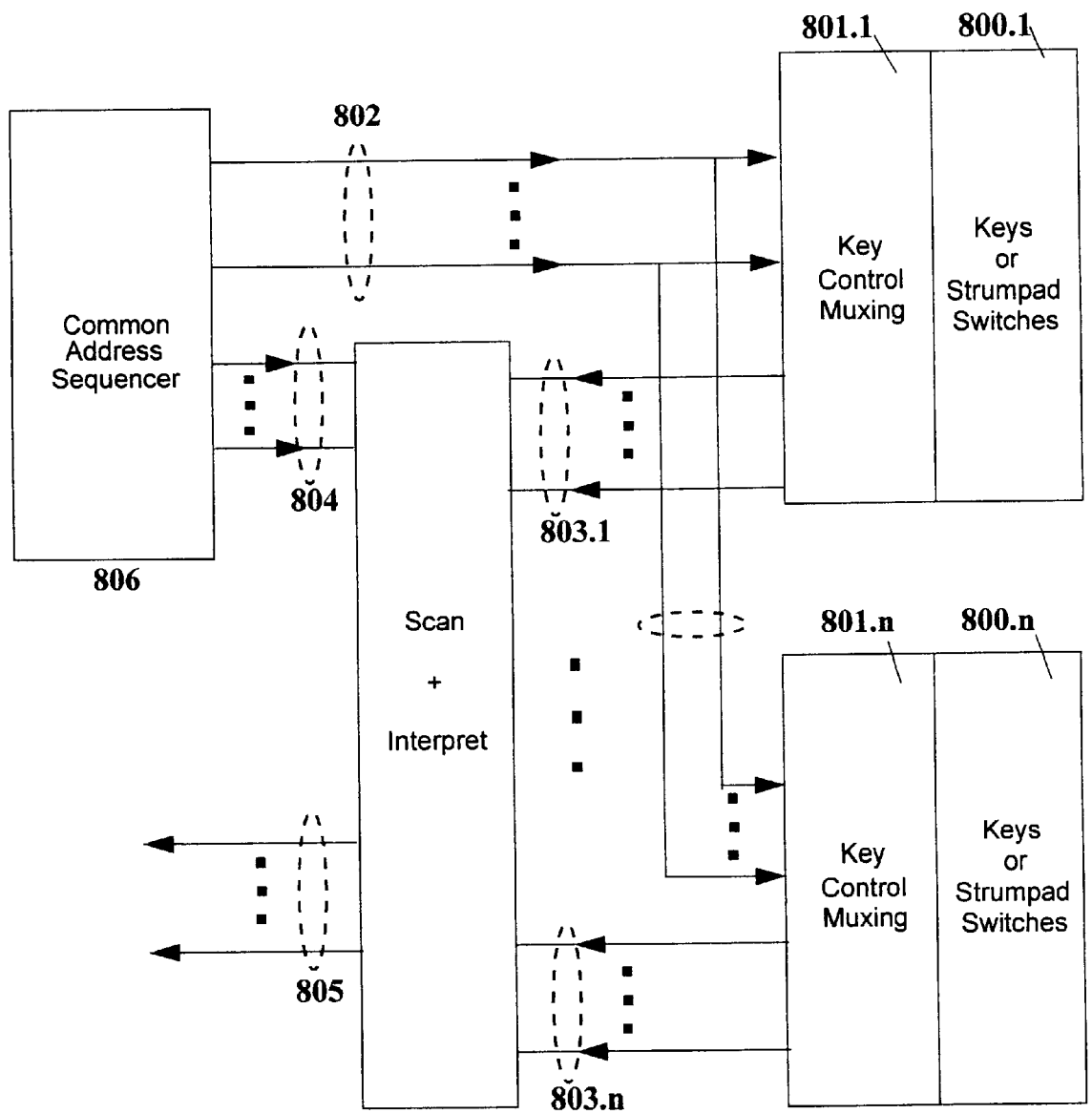
FIG. 8 illustrates a shared scanning arrangement supporting a plurality of any of keyboards, strum-pad, buttons, switches, etc.

In arrangements with multiple keyboards, superimposed keyboards, or related input devices (such as the strum-pads discussed below) the keyboard-scanning electronic hardware can be in many cases largely shared across pluralities of these keyboard contacts and/or related input devices. For example, a common microprocessor could be used to generate common multiplexing address for a group of contacts or sensors across several keyboards and the status of individual contacts would then be serially polled or transferred in parallel. FIG. 8 illustrates a shared scanning arrangement supporting a plurality of any of keyboards, strum-pad, buttons, switches, etc.

2.1.2 Strum-pads

A few early music synthesizers replaced a conventional keyboard with a low-activation pressure membrane switch array laid out to resemble a keyboard. One could freely tap or easily drag fingers over the membrane switch array without the overhead and potential injury involved in more deeply operative conventional keyboards. Because of the lack of conventional keyboard action and technique, such keyboards rapidly lost their appeal. More recently, the Suzuki "Omnichord" product, designed to mimic an autoharp, provided a low-activation pressure membrane switch array, called a "strum-pad," laid out to mimic the strummed-string array of an autoharp; as a selected chord button is activated various notes associated with the chord are assigned to the various membrane switches so that a finger sweeping over the strum-pad produces an arpeggiated chord in a way suggestive of strumming a traditional autoharp. The Omnichord strum-pads are hard-wired to repeat notes multiple times and the note assignment software permits only fixed chord selections with preassigned arpeggio note sequences.

The invention includes an important element to create or expand instruments through a generalized adaptation of these ideas:

a more generalized strum-pad element with the following attributes:
    low activation-pressure proximate switches
    linear arrangement (although others are useful)
    no hard-wired note repeats
    visual and/or small tactile markings to the player
    compact physical size
    simultaneous multiple switch activation without perceivable interaction
    generalized note event information that can be assigned interpretation under program control
  more generalized strum-pad interpretation software and hardware with the following stored program attributes and assignments which can be rapidly altered during playing:

assignment to selected melodic notes, percussive events, lighting or special effect events, etc.

arpeggio pattern select note-repeats added as desired and in the manner desired issuance of note, outgoing program change, and/or other control signals at the initial activation of each stored program (to sound a background chord, activate lights, etc.) with or without activity on the strum-pad selection and rapid change of specific programmable attributes and assignments via button or foot-switch control The resulting element can, for example, be attached to a guitar pick-guard and used in conjunction with foot-switches and/or finger-activated buttons to select stored program interpretations. Free fingers can then, while freely playing the guitar as normal, "strum" or tap arpeggios, trigger percussion devices, trigger lighting or special effect events, etc.

Figure 9:
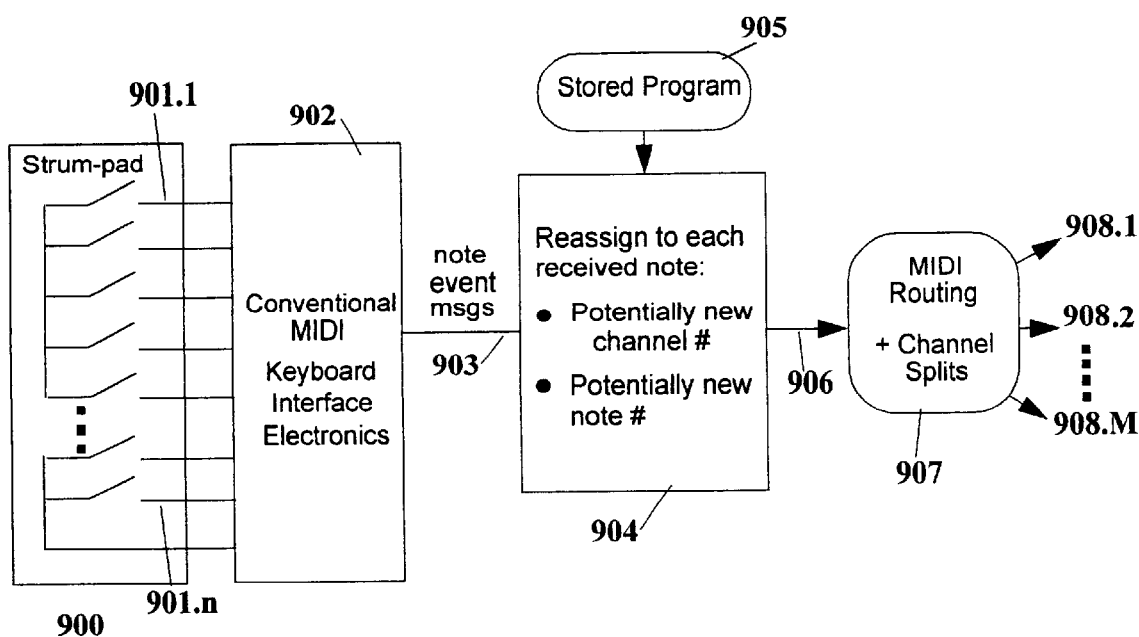
FIG. 9 illustrates an example method for realizing a flexible generalized strum-pad element and associated stored program control.

FIG. 9 illustrates an example method for realizing a flexible generalized strum-pad element and associated stored program control. In this example implementation, the strum-pad switches can be electrically wired to a simple conventional MIDI keyboard interface so that each consecutive switch triggers a consecutive MIDI note event. The note event stream is then directed to a MIDI message processor which can, under program control, reassign each incoming note event a potentially new MIDI note number and MIDI channel, or perhaps a null operation to create "safety" or "dead" zones. From here individual MIDI channels can be directed to a variety of destinations: various synthesizer voice channels, lighting systems, special effect systems, etc. Additional control possibilities can be further realized by translating note events into other types of MIDI events, as described later, or into non-MIDI control signals.

It is also possible to add note-velocity and/or "key-pressure"/"after-touch"/"channel-pressure" control to the strum-pad by placing a velocity sensor (such as a piezo element) and/or pressure-sensor under it and feeding the resulting signal(s) to the MIDI keyboard interface as would be done in a conventional MIDI keyboard realizing these features with such sensors. It is also possible to supplement, or replace altogether, each membrane switch with a pressure-sensor, thus creating a pressure-sensor array. Such an array can be used to implement note-velocity and/or "keypressure"/"after-touch"/"channel-pressure" control, but can also be used for a great many other purposes, particularly when implemented in a two-dimensional array, as described later.

2.1.3 Panel Controls, Actuators, Sensors

Expressive control can be enhanced considerably by attaching one or more of any of various additional panel controls, actuators, and sensors to any electronic instrument.

Applicable types of panel controls include potentiometers (knob, slider, etc.), joysticks, panel switches, panel buttons, etc. Panel controls may be distributed in isolated spots, in small groups, or in arrays.

Applicable actuators can include limit switches, magnetic switches, mercury switches, optical detectors, piezo or other impact detectors, etc. Actuators may be attached or associated with moveable parts of instruments (such as guitar vibrato "whammy" bars, harp tuning levers, autoharp string-damper bars, etc.). Additionally, actuators may be affiliated with the instrument as a whole, detecting rapid jarring of the instrument etc. Further, actuators may also be provided in isolated spots of the instrument, such as velocity-sensitive tap-actuators for percussion event-triggers and "body blows" to the instrument, as abstracted from for examples: ancient Chinese Pipa, centuries old Flamenco guitar, and recent Jimi Hendrix/Adrian Belue (borderline to actual guitar abuse) techniques.

Applicable sensors can include pressure, motion (velocity, acceleration, etc.), position (optical, magnetic or electric field, electromagnetic standing wave, acoustic standing wave, etc.), impact (such as piezo sensors used with electronic drum pads), tension, strain, torsion, light, temperature, etc. Position sensors may be used to measure the position of a physical element of an instrument (such as a damper bar or pitch-modulating lever) or the absolute position of the instrument itself. Tension sensors may be used, for example, to measure modulated string tension as on a Koto or electric guitar; such string tension controllers need not even involve sounding strings—for example a small Koto string and bridge arrangement may be used strictly as an electronic control provided to the player in the form of a familiar Koto string format.

In general these panel controls, actuators, and sensors can be configured to provide a range of either continuous or discrete-step control voltages. In some cases additional electronics or subsequent software transformations may be necessary to recontour/redistribute the control voltage over the full range of the controls, actuators, and/or sensors. In some cases, multiple transformations may be made available under selectable or stored program control. In any case, the resulting control voltages may be then treated as generalized control signals which are presented to the generalized interface 110. Alternatively, some of the control voltages may be used for specialized control signals, such as setting values for note-velocity, after-touch, etc.

Figure 10:
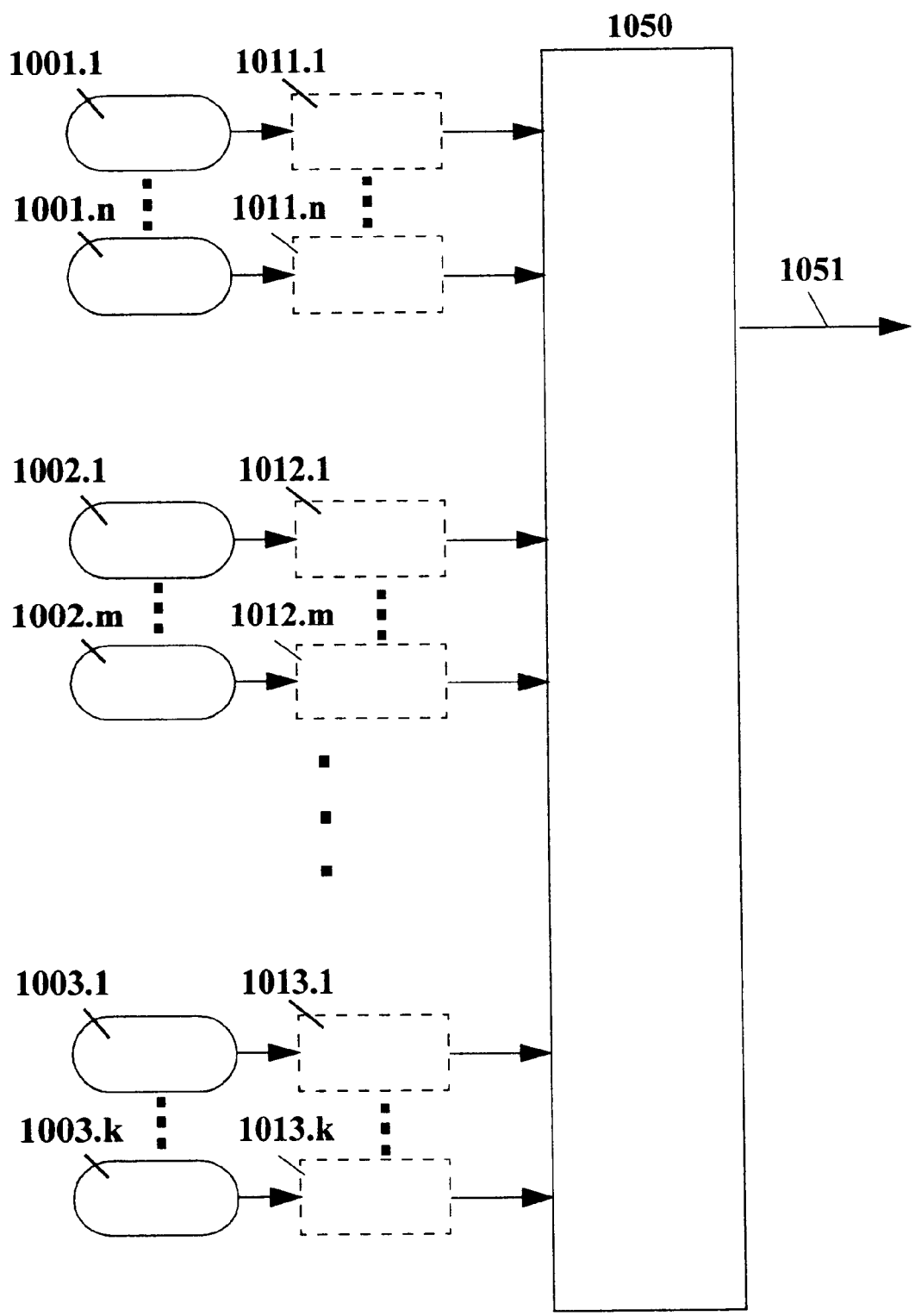
FIG. 10 shows an example implementation of both generalized and specific control signals derived from panel controls, actuators, and sensors using MIDI.

FIG. 10 shows an example implementation of both generalized and specific control signals derived from panel controls $1001.1-1001.n$, actuators $1002.1-1002.m$, and sensors $1003.1-1003.k$ as provided for by the invention. The panel controls $1001.1-1001.n$, actuators $1002.1-1002.m$, and sensors $1003.1-1003.k$ may or may not be provided with appropriate interface electronics, respectively $1011.1-1011.n$, $1012.1-1012.m$, and $1013.1-1013.k$ which deliver signals to a control signal formatter 1050 which issues control signals 1051. These control signals may be of various formats, for example MIDI.

2.1.4 Null/contact Touch-pads

Distinguished from panel controls and sensors considered above are what will be termed null/contact touch pads. This is a class of contact-position sensing devices that normally are in a null state unless touched and produce a control signal when touched whose signal value corresponds to typically one unique position on the touch-pad. Internal position sensing mechanisms may be resistive, capacitive, optical, standing wave, etc. Examples of these devices include one-dimensional-sensing ribbon controllers found on early Music synthesizers, two-dimensional-sensing pad such as the early Kawala pad and more modern mini-pads found on some lap-top computers, and two-dimensional-sensing see-through touch-screens often employed in public computer kiosks. As a music controller these devices are attractive in that they can very easily capture very expressive finger nuances as does a violin fingerboard or Koto bridge/string arrangement but not limit them to controlling only pitch. Two-dimensional versions of these devices also permit the use of spatial metaphors and notions of "musical finger-painting."

The null condition, when the pad is untouched, requires and/or provides the opportunity for special handling. Some example ways to handle the untouched condition include:

sample-hold (hold values issued last time sensor was touched, as does a joystick)

bias (issue maximal-range value, minimal-range value, mid-range value, or other value)

touch-detect on another channel (i.e., a separate out-of-band "gate" channel)

Example uses for these devices as controller elements within the context of the invention include any one or more of the following:

issuance of melodic or percussion note events pitch, amplitude, timbre, and location (i.e., panning, etc.) modulations lighting and/or special effects control general MIDI CC control signals Additional enhancements can be added to the adaptation of null/contact touch pad controllers as instrument elements. A first enhancement is, as discussed above for strum-pad elements, the addition of velocity and/or pressure sensing. This can be done via global impact and/or pressure-sensors in the same manner as described for the strum-pads. An extreme of this is implementation of the null/contact touch pad controller as a pressure-sensor array; this special case and its many possibilities are described later. On the simpler extreme, a null/contact touch pad together with such a global velocity and/or pressure-sensor can act as a rich metaphor for a drum head, gong surface, cymbal surface, etc. and as such may be played with fingers, whole hands, cushioned beaters, or sticks.

Figure 11:
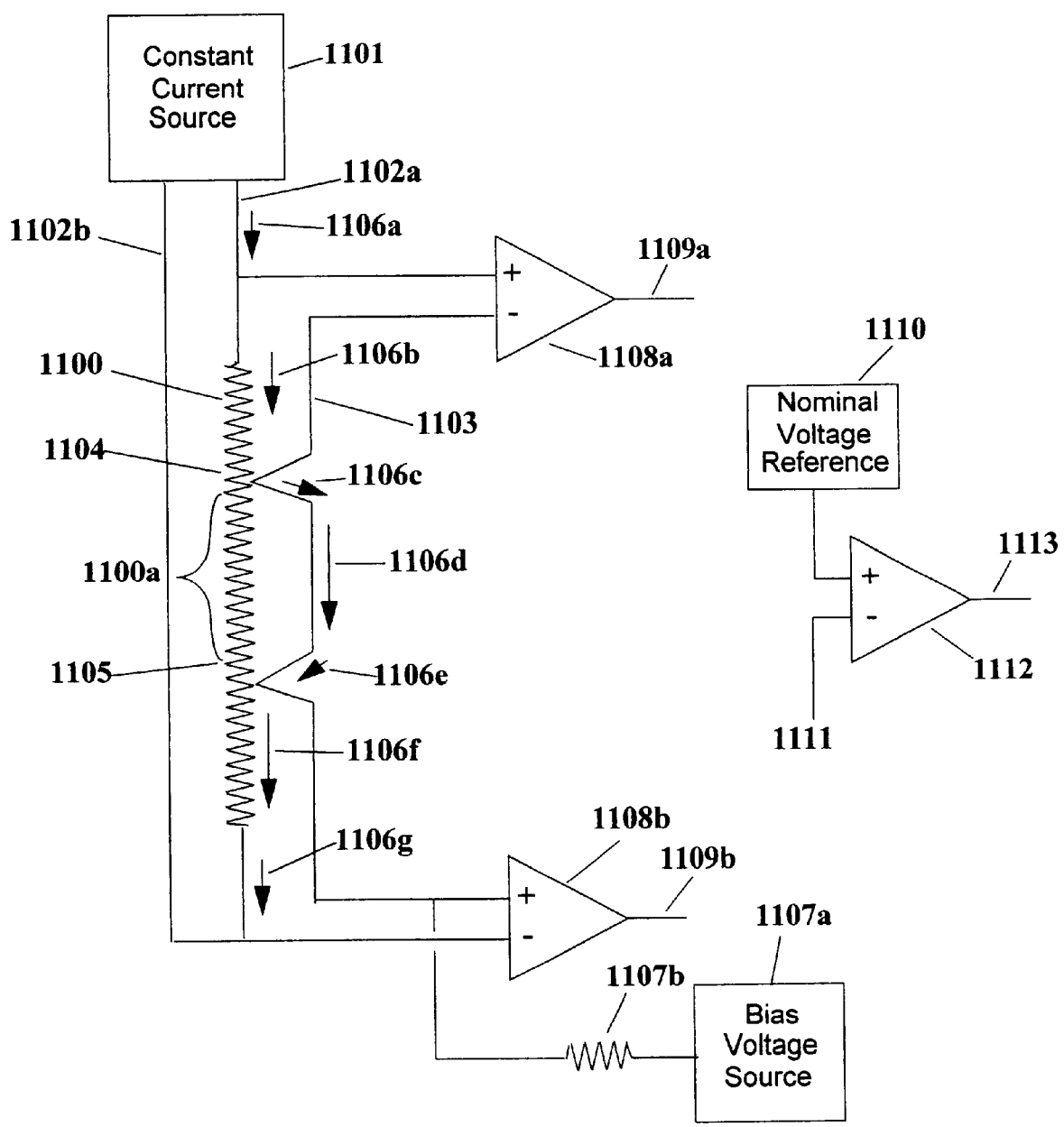
FIG. 11 shows an example of how two independent contact points can be independently discerned, or the dimensional-width of a single contact point can be discerned, for a resistance null/contact controller with a single conductive contact plate or wire and one or more resistive elements whose resistance per unit length is a fixed constant through each resistive element.

A second enhancement is the ability to either discern each dimensional-width of a single contact area or, alternatively, independently discern two independent contact points in certain types of null/contact controllers. FIG. 11 shows an example of how two independent contact points can be independently discerned, or the dimensional-width of a single contact point can be discerned, for a resistance null/contact controller with a single conductive contact plate (as with the Kawala pad product) or wire (as in a some types of ribbon controller products) and one or more resistive elements whose resistance per unit length is a fixed constant through each resistive element. It is understood that a one-dimensional null/contact touch pad typically has one such resistive element while a two-dimensional null/contact touch pad typically has two such resistive elements that operate independently in each direction. Referring to FIG. 11, a constant current source can be applied to the resistive element as a whole, developing a fixed voltage across the entire resistive element. When any portion of the resistive element is contacted by either a non-trivial contiguous width and/or multiple points of contact, part of the resistive element is shorted out, thus reducing the overall wind-to-end resistance of the resistance element. Because of the constant current source, the voltage developed across the entire resistive element drops by an amount equal to the portion of the resistance that is shorted out. The value of the voltage drop then equals a value in proportion to the distance separating the extremes of the wide and/or multiple contact points. By subtracting the actual voltage across the entire resistive element from the value this voltage is normally, a control voltage proportional to distance separating the extremes of the wide and/or multiple contact points is generated. Simultaneously, the voltage difference between that of the contact plate/wire and that of the end of the resistive element closest to an extremal contact point is still proportional to the distance from said end to said extremal contact point. Using at most simple op-amp summing and/or differential amplifiers, a number of potential control voltages can be derived; for example one or more of these six continuously-valued signals:

value of distance difference between extremal contact points (or "width"; as described above via constant current source, nominal reference voltage, and differential amplifier)

center of a non-trivial-width region (obtained by simple averaging, i.e., sum with gain of ½)

value of distance difference between one end of the resistive element and the closest extremal contact point (simple differential amplifier)

value of distance difference between the other end of the resistive element and the either extremal contact point (sum above voltage with "width" voltage with appropriate sign)

Further, through use of simple threshold comparators, specific thresholds of shorted resistive element can be deemed to be, for example, any of a single point contact, a recognized contact region width, two points of contact, etc., producing corresponding discrete-valued control signals. The detection of a width can be treated as a contact event for a second parameter analogous to the single contact detection event described at the beginning. Some example usage of these various continuous and discrete signals are:

existence of widths or multiple contact points may be used to trigger events or timbre changes degree of widths may be used to control degrees of modulation or timbre changes independent measurement of each extremal contact point from the same end of the resistive element can be used to independently control two parameters. In the simplest form, one parameter is always larger than another; in more complex implementations, the trajectories of each contact point can be tracked (using a differentiator and controlled parameter assignment switch); as long as they never simultaneously touch, either parameter can vary be larger or smaller than the other.

It is understood that analogous approaches may be applied to other null/contact touch pad technologies such as capacitive or optical.

A third possible enhancement is that of employing a touch-screen instance of null/contact touch pad and position it over a video display. In this case the video display signal may be created either within an instrument entity 100, within the signal routing, processing, and synthesis entity 120, or from external sources such as stage cameras, attached computers, etc. The video display could for example provide dynamically assigned labels, abstract spatial cues, spatial gradients, line-of-site cues for fixed or motor-controlled lighting, etc. which would be valuable for use in conjunction with the adapted null/contact touch pad controller.

Figure 12:
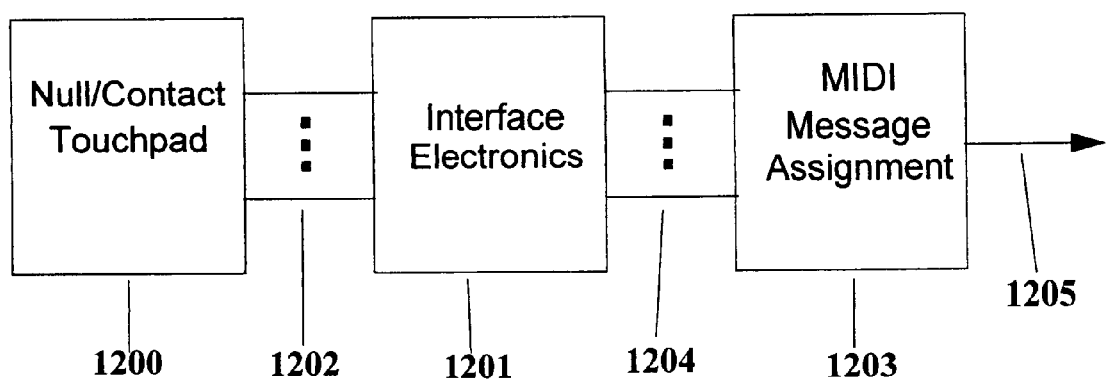
FIG. 12 shows an example implementation of both generalized and specific control signals derived from electrical contact touch-pads employing MIDI messages as the output control signal format.

These various methods of adapted null/contact touch pad elements can be used stand-alone or arranged in arrays (as in a percussion controller). In addition, they can be used as a component or addendum to instruments featuring other types of instrument elements. FIG. 12 shows an example implementation of both generalized and specific control signals derived from electrical contact touch-pads employing MIDI messages as the output control signal format.

2.1.5 Pressure-sensor Array Touch-pads

The invention provides for the selective inclusion of considerably advanced expressive control of electronic musical processes through use of a pressure-sensor array arranged as a touch-pad together with associated image processing. As with the null/contact controller, these pressure-sensor array touch-pads may be used stand-alone, organized into an array of such pads, and/or used as a component and/or addendum to instruments employing other types of instrument elements.

It is noted that the inventor's original vision of the below described pressure-sensor array touch-pad was for applications not only in music but also for computer data entry, computer simulation environments, and real-time machine control, applications to which the below described pressure-sensor array touch-pad clearly can also apply.

Figure 13:
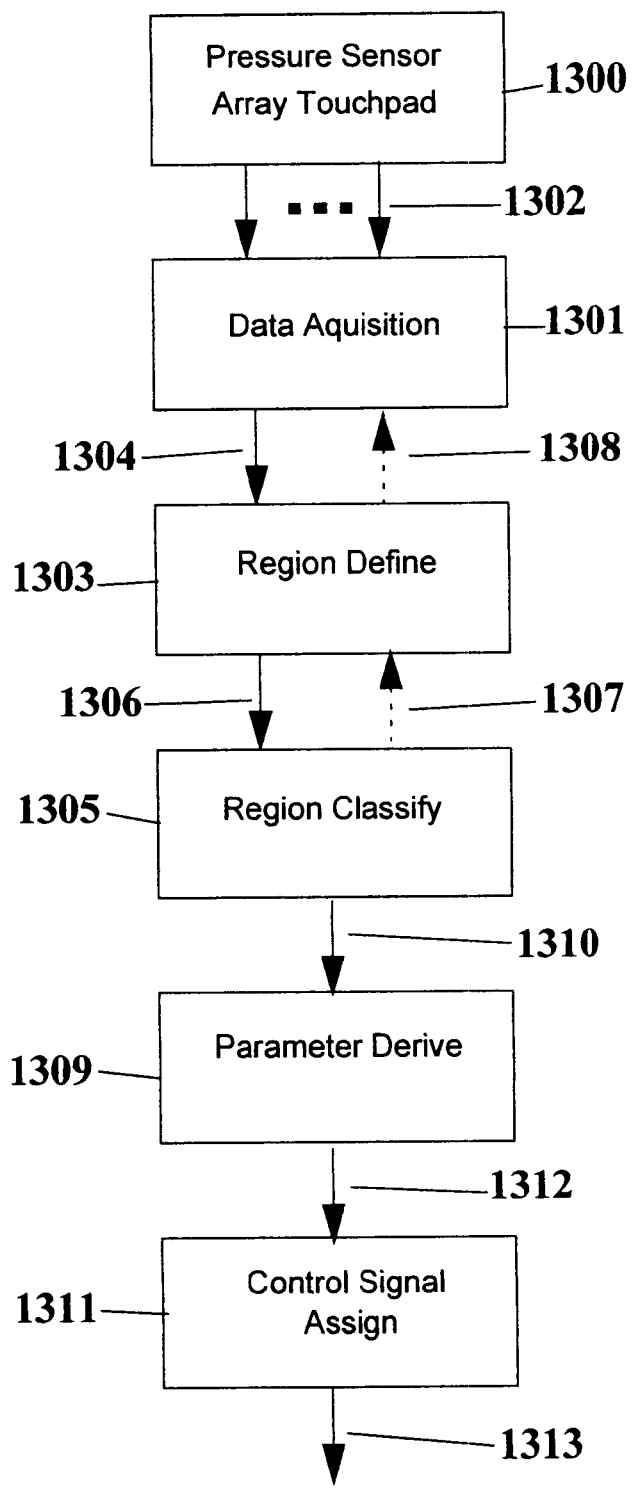
FIG. 13 shows how a pressure-sensor array touch-pad can be combined with image processing to assign parameterized interpretations to measured pressure gradients and output those parameters as control signals.

A pressure-sensor array touch-pad of appropriate sensitivity range, appropriate "pixel" resolution, and appropriate physical size is capable of measuring pressure gradients of many parts of the flexibly-rich human hand or foot simultaneously. FIG. 13 shows how a pressure-sensor array touch-pad can be combined with image processing to assign parameterized interpretations to measured pressure gradients and output those parameters as control signals.

The pressure-sensor "pixels" 1300 of a pressure-sensor array touch-pad 1301 are interfaced to a data acquisition stage 1302. The interfacing method may be fully parallel but in practice may be advantageously scanned at a sufficiently high rate to give good dynamic response to rapidly changing human touch gestures. To avoid the need for a buffer amplifier for each pressure-sensor pixel 1300, electrical design may carefully balance parasitic capacitance of the scanned array with the electrical characteristics of the sensors and the scan rates; electrical scanning frequencies can be reduced by partitioning the entire array into distinct parts that are scanned in parallel so as to increase the tolerance for address settling times and other limiting processes. Alternatively, the pressure-sensor array 1301 may be fabricated in such a way that buffer amplifier arrays can be inexpensively attached to the sensor array 1301, or the sensors 1300 may be such that each contains its own buffer amplifier; under these conditions, design restrictions on scanning can be relaxed and operate at higher speeds. Although the pressure-sensors may be likely analog in nature, a further enhancement would be to use digital-output pressure-sensor elements or sub-arrays. A particularly useful example of sensor sub-arrays is presented in a few paragraphs.

The data acquisition stage 1302 looks for sensor pixel pressure measurement values that exceed a low-level noise-rejection/deformity-rejection threshold. The sufficiently high pressure value of each such sensor pixel 1300 is noted along with the relative physical location of that pixel (known via the pixel address). This noted information may be stored "raw" for later processing and/or may be subjected to simple boundary tests and then folded into appropriate running calculations as will be described below. In general, the pressure values and addresses of sufficiently high pressure value pixels are presented to a sequence of processing functions which may be performed on the noted information:

contiguous regions of sufficiently high pressure values are defined (a number of simple run-time adjacency tests can be used; many are known—see for example [Ronse; Viberg; Shaperio; Hara])

the full collection of region boundaries are subjected to classification tests; in cases a given contiguous region may be split into a plurality of tangent or co-bordered independently recognized regions various parameters are derived from each independent region, for example geometric center, center of pressure, average pressure, total size, angle-of-rotation-from-reference for non-round regions, second-order and higher-order geometric moments, second-order and higher-order pressure moments, etc.

assignment of these parameters to the role of specific control signals (note events, control parameters, etc.) which are then output to the signal routing, processing, and synthesis entity 120; for example, this may be done in the form of MIDI messages.

Because of the number processes involved in such a pipeline, it is advantageous to follow a data acquisition stage 1302 with one or more additional processing stages 1303. Of the four example processing functions listed above, the first three fall in the character of image processing. It is also possible to do a considerable amount of the image processing steps actually within the data acquisition step, namely any of simple adjacency tests and folding selected address and pressure measurement information into running sums or other running pre-calculations later used to derive aforementioned parameters. The latter method can be greatly advantageous as it can significantly collapses the amount of data to be stored.

Figure 14:
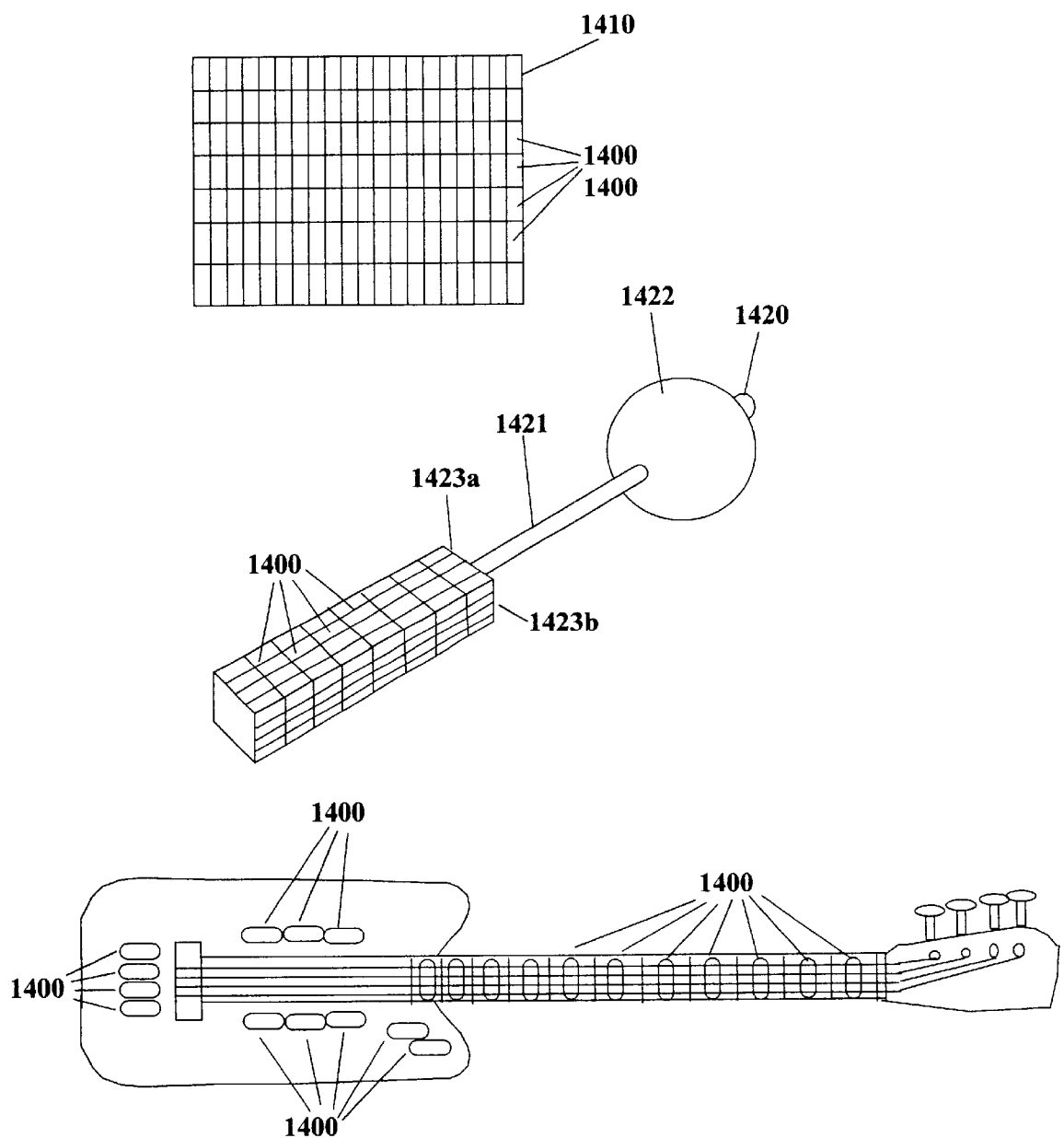
FIG. 14 illustrates the positioning and networking of pressure sensing and processing "mini-array" chips in both larger contiguous structures and in isolated use on instrument keys, instrument fingerboards, and instrument bodies.

Regardless of whether portions of the image processing are done within or beyond the data acquisition stage, there are various hardware implementations possible. One hardware approach would involve very simple front-end scanned data acquisition hardware and a single high-throughput microprocessor/signal-processor chip. Alternatively, an expanded data acquisition stage may be implemented in high-performance dedicated function hardware and this would be connected to a lower performance processor chip. A third, particularly advantageous implementation would be to implement a small pressure-sensor array together with data equitation and a small processor into a single low-profile chip package that can be laid as tiles in a nearly seamless larger array. Such "mini-array" chips have additional value as they can readily be put on instrument keys (as described below), instrument fingerboards, instrument bodies, etc. In such an implementation all image processing could in fact be done via straightforward partitions into message-passing distributed algorithms. One or more individual chips could direct output parameter streams to an output processor which would organize and/or assign parameters to output control channels, perhaps in MIDI format, perhaps in a programmable manner under selectable stored program control. A tiled macro array of such "sensor mini-array" chips could be networks by a tapped passive bus, one- or two-dimensional mode active bus daisy-chain, a potentially expandable star-wired centralized message passing chip or subsystem, or other means. Creating a large surface from such "tile chips" will aid in the serviceability of the surface. Since these chips can be used as tiles to build a variety of shapes, it is therefore possible to leverage a significant manufacturing economy-of-scale so as to minimize cost and justify more extensive feature development. Advanced seating and connector technologies, as used in laptops and other high-performance miniature consumer electronics, can be used to minimize the separation between adjacent chip "tiles" and resultant irregularities in the tiled-surface smoothness. A tiled implementation may also include a thin rugged flexible protective film that separates the sensor chips from the outside world. FIG. 14 illustrates the positioning and networking of pressure sensing and processing "mini-array" chips in both larger contiguous structures and in isolated use on instrument keys, instrument fingerboards, and instrument bodies.

With the perfection of a translucent pressure-sensor array, it further becomes possible for translucent pressure-sensor arrays to be laid atop aligned visual displays such as LCDs, florescent, plasma, CRTs, etc. as was discussed above for null/contact touch-pads. The displays can be used to label areas of the sensor array, illustrate gradients, etc. Note that in the "tile chip" implementation, monochrome or color display areas may indeed be built into each chip.

Returning now to the concept of a pressure-sensor array touch-pad large enough for hand-operation: examples of hand contact that may be recognized, example methods for how these may be translated into control parameters, and examples of how these all may be used are now described. In the below the hand is used throughout as an example, but it is understood that the foot or even other body regions, animal regions, objects, or physical phenomena can replace the role of the hand in these illustrative examples.

Figure 15:
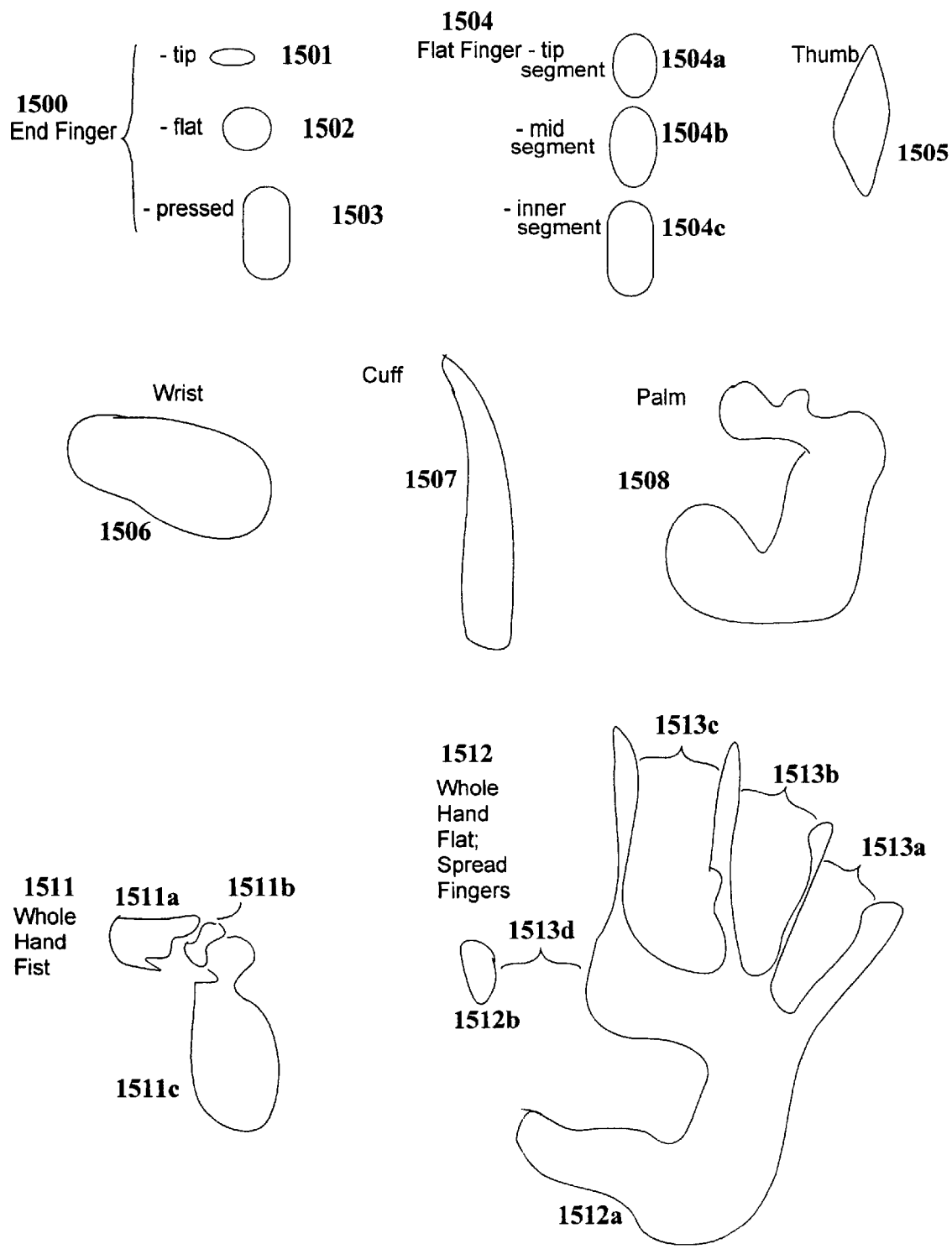
FIG. 15 illustrates the pressure profiles for a number of example hand contacts with a pressure-sensor array.

FIG. 15 illustrates the pressure profiles for a number of example hand contacts with a pressure-sensor array. In the case 1500 of a finger's end, pressure on the touch pad pressure-sensor array can be limited to the finger tip, resulting in a spatial pressure distribution profile 1501; this shape does not change much as a function of pressure. Alternatively, the finger can contact the pad with its flat region, resulting in light pressure profiles 1502 which are smaller in size than heavier pressure profiles 1503. In the case 1504 where the entire finger touches the pad, a three-segment pattern (1504a, 1504b, 1504c) will result under many conditions; under light pressure a two segment pattern (1504b or 1504c missing) could result. In all but the lightest pressures the thumb makes a somewhat discernible shape 1505 as do the wrist 1506, cuff 1507, and palm 1508; at light pressures these patterns thin and can also break into disconnected regions. Whole hand patterns such the fist 1511 and flat hand 1512 have more complex shapes. In the case of the fist 1511, a degree of curl can be discerned from the relative geometry and separation of sub-regions (here depicted, as an example, as 1511a, 1511b, and 1511c). In the case of the whole flat hand 1500, there can be two or more sub-regions which may be in fact joined (as within 1512a) and/or disconnected.(as an example, as 1512a and 1512b are); the whole hand also affords individual measurement of separation "angles" among the digits and thumb (1513a, 1513b, 1513c, 1513d) which can easily be varied by the user.

Relatively simple pattern recognition software can be used to discern these and other hand contact patterns which will be termed "postures." The pattern recognition working together with simple image processing may, further, derive a very large number of independent control parameters which are easily manipulated by the operating user. In many cases it may be advantageous to train a system to the particulars of a specific person's hand(s) and/or specific postures. In other situations the system may be designed to be fully adaptive and adjust the a persons hand automatically. In practice, for the widest range of control and accuracy, both training and ongoing adaptation may be useful. Further, the recognized postures described thus far may be combined in sequence with specific dynamic variations among them (such as a finger flick, double-tap, etc.) and as such may be also recognized and thus treated as an additional type of recognized pattern; such sequential dynamics among postures will be termed "gestures." The admission of gestures further allows for the derivation of additional patterns such as the degree or rate of variation within one or more of the gesture dynamics. Finally, the recognized existence and/or derived parameters from postures and gestures may be assigned to specific outgoing control signal formats and ranges. Any training information and/or control signal assignment information may be stored and recalled for one or more players via stored program control.

Figure 16:
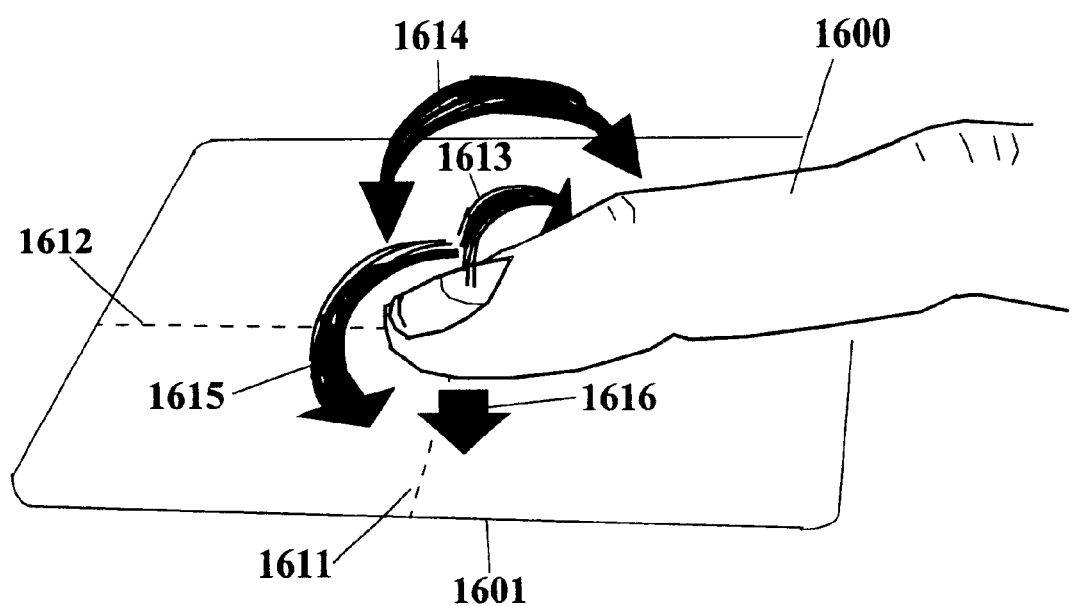
FIG. 16 illustrates how six degrees of freedom can be recovered from the contact of a single finger.

For each recognized pattern, the amount of information that can be derived as parameters is in general very high. For the human hand or foot, there are, typically, artifacts such shape variation due to elastic tissue deformation that permit recovery of up to all six degrees of freedom allowed in, an object's orientation in 3-space. FIG. 16 illustrates how six degrees of freedom can be recovered from the contact of a single finger. In the drawing, the finger 1600 makes contact with the touch-pad 1601 with its end segment at a point on the touch-pad surface determined by coordinates 1611 and 1612 (these would be, for example, left/right for 1611 and forward/backward for 1612). Fixing this point of contact, the finger 1600 is also capable of rotational twisting along its length 1613 as wall as rocking back and forth 1614. The entire finger can also be pivoted with motion 1615 about the contact point defined by coordinates 1611 and 1612. These are all clearly independently controlled actions, and yet it is still possible in any configuration of these thus far five degrees of freedom, to vary the overall pressure 1616 applied to the contact point. Simple practice, if it is even needed, allows the latter overall pressure 1616 to be independently fixed or varied by the human operator as other parameters are adjusted.

In general other and more complex hand contacts, such as use of two fingers, the whole hand, etc. forfeit some of these example degrees of freedom but often introduce others. For example, in the quite constrained case of a whole hand posture, the fingers and thumb can exert pressure independently (5 parameters), the finger and thumb separation angles can be varied (4 parameters), the finger ends 1504a can exert pressure independently from the middle 1504b and inner 1504c segments (4 parameters), the palm can independently vary its applied pressure (1 parameter) while independently tilting/rocking in two directions (3 parameters) and the thumb can curl (1 parameter), yielding 17 instantaneously and simultaneously measurable parameters which are independently adjustable per hand. Complex contact postures may also be viewed as, or decomposed into, component sub-postures (for example here, as flat-finger contact, palm contact, and thumb contact) which would them derive parameters from each posture independently. For such complex contact postures, recognition as a larger compound posture which may then be decomposed allows for the opportunity to decouple and/or renormalize the parameter extraction in recognition of the special affairs associated with and constraints imposed by specific complex contact postures.

It is noted that the derived parameters may be preprocessed for specific uses. One example of this would be the quantization of a parameter into two or more discrete steps; these could for example be sequentially interpreted as sequential notes of a scale or melody. Another example would be that of warping a parameter range as measured to one with a more musically expressive layout.

Next examples of the rich metaphorical aspects of interacting with the pressure-sensor array touch-pad are illustrated. In many cases there may be one or more natural geometric metaphor(s) applicable, such as associating left-right position, left-right twisting, or left-right rotation with stereo paning, or in associating overall pressure with volume or spectral complexity. In more abstract cases, there may be pairs of parameters that go together—here, for example with a finger end, it may be natural to associate one parameter pair with (left/right and forward/backward) contact position and another parameter pair with (left/right and forward/backward) twisting/rocking. In this latter example there is available potential added structure in the metaphor by viewing the twisting/rocking plane as being superimposed over the position plane. The superposition aspect of the metaphor can be viewed as an index, or as an input-plane/output-plane distinction for a two-input/two-output transformation, or as two separated processes which may be caused to converge or morph according to additional overall pressure, or in conjunction with a dihedral angle of intersection between two independent processes, etc.

Next, examples of the rich syntactical aspects of interacting with the pressure-sensor array touch-pad are illustrated. Some instruments have particular hand postures naturally associated with their playing, particularly hand drums and especially Persian and Indian hand drums (such as the tabla/baya bols, dumbek, etc.). It is natural then to recognize these classical hand-contact postures and derive control parameters that match and/or transcend how a classical player would use these hand positions to evoke and control sound from the instrument. Further, some postures could be recognized either in isolation or in gestural-context as being ones associated with (or assigned to) percussion effects while remaining postures may be associated with accompanying melodies or sound textures. As an additional syntactic aspect, specific hand postures and/or gestures may mapped to specific selected assignments of control signals in ways affiliated with specific purposes. For example, finger ends may be used for one collection of sound synthesis parameters, thumb for a second potentially partially overlapping collection of sound synthesis parameters, flat fingers for a third partially-overlapping collection, wrist for a fourth, and cusp for a fifth, and fist for a sixth. In this case it may be natural to move the hand through certain connected sequences of motions; for example: little finger end, still in contact, dropping to flat-finger contact, then dropping to either palm directly or first to cusp and then to palm, then moving to wrist, all never breaking contact with the touch-pad. Such permissible sequences of postures that can be executed sequentially without breaking contact with the touch-pad will be termed "continuous grammars." Under these circumstances it is useful to set up parameter assignments, and potentially associated context-sensitive parameter renormalizations, that work in the context of selected (or all available) continuous grammars. For example, as the hand contact evolves as being recognized as one posture and then another, parameters may be smoothly handed-over in interpretation from one posture to another without abrupt changes, while abandoned parameters either hold their last value to return to a default value (instantly or via a controlled envelope).

Now a number of example applications of the pressure-sensor array touch-pad are provided. A natural start for a first example is that of the Indian tabla and baya; here the traditional bols are recognized and used to control synthesized or sample-playback sound generation. The produced sound can be authentic or transcend the classical instrument. Additional posture and gesture recognition can be added in either sound generation style to expand the available sounds and/or control additional signal processing such as location modulation, muffling or peaking filtering, reverb, sustain, instrument pitch, etc. Considering hand drums more generally it is noted that whole-hand slaps are commonly used in the technique but that the spread of the fingers in the hand slap or hand after-touch of the drum head typically provide no usable control. With the system described above, details of at least four parameters of finger spread and even more on whole-hand posture in whole-hand slaps and on-going after-touch pressing may be used for extensive timbre variation.

Next, examples are given as to how derived parameters may be used to control musical processes and lighting control, effectively allowing one to "fingerpaint" with sound and/or light. There are a large number of ways in which six parameters of synthesizer "voices" may be controlled with one finger. One possible example of a mapping is to use all six parameters to control prominent features of a single synthesizer voice:

left/right position: pitch in/out position: volume left/right twist: waveform morphing dimension 1 ("duty cycle," even-harmonic content, etc.)

in/out rock: waveform morphing dimension 2 ("waveform curvature," odd-harmonic content, etc.)

rotation: stereo pan overall pressure: filter opening

Another example is that of controlling two voices with one finger:

left/right position: pitch of voice 1 in/out position: pitch of voice 2 left/right twist: pan or filter opening of voice 1 in/out rock: pan or filter opening of voice 2 rotation: relative volume balance of voice pair overall pressure: total volume of voice pair By assigning pitch to an aspect of physical contact that is geometrically large (i.e, position on the pad), it is possible to get a great deal of accuracy in pitch control. In potentially typically cases where pitch choices are to be associated with traditional scales, the pitch control parameter may be quantized into discrete steps and each step assigned to a note in a scale or melody. At the point of contact within a selected quantization interval, a small "vibrato" neighborhood may then be defined so that wiggling the finger position is mapped to a vibrato-range pitch variation (as on a violin string). If the spatially-quantized positions are mapped to notes in a melody, it is possible to set up mappings for several musical phrases or in fact an entire melodic line start-to-finish. In the latter circumstance, it may be desirable to either "page" the pitch assignments to give up one of the position parameters for sound control or instead use it for laying out the melody geometrically as per a sheet of music; here the spatial quantization may be uniformly spaced or under limited degrees be proportional to the pitch duration of the associated note. The sheet-music layout is particularly interesting because it allows the performer to concentrate extreme dexterity in the timbre and timing expression of a melody without having to devote very much effort or attention to the selection of pitch value. The resulting allocation shift of performer attention is very valuable as the amount of expression and variations in timbre are often what distinguish a spellbinding performance from a run-of-the-mill performance. Although purist musicians may scoff at the release from pitch selection struggles endemic in musical instruments over the centuries, they are also known to spend thousand of dollars on finest-instruments that allow additional nuances of expression and spend many, many years of their lives making pitch selection efforts nearly as subconscious as this instrument approach does. This class of instrument controller, then, allows those years of skill development to be devoted directly to perfecting advanced degrees of musical expression, potentially higher than may be achieved with conventional human life spans, traditional real-time instruments, and orchestra-conductor protocol.

Leaving higher callings in music for the moment, it is also possible to use the pressure-sensor array touch-pad for lighting control, particularly multi-channel lighting and/or motor-controlled (any one or more of pan, tilt, zoom, gel, pattern-gel orientation, etc.) lighting. In multiple-light control situations, regions of the pad may be quantized into cells, each associated with a particular light and parameters within the region, controlling any of: light, brightness, position, zoom, gel, gel-pattern-orientation, etc. What can be especially interesting in performance is to combine music process control with lighting control. Some postures, gestures, or pad-regions may be exclusively devoted to only music control or only lighting control parameters, but other postures, gestures, or pad-regions may be set up to intermingle and/share parameter assignments between music and lights.

It is also known to be possible and valuable to use the aforementioned pressure-sensor array touch-pad, implicitly containing its associated data acquisition, processing, and assignment elements, for many, many non-musical applications such as general machine control and computer workstation control. One example of machine control is in robotics: here a finger might be used to control a hazardous material robot hand as follows:

left/right position: left/right hand position in/out position: in/out hand position in/out rock: up/down hand position rotation: hand grip approach angle overall pressure: grip strength left/right twist: gesture to lock or release current grip from pressure control A computer workstation example may involve a graphical Computer-Aided Design application currently requiring intensive mouse manipulation of parameters one or two at a time:

left/right position: left/right position of a selected symbol in a 2-D CAD drawing in/out position: up/down position of a selected symbol in 2-D CAD drawing left/right twist: symbol selection—left/right motion through 2-D pallet in/out rock: symbol selection—up/down motion through 2-D pallet rotation: rotation of selected symbol in the drawing overall pressure: sizing by steps tap of additional finger: lock selection into drawing or unlock for changes tap of thumb: undo palm: toggle between add new object and select existing object Clearly a symbol can be richly interactively selected and installed or edited in moments as opposed to tens to hundreds of seconds as is required by mouse manipulation of parameters one or two at a time and the necessary mode-changes needed to change the mouse action interpretation.

2.1.6 Multi-parameter Instrument Keys

The famous multiple tape-loop Melletron product had keys which served to a rough extent as per-note volume controls, allowing valuable relative voice level variations. Robert Moog patented a key with a two-dimensional touch sensor on a keyboard key surface. The present invention allows for the synergistic combination of these technologies so as to create a three-parameter controlling key particularly suited to vowel-choir synthesis and other applications, next extends this to include more arbitrary instrument keys (such as those on a woodwind), and finally develops multi-parameter sensing keys further by incorporation of the aforementioned pressure-sensor array touch-pad on each key.

Figure 17:
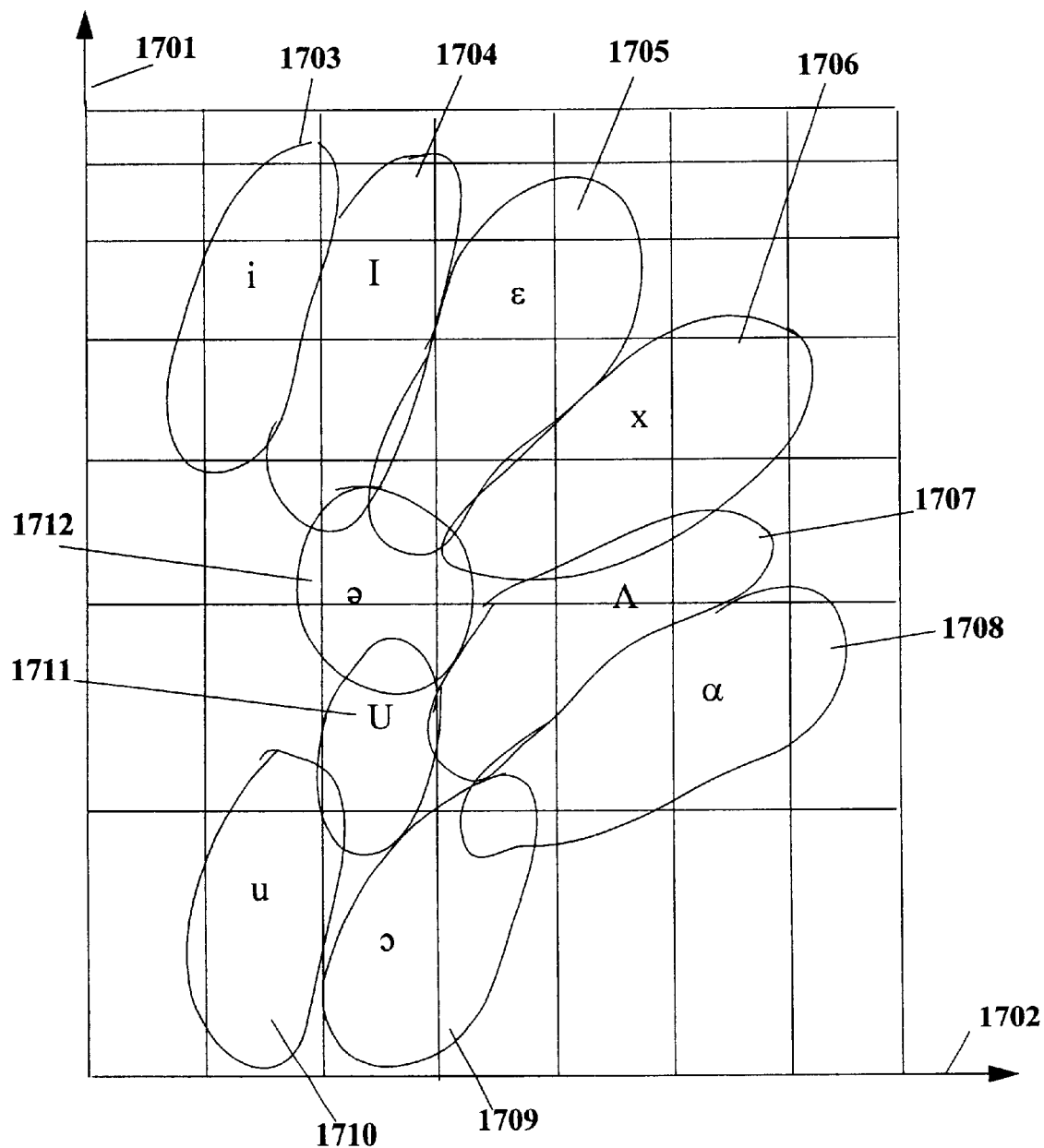
FIG. 17 illustrates the regions of vowel sounds associated with particular resonant frequency combinations in vowel sound production.

When voice choirs are used as instrumentation rather than the deliverer of libretto, the principal parameters are typically the vowel sound used and the relative amplitude of each vocal line. If these parameters were to be controlled by a keyboard, and for the moment if unisons of two or more vocal lines were excluded (unisons will in fact be handled later), each vocal line would be at a different pitch from the others. This allows at any particular instant specific keys on a keyboard to be uniquely associated with one vocal line apiece. As with the now somewhat traditional Melletron, the displacement of key sounding the note of a particular vocal line then may be used to control the volume of that vocal line. By incorporating a two-dimensional touch-pad controller to each key, it is also possible to select and in fact vary the vowel sound. In phonetics and vocal pedagogy it is well known [Appelman, Winckel] that the quality of the vowel is largely determined by the frequencies of resonances produce by the vocal cavity. In fact, the full range of realistic vowel sounds may be created by passing simple sawtooth or narrow-wide pulse oscillator waveforms into a pair of band emphasis filters, the vowel sounds varying as the filter emphasis frequencies are varied. FIG. 17, adapted from Winckel, illustrates the regions of vowel sounds associated with particular resonant frequency combinations in vowel sound production. Clearly there are two dimensions, then, which control vowel quality at this level of approximation, and further the surface of the key may be viewed as a metaphor for the plot of FIG. 17. Further details of effective choir synthesis and variations upon it are discussed later, but the synergistic value of the two-dimensional touch-pad key surface and key displacement as sources of control signals for choir synthesis is clearly established. In fact, this three-parameter per individual synthesizer "voice" may be very valuable in at least two additional situations.

Figure 18:
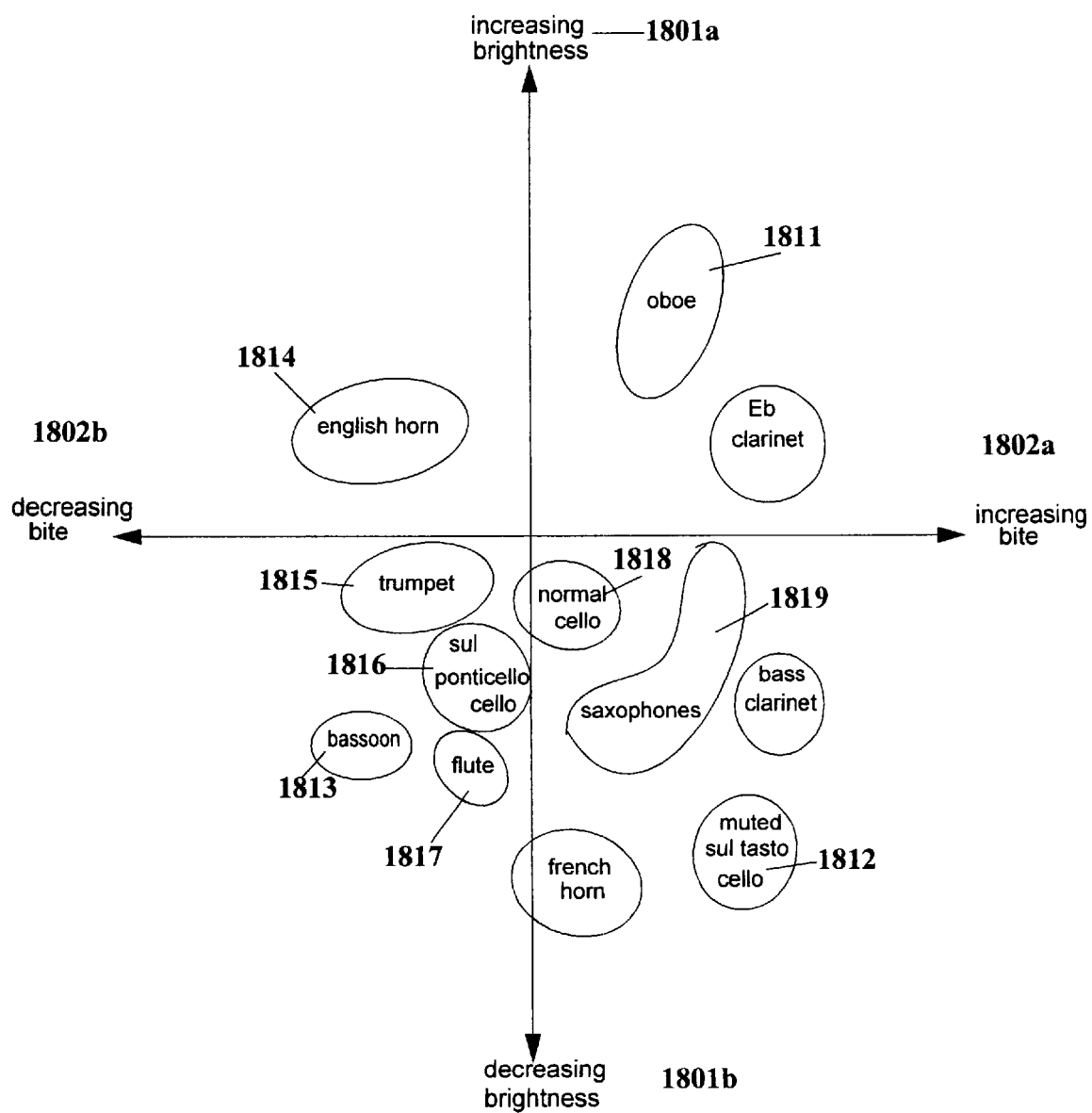
FIG. 18 illustrates an example two-dimensional timbre space in traditional instrument orchestration.

In a first of these additional situations, it is first noted that in traditional multiple-instrument orchestration, the principal parameters are volume and timbre. Using the aforementioned three-parameter key arrangement, key displacement may again be used for per-note volume control, leaving the remaining two dimensions for timbre control. Wessel and others have shown empirically that continuous multidimensional "timbre spaces" are useful organizations for analyzing and executing orchestration aspects of timbre assignment. Often two-dimensional timbre spaces offer a more than rich enough environment to be very useful. FIG. 18, adapted from Wessel, illustrates some example two-dimensional timbre spaces from traditional instrument orchestration. Again, a metaphor may be made between these two-dimensional graphs and the two-dimensional touch-pad key surface. The implementation on the synthesis side may be implemented by methods as simple as volume cross-fading of sampled traditional instruments (and/or synthesized sounds) to methods as sophisticated as morphable numeric instrument models.

The second additional situation also pertains to so-called model-based synthesis (as employed in the Yahama VL1) but over a lesser range of timbre variation, in fact a range typically within the scope associated with a single instrument rather than a multi-instrument orchestration environment. Model-based synthesis typically has an abundance of parameters and a dearth of effective methods for controlling them. Selected parameters, in fact, are controlled with global control interfaces such as a wheel, joystick, or breath controller. Because of the need for associating parameter control with each note, rather than a group of notes, the best model-based synthesis engines then have been monophonic (i.e., only producing one note at a time). The invention's provision of a keyboard with the availability of three parameters tied specifically and independently to each key is an ideal solution to a polyphonic model-based synthesis instrument.

It is noted that choir synthesis, dynamic timbre-space based orchestration, and polyphonic model-based synthesis instruments require the synergistic combination of key displacement and key surface touch-pad, while the said combination also is fully capable of implementing Moog's original vision for two-dimensional synthesis control (filter parameters, oscillator waveforms, etc.) and as an alternative implementation to MIDI keyboard channel pressure which typically requires each active key to be fully displaced.

The invention also provides for the application control discussed above to be enhanced yet further by placing a pressure-sensor array touch-pad on each key. In the limit, this would allow each key to derive up to six parameters for each point of contact on a key and even multiple points of contact (i.e., more than one finger) per key. Although custom pressure-sensor array touch-pads could be crafted for the keys, it is advantageous to employ the aforementioned pressure sensing and processing "mini-array" chips. In fact, applications to key surfaces could be used to dictate the canonical dimensions of the chips, for example the width of the top surface of a black key and a length that is a least common multiple of a black key surface length and a white key surface length.

Figure 19:
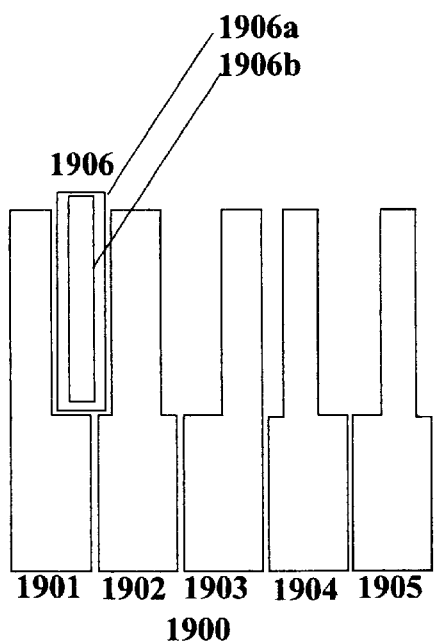
FIG. 19 shows an example of keys from a traditional Western keyboard fitted with multiple uniformly-sized pressure-sensing and processing "mini-array" chips.
Figure 19:
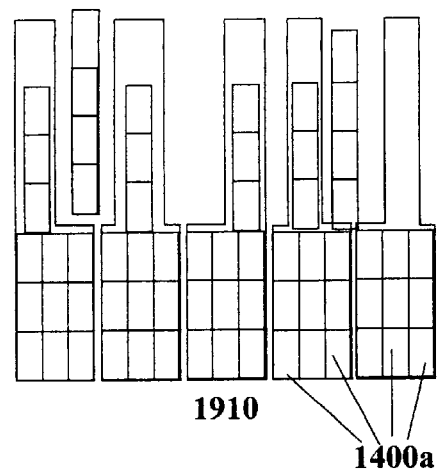
Figure 19:
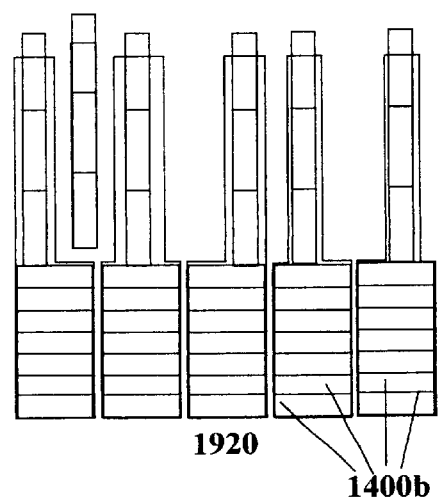
Figure 19:
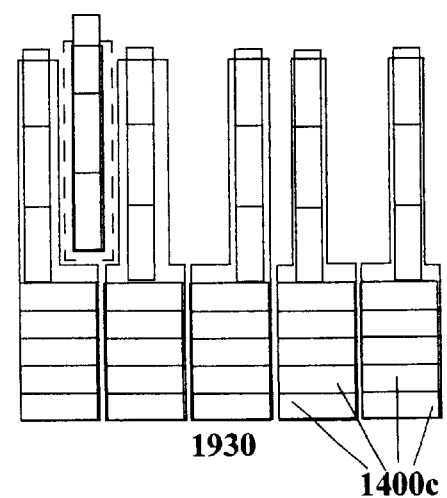

FIG. 19 shows an example of keys from a traditional Western keyboard fitted with multiple uniformly-sized pressure-sensing and processing "mini-array" chips. These chips may be interconnected using the networking features described earlier. Alternatively, special pressure-sensing and processing "mini-array" keys may be made without the chip as a tiling sub-component; these would be networked in the same fashion. As to how the uniformly-sized pressure-sensing and processing "mini-array" chips could be applied to the keys, FIG. 19 first shows the collection of key shapes 1900 used to make a conventional Western keyboard. There are five types of white key shapes (1901–1905) and one black key shape 1900 used, although the black key 1900 may have a taper leading from its widest base area 1906*a* to a narrower top area 1906*b*. Each of these white keys may be viewed in general terms as the combination of two adjoined areas: one forward area rectangle of dimensions 0.75" by 1.75" and a rear area bar typically at least 0.375" wide (varying with different styles of keys). One example black key has a taper leading to a top surface 1906*b* of 0.25" wide by 2" deep, and another example black key has a lesser taper with a top surface 1906*b* hat is 0.3125" wide by 2" deep. As one example, a sensor size of 0.25" wide by 0.58" deep could be tiled on the six keys 1901–1906 according to the arrangement of 1910. As another example, a sensor size of 0.25" wide by 0.75" deep could be tiled on the six keys 1901–1906 according to the arrangement of 1920. As a third example, a sensor size of 0.75" deep could be tiled on the six keys 1901–1906 according to the arrangement of 1930.

A point not discussed yet—though relevant to all the controllers—is one that is especially relevant to all forms of multi-parameter touch-sensing keys: that is the perceptual trade-off between note duration and the perception of timbre detail. In short duration notes the ear is not able to gather much information about the timbre of the note, while in long notes the ear typically examines the timbre, as well as any inherent harmonic animation therein, in considerable detail and becomes easily turned away when there is no variation, or easily learned predictable variation, in harmonic content over time. The multi-parameter touch-sensing keyboard is thus well-targeted for this phenomenon in hearing. On rapid notes multi-parameter touch-sensing keys may actually be played with increasing degrees of timbre-control arbitrariness, while longer notes may be played with a great deal of timbre and amplitude variation. Although two degrees of freedom afford by the Moog key is helpful in adding per-voice expression for long-duration notes, the three degrees of freedom provided by the aforementioned techniques in practice seems to be a minimal control-dimensionality threshold for useful musical expression. A venture as to why two parameters are not enough could start with the fact that there is great importance in relative volume variation between voices—this leaves only one parameter then for timber variation which quickly bores the ear; adding another dimension allows for more sophisticated temporal interplays and variations over time in timbre qualities. Empirical support for this is seen in the fact that discussions of "timbre space" and "sound color" in the literature devote a minimum of two-dimensions to timbre. A venture as to why the interplay of two timbre dimensions itself is a minimal control-dimensionality threshold for timbre could resort to an abstraction of FIG. 17: human hearing is attuned to speech which is in turn a sequence of phonemes—each phoneme, roughly, is a vowel sound modulated in time according to some consonant aspects and supplemented by, loosely, "percussive" effects in other consonant aspects. With respect to timbre in phonemes, the ability of human hearing to follow and distinguish vowels and their modulation (including diphthongs) is largely centered on essentially independent variation in the two formats. Thus, it could be postulated that amplitude variation together with two-dimensional timbre variation engages the speech center of the brain in a full and natural way. As with speech, words and phonemes spoken quickly cannot be discerned with nearly as much expression as words and phonemes spoken in long duration can, and in long duration phonemes the ear is pleased with expressive fluctuations in timbre and amplitude.

Finally, as to the handling of unisons (and the related problem of melodic line pitch crossings of uncommon timbre), in usual practice (and prior to the invention) these are typically addressed by use of multiple keyboards or by a split of keyboard ranges into independently interpreted zones. The addition of proximate keyboards and superimposed keyboards as afforded by the invention significantly enhances the practical extent to which and ease by which unisons and melodic line pitch crossings may be handled. As a simple example, if all melodic lines have timbre ranges that lie in a common range, and unisons sharing the same timbre unisons may be naturally handled by superimposed keyboard aspect of the invention—push the key deeper, or harder, for two (or sequentially, three, four, etc.) notes in unison all following the same timbre control. More generally, proximate keyboards may be used to partition the notes that may be played with one hand between two, and in some cases three, distinct keyboards; this freely allows the player, in all but some pathological cases, to independently control unisons and melodic line pitch crossings without constraint as to relative timbre differences.

2.1.7 Video Cameras and Other Optically-controlled Sensors

Video cameras and other optically-controlled sensors may also be used as control elements within an instrument 100. As with other instrument elements, video cameras and other optically-controlled sensors may be used stand-alone, in arrays, or as component/addendum to other instruments. Video cameras are especially interesting as controllers because of available image processing, image recognition, and image motion tracking utilities which have been developed for manufacturing inspection, medicine, and motion-video compression together with the ability to actually display a real-time image in recording or performance.

2.1.7.1 Non-video Optically-controlled Sensors

So as to devote most of the discussion to video, the case of simple non-video optically-controlled sensors is first considered. A simple example is a set of photo-detectors which are used to discretely trigger one or more note, lighting, or special effect events. For example, a light-harp without strings may trigger notes, potentially together with selected stage lights and artificial fog blasts, as the fingers interrupt light beams directed towards the photo-detectors. Another example is that of a stage area with an array of light beams directed towards an associated first group of photo-detectors: the beams to individual photo-detectors of this first group may be interrupted, or redirected by means of reflective surfaces to a second group of photo-detectors, by dancers, actors, or musicians in choreographed movement; the various deactivations and activations of photo-detectors, respectively, may trigger one or more of: note, lighting events, or special effects. It is noted that a later described aspect of the invention provides for the generation of an event base on the detection of predefined sequences of events; here then certain note phrases or paths through the stage installation would trigger additional events such as fog blasts illuminated by selected colors of light which are distinguished by the pattern detected.

A more sophisticated use of simple non-video optically-controlled sensors is to continuously control one or more of sound, lighting, or special effect parameters; here the photo-detection is not one of on/off on a relatively narrow beam but rather continuous intensity variation of a relatively wider light beam. The light intensity directed at a photo-detector may be varied by means of varying the percentage of light interruption by the parts of the human body, clothing, artificial fog clouds affected by a performer, or other translucent, light-reflective or light-refractive objects manipulated by a performer.

In the above, the source light may exist in an environment of performance stage lighting or other illumination. To limit interference on the instrument, light sources may be any one or more of frequency-modulated, selected-wavelength operation, or minimum-intensity operation (via inexpensive low-power lasers) methods. Alternatively, or in addition, a photo-detector may be provided with an optically-directional shroud to limit interfering ambient light.

It is also possible to actually use stage lights as light sources for photo-detection as an aspect of the invention. For example, a spotlight beam may be directed, via light-reflective or light-refractive elements operated by performers, on to one or more photo-detectors operating in either discrete-trigger or continuous-variation modes.

Finally, it is possible for the photo detectors to be color sensitive. This may be done any number of ways, ranging from putting color filters over photo-detectors to using color electronic cameras and simple image processing to derive average measured color. Should a camera be used for color or other photo-detection roles, photo-detector sites may actually be fiber optic paths that lead to a centralized camera element. Light color directed to the photo-detectors may be varied by performers by means of filters, prisms, or other manipulable translucent, reflective, of refractive objects.

2.1.7.2 Video Cameras

Video cameras may be attached to an instrument for showing close-up of the performer's playing. The video close-up feed may be displayed on monitors during a performance or recorded, and as discussed later, potentially involving other video sources and potentially with or without special effects. For movable instruments, such as guitars, woodwinds, etc. this can create an interesting visual effect as the instrument profile will be firmly fixed in the video image while the ambient visual background will move as the performer moves the instrument. These visual effects seem to work best with instruments that have sufficient physical inertia and/or which are supported by straps; instruments subject to significant undamped motion, such as flutes, may actually have so much background motion that the image is uncomfortable to watch.

Video cameras, be they attached to an instrument or not, may also be used as instrument elements by processing the video image signals to degrees that range from simple average image brightness calculation through pattern recognition to image interpretation. In a simple example, the luminance signal for each video frame or interlace-field (i.e., only the odd or only even lines) may be sent to an integrater element followed by a sample-hold element; the integrator may be further enhanced to not integrate during retrace intervals. The result gives the average brightness of the processed image. Adding two such additional integrate/hold elements and feeding the three the red/green/blue decomposition of a color video signal makes an image-averaged color detector. In these ways the same camera that produces performance and/or recording video images may be used as a non-video optical sensor in the manners described earlier. This primitive capability, then, may allow a performer to tilt or rotate the instrument 100 position so as to include stage lights or background images of particular brightness and/or colors, direct or impede incoming light with the hand or objects, cover the lens, etc., and in so doing trigger and/or continuously control sound, lighting, or special effect events. The latter may occur when the video image is being displayed and/or recorded or with the video signal used solely in an instrument mode.

Far more valuable is the use of the spatial capture aspects of a video camera. A simple example of this would be to split the image into "sub-image cells" (i.e., half, quarters, etc. of the entire video image) using various means and again deriving average luminance and/or color information from each of the cells. For small numbers of cells this may be done with analog electronics: sync detectors trigger one-shots that gate specific integrate/hold circuits for specific intervals of horizontal scan lines in specific vertical regions of the image. Digital methods may also be used, for example: reading the image into a frame buffer which is then analyzed in the retrace interval for the next frame, doing running calculations on the video signal as the fields are scanned, etc. Digital methods will typically scale to higher resolutions and more complex functionalities and thus in many cases may be preferred. Digital methods may be implemented with special dedicated hardware or standard personal computers fitted with standard video capture and MIDI interface cards, etc. Such personal computer implementations may implement a number of image processing, parameter derivation, and control signal assignments in a flow virtually identical to that of FIG. 13. These functions may be done in software run on the personal computer or in part or in whole by dedicated hardware boards or peripherals (for functions such as video acquisition, pattern recognition, etc.)

With the ability to process images at higher resolutions and in more complex ways, it becomes possible to use video in increasingly valuable ways as an instrument element. By correlating higher resolution image area measurements, it becomes possible to recognize patterns and shapes and derive parameters from them in real-time. In fact, the same image processing software structures used in pressure-sensor array touch-pads, or even exact portions of software itself, may also be used to process video images in real-time, replacing pressure pixel information with, for example, luminance pixel information. These algorithms may be enhanced further by exploiting available color information as well. The shapes recognized and some of the parameters derived from them are likely to have a somewhat different quality: the 3D-projected-to-2D nature of camera images, gradients of luminance created by shadows and reflections, as well as the types and (potentially) ranges of shapes to be recognized typically differ significantly from those discussed in the pressure-sensor array touch-pad context. Nevertheless, similar software structures may be used to great value. Specific types of shapes and patterns—such as written characters, particular gradients in brightness or color, separation distances between bars and/or bar widths—may be particularly useful variations from those shapes and patterns discussed in the context of pressure-sensor array touch-pads.

Next: examples of how video cameras supplemented with these capabilities may be used to trigger events and/or continuously control sound, light, and special effects.

A first example is that of recognizing the human hand posture, position, and proximity to the camera in 3-space. Simple hand orientation and posture geometry may be used to create specific control signals. In a more advanced implementation, dynamic gestures may be recognized. These two capabilities give the system, with sufficient software, the ability to recognize a few if not many verbal hand signals; with yet more enhancements, potentially including the ability to recognize the roles of two hands with respect to the human body, the recognition capabilities could include, for example, formal ASL as well as particular dance postures. The ability to recognize postures of hand, hand/arm, hand/arm/body, etc. allows hands, dance, "conducting" (not necessarily restricted to formal conducting gestures), etc. to be used directly for the control of sound, lighting, and special effects.

In another class of examples, video cameras may recognize, and derive parameters from, characters and/or patterns available on a stage. Such characters and/or patterns may be brought before the camera, exposed and obfuscated from the camera; the camera may be turned towards the characters and/or patterns, etc., resulting in derived parameters and issued control signals. Stage cameras may also be used to recognize and track the location and some aspects of body orientation and posture of performers, deriving parameters and issuing control signals from these as well.

In each of the above examples, it is noted that the use of two or more cameras, either in stereoscopic layout similar to those of human eyes or in an orthogonal layout (i.e., forward facing camera and overhead camera covering the same 3-space region), may be used to resolve 3D-to-2D projection singularities in the pattern and shape recognition and processing.

As a third class of example, recent developments have allowed for the recognition of human facial expressions from video images and even degrees of lip reading. These recognition and parameter derivation methods may also be adapted in the invention to provide the ability for the human face to be used as a controller for sound, lighting, and special effects. Simplified systems can be created to recognized and parameterize a few selected expressions or to recognize and measure geometric variations in specific areas of the face.

From a formal, traditional music perspective, much of the above may appear to be gimmickry with meaningful application at best in avant garde installations or modern play products. In one response to this, directed on hand posture capture, it is noted that the hand in 3-space is clearly the most physically expressive aspect of the human body and is used to control almost all musical instruments but by very restricted geometric means. Freeing the hand to move unrestricted allows considerably more expression to be captured. Further then, as a fourth example, advances in cost reductions for video cameras and signal processing can make it possible for an array of cameras to be devoted to a traditional instrument controller, such as a keyboard, drum head, or flute key array (as well as, for example, a pressure-sensor array touch-pad) so as to capture hand expressions that cannot otherwise be cost-effectively captured from the instrument controller.

Final, a brief preliminary discussion is provided here on the significant role of video in compositional and performance semiotics. For many years music, dance, art, film, plays, literature, poetry, linguistics, and other fields have come under study and compositional methods involving common abstractions or "signs" that live within and among their works and idioms. More will be said later about the invention as a whole as an environment for more significantly exploiting semiotics as a compositional and performance tool. However, video cameras used as an instrument element, either with or without the video stream being displayed or recorded, offer a special role in the creation of semiotic elements because they may be used to link visual symbols of object and body to sound, lighting, and special effects which in turn may have assigned and/or intrinsic semiotic content.

2.1.8 Singing and Speech Detection, Recognition, and Parameterization

Speech recognition systems have become increasing accurate and inexpensive. These technologies can, in many valuable ways, be adapted to also recognize sung words and/or phonemes. Recognized words or phonemes may be used to trigger any of sound, lighting, or special effect events, while existing pitch detection and amplitude following technologies (as found, for example, in the early Roland CP-40 product or in the more modern MidiVox Synchro-Voice product) may be used to derive continuous control signals. In addition, inter-event timers may be used to measure individual word and/or phoneme duration.

These singing and speech recognition capabilities together with their parameterization also have significant potential value in the aforementioned creation of semiotic elements because they can be used to link verbal linguistic events and expression to sound, lighting, and special effects which in turn may have assigned and/or intrinsic semiotic content.

2.1.9 Air Pressure, Air flow, and Air Turbulence Sensors and Transducers

Air flow, or "breath," controllers for musical instruments are known and have been employed in electronic woodwind-like controllers. It is a provision of the invention to include these along with air pressure and air turbulence sensors and transducers as elements of an instrument entity 100. In particular, air pressure-sensors can be attached to air bladders to form a particular kind of pressure or squeezing controller. Air pressure-sensors can also be introduced into a wind instrument interior in an instrument where subsonic variations in ambient pressure occur as the instrument is played.

Traditional wind instrument players often invoke air turbulence effects, such as transient "chiffs", tongue trills, overblowing, etc. Air turbulence is then also a candidate control interface for use in an electronic instrument entity 100. Air turbulence sensors may be crafted in various ways, including by means of signal processing the output of any one or more of air flow and/or air pressure-sensors. A simple example would be to define a high-pass cut-off frequency for air flow and/or air pressure variations and another (higher) low-pass cut-off frequency for the lowest musical "pitched" frequencies; the energy in the remaining band of frequencies would be a crude measure or air turbulence. In a more sophisticated implementation, an array of air pressure-sensors can be distributed throughout a wind tube and sensor-array signal processing techniques can be used to separate turbulence signals from environmental acoustic noise, standing waves in the tube, etc.

2.1.10 Clothing, Jewelry, Skin, and Muscle Sensors

Sensors on the human body have been used in some dance performances to control sounds. The invention provides a generalization of this for synergistic use in conjunction with others of its aspects.

Sensors may be attached to the human body by means of clothing, jewelry, straps, adhesive pads, etc. These sensors can be of a variety of types: position, motion, optical, skin resistance, muscle activity, etc. and may be used to capture body position, posture, activity, environment, etc. and convert these into control signals used to control sound, lighting, and special effects. Sequences of control signals can also be interpreted as gestures by recognition systems which in turn can be used to generate yet other control signals. Interfaces to the sensors, taken collectively as an instrument entity 100, to one or more signal routing, processing and synthesis entities 120, may be done by means of radio, wireless optical, fiber optic cable, electrical cable, or combinations or sequences of these.

Although the sensors described here taken as an instrument entity 100 may be used in isolation, there is particular synergistic value in using these in conjunction with other instrument entities in a performance or recording situation. For example, a particular body motion or gesture (such as raising an arm, swinging a hand, jumping, etc.) may have significant artistic value at a critical moment but not be captured by another instrument entity. As another example, in recording sketches during a composition phase, particular body motions or gestures can be used to call attention to specific aspects of the sketch for future review.

2.1.11 Stage Environment and Macro-environment Sensors

Sensors other than optical can be distributed on a stage and/or on component installations on the stage (for example staircases, risers, scaffolds, sculptures, props, etc.). Sensors can also be used to measure larger environments ranging from audience activity to outdoor meteorology. The sensors can include proximity, position, motion, weight, temperature, humidity, etc. and can be used to create control signals. As a result, these arrangements can be formalized into an instrument entity 100.

Examples of such usage include human proximity and/or interaction with props or sculptures, tracking of artificial fog cloud migration across a stage, detecting the location of performers on staircases or risers, detecting audience motion activity, characterizing room-internal and room-external meteorology (such as wind speed, wind direction, rainfall, wind and/or rainfall noise, etc.) to bring it into an aspect of the performance.

2.2 Vibrating-element Instrument Elements and Subsystems 2.2.1 Single-channel Audio Signal Handling The invention provides for the inclusion of traditional group (or "composite") audio signals such as a group pickup serving all strings on a traditional electric guitar. These can be treated as a peer to any of the multi-channel audio signals or of special significance because of its timbre, functionality, or traditional use. As will be illustrated in the discussion of layered signal processing, such a signal can be processed so as to create the subtle or dominate backdrop against which processed multi-channel signals are superimposed. In some situations, multi-channel signals on the instrument may be combined to create a single channel audio output, as in the case where individual piezo bridge pickups are only one of a plurality of multi-channel signal sources on an instrument; simple full or partial mix-downs may be provided for use when such multichannel sources are not featured in a multi-channel manner so as to conserve channel usage on the generalized interface 110. This can be particularly valuable in complex instruments with many arrays of vibrating elements such as those in FIGS. 4–5 and many others to be discussed.

2.2.2 Multi-channel Audio Signal Handling

The use of various types of musically-oriented signal processing with electronic stringed instruments has been common in popular music almost as long as there have been electronic stringed instruments. Typically a single pickup is used to capture audio signals from all vibrating elements on the instrument (although there may be a plurality of such group pickups on a given instrument so as to obtain different selections of timbre).

The invention provides for the use of multi-channel electric transducer arrangements, by which each vibrating element (string, tyne, membrane, etc.) of an electronic instrument with multiple vibrating elements is provided with an independent isolated electrical output, and dedicated signal processing can be applied to the signal of each vibrating element or incomplete combinations thereof, to achieve significantly important musical functions—all done in a way where the same interfaces, multi-channel signal routing and processing, and internal instrument electronics can be reused across a variety of instruments.

Multi-channel vibrating element pickup arrangements, by which each vibrating element (string, tyne, membrane, etc.) of an electronic instrument with multiple vibrating elements is provided with an independent isolated electrical output, have been commercially available but in largely hidden forms, most commonly used in synthesizer interfaces for guitars. Beyond such synthesizer interfaces, and the recent Roland VG-1 product discussed later, the usage of such multi-channel vibrating element pickups has been limited to roles in volume equalization and imaging in a stereo sound field on only a very few electric guitars models. Such musically-oriented signal processing is only known to have been applied to the summed mixture of all vibrating elements of the instrument, not for individual or sub-groups of the vibrating elements of the instrument.

Conventional signal processing can be used on each vibrating element signal to create "generalized pedal steel guitars" (augmenting or replacing mechanical pedal tuning changers), instantly retunable guitars (augmenting or replacing mechanical tuning changers such as the Hip-shot "Trilogy"), multi-modal Indian sitars (where drone and sympathetic strings can be electronically retuned while playing, allowing a more robust mix between Eastern and Western tonality in musical form), spatially animated instruments where individual vibrating element sounds are location modulated within a stereophonic or other spatial sound field, and mixed timbre instruments where different signal processing methods are applied to each string.

Figure 20:
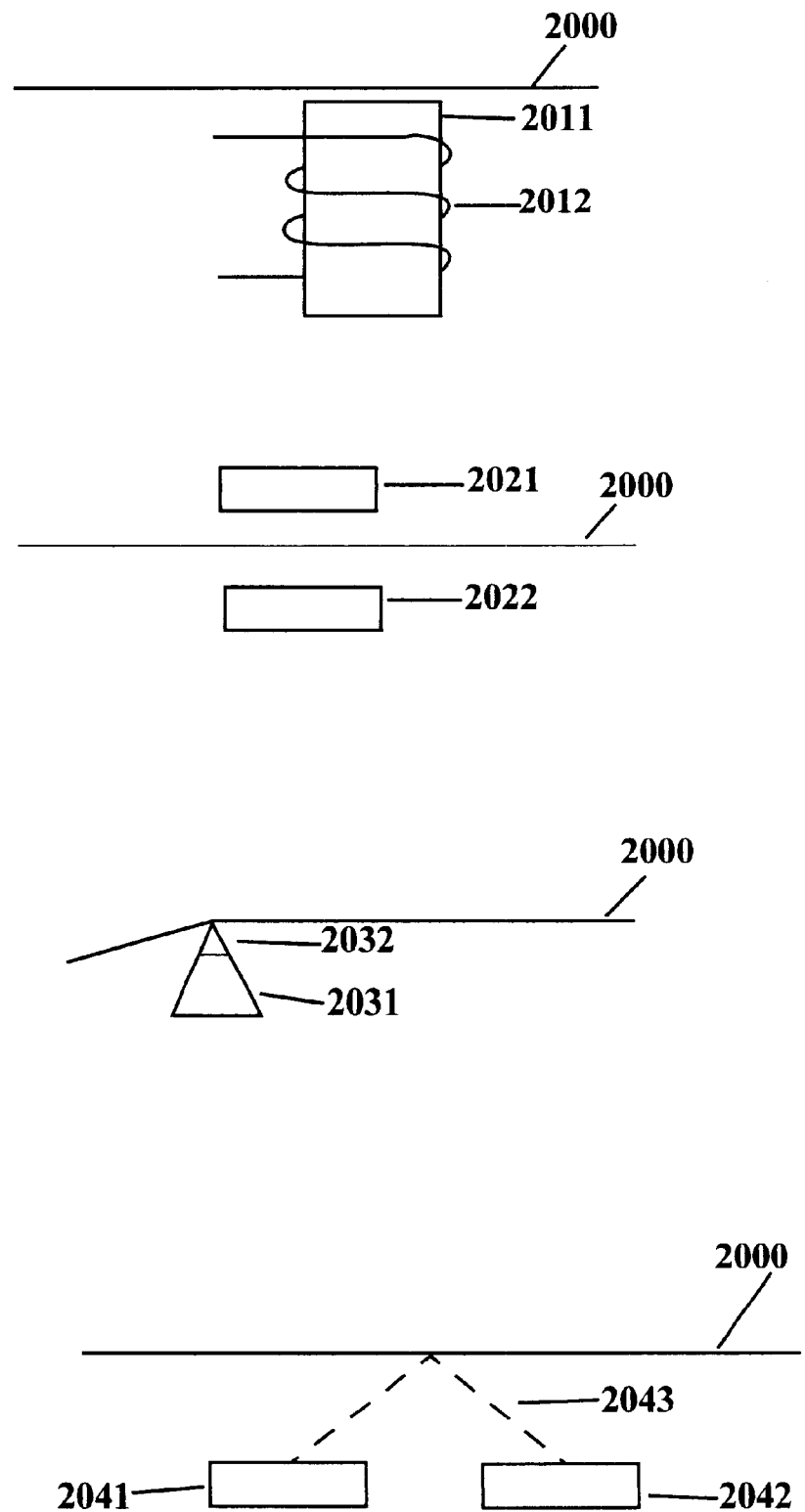
FIG. 20 shows electromagnetic, Hall-effect, piezo, and optical pickup methods for deriving separate audio signals for each vibrating element of a multiple vibrating element instrument entity.

Standard pickup elements available to implement individual pickups for each vibrating element include piezo contact elements, installed on a bridge acoustically isolated from other vibrating elements, and non-contacting coil-based electromagnetic pickup elements. Optical pickup products have also been devised, and a coilless Hall-effect pickup method has been taught as U.S. Pat. No. 4,182,213. Both optical and Hall-effect methods do not involve contact with the vibrating element. FIG. 20 shows electromagnetic, Hall-effect, piezo, and optical pickup methods for deriving separate audio signals for each vibrating element of a multiple vibrating element instrument entity. Electromagnetic coils and Hall effect elements require the string material to be ferromagnetic while piezo and optical methods do not.

It is noted that a pickup localized for individual vibrating element must by its nature have small geometry. For the pickup technologies not involving contact with the string (e.g., electromagnetic coils, Hall effect, and optical) multiple small pickups can be aligned along a vibrating element's length; the resulting multichannel signal may be handled with multi-channel signal processing, selected by a switch, selectively mixed/morphed, etc. to obtain a range of tones. In one implementation the selection, mixing, morphing of the pickup signals, and hence the resulting output tone, may be operated by control signals.

It is noted that excessive magnetic fields from a large number of magnetic pickups may make a low-mass vibrating element such as a thin string vibration go inharmonic. Although this should be a design consideration with a number of pickups, it can also be used to produce special effects. The invention thus provides that one or more electromagnetic coils, which may or may not otherwise double as pickups, be used to issue localized DC magnetic fields of varying intensity for inducing inharmonic effects on one or more selected strings, most advantageously under control signal control. The coils may create the DC magnetic fields themselves or instead cause a permanent magnet to vary its distance to the vibrating element via solenoid structures.

Figure 21:
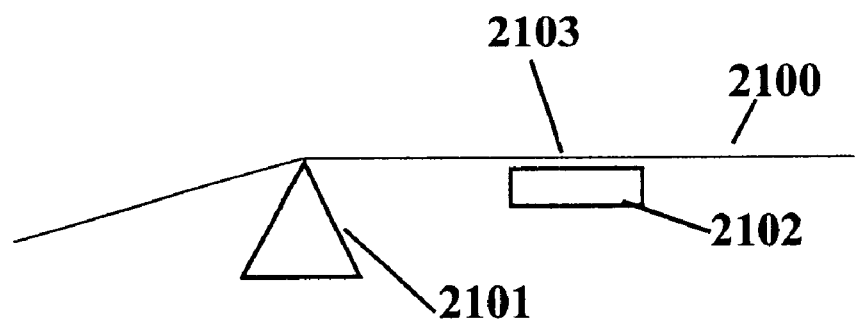
FIG. 21 shows how an off-bridge buzz-plate can be combined with a piezo bridge sensor in replacement of a gradient buzz-bridge so as to permit the use of non-ferromagnetic strings.

The sloped bridges of sitars and other twanging/buzzing stringed Indian instruments have not to date lent themselves to individual piezo bridge structures. This is not impossible; the invention provides for individual miniature sloped bridges, one for each string, to be embedded with its own piezo pickup element. Such bridges can also be used with non-string vibrating elements, such as bars and tynes, to create new types of sounds. This method can also be adapted to the very gradual and softer sloped body contact of certain African harps whose strings buzz against a typically animal fur-covered harp body. Alternatively, FIG. 21 shows how an off-bridge buzz-plate, such as those provided by Biax to simulate a fretless based sound with a conventional fretted bass, may be combined with a piezo bridge sensor in replacement of a gradient buzz-bridge so as to permit the use of non ferromagnetic strings.

2.2.3 Vibrating Element Excitation

The use of "controlled (acoustic) feedback" with electronic stringed instruments has been in common use in popular music since at least the 1960's. It has been possible to replace the acoustic excitation of string resonance with electromagnetic excitation (as embodied by the Heet Sound E-bow) for some time, but only for one string at a time and via hand-held mechanically operated apparatus. The practice of electromagnetic excitation in non-stringed musical instruments with vibrating elements is not currently known.

The invention presents a system using electromagnetic excitation of the vibrating elements of an electronic instrument to produce controlled feedback relationships with signal processing control of the feedback characteristics, typically hands-free as desired, with either standard parts (for inexpensive mass manufacture and retrofit) or more specialized parts (to provide additional features).

Figure 22:
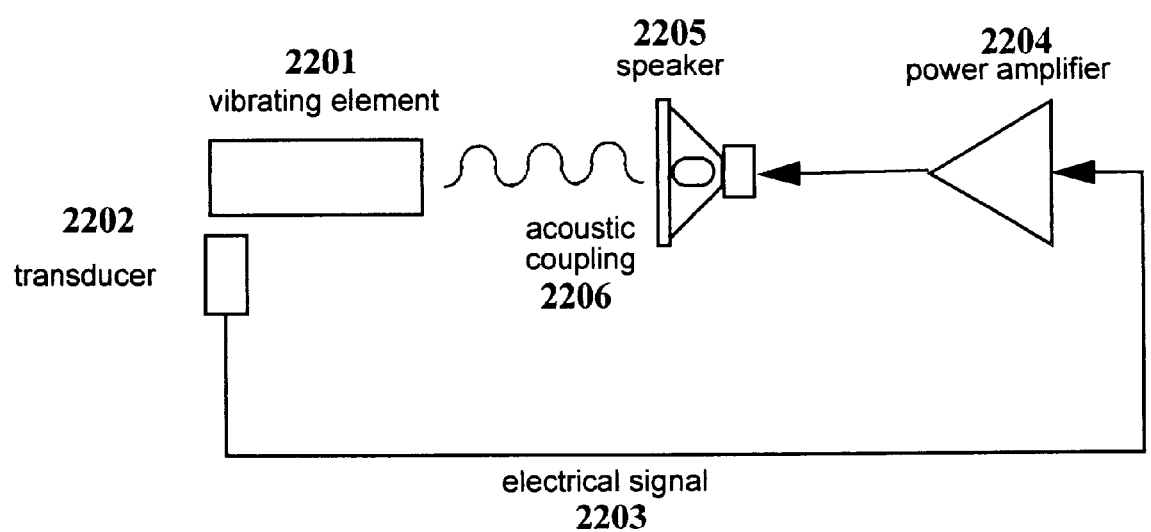
FIG. 22 shows the basic idea of controlled feedback as used in recent contemporary music.

FIG. 22 shows the basic idea of controlled feedback as used in recent contemporary music circa 1960. A vibrating element 2201 within the instrument is coupled (by electromagnetic, optical, or mechanical means) to an electrical transducer 2202 (electromagnetic, optical, Hall-effect, piezo, etc.) which converts the vibration to an electrical signal 2203. The electrical signal 2203 is applied to a power amplifier 2204 which drives a loudspeaker 2205 which is acoustically coupled 2206 (by means of air, mounting apparatus, etc.) to the vibrating element 2201. This creates a feedback arrangement allowing vibrations of specific frequencies to resonate within the resulting closed-loop system. By exciting or damping the vibrations of the vibrating element 2201, changing the characteristics of the frequency and/or phase response of the speaker's power amplifier 2204, and/or changing the characteristics of the means of acoustic coupling 2206 (as in changing the distance between the vibrating element 2201 and speaker 2205), the "controlled feedback" methods used in popular music are obtained. Note, however, that the required acoustic coupling characteristics are affected by factors such as volume level (typically this must be relatively high), speaker/room geometry, room acoustics, and other difficult to control factors that can often be unpredictable liabilities.

Figure 23:
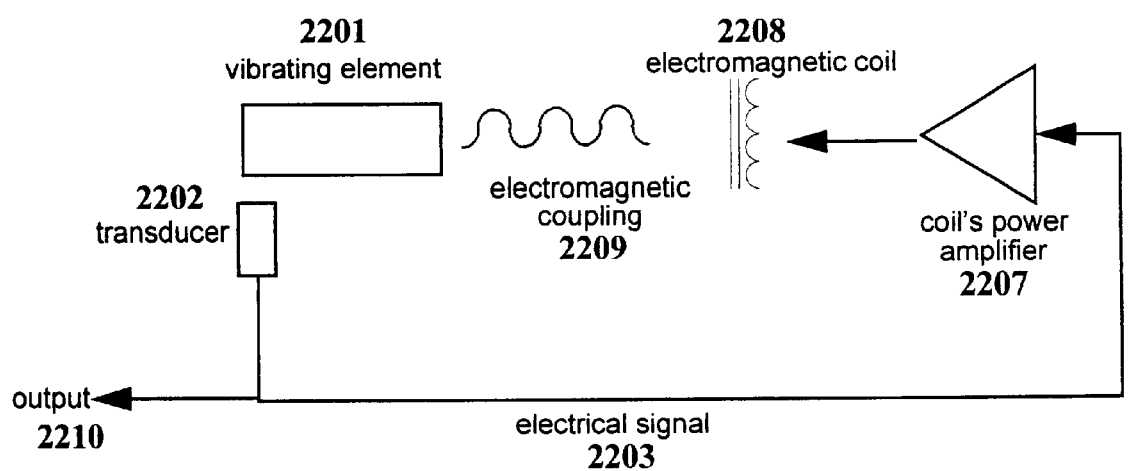
FIG. 23 shows an example implementation of a simple approach for replacing acoustic excitation of a vibrating element with electromagnetic excitation.

The invention provides for an approach to replacing the acoustic excitation component of this process with electromagnetic excitation. FIG. 23 shows an example implementation of simple approach for replacing acoustic excitation of a vibrating element with electromagnetic excitation. In this case the vibrating element 2201 must be ferromagnetic, although the transducer need not use ferromagnetic means itself. Here, rather, the acoustic coupling 2206 is replaced by electromagnetic coupling 2209, produced by an electromagnetic coil 2208 with an internal magnet or other magnetic bias that replaces the speaker 2205. Without this nominal magnetic field, the string will be excited with a full-wave rectification as the ferromagnetic string is drawn to the coil regardless of the direction of current flow. In this configuration, the power amplifier must now match the coil's electrical drive requirements which can differ from the speaker's, hence the speaker's power amplifier 2204 is replaced by the coil's power amplifier 2207. A signal output 2210 for subsequent amplification and signal processing can be taken off at the transducer. (In particular, this output arrangement 2210 differs from the Heet Sound E-bow where no such output is provided or relevant for that product). The result is a system that provides a comparable arrangement to that of FIG. 22 without the requirements of high volume level, speaker/room geometry, room acoustics, and other liabilities of acoustic coupling.

It is also noted that as piezo elements both convert vibrations into alternating current signals and, reciprocally, convert alternating current signals into mechanical vibrations, a piezo group element bridge pickup can be used, in lieu of a coil, either as the audio signal pickup or as a mechanical drive exciting element. Further, the signal pickup can also be optical or Hall effect. If both the signal and drive elements are electromagnetic (coils or Hall for signal pickup, coil for drive) undesirable magnetic coupling, not unlike that of an electric transformer, can occur. This effect may be minimized if said signal and drive elements are sufficently separated and/or shielded or otherwise localized (for example, with a two-coil/opposite-magnet arrangement.

Figure 24:
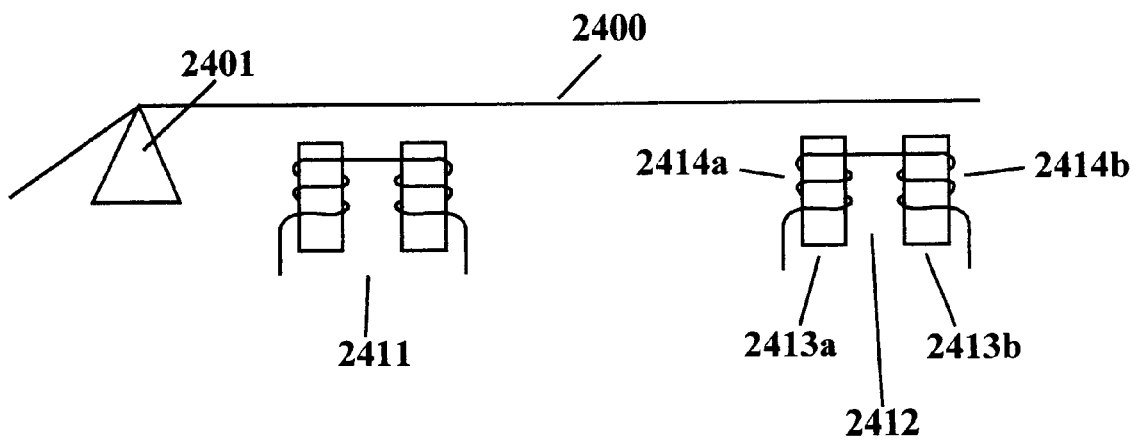
FIG. 24 shows various combinations of piezo and electromagnetic vibrating element pickups and exciters for separately controllable excitation of each vibrating element.

FIG. 24 shows various combinations of piezo and electromagnetic vibrating element pickups and exciter drivers for separately controllable excitation of each vibrating element. In one arrangement, the string 2400 suspended over the bridge 2401 is electromagnetically coupled to two electromagnetic coil pairs 2411 and 2412. Each coil pair is in a standard "humbucking" arrangement with complementary magnet pole directions 2413a, 2413b and complementary winding directions 2414a, 2414b so as to significantly localize the magnetic coupling region about the coil. Here either coil may be used as the signal source or as the driver. The source coil can also be replaced with an optical or Hall-effect pickup. In a piezo-based arrangement, the string 2400 is in contact with a piezo pickup element 2421 on the bridge 2401, and the string 2400 is magnetically coupled with an electromagnetic coil pair 2422. Here either the coil pair or the piezo may serve as the driver and the other serve as the signal source. In cases where the piezo element acts as the driver, the electromagnetic signal source element may be replaced with a Hall effect or optical technology pickup.

It is noted that the invention provides for the above discussions to apply equivalently should the signal source and driver elements serve an individual vibrating element or a group of vibrating elements. The invention also provides for the case where either the signal source or driver is a single element unit while the other is a group element unit; such configurations are easily supported by the signal routing, processing, and synthesis entity 120 (referring to FIG. 1). In particular the invention provides for the case where a multiple vibrating element instrument has at least one of the following: individual source and individual excitation, group source and group excitation, individual source and group excitation, and/or group source and individual excitation.

Figure 25:
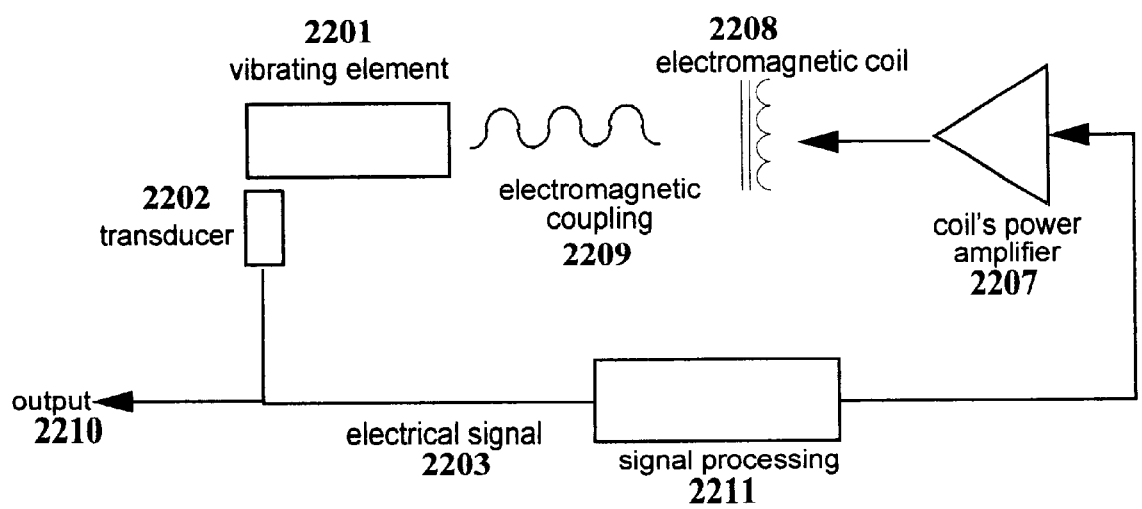
FIG. 25 shows adding signal processing for spectral and amplitude control of electromagnetic excitation.

Since the driving element (coil or bridge piezo) may be mounted in permanent relation to the vibrating element, it is possible to replace conventional means of altering the acoustic coupling with electronic signal processing means 2211. FIG. 25 shows adding signal processing for spectral and amplitude control of electromagnetic excitation. For example, fixed or adaptive equalizers can be used to alter the frequency and phase response of the signal/vibration/transducer loop, permitting additional control over which vibrational harmonic(s) are emphasized in the feedback. Attenuation can be used to vary the degree of feedback. Delay can be used to alter the attack characteristics of the resonance behavior. Dynamic compressors and expanders can be used to vary the ease and dynamics of the resonance behavior. Many interesting special effects are possible, such as using pitch-shifters alone or in combination with delays to transfer energy between vibrational modes. In the case of a drive coil, a pitch shifter or octave divider (such as an inexpensive toggle flip-flop) may be used to create a drive signal that is an octave lower than the string signal and thus eliminate the need for a magnet in the drive coil. The invention provides for any driver electronics and/or signal processing to be any of the following: internal to the instrument, mounted on the outside of the instrument as an add-on module, remotely located off the instrument (particularly in the signal routing, processing, and synthesis entity 100), or any combination thereof.

Figure 26:
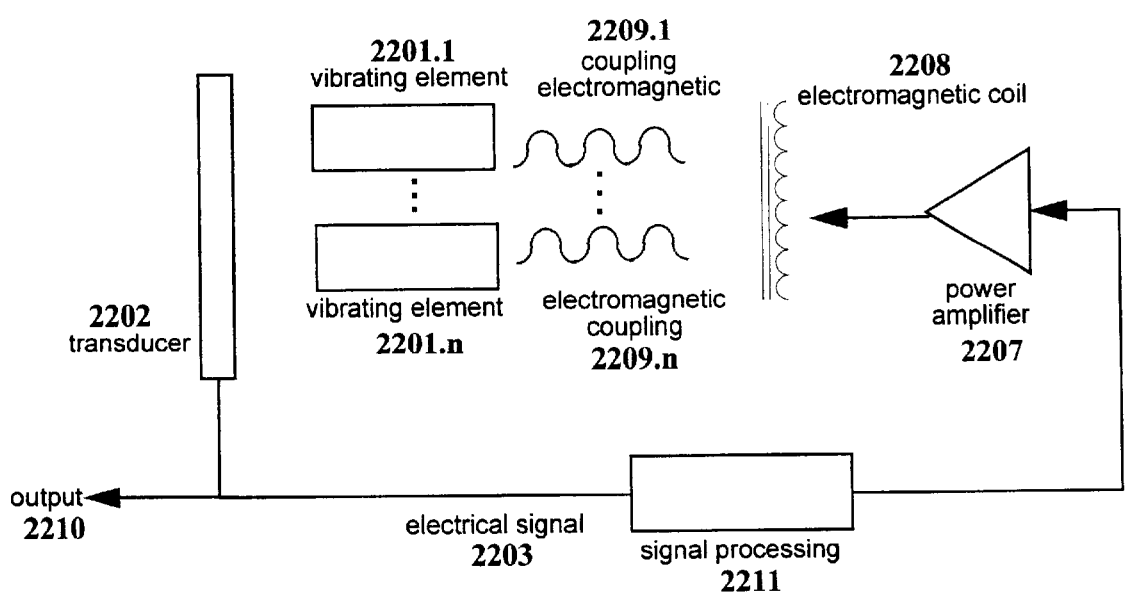
FIG. 26 shows multiple vibrational elements with common electromagnetic excitation.

In most electronic instruments, a single pickup serves many if not all the featured vibrating elements. The invention provides for the approaches discussed thus to also be applied to such instruments using conventional components. FIG. 26 shows an example arrangement involving multiple vibrating elements served with a group pickup and which are also subjected to common electromagnetic excitation using conventional guitar pickup components. (In the example of FIG. 26 it is understood that signal processing 2211 may be introduced or omitted from the feedback loop as appropriate or desired and that a group piezo bridge may, in some constructions, serve as a driving element in place of the pickup coil.). A plurality of vibrating elements 2201.1–2201.n share a common group pickup transducer 2202 and a common electromagnetic coil 2208. This arrangement is very simple to implement and very useful musically for traditional electric guitarists. A simple prototype can be made using an electric guitar with two humbucking-pickups (such as a Gibson ES-335). The rear pickup can be used as the transducer 2202 and the front pickup as the coil 2208 (the humbucking pickups assist in decoupling the coils, decreasing a parasitic "transformer" effect). Almost any power amplifier of sufficiently high enough current or voltage drive, (for example, even a Fender Bassman tube guitar amplifier) can be used as the coil's power amplifier 2207, directly driving the coil (despite the impedance mismatch) from the amplifier speaker output connector.

3 Example Electronic Controller Instruments

3.1 Touch-pad Array

Touch pad instrument elements, such as null/contact types and pressure-sensor array types described earlier, can be used in isolation or arrays to create electronic controller instruments. The touch-pad(s) may be advantageously supplemented with panel controls such as push buttons, sliders, knobs as well as impact sensors for velocity-controlled triggering of percussion or pitched note events. In the case of null/contact touch-pads, impact and/or pressure-sensors can be added to the back of the pad and the pad suspended in such a way that it can be used as an electronic drum head. If one or more of the touch-pads is transparent (as in the case of a null/contact touch screen overlay) one or more video, graphics, or alphanumeric displays may placed under a given pad or group of pads.

Figure 27:
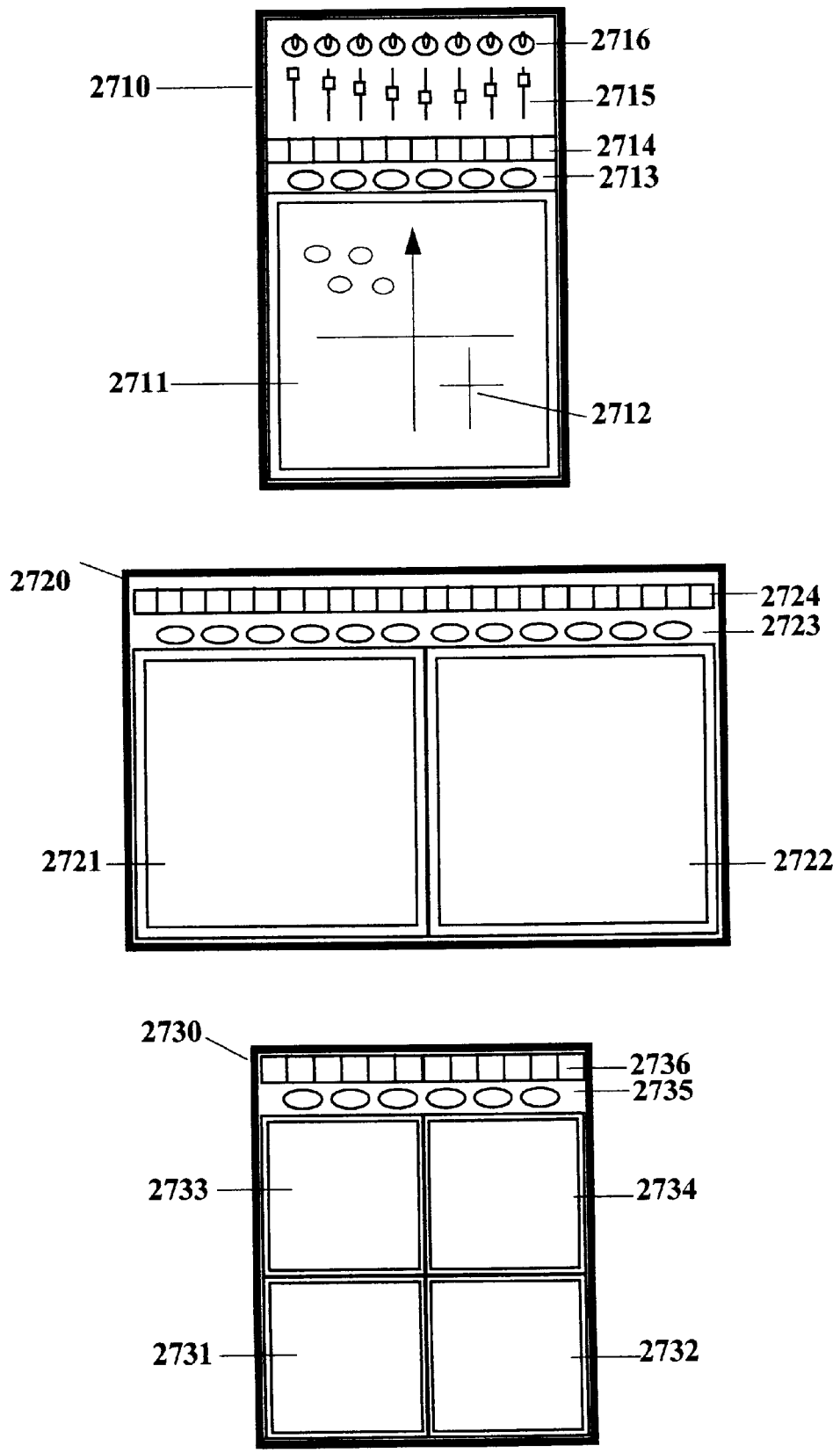
FIG. 27 illustrates examples of single, double, and quadruple touch-pad instruments with pads of various sizes and supplemental instrument elements.

FIG. 27 illustrates examples of single, double, and quadruple touch-pad instruments with pads of various sizes and supplemental instrument elements. A single touch-pad could serve as the central element of such an instrument, potentially supplemented with panel controls such as push buttons, sliders, knobs as well as impact sensors. In FIG. 27, a transparent pad superimposed over a video, graphics, or one or more alphanumeric displays is assumed, and specifically shown is a case of underlay graphics cues being displayed for the player.Two large sensors can be put side by side to emulate the left-hand/right-hand layout of many hand drum arrangements such as tabla/baya, congas, etc. This is particularly suitable for pressure-sensor array touch-pad elements where a larger pad-area (for example 8 to 12 inches square) could be advantageous for detailed control. Because of the extensive capabilities of either type of touch-pad element provided for in the invention, this arrangement is by no means limited to percussion applications but rather easily serves as a far more general purpose left-hand/right-hand multi-parameter controller. In variants of this arrangement that are intended specifically for tabla/baya emulation, the relative size of the two pads and angle of placement with respect to the floor can be arrangement to match that expected by an experienced tabla player. Instruments involving arrays of larger numbers of touch-pads can also be valuable. Here it may be advantageous to make the pads smaller so that the fingers of a single hand can touch two or more pads simultaneously.

3.2 Foot Controllers

With the extensive real-time control capabilities provided for in the invention, foot controllers can be especially valuable. They can select preset configurations at various points in a control hierarchy, issue notes or chords, control timbre, alter lighting, invoke special effects, etc. In general a commercially available floor controller typically includes a plurality of momentary action foot-switches, and various visual status indicators such as LEDs over momentary action foot-switches and a master status (and programming) display. Many such products also include provisions for rocker foot pedals to control continuous parameters, either via external connection (as with the Digitech PMC-10 and Digital Music "Ground Control" products) or internally (as with the ART X-15 product). With the exception of the Digitech PMC-10, the control assignment and organization capabilities of these controller products have historically been quite limited, and as all the products seem aimed largely at issuing MIDI program change commands, the number of foot-switches has been small. Further, the rocker foot pedals control only one parameter at a time.

The invention provides for extensive elaboration over these products by supporting any of multi-dimensional rocker pedals, arbitrary control signal assignment, control signal assignment organized by selectable pages, separate alphanumeric function display for each foot control (switches and pedals), pause operations, and real-time event play-back capabilities.

The traditional way to control volume on an electronic keyboard instrument is by a means of a rocking floor-level foot-pedal. More recently such pedals have been used to generate continuous-range control signals such as MIDI messages, though allowing the control of only one continuous-range parameter at a time. Many years ago a number of "volume/tone" foot pedal products were available, though none appear available at this writing. These products offered a rocker capability devoted to controlling instrument volume supplemented with a left-right twist capability devoted to the control of instrument tone. Such arrangements may be used to double the number of foot controllable parameters that can be controlled in roughly the same physical layout area together with the bonus of allowing a foot to control two continuous-range parameters at once.

Figure 28:
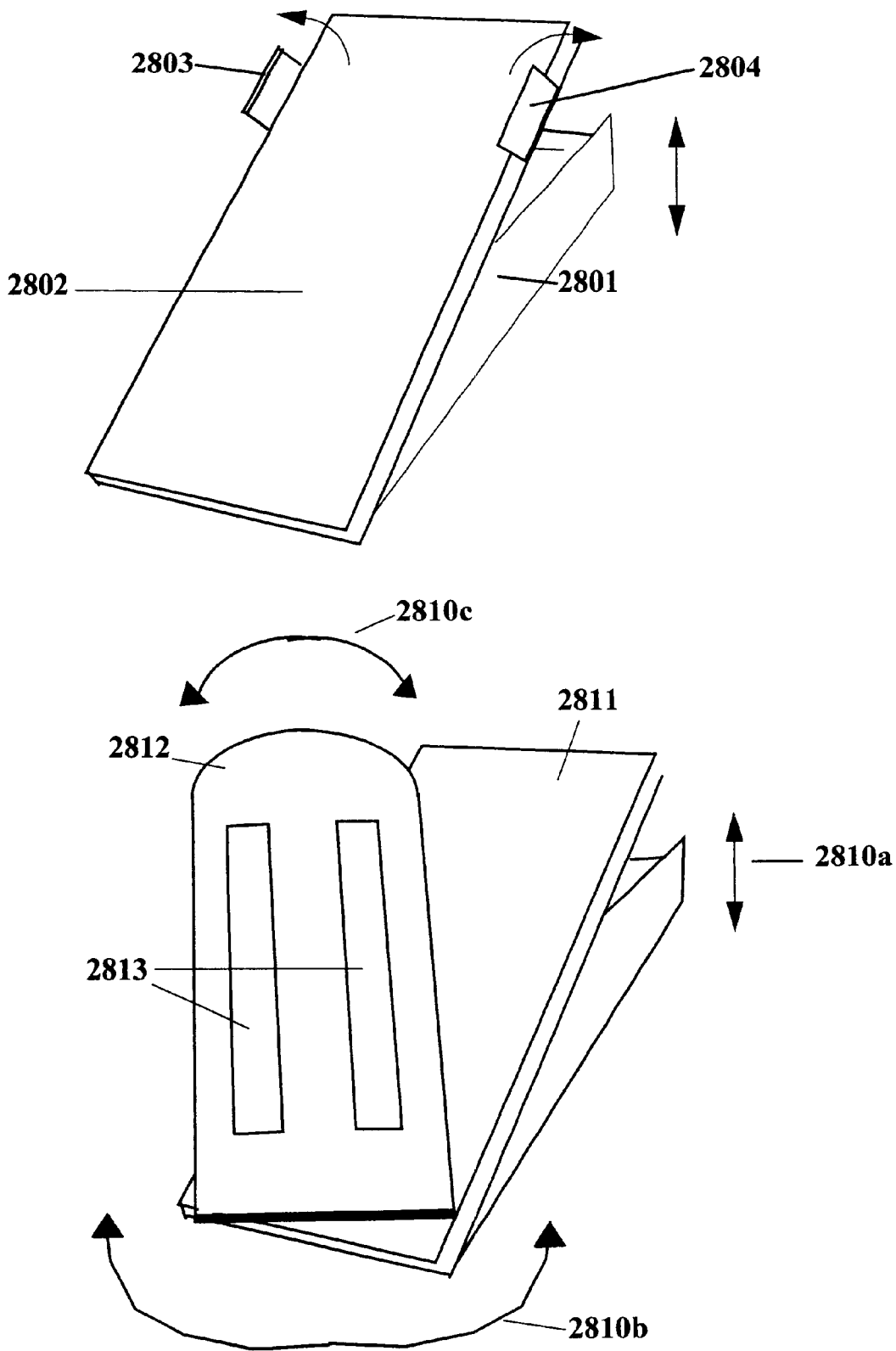
FIG. 28 illustrates some enhanced foot-pedal arrangements which permit simultaneous single-foot adjustment of a plurality of continuous range parameters for use with floor controllers.

FIG. 28 illustrates some enhanced foot-pedal arrangements which permit simultaneous single-foot adjustment of a plurality of continuous range parameters for use with floor controllers. The use of rocking foot-pedals to control two continuous-range parameters at once may be enhanced by using one or more side-mounted spring-levers. Side-mounted momentary-action switches have been used on rocker foot-pedals for mode control (products by Ernie Ball and Soloton), but side-mounted spring-levers are particularly advantageous for continuous range parameters that have a specific nominal value. For example, these can be used in conjunction with pitch-shifters to modulate pitch as do the foot and knee levers of a pedal steel guitar, or in complementary pairs to emulate the action of a synthesizer modulation wheel or an electric guitar vibrato "whammy bar." In FIG. 28, one or more side-mounted spring-levers 2803, 2804 may mount on either the base 2801 or rocker plate 2802 of a foot-pedal. A spring lever may directly operate a slide, geared, pulleyed, etc., potentiometer, an optical sensor, magnetic sensor, pressure-sensor, etc. to produce an electrical signal. If two side-mounted spring-levers 2803, 2804 are positioned on opposite sides of the pedal, two mutually-exclusive parameter adjustments can be realized (as found in pedal steel knee-lever pairs and in the action of a synthesizer modulation wheel or an electric guitar vibrato whammy bar). It is also possible to mount a springed center-return synthesizer modulation wheel 2805 at the far end of the rocker plate if the arrangement and materials used forego breakage in heavy usage situations.

Further, it is possible to add a third control continuous-range adjustment capability on the rocker pedal by measuring the length-axis rotation of the foot: this could be done by various methods. As one example, a two-dimensional "volume/tone" foot pedal with control motions up-down 2810*a* and twisting 2810*b* may be modified to permit length-axis rotation of the foot 2810*c* and measure it with a potentiometer or sensor. Another method would involve putting at least two pressure-sensors 2813 on the twist plate 2812 of a non-modified two-dimensional foot pedal 2811 and deriving a control signal from these. A third way would be to mount a springed center-return synthesizer modulation wheel at the far end of the twist plate if the arrangement and materials used forego breakage in heavy usage situations. Other methods can be used for multi-dimensional foot controllers, such as the null/contact touch-pad and pressure-sensor array touch-pad elements discussed earlier which can be adapted for foot operation.

The invention provides for arbitrary assignment of control signals to specific foot-switches, foot-pedals, and other foot controllers. As an example, one or more MIDI messages could be assigned to each foot-switch, foot-pedal, or other foot controller as is largely done in the Digitech PMC-10 and with other functionality as the custom message construction and hierarchical ganging provided by, for example, the Peavey PC-1600 slider/button controller). A particularly valuable additional function would be that of issuing continuous controller messages that oppositely complement the basic control signal value: for example, in MIDI messages where "Continuous Controller" control values lie in the range 0 to 127, if a continuous foot-pedal position causes a first control signal to be issued with value of "x", it is also possible to enable the subsequent transmission of a second separate control signal to be issued essentially simultaneously with a value determined by the algebraic relation "127−x"; such complementary signals may be used for many purposes, for example prorating an audio mix between two sources, prorating modulation indices among two synthesizer voices, etc.

Stored program memory may be used to retain these assignments. In this situation it is advantageous to allow for multiple stored program selections to be recalled, thus allowing for multiple assignment sets for each foot-switch, foot-pedal, etc. Each assignment set could be thought of as a "page." Pages could be copied as a whole and edited. These capabilities would be similar to those of the Digitech PMC-10 and Peavey PC-1600 products. However, because of the number of controller assignments and the diversity of possibilities it is desirable to add physically adjacent to each foot controller an alpha-numeric display indicating the current assignment and status of that controller: in particular, for each given selected page, each controller display may show one or more of the currently assigned function, the current value(s) transmitted or last-transmitted, any additional identifying information such as short-hand names or relationships with other controllers, etc. LEDs may be provided for quick reference as to which foot-switch and which continuous foot controller (pedal, touch-pad, etc.) were last operated; as an enhancement these LEDs could be bi-color and of the two LEDs lit at a given instant (one for last foot-switch used, the other for continuous controller used), one color (i.e., green) could be used to indicate to overall last operation while a second color (i.e., red) would be used to illuminate the remaining lit LED.

The operation of a foot-switch may be assigned, under stored program control, to issue one or more simultaneous control signals, or short burst of contiguously-sequential control signals such as a group of MIDI messages. These control signal events may occur on the depression of the foot-switch, its release, or both. The foot switch may also be configured to operate in a toggle mode using a divide-by-two counter and messages can be issued on each toggle transition. These useful features can be found on, for example the Digitech PMC-10, but a number of useful enhancements are provided for by the invention. One enhancement would be to allow any specific pedal to independently operate in a generalization of toggle mode to permit a round robin selection of 3 or more states (for example "off," "slow," "medium," "fast"). Another enhancement is to allow a more complicated state transition map involving a group of foot-switches. Yet another enhancement is to permit timed events to be issued. The simplest of these would be timed pause operations between control signal events, while a more enhanced implementation would permit real-time control event play-back capabilities to be assigned to a foot-switch. Such real-time event sequences could include not only note sequences but also trajectories of continuous parameters (for example, exponential transients or linear ramps). Further, the invention provides for the issuance of the same selection of possible control signal options upon incoming or outgoing page-change events during a stored memory page change.

Finally, larger foot controller assemblies with appropriate organizational and ergonomic layout are advantageously provided for by the invention. Among the factors here are overall ergonomic operation, putting some foot controlled elements closer to the user for fast or intimate use with others farther away for background or occasional use, and an overall physical and operational organizational hierarchy. In implementing such hierarchies, each full stored program page can involve one or more sub-pages which also be used as a part of other full stored program page. Although such a sub-page can in general be assigned to any foot operated control element, it typically would be useful to confine each sub-page to a pre-defined reusable geometric region in the overall foot controller layout. Further, the invention provides for sub-pages to be changes within an active full page.

Figure 29:
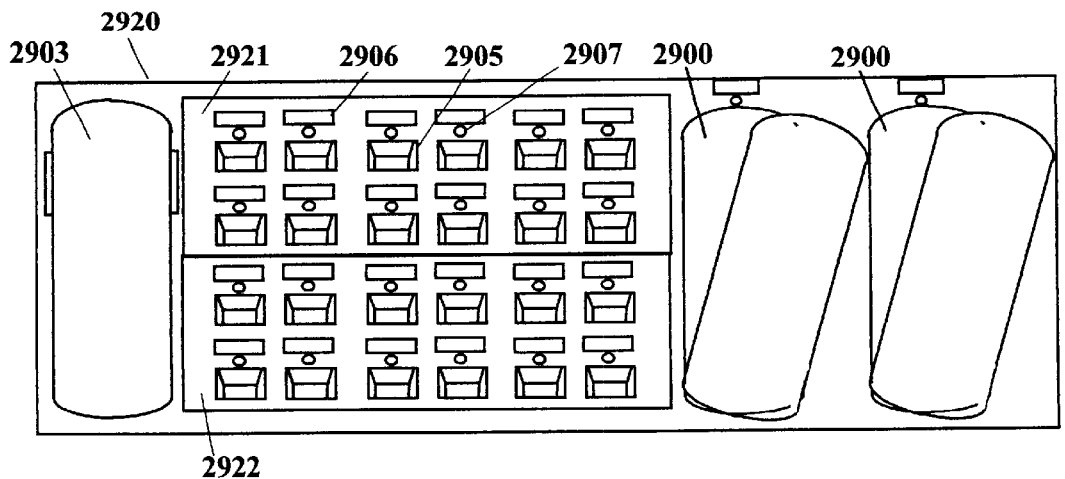
FIG. 29 shows some example layouts involving 2 geometric regions for a moderate number of foot operated controllers and 4 geometric regions for a larger number of foot operated controllers.
Figure 29:
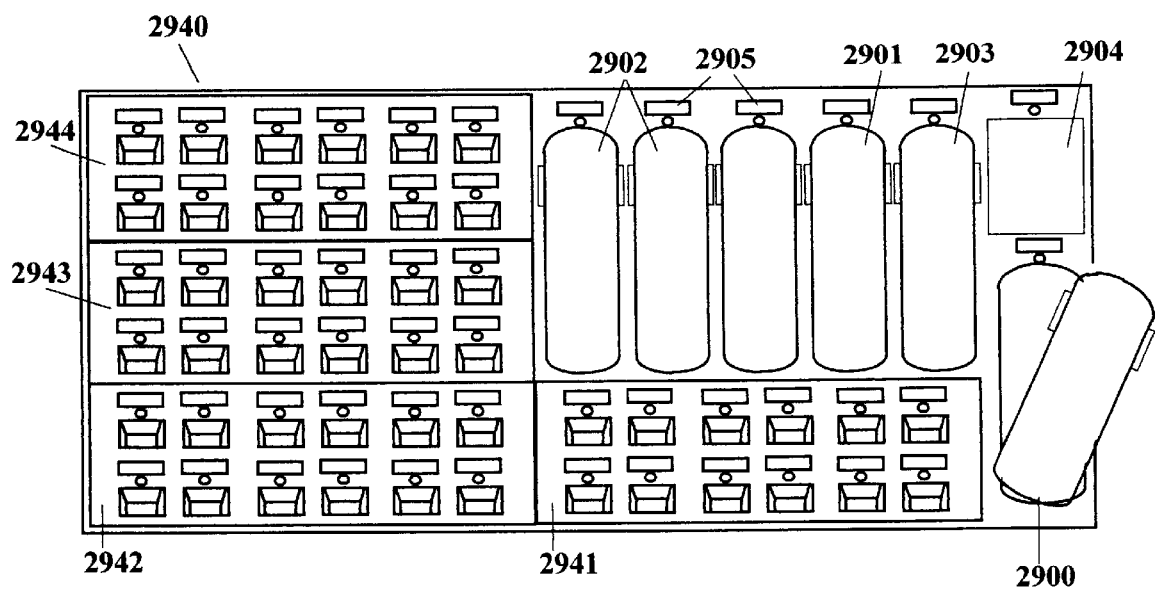

FIG. 29 shows some example layouts involving 2 geometric regions for a moderate number of foot operated controllers 2920 and 4 geometric regions for a larger number of foot operated controllers 2940. The smaller arrangement 2920 features a rocker pedal with two side-mount spring controllers 2903 and two rock/twist pedals 2900 as well as two geometric regions—one proximate 2921, another remote 2922—of foot-switches 2905. Each foot-switch and pedal is provided with an alphanumeric display 2906 and a last-operation indicating-LED 2907. The larger arrangement 2940 features an advantageous layout of two proximate geometric regions 2941, 2942 of foot-switches, two increasingly remote geometric regions 2943, 2944 of foot-switches, one proximate rock/twist pedal 2900, remote pedals of rocker only 2901, single side spring lever 2902, and double side spring lever 2903, as well as a foot or toe operated touch-pad 2904. Each foot operated controller is also provided with an alphanumeric display 2906 and a last-operation indicating-LED 2907. The layout used in the larger unit permits logical association of groups of switches and pedals in a wide variety of contexts. In either the smaller or larger arrangement, the more remote controllers can be put on progressively higher risers to create a staircase layout. These arrangements permit for an arbitrary logical hierarchy of page and sub-page recall control and arbitrary assignment of which buttons may be used to do this. In some cases it may be desirable to have an additional summary display showing the selected page and sub-page status in one location at a glance.

3.3 Multi-tier Proximate/superimposed Keyboards

The proximate and superimposed keyboard elements described earlier can be combined to create a powerful enhanced keyboard controller. In an example implementation, an arrangement of three proximate keyboards such as shown in FIGS. 3A–3C may be brought together in a common unit. This unit may also advantageously include one or more of any of sliders, knobs buttons, joysticks, touch-pads, strum-pads, impact sensors, etc. Further, it is noted that any of the keyboards here may be either of a standard variety or any of the more advanced keyboards described later (miniature, superimposed, multi-parameter keys, pressure-sensor array, etc.). It is also noted that this technique may be applied to other types of keyboards with applicable types of key geometry.

3.4 One-hand Enhanced-drum-roll Controllers

Figure 30:
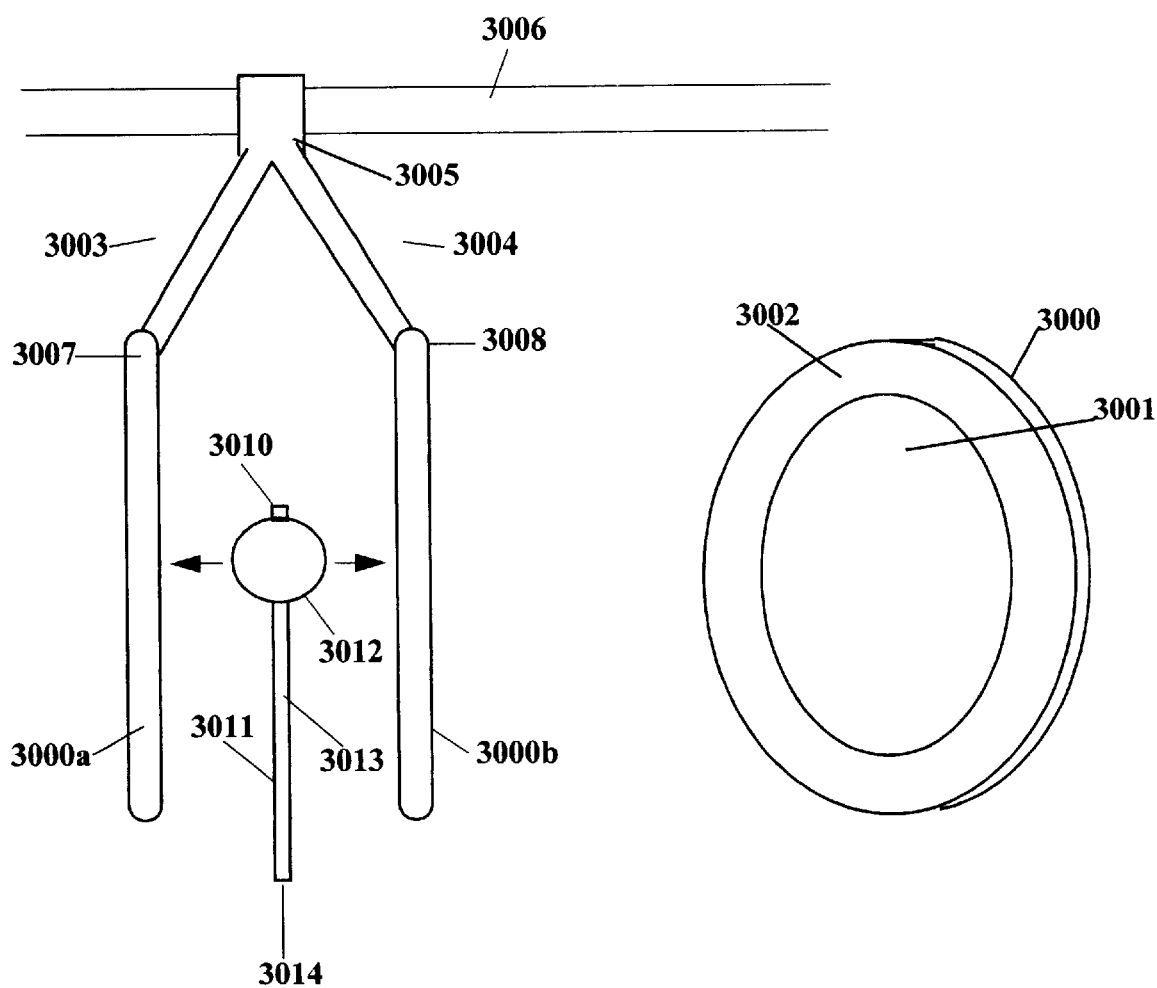
FIG. 30 shows an example large-scale arrangement of two impact sensors and/or touch pads for executing one-handed drum-rolls and deriving large amounts of control information.

The invention provides for one-handed methods of performing drum-rolls with some advanced capabilities. The basis of the method involves the proximate location of two electronic impact sensors and/or touch pads oriented to be facing each other, but the method can also be used with acoustic drums. The arrangement can be small in scale, i.e., played with a single finger, or larger to be played with hands, beaters, mallets, or sticks. FIG. 30 shows an example large-scale arrangement of two impact sensors and/or touch pads for executing one-handed drum-rolls and deriving large amounts of control information. The figure illustrates a larger-scale arrangement of two impact sensors and/or touch pads 3000a, 3000b supported in the method's configuration by, for example, supporting beams 3003, 3004 connecting to a common suspending clamp 3005 on an instrument-stand beam 3006 on one side and joints 3007, 3008 to the sensors and/or pads 3000a, 3000b on the other side; though, clearly, other mounting arrangements are possible. The sensors and/or pads 3000a, 3000b are separated from one another by a distance that permits a beater 3010, mallet, or stick to be held in one hand at the far end 3011 and rapidly rocked back and forth between the two sensors and/or pads so that the beater head 3012 impacts the sensors and/or pads. The beater may also be held at its center of mass or geometry 3013 and vibrated so that both the beater head 3012 and end tip 3014 of the far end impacts the sensors and/or pads; in this technique the player may orient the beater motion so as to simultaneously impact one impact sensor and/or pad with the beater head 3012 and impact the other impact sensor and/or pad with the beater end tip. In this playing technique it is advantageous to have provided for some regional differentiation of the impact sensors and/or pads; null/contact pads, for example can do this. Another arrangement is that of two impact sensors, one for the center area 3001 of an impact pad 3000 and the other for the outer rim area 3002. With the ability to differentiate regions of impact, and even non-impact applied contact regions and pressure, the portion contacted by the end tip and head can be differentiated. Further enhancement can be obtained by using a beater endowed with sensors; these can provide contact localization information, as well as hand grip information, which may be used independently or in correlation with the information generated by the pads 3000a, 3000b. The resulting arrangement allows a performer with one hand to do a wide range of percussion and other control actions, leaving the other hand free for playing another instrument entity or expressing visual gestures during performance.

In a smaller scale implementation, one or more fingers can be used in place of a beater. This arrangement can be treated as an instrument element in itself to be used as part of other instrument entities.

Regardless of scale, it is noted that two such arrangements can be colinearly co-located but in 90-degree rotational offset. This creates a rectangular cavity for beats, fingers, etc. to be inserted and vibrated, and additional degrees of control. This can be generalized into arbitrary polygonal cross-sections (triangles, pentagons, hexagons, etc.).

3.5 Video Hand Position and Gesture

A camera with appropriate real-time image processing may be used simultaneously or mutually exclusively as an instrument element as well as a video feed source for recording or performance. As such the camera may be treated as an instrument element mounted on an instrument entity, but can also be used as a self-contained instrument entity. For example, a camera could be aimed upwards and surrounded by illuminating lights. A performer can activate and control this instrument entity by putting a hand over the camera and executing various positions and gestures recognized by the image processing capabilities.

3.6 Video Stage Tracker

A camera may also be used to transform visual information observed from a stage into control signals. The relevant image processing and recognition capabilities may advantageously include identifying and tracking performer location and motions.

4 Example Adapted Instruments

This section discusses example manners and methods the invention provides by which a number of traditional vibrating element instruments can be enhanced by incorporating various synergistic combinations of traditional components and the invention's instrument elements.

4.1 Autoharp

A traditional autoharp incorporates a plurality of strings, tuned to selected notes in a chromatic scale, which are selectively damped by mechanical damping bars with cut-outs in the damping material that allow only selected strings to sound. A player selects and activates a damper bar associated with a chord and strums a portion or all of the strings, and only the undamped strings, namely those associated with the voicing of the chord, sound. Although at times considered a lower folk or beginning instructional instrument, the basic arrangement of the autoharp can give rise to a powerfully flexible instrument.

In its simplest provision, the invention provides for an autoharp to be supplemented with sliders, switches and buttons for issuing control signals. In particular, a select group of buttons or contacts can be operated by, or in conjunction with, the mechanical damper bars. This group of buttons or contacts may be used to control at least one of the following: issued note control signals for sound, lighting, and/or special effects, note assignments to one or more strum-pads, and/or the amplification of individual strings. The individual strings of the autoharp may have one or more of the following: a common pickup for the entire group of strings, a plurality of smaller pickups associated with subgroups of strings, or a full plurality of individual pickups for each string. The pickups may be any of electromagnetic, piezo, optical, etc. in their operation. In cases where a plurality of pickups is employed, signals from groups of strings or individual strings may be handled by multi-channel signal processing as described later (for example, treating the strings with differing degrees of equalization, chorus, reverb, pitch shift, dynamic filter sweeps, etc., and/or providing separate noise gates, compression, limiting, amplitude control, etc.). In cases where each string has its own pickup, the plucking of a particular string may further be used to trigger a synthesizer note, lighting, or special effect event, potentially using the amplitude of the pluck to set note velocity and potentially tracking the ongoing string amplitude and even harmonic structure variations as provided for in the invention and described later. Strum-pads may be provide for use in conjunction with strumming the strings or in conjunction with operating the mechanical chord dampers. Controls may be provided for stored program recall of control signal assignments, strum-pad voicings, etc. as well as operational features such muting or sustaining of strum-pad notes, whether notes issued at the pressing of a chord damper bar are released when the damper bar is released or instead only when a new bar is activated, etc. These control features may also be controlled remotely, for example, with a foot controller, and/or implemented remotely in a separate signal routing, processing, and synthesis entity 120.

Figure 31:
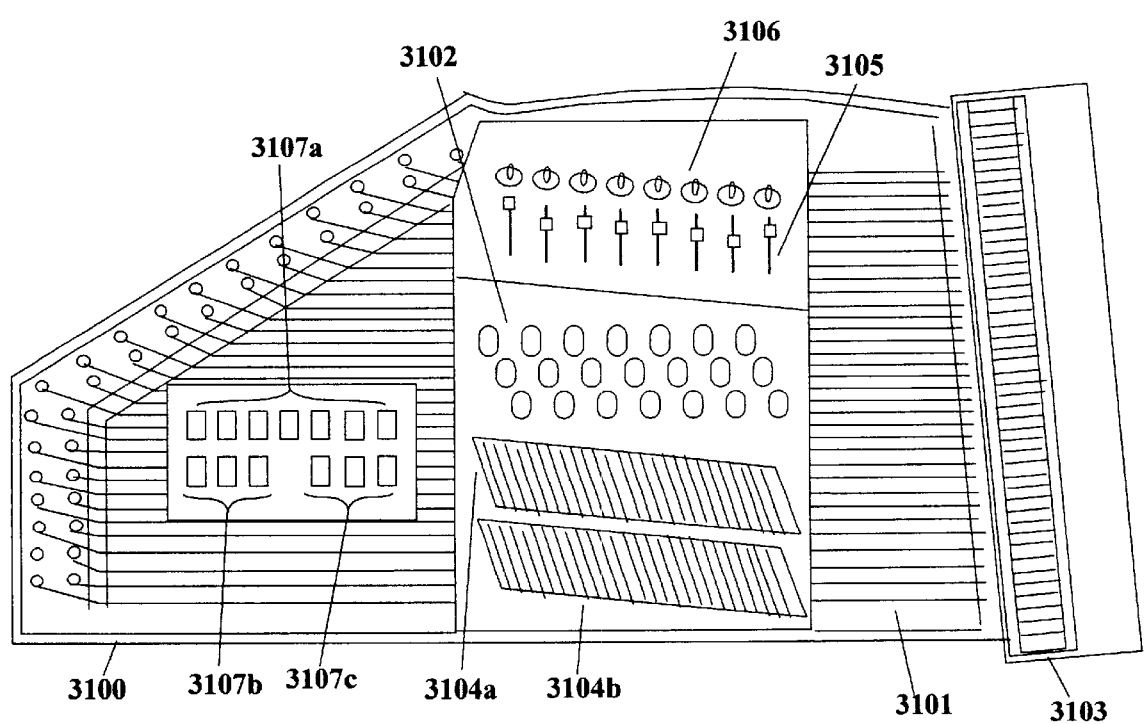
FIG. 31 shows an example of an enhanced autoharp implementation as provided for in the invention.

FIG. 31 shows an example of an enhanced autoharp implementation as provided for in the invention. A conventional autoharp 3100 with the usual arrangement of strings 3101 and damper-bar activating chord buttons 3102 may be fitted with a long strum-pad 3103 adjacent to the traditional strumming area, one or more shorter strum-pads 3104*a*, 3104*b* near the chord button area, a plurality of slider controls 3105 and control switches 3106, and control buttons for stored program recall 3107*a*, operational mode control 3107*b*, or other features 3107*c*.

As another part to the invention, the mechanical chord damper bar arrangement may be advantageously replaced with a 12-note keyboard or similar arrangement for selecting which chromatic notes are allowed to sound. String damping control may be done mechanically although this requires damper bars to normally damp selected strings and let those wanted strings sound only when a key or button is depressed (rather than damping only unwanted strings when a key or button is depressed). In this way more arbitrary chords can be selected, chords can be dynamically changed at a resolution down to one pitch at a time, etc. Alternatively, if a separate pickup can be provided for each string, mechanical string sounding control may be replaced with electronic amplitude control. In the simplest form, all strings of various octaves of the same note are gated on and off by the depression of the key on the keyboard associated with that note. If the key depression-depth or total pressure on the key is used as a volume control, the relative volume of all octaves of each pitch can be controlled independently from that of other pitches. If the key further has two-dimensional touch sensing, as with a null/contact touch-pad on each key, balance between various—typically four—octaves can be continuously varied (for example left/right controls the balance between octaves 1 and 2 and in/out controls the balance between octaves 3 and 4, thus allowing arbitrary balance choices of the four octaves). The multi-parameter key control of the amplitude and mix of each sounded note is of particular value while the string sounds after the note is initiated. The keyboard, multi-parameter or not, can also be used to control similar aspects of note assignments and amplitudes of synthesizer notes initiated with each strum-pad.

Figure 32:
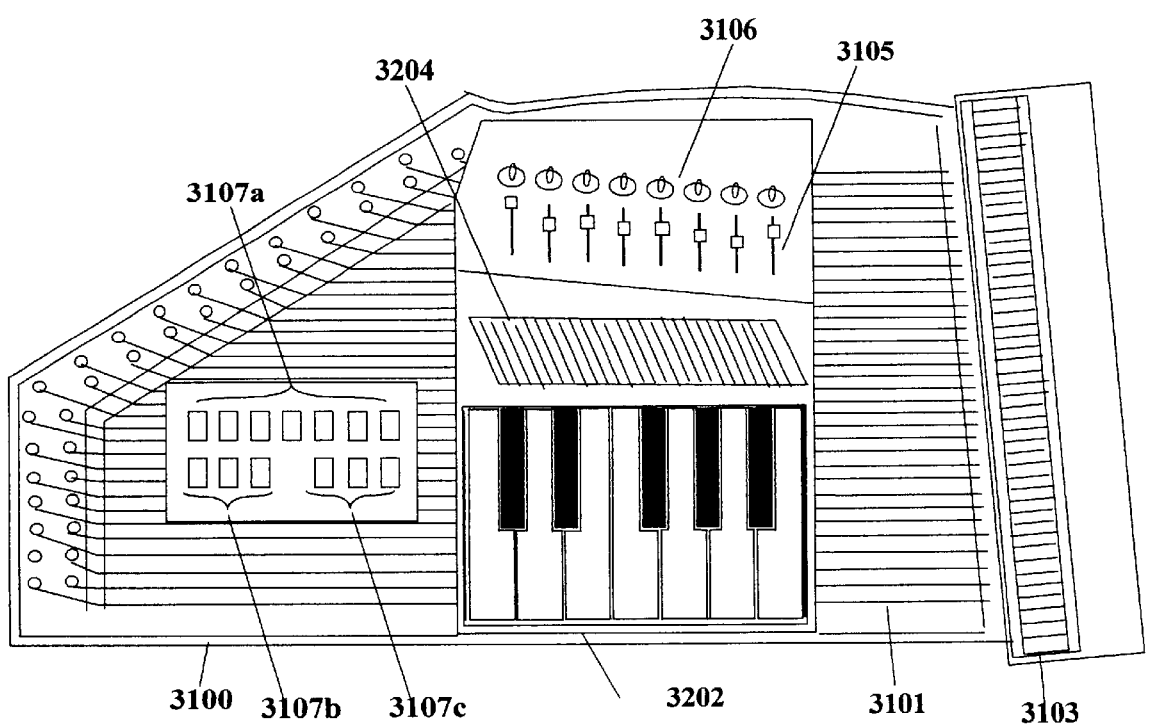
FIG. 32 shows how the autoharp arrangement of FIG. 31 can be adjusted to replace its chord button array and associated strum-pads with a keyboard and one or more strum-pads positioned over the keyboard.

FIG. 32 shows how the autoharp arrangement of FIG. 30 can be adjusted to replace the chord button array 3102 and associated strum-pads 3104*a*, 3104*b* with a keyboard 3202 and one or more strum-pads 3204 positioned over the keyboard.

4.2 Harps, Koras, Zithers, Kotos, Mbiras

The enhancements of Harps, African Koras, Zithers, Japanese Kotos, African Mbiras, and other related instruments with a large array of hand-plucked vibrating elements are also provided for as part of the invention. As with the above autoharps, pickups may be used for all vibrating elements, or, advantageously, sub-groups of elements, or—most advantageously—separately for each vibrating element. The pickups may be any of electromagnetic, piezo, optical, etc. in their operation. The invention also provides for the instrument to be supplemented with strum-pads, touch-pads, sliders, switches and buttons for issuing control signals and affecting internal operation and note-event handling modes.

In cases where a plurality of pickups are employed, signals from groups of vibrating elements or individual vibrating elements may be handled by multi-channel signal processing as described later (for example, treating the strings with differing degrees of equalization, chorus, reverb, pitch shift, dynamic filter sweeps, etc., and/or providing separate noise gates, compression, limiting, amplitude control, etc.). In cases where each vibrating element has its own pickup, the plucking of a particular vibrating element may further be used to trigger a synthesizer note, lighting, or special effect event, potentially using the amplitude of the pluck to set note velocity and potentially tracking the ongoing string amplitude and even harmonic structure variations as provided for in the invention and described later. Strum-pads may be provided for use in conjunction with plucking the vibrating elements.

Harps, Koras, Zithers, Mbiras, and other related instruments with a large array of hand-plucked vibrating elements often have only selected pitches available; accidentals and extreme octaves typically are not represented. Many of these instruments allow for accidentals during playing, for example harp tuning levers and Koto string bends, while others, such as the Mbira, do not; in almost all cases extremal octaves are not supported at all (aside from execution of fundamental-muting string "harmonic chiming" to attain high octave pitches). With each vibrating element (or, less flexibly, groups of vibrating elements) provided a separate pickup and audio channel, pitch shifting can be used to electronically obtain pitches not provided for by the natural form of the instrument as well as large expressive pitch bends that may also not otherwise be possible.

Figure 33:
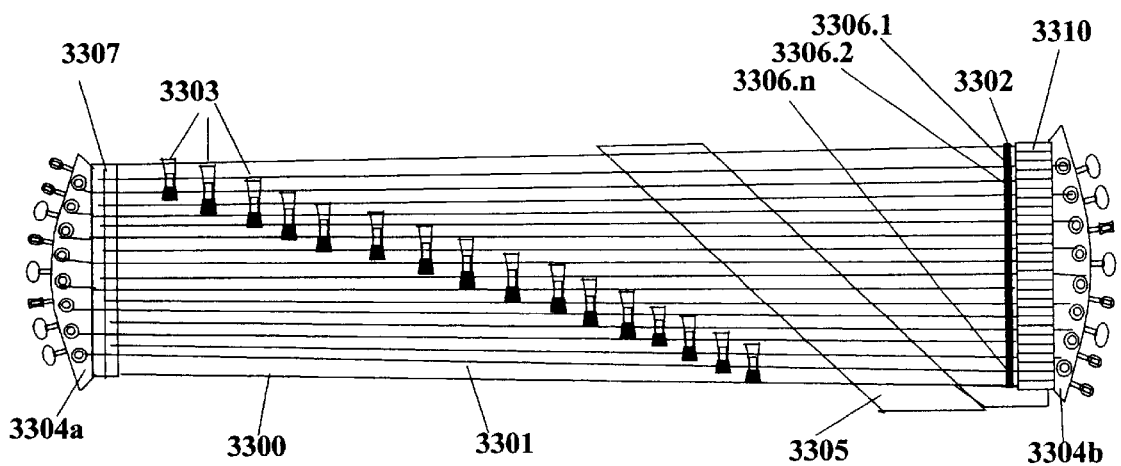
FIG. 33 shows an example Koto implementation provided for in accordance with the invention.

FIG. 33 shows an example Koto implementation provided for in accordance with the invention. In general a Koto includes a number of strings 3301 (typically 13 to 22 in number), a sounding bridge 3302, and a movable truss bridge 3303 for each string. The Koto 3300 shown in FIG. 33 is of the Vietnamese variety, traditionally strung with sixteen metal strings; in general any traditional Koto (or Chinese Sheng) can be adapted as will be described and may have any traditional number of silk, nylon, metal, or other material strings. In this example the Koto has been fitted with geared string tuners split into two groups 3304*a*, 3304*b* to facilitate radical tuning changes and string replacement; other nominal string tuning mechanisms, including traditional friction pegs or slip knot systems, may also be used. Each string can be given its own pickup 3306.1–3306.*n*, at the bridge 3302; alternatively, or in addition (should the string be such that electromagnetic, optical, or other non-piezo pickups be applicable) at a different string location in one or more pickup housings 3305. Multi-channel signal handling as described earlier and later on can be used. The Koto can be fitted with a strum-pad 3310 and may also be provided with various additional sensors and controls as described earlier. Because of the unique pitch-bending arrangement of the Koto involving varying the tension of the string on the non-plucked side of the movable truss bridges 3303, it may also be advantageous to provide strain gauges on far bridge 3307 or via, for example, flexible attaching electrical cables on the truss bridges 3303 themselves.

Figure 34:
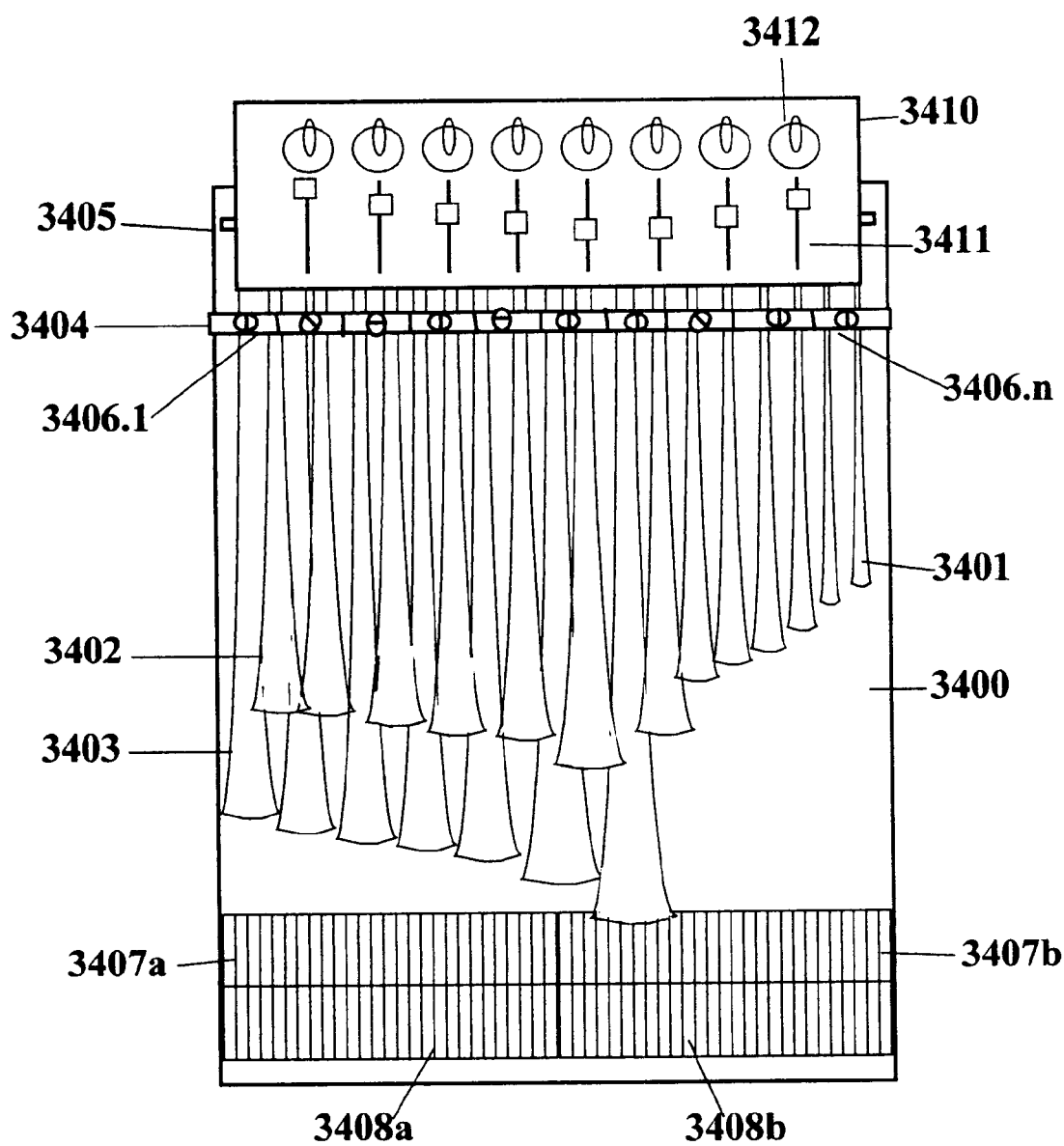
FIG. 34 shows an example Mbira implementation provided for in accordance with the invention.

FIG. 34 shows an example Mbira implementation provided for in accordance with the invention. Here a traditional Mbira 3400 with three sets of tynes 3401, 3402, 3403 secured by a bridging pressure bar 3404 is shown. Here the traditional bar bridge may be replaced with individually adjustable bridge elements 3406.1–3406.*n* which may include separate piezo pickups for each tyne; alternatively electromagnetic or optical pickups may be provided under each tyne. The Mbira may also be provided with one or more strum-pads 3407,3408 which may be full length or partitioned into right and left segments 3407*a*, 3407*b*, 3408*a*, 3408*b* for use with the thumbs of both hands.

Any of these instruments may also be provided with vibrating element excitation employing the methods presented earlier in association with FIG. 24. In addition, as the timbre of these instruments is typically shaped by the sympathetic vibration of unplucked strings on the instrument, it may also be advantageous to excite, as a group or individually, a number of vibrating elements such as tynes or strings using the methods described earlier; these sympathetically vibrating electronic elements, which need not be mounted to the instrument, can then produce audio signals that can be used for ambient effects. Alternatively, a dedicated group of sympathetically vibrating elements can be mounted to the instrument and excited mechanically rather than electrically. If the sympathetic vibrating elements have individual pickups, some of the elements can be selectively turned off or attenuated so as to thin out or spectrally sculpt the ambient effect.

4.3 Single-course Guitars and Variations

One of the most versatile instruments available for the range of timbre and expression is the electric guitar which is sadly not often used seriously in music composition due to its origins and significant role in popular music. (In fact, at this writing, even toy pianos are taken more seriously than the electric guitar!) Part of the reason for the immense range of timbre and expression is the fact that it is one of the few instruments where both hands can be in direct contact with the string. Another important reason is the range of timbres that can result from string pickups followed by a wide degree of signal processing methods that have been developed and can be applied. Although there continue to be developments in basic electric guitar themes, the invention provides for significant enhancements of the electric guitar as a powerful instrument entity.

An important first step is the provision of separate audio signal pickups for each string; these may be electromagnetic, piezo, optical, etc. This allows for multi-channel signal processing as will be described later (for example pitch shifting particular strings for big bass notes, enhanced processing for strings playing solo lines to stand out from strings playing background material, etc.). Strings may be given one or more dedicated or shared pickups at different points along the string's length so as to capitalize on the different harmonic structure and dynamics offered by different pickup locations. A plurality of pickups dedicated to the same string or same group of strings can be selected or mixed, potentially in adjustable phase relationships, statically and/or varying in time, on the instrument and/or externally. Further, selected strings may be excited by electromagnetic, piezo, or other methods to give a continuously sounding bowed effect whose inter-note attack can be controlled by various fretting techniques. Additional strings arranged to serve as a harp element, bass notes as on an arch-lute, or for sympathetic vibration may also be provided, as may tynes or other vibrating elements used in similar ways. Strum-pads, sensors, sliders, joysticks, buttons, touch-pads, actuators, etc. may also be added to issue control signals to any of signal processing, lighting, synthesizer, or special effects. Similarly, video cameras can be used to generate control signals and/or for video image feeds in performance or recording.

Figure 35:
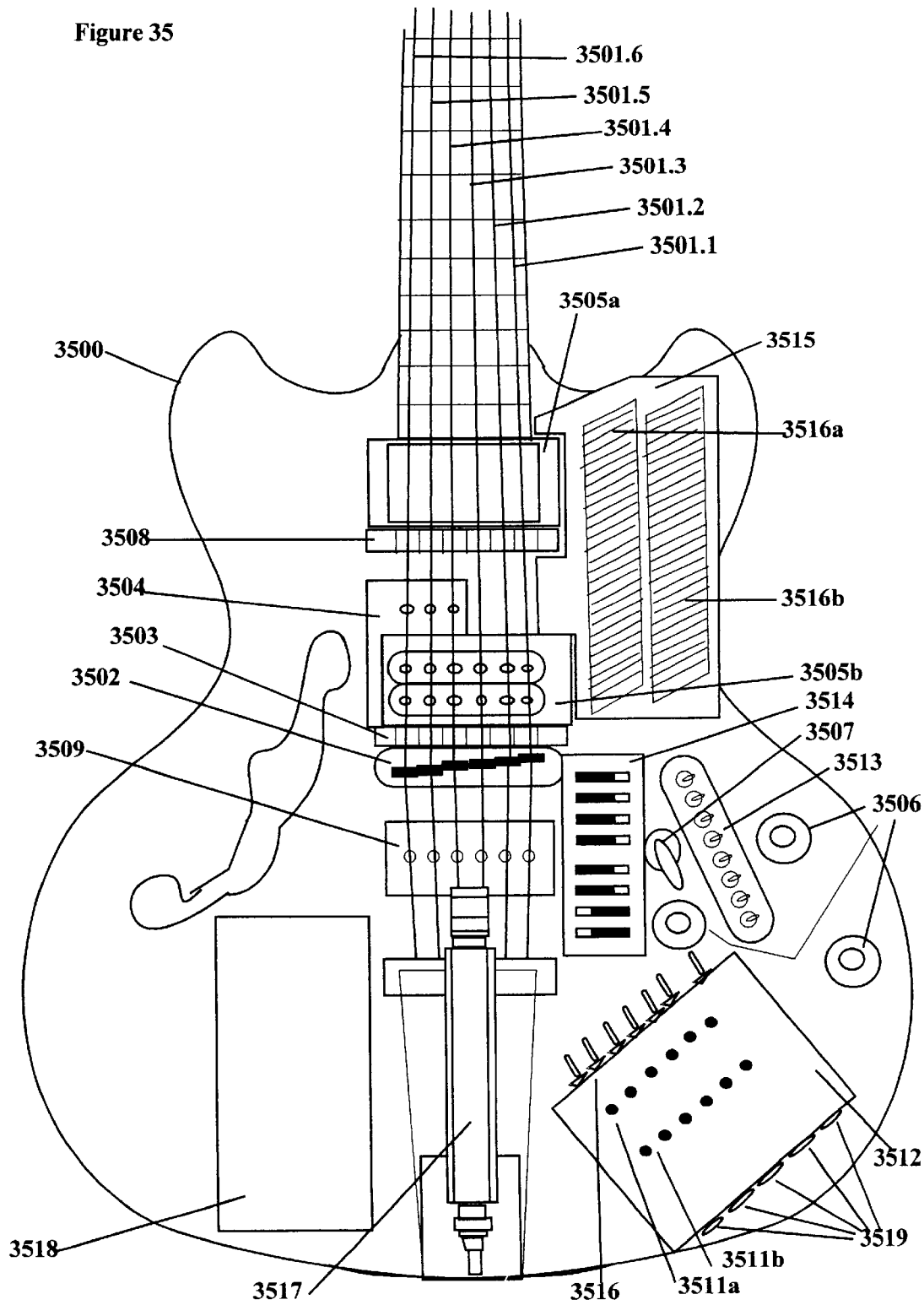

FIG. 35 shows an example electric guitar implementation in accordance with the invention based on a Gibson model ES-335 guitar or other instruments of that style. The invention's enhancements shown can be added on as modules, added collectively, or built-in. The core guitar 3500 features six strings 3501.1–3501.6, a bridge 3502 which may provide separate piezo pickups for each string, an adjacent hexaphonic pickup module 3503 which provides separate electromagnetic, optical, or other pickups for each string, and additional individual string pickup module 3404 for the three lower pitched strings 3501.4–3501.6, two shared pickups of a two-coil humbucking design near the neck 3505a and near the bridge 3505b, shared pickup volume and tone controls 3506, and a shared pickup selector switch 3507. Individual strings may be electronically excited by means of any of a hexaphonic electromagnetic drive unit 3508, a hexaphonic pickup used as a drive unit (or designed as a drive unit) built into the forward shared pickup 3505a, or by mechanical excitation via the piezo elements in the bridge 3502. Individual string excitation, or even string activity in general, can be visually indicated by an LED (preferably high-brightness) array 3509 under the strings. Group string excitation may be realized by whichever of pickup 3505a or 3505b is not in use, an additional module under the stings, or by group mechanical excitation via the piezo elements in the bridge 3502. Individual string pickup gain normalizing adjustments for each hexaphonic pickup can be made available for screwdriver adjustment 3511a, 3511b on an add-on box or built-in panel 3512, shown in the Figure as an add-on box with generalized interface connectors 3519 on its back downward side. The instrument may also be provided with an array of control switches 3513 and sliders 3514, individual string pickup selector switches 3516, a video camera 3517 aimed at the playing area but also useful for hand posture and gesture control, and an area 3518 for additional controls, touch-pads, string or tyne arrays, etc.

FIG. 5 shows an example electric guitar implementation in accordance with the invention based on a Gibson Explorer model guitar; the invention's enhancements shown can be added on as modules, added collectively, or built-in. The core guitar 500 includes six strings 501.1–501.6, a locking-nut vibrato bridge 502a with string-tension "whammy bar" 502b and fine tuners 502c, a hexaphonic electromagnetic or optical pickup module 503, a shared pickup 505a near the neck and another 505b near the bridge, a shared pickup volume control 506, shared pickup selection, mixing, phase, and coil-shunt switches 507. The instrument may also be fitted with a hexaphonic electromagnetic excitation module 508 with string drive indicated LEDs 509. Also provided for by the invention are controls for creating control signals: an array of switches 513, knobs 514a, one or more expression wheels 514b, one or more joysticks 514c, two side-by-side strum-pads 56a, 56b which can be operated as one long strum-pad, chord buttons 520 as described for the autoharp but here used without strings and rather in conjunction with the strum-pads, a touch-pad 522, two miniature keyboards 521a, 521b, a miniature harp/sympathetic string set 524 with group or individual pickups partitioned in string triads with separate bridges 523a, 523b, 523c and tuning heads 525, and a plurality of impact sensors. Internally the whammy bar may operate a discrete or continuous position sensor and the instrument may also include motion sensors (such as accelerometers) or position detectors (radio, ultrasonic, optical, etc.). The generalized interface connector area 519 in this instance is shown built into the instrument.

4.4 Baroque and 12-String Guitars, Lutes, Tars, Setars, Saz, Oud, Mandolins, Mandolas These instruments involve double-strings. In addition to the techniques and additional instrument elements, each double-string pair may share an individual pickup, or each string within in a double string pair may have its own pickup. At this writing the best more for the latter appears to be piezo pickups at the bridge due to limitations in localizing magnetic fields for such close geometries but optical or other methods could be devised. With a separate signal for each string within in a double string pair, either of the strings can be selectively disable, pitch-shifted, equalized, etc. along with other capabilities such as adjustable balance, stereo spatial output, opposing location modulation trajectories, etc. Further, as a combined double-string signal would confuse audio-to-note information conversions, separation of the string signals for a given string pair enables control extraction such as conversion to MIDI note functions.

Figure 36:
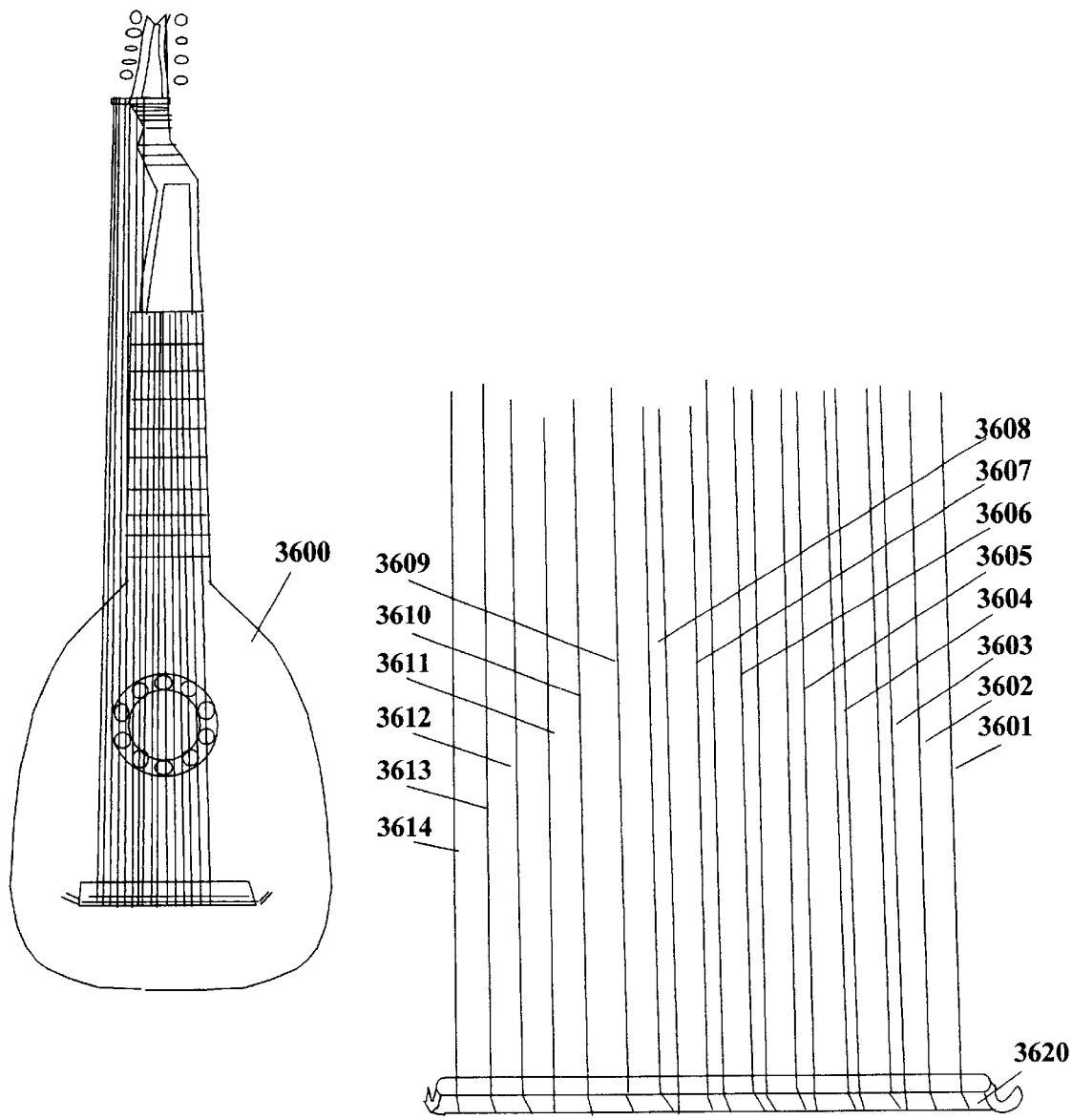
FIG. 36 shows an example of an adapted European arch-lute with a mix of single strings and double string pairs.

FIG. 36 shows an example of an adapted European arch-lute with a mix of single strings and double string pairs. The European arch-lute 3600 with various ranges of extended fretted and unfretted bass strings is a noble instrument which with amplification, signal processing, and multi-channel signal handling can contribute greatly to electronic music. FIG. 36 shows a close-up of the strings at the bridge 3620 for a fourteen string version of the lute with six extended-length unfretted bass strings: the two highest-pitched melody strings 3601, 3602 and the six extended-length unfretted bass strings 3609–3614 are single while the remaining courses 3603–3608 are double-strung. Of the double-strung strings the higher pitched ones are typically in unions while the lower pitched ones are paired in octaves. It is understood than many other string configurations, varying in how many strings and which are single or doubled, exist and can be adapted as described herein. In fact no electric lutes are known at this time, thus it is novel simply to include a group piezo pickup in the bridge 3620 for all the strings so as to bring the instrument into the world of amplification and signal processing. A next level refinement would be to provide separate group pickups for the extended bass strings and the rest of the strings so that special equalization or other effects can be applied to the bass notes in a manner differing from the other strings. A next level of refinement would be for the bridge 3620 to provide an individual pickup for each individual single string course or string-pair, while a final refinement provides a separate piezo pickup for every individual string on the instrument.

It is understood that various controls, strum-pads, etc. may also be added in the manner described for previous instrument examples. It is also understood that the methods described also apply to other double-strung instruments such as 12-string guitars, Saz, Oud, Mandolin, etc. Many of these instruments may also benefit from an additional set of unfretted bass strings as incorporated in the traditional European arch-lute.

4.5 Pedal Steel Guitars

The pedal steel guitar is a remarkable instrument in that the pitches of individual strings are changed as a group by a hand-held metal slide and relatively within the group by mechanical bridge arrangement, usually called a "changer," which changes the tension on one or more selected strings in response to the action of a given foot-pedal or knee lever. The basic sound of the steel guitar is very attractive and it is possible to tastefully play Bach chorales and hymns on the instrument. Years of incremental development have lead to specific standard pedal and knee lever configurations that are widely accepted. Variations are sometimes difficult to implement because of mechanical limitations to provided adjustments. Because of the commitment involved in mechanically establishing an alternate pedal and lever configuration, immense experience and/or a computer-aided design tool may be required to make valuable accomplishments. By providing a separate pickup for each string, retuning can be done electronically, supplementing or replacing the traditional mechanical mechanisms. As with other adaptations of instruments described thus far, each string can also be processed separately or in groups as desired, allowing for mixes of timbres, and audio-to-control signal extractions can be used to control synthesizers, signal processing, lighting, and special effects. Further, the nearly fixed position of the picking hand and the freedom of some fingers in adapted playing techniques allow usage of miniature keyboards and strum-pads in the picking area as will as use of the wrist to control parameters. Information from the mechanical or electronics pedals and levers and the steel bar position can be used to control the pitches assigned to a strum-pad. The bar itself can have a control area built-in, detecting applied pressure, for example.

Figure 37:
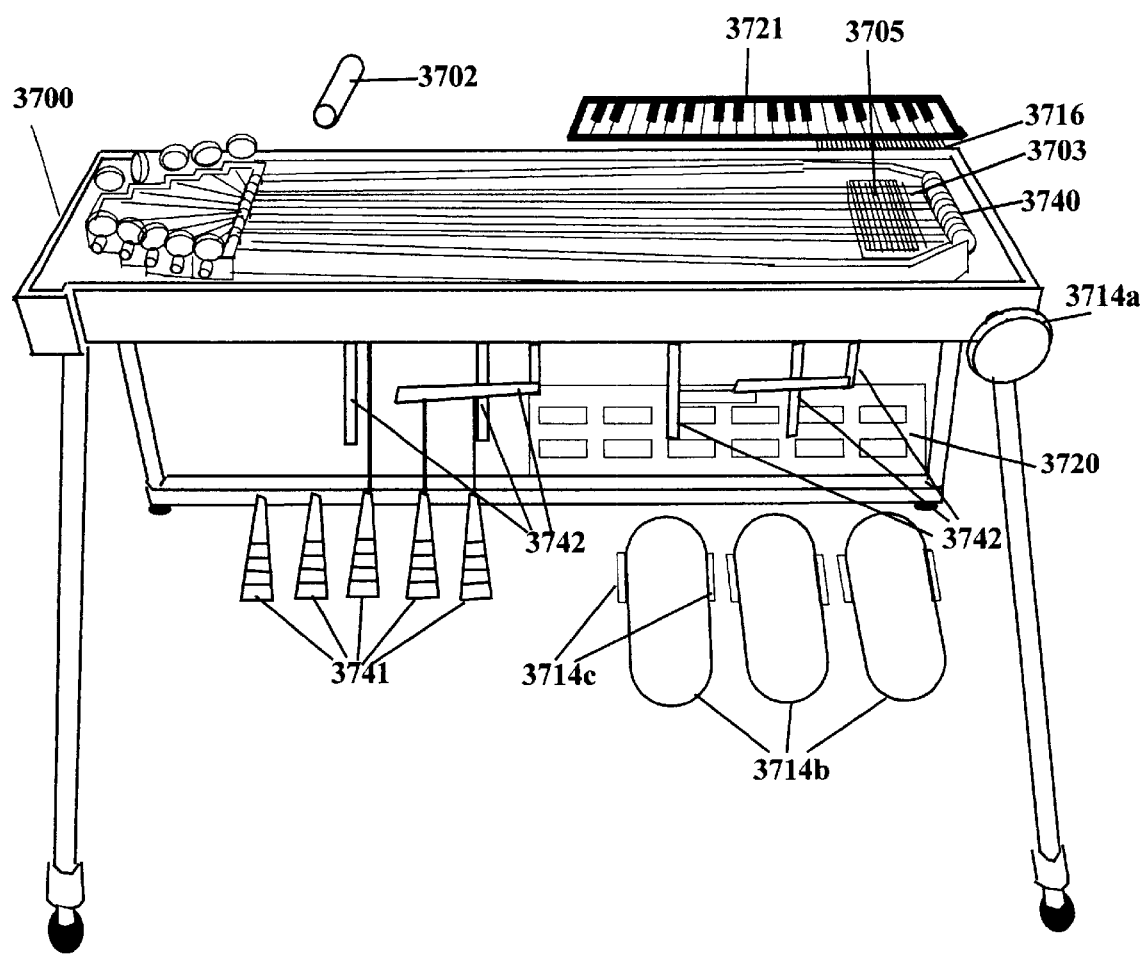
FIG. 37 shows an example pedal steel guitar adaptation as provided for by the invention.

FIG. 37 shows an example pedal steel guitar adaptation as provided for by the invention. A traditional pedal steel instrument arrangement 3700 is used here. The bar 3702 may or may not be provided with internal sensors or controls. The position of the bar 3702 over the instrument 3700 may be sensed by various means (changes in round-trip string resistance, capacitive sensing, etc.) within the instrument 3700. The instrument may include a traditional mechanical changer 3740 with linkages to pedals 3741 and levers 3742 or may be fixed if all pitch bends are to be done electronically. With a mechanical changer, the pedals 3741 and levers 3742 may be fitted with sensors that measure and convert their displacement into control signals. Other control signals may be issued by a wrist operated expression wheel 3714a (which in practice works well for overall volume control), one or more pedals 3714b, some of which may be fitted with side-mounted spring-lever controls 3714c. The pedal rockers can be used for various control functions, but offer a way of bending pitches electronically and holding them without having to devote a foot or knee to that purpose. In contrast, the side-mount spring levers, as well as a spring loaded version of a rocker pedal, directly emulate the spring-return operation of a traditional pedal steel guitar's pedals and levers. The pedals can also be used for the introduction or variation of signal processing on one or more selected strings and can be configured to make such effects while simultaneously changing pitch of selected string or strings. The adaptation also provides for a strum-pad 3716 and miniature keyboard 3721 in the picking area for use by idle fingers. Finally, a foot-controller foot-switch unit 3742 for use in selecting stored programs, controlling signal processing, issuing notes or chords, operating drum machines, etc. is also provided.

4.6 Sitars

The Sitar is an extraordinary rich instrument that is well-suited for the particular structural details of classical indian music. It includes a number of drone strings, only one or two of which can be fretted in any musical way, a single melody string, and an octave pair of unfretted high pitch strings, called the "chikori" (Western spellings vary) used for a variety of purposes including quite effective rhythmic accents, all sharing a common sloping bridge that cause the aforementioned strings to twang to a degree determined by the slope of the bridge. A set of sympathetic strings with their own sloping bridge, which in some techniques can be arpeggiated and/or used as a small harp to a limited extent, is also provided. The Sitar features a selected combination of both brass and steel string types which have important essential distinctions in timbres.

Uses of the Sitar in Western music tend to fall into two categories: one where only the melody string, along with any sympathetic string action, is used, and another where the sitar's many drone strings force the tonality into the standard Indian tonal development system (rich and extraordinarily beautiful as it is). A Sitar-like sloping bridge has been successfully put on a guitar (the Jerry Jones Coral Sitar" heard in many Motown-era popular recorded songs), but all that remains is the twang as the genius of the Sitar holistically has been omitted.

The invention provides for a powerfully rich adaptation of the Sitar by combining the techniques described thus far with the signal routing, processing, and synthesis techniques to be described later and, as with the previous examples, inherent aspects of the instrument.

FIG. 4 shows an adapted sitar as provided for in the invention. The core instrument is a standard Indian Sitar 400 with a standard melody string 401.2, any one of a number of possible stringings of drone strings—here two 401.3, 401.4, are used, and the chikori pair 401.5a, 401.5b all sharing the common sloped bridge 402a. Also part of the core instrument, but not showed explicitly in the Figure for the sake of clarity, are the sympathetic strings, typically eleven in number, with their own sloping bridge 402b and multi-length termination area 402 on the neck under the Sitar's curved frets. Because of the curved frets and the flat bridge 402a, the drone strings 401.3, 401.4 will not sound accurately in pitch for nearly all the frets; further, the characteristic extensive bending of the string, often the interval of a major fourth or more, requires quite a bit of area on the sitar neck (namely the entire bottom half of the neck) and as a result the drone strings' use in melody is essentially nil. However, it is possible to add an additional melody string 401.1 with its own lower bridge; this string would be pushed up to get the bending effects that the original melody string 401.2 is pulled down for. Both melody strings are provided with fine tuning adjustments such as the typical beads 430; these may also be used on drone strings and/or alternate tuning mechanics may be substituted throughout the instrument. Also provided, though not essential, is an additional set of strings 424 that can be used as a harp in addition to the limited-access aforementioned sympathetic strings. In the Figure these are shown well-removed from the neck at the top of the instrument, but the assembly 424 could be brought forward and put in the position currently occupied by the keyboard 421. The keyboard 421 is also not essential but is easy to support electronically, employing the method associated with FIG. 8, in conjunction with the strum-pad 416a located on the plucking area of the neck and the strum-pad 416b located on the thumb-rest area of the neck; further, both the keyboard Harmonium and keyboard synthesizer are popular in Indian classical, modal, and Ghozal folk music.

The strum-pads are provided because of there particular potential use in the Rag (Raag, Raga) form both in laying out the scale of the Rag and melody expositional fragments which are repeatedly drawn upon.

Important to the adaptation is the pickup assembly 403 which provides a separate pickup for each melody string, each drone string, and either the chikori pair or its individual strings. The separate outputs allow for pitch shifting of individual strings; in particular, the pitch shifted retunings of the drone strings and chikori can be made while playing. If the pickup is electromagnetic, the brass strings cannot be used. There is the opportunity here for alternative stringing systems, particularly if pitch shifting of individual strings is used to create larger pitch-shifts, but the character of the brass strings is beautiful and can be captured. One method is to use an optical pickup for the pickup assembly 403. Another more radical approach is to replace the sloping bridge 402 with a standard bridge arrangement fitted with individual piezo pickups and to create the twanging using the off-bridge sitar plate discussed in association with FIG. 21.

The additional melody string can be tuned in union or in an interval to the original melody string; because the have separate audio channels they can be processed differently or be located at different positions in the stereo sound field. Further, the additional melody string, strum-pads, and addition string assembly serve to expand an important orchestrational aspect of seasoned Sitar technique, namely a constant variety of timbres and effects with attention constantly shifting among them. Finally, the electronic pitch shift retuning capabilities allow for hitherto impossible tonality shifts within the Sitar environment, while the electronic pitch shift pitch-bend capabilities allow the drone strings to obtain pitch bending and the melody strings to be harmonized in a pitch-modulated manner.

Figure 38:
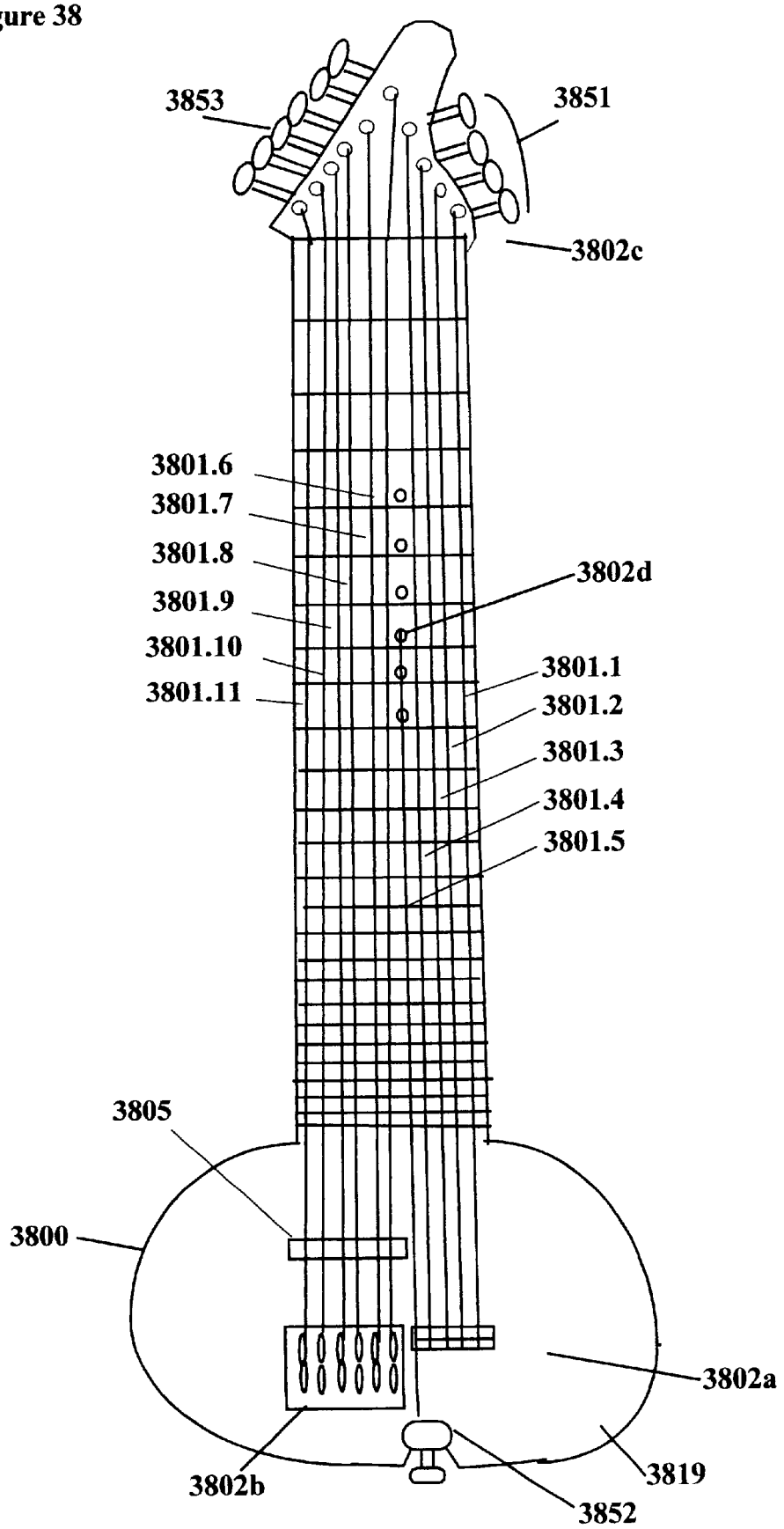
FIG. 38 shows an example flat-necked instrument with a five string section emulating a sitar string arrangement and several additional strings used for bass or other accompaniment.

It is also possible to carry simplified versions of the Sitar tonality into more Western instrument formats. FIG. 38 shows an example flat-necked instrument 3800 with a five string section emulating a sitar string arrangement and several additional strings used for bass or other accompaniment. The sitar emulation section involves strings 3801.1–3801.5 sharing a common bridge 3802a providing a separate piezo pickup for each of the strings. The first four of these strings terminate their vibrations at the nut 3802c and are tuned with neck tuners 3851, while string 3801.5 acts as a one-string fretted chikori and terminates its vibration at one of the mid-neck frets. The best terminating fret may depend on the chosen tuning and thus terminating holes for this string might be provided at several different frets, for example from the 4th fret to the 12th. String 3801.5 requires a different tuning arrangement and in order to accommodate a selection of termination points the tuner 3802 may be located on the body, perhaps with the tuning head in a protective cut-out area of the body. Another important item is that string 3801.4 is brass while the others are steel, creating the Sitar sonority. The additional strings, shown in FIG. 38 as six in number 3801.6–3801.1, can serve as bass strings or harp strings and may be terminated on a rapid return bridge (such as the Hipshot Trilogy product) to facilitate flexible use during performance, particularly because of the width of the fretted neck; alternatively these strings may be unfretted as on the European arch-lute. These strings are most likely best served by steel strings and thus each string may be given its own pickup either at the rapidly retunable bridge assembly 3802b or with a body-mounted multi-channel pickup 3805.

Figure 39:
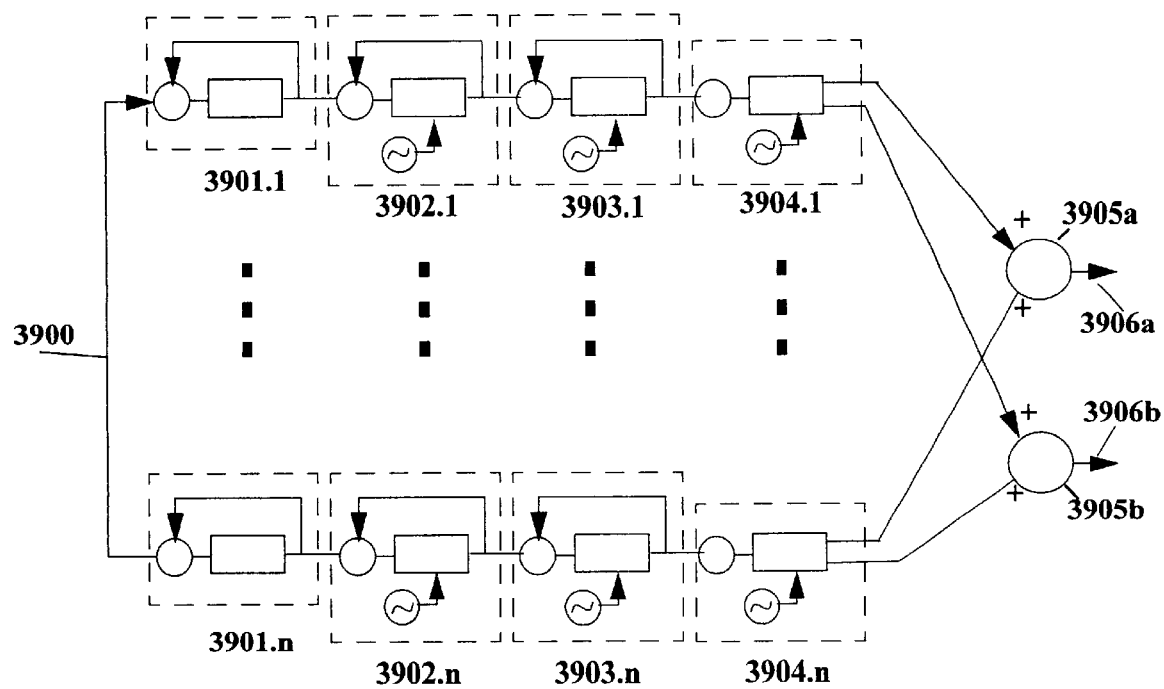
FIG. 39 shows an example multiple-pitch sympathetic/buzz/twang resonator using banks of short audio delays with high resonances tuned to each selected pitch, each followed by a dedicated low-speed sweeping flanger with moderate resonance, a dedicated low-speed sweeping flanger with moderate resonance, and a low-speed auto-panner.

Finally, in lieu of a sloped bridge or the arrangement of FIG. 8, it is also possible to create a synthetic and/or enhance the actual sympathetic/buzz/twang aspect of these instruments with signal processing techniques. A precisely-set, short audio delay (for example 3 msec, 6 msec, or 12 msec for various octaves of the note E in A440 tuning) with high positive feedback acts as a resonator that easily distorts when excited by an audio input at its resonant frequency. This resolutes in a swelling and diminishing twanging similar to that created by the sloping bridge. This sort of effect can be found in one of the example presets of the Boss SE-70 stereo signal processor. The effect can be considerably enhanced by following this resonator with a low-speed sweeping flanger and a low-speed sweeping chorus, each with their own moderate amount of positive feedback, and made more emotionally powerful by low-speed auto-panning location modulation. FIG. 39 shows an example multiple-pitch sympathetic/buzz/twang resonator feeding an input signal 3900 into banks of short audio delays 3901.1–3901.n with high resonances tuned to each selected pitch, each followed by a dedicated low-speed sweeping flanger with moderate resonance 3902.1–3902.n, a dedicated low-speed sweeping flanger with moderate resonance 3903.1–3903.n, and a low-speed auto-panner 3904.1–3904.n. All autopanner outputs are summed by a stereo mixer 3905a, 3905b to create a stereo output 3906a, 3906b. It is important that all the sweep oscillators be slightly detuned to minimize repetitive discernible patterns. The number of individual resonant pitches supported would involve every note in the scale and perhaps an octave of some selected notes such as the tonic and fifth; this could range from 5 to 16 pitches. It is understood that variations, simplifications, and elaborations of this example arrangement are possible.

4.7 Pipas

Like the Indian Sitar, the Chinese Pipa features a mix of string types, here involving steel, silk, and composites of these. The Pipa (and to some extent its Japanese colleague, the Biwa) also has a rich ancient tradition yet contemporary appeal. Despite being far less known, it is capable of a great range of sonic techniques, with a high number of formal playing techniques as compared to many other instruments. Included in the extensive technique suite are a number of body taps and impacts made on the large front surface of the instrument.

As with the above example adaptations, the invention provides for adaptations of the Pipa that involve instrument elements of the invention set to capture and complement the characteristics of this rich and deep instrument. Again, piezo bridge pickups are felt to be the best mode for capturing the subtle acoustic nuances of the different string types, and a separate pickup for each string permits the usual multi-channel signal processing possibilities and control signal extraction for controlling synthesizers, signal processing, lighting, and special effects. Body taps and impacts can be directed towards impact sensors, and the usual possible collection of extra strings, keyboards, strum-pads, touch-pads, sliders, switches, buttons, sensors, etc. may be added to the large open area for instrument augmentations. In particular, strum-pads and a bank of harp strings are especially applicable due to the common use of pentatonic scale sweeps and repeated short melodic figures during development. Also especially useful for incorporation into Western sonic structures would be the addition of a bank of bass strings and the use of signal processing as the Pipa tonal range, though fascinating, arrives somewhat unfocused on undeveloped Western ears unfamiliar with the instrument repertory.

Figure 40:
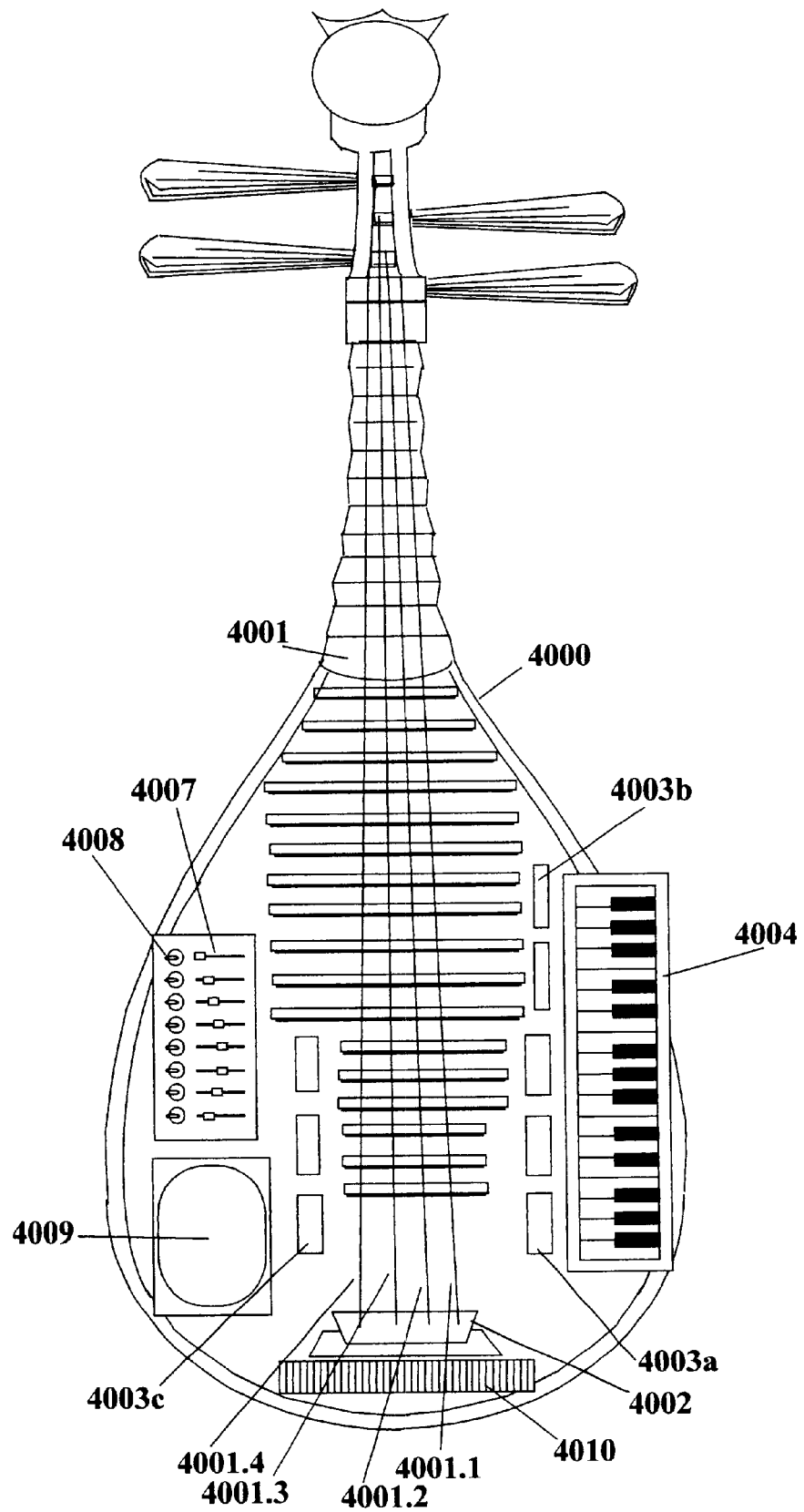
FIG. 40 shows an example adapted Chinese Pipa as provided for by the invention featuring a keyboard, strum-pad, touch-pad, slider array, switch array, and impact sensors.

FIG. 40 shows an example adapted Chinese Pipa as provided for by the invention featuring various impact sensor arrays 4003*a*, 4003*b*, 4003*c*, a keyboard 4004, slider array 4007, switch array 4008, touch-pad 4009, strum-pad 4010, and separate piezo pickups for each string 4001.1–4001.4 at the bridge 4002.

Figure 41:
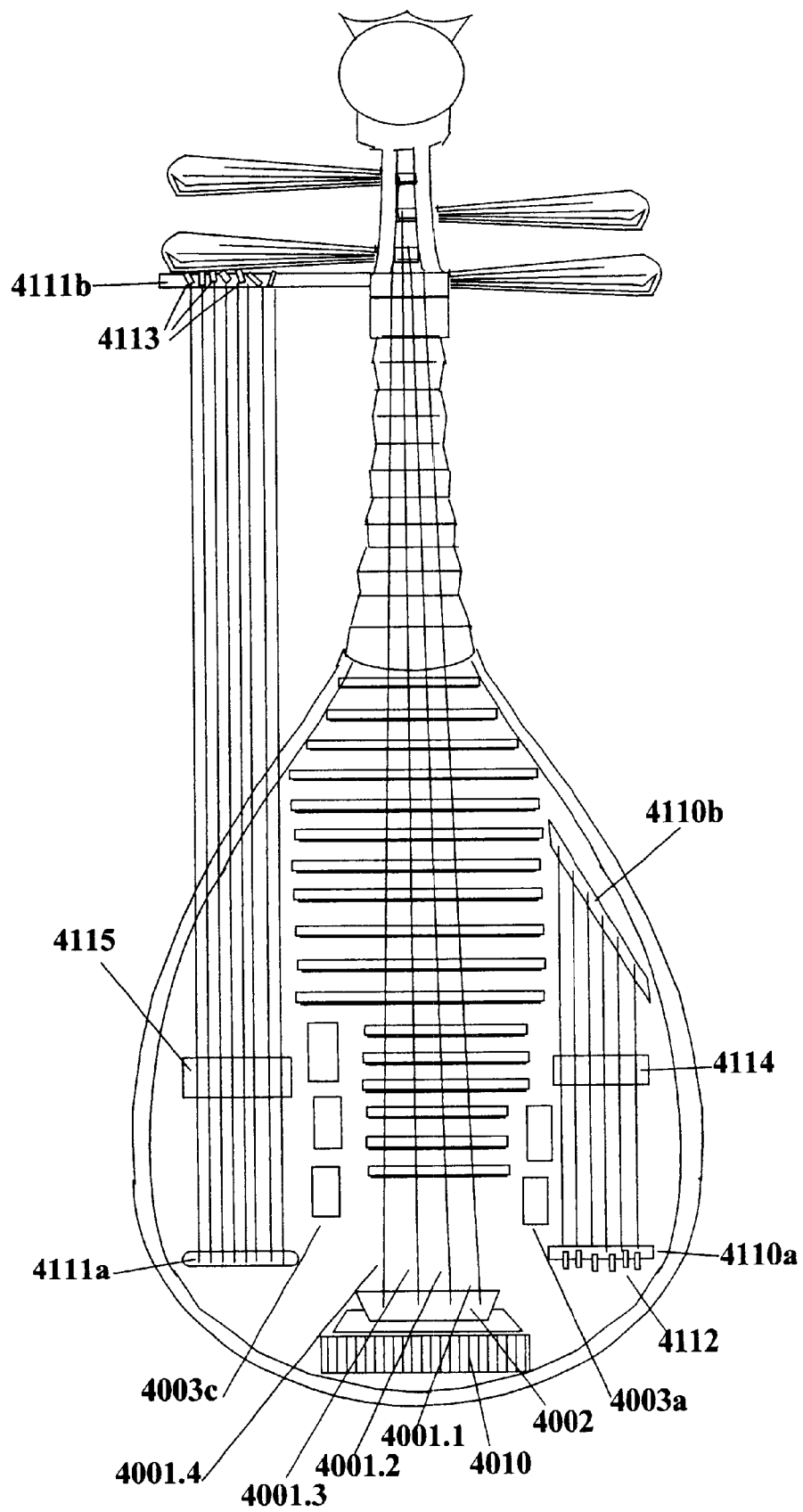
FIG. 41 shows another example adapted Chinese Pipa as provided for by the invention featuring a bass string array, a harp string array, and impact sensors.

FIG. 41 shows another example adapted Chinese Pipa as provided for by the invention featuring impact sensors arrays 4003*a*, 4003*c*, strum-pad 4010, an unfretted harp string array, involving a terminating body tuning bridge 4110*a* and body bridge 4110*b*, and an unfretted bass string array involving body bridge 4111*a* and head tuning bridge 4111*b* with tuners 4113. The two string arrays may have individual string or group pickups located either in the body bridges 4111*a*, 4111*b* and/or on the body at an interior portion of the string vibration 4114, 4115.

It is understood that many other combinations of instrument elements are possible.

4.8 Erhus, Dilruba, Esraj, Sarangi, Kamamcheh

Each of these bowed instruments has its own rich tradition and special tonal qualities. Many of these instruments are used to accompany vocals or even to replace a singer due to the vocal quality of the instrument.

The invention provides for adaptation of these instruments involving instrument elements of the invention set to capture and complement the characteristics of the traditional instrument and its musical traditions. In particular, in addition to the vocal quality of the sounds, bowing is a more conspicuous part of the sound as opposed to Western bowed instruments which encourage burying the perception of bowing logistics in favor of overall smoother tones.

Again separate pickups may be used for each string: electromagnetic, piezo, and/or optical as appropriate for the type of string material, mounting arrangements, and other engineering considerations. A separate pickup for each string permits the usual multi-channel signal processing possibilities and control signal extraction for controlling synthesizers, signal processing, lighting, and special effects. Those instruments with sympathetic strings, such as the Esraj, Dilruba, and Sarangi, may also include pickups for those strings as described in previous example instrument adaptations.

Because each string has its audio channel picked up intimately with the string, it is possible to diminish some effects of the body resonance and replace it with electronically created resonances. In particular, vocal sounds are known to appeal to the ear as vocal in nature due to the relative center frequencies of a pair of predominant resonances as illustrated in FIG. 17. Through electronic synthesis of these resonances the vocal character of the instrument can be changed and, in fact, varied over time if one would dare to make the vocal bowed instrument literally sing.

Figure 42:
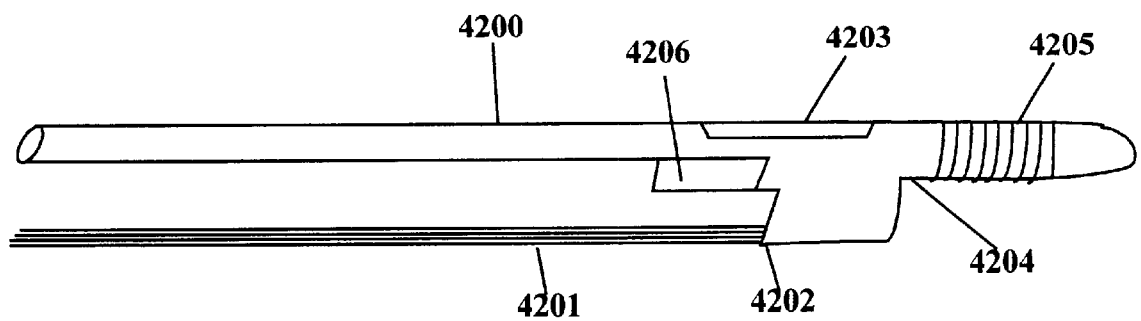
FIG. 42 shows a bow fitted with sensors to gather information from the hand, bow hairs, and bow motion.

Further, because of the somewhat different role of bowing, more attention can be paid to collecting control information from the bow. However, the bow sensor techniques described can also be used to great advantage in Western bowed instruments. FIG. 42 shows a bow fitted with sensors to gather information from the hand, bow hairs, and bow motion. The bow 4200 fitted with bow hair 4201 as usual, may include a bow-hair tension sensor 4202, a free finger pressure-sensor and/or null/contact touch-pad (or pressure-sensor array) 4203, a handle grip 4204 pressure-sensor 4205, and an internal accelerometer 4206 to determine bow direction and acceleration. These control parameters can be transmitted to the instrument by attached electrical or fibre cable, wireless optical, wireless radio, or other means. As a simple example, the free finger controls the choice of resonant vowel formants for the instrument while the hand grip pressure 4205 or pressure on the free finger control 4203 may be used to control the sympathetic string amplitude or a signal processing parameter. The bow tension and accelerometer measurements can be used to control emphasis signal processing or darkening lowpass filtering.

4.9 Flutes and Recorders

Reed instrument layouts have been used in wind controller products by Akia and Yahama. However, flute-like (embouchure air hole) and recorder-like (fingers normally down) instruments have to date not been used as models or methods for electronic instrument controllers.

Figure 43:
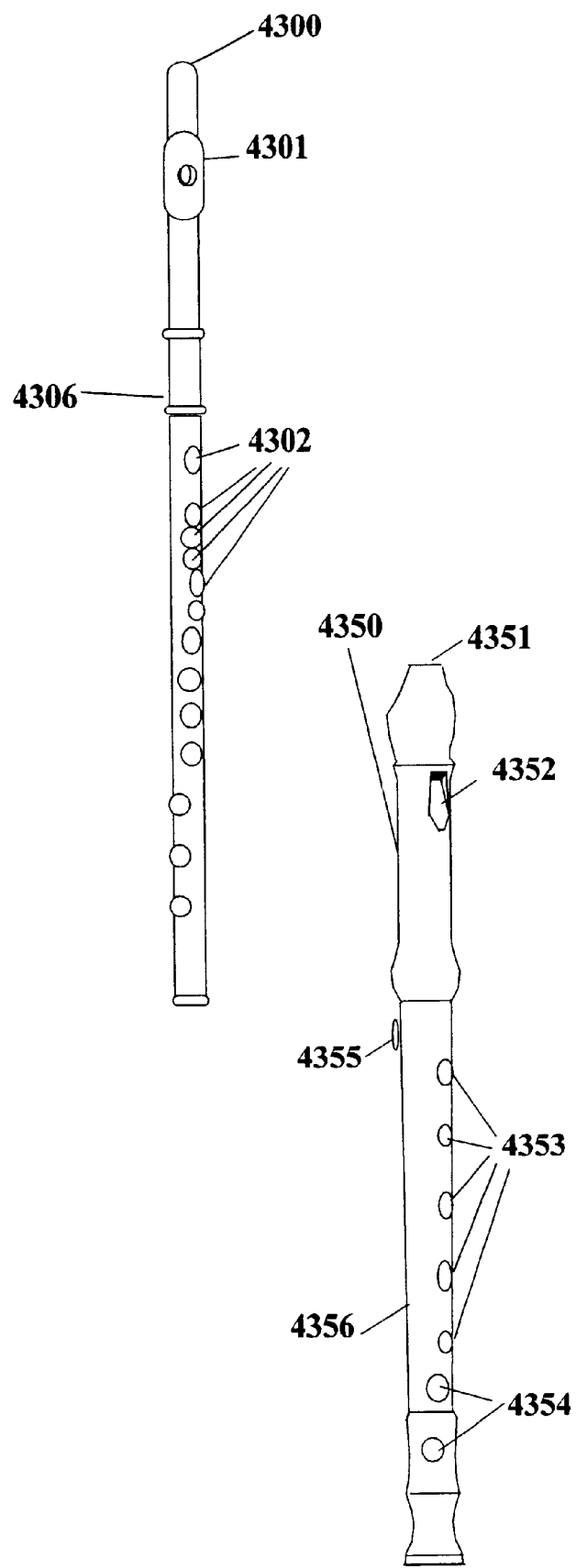
FIG. 43 shows adaptations of a flute and recorder layout with pressure sensors replacing key sites, air turbulence measurements, and air pressure average measurements as provided for in the invention.

It is noted that some types of Western flutes have at least some open holes, many folk and non-Western flutes have only open holes, and some flutes and recorders have at least one hole that is open but is operated by a levered key. In the discussion below, the flute example is considered to be purely closed hole and key operated while the recorder example is considered to be purely open hole without levered keys; the thus illustrated techniques can be freely applied to other hole and lever arrangements of a particular instrument variant. FIG. 43 shows adaptations of a Western (closed-hole) flute and an (open hole) recorder layouts with pressure-sensors, or small pressure-sensor array touch-pads, replacing sites of the keys, together with air turbulence measurements, and air pressure average measurements as provided for in the invention. In either instrument adaptation, the instrument may be maintained as a sounding instrument or used as a model for an all electric controller. In a sounding version, an attached or internal transducer may be used to provide both an audio signal for processing and a means for note event control extraction (for example, using pitch-to-MIDI technologies such as those of, or superseding, the Roland CP-40).

In the example flute and example recorder shown in FIG. 43, the body area around the flute embouchure wind opening 4301 and recorder wind opening 4351 may experience air pressure changes and turbulence which may be measured with sensors and signal processing as described earlier; if the sensors and wiring to them are mounted securely in low profile the instrument behavior and sound will not be noticeably affected. Alternatively, in non-sounding versions, more obtrusive internal sensing of air turbulence and/or air pressure may be employed.

In a sounding adaptation of the closed hole flute 4300, the area of the keys which contact the fingers 4302 can be covered with simple switches, a pressure-sensor, or a pressure-sensor array. Alternatively, in a non-sounding controller adaptation of the closed hole flute 4300, the area of the keys which contact the fingers 4302 can be replaced by simple switches, a pressure-sensor, or a pressure-sensor array. In the case of the open hole recorder, simple switches, a pressure-sensor, or a pressuresensor array can be put around the perimeter of any of each single-hole 4353, each double-hole 4354, and the thumb-hole 4355. Because of special playing techniques associated with the double-holes (i.e., "half-covering") and thumb-hole (thumb tip flip or other "half-covering" methods), these areas may be handled with more specialized switch and/or sensor arrangements.

For the most part such hole-positioned and key-positioned sensors may be used to assist in issuing note events but ranges of additional technique can be developed for more sophisticated control. A less technique-oriented approach would be to put simple switches, a pressure-sensor, or a pressure-sensor array in an area 4306, 4356 where a thumb is otherwise only used for supporting the instrument.

As with the other instrument examples, it may also be advantageous to place additional instrument elements such as strum-pads, touch-pads, sliders, switches, buttons, other sensors, etc. on the body of the instrument.

4.10 Gongs, Bells, Cymbals, Chime Bars, Other Metallaphones, and Acoustic Drum Heads Gongs, bells, cymbals, chime bars, xylophones, and other metallophones, as well as the stretched heads of acoustic drums, can be problematic to amplify because they typically undergo significant displacement motion when struck yet their sound may alter significantly if this motion is restrained and/or if a surface transducer is attached to them. It is noted that there are many types of musically useful non-stereotypical gongs with widely varying timbres, including for example the non-crashing, pitched Indonesian gongs with close-set overtones which beat at low frequencies creating a complex tremolo effect that sounds in many of these instruments very similar to pitch vibrato.

Figure 44:
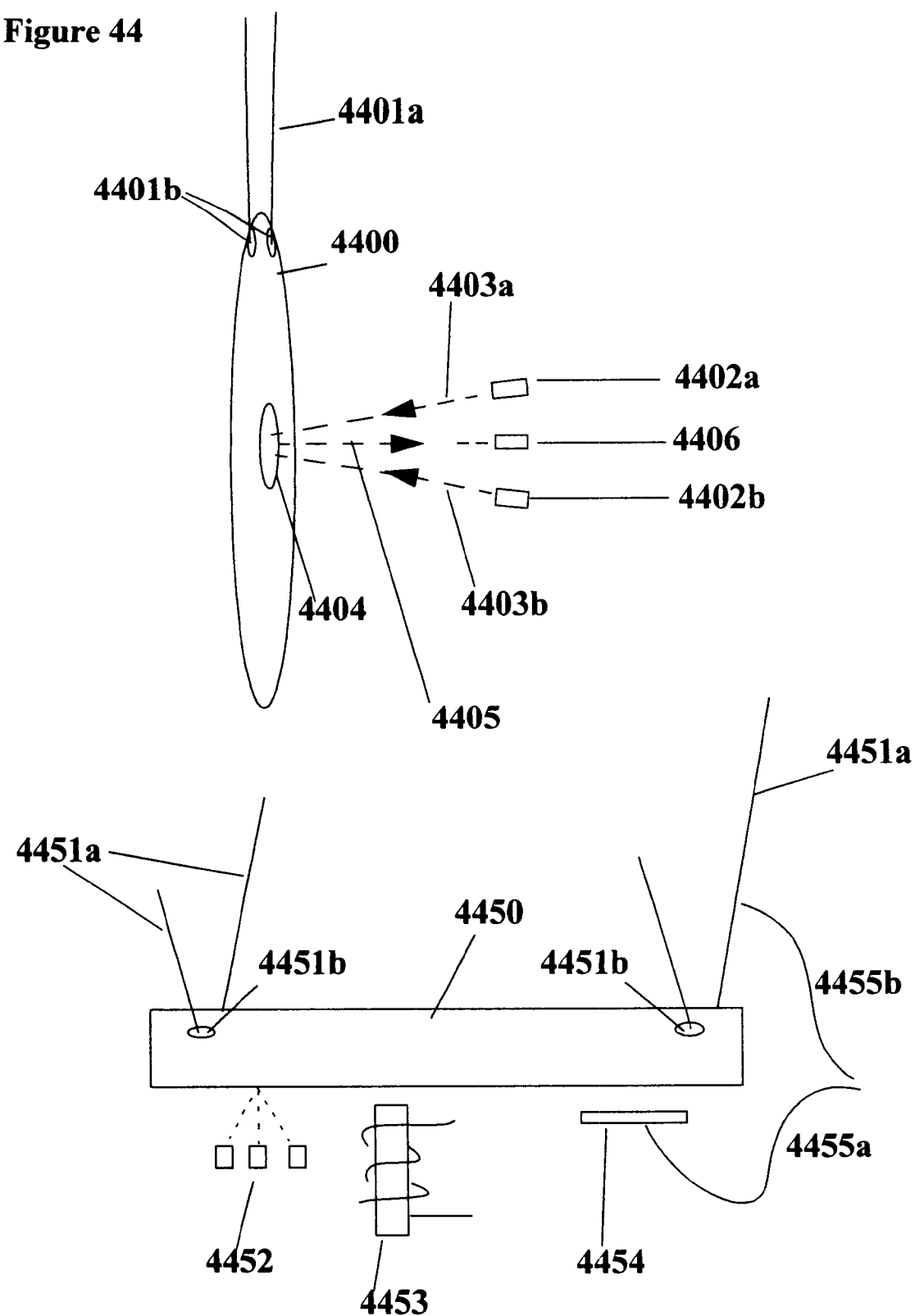
FIG. 44 shows how an optical pickup may be created for a suspended gong; this technique may also be used for many other types of metallophones.
Figure 45:
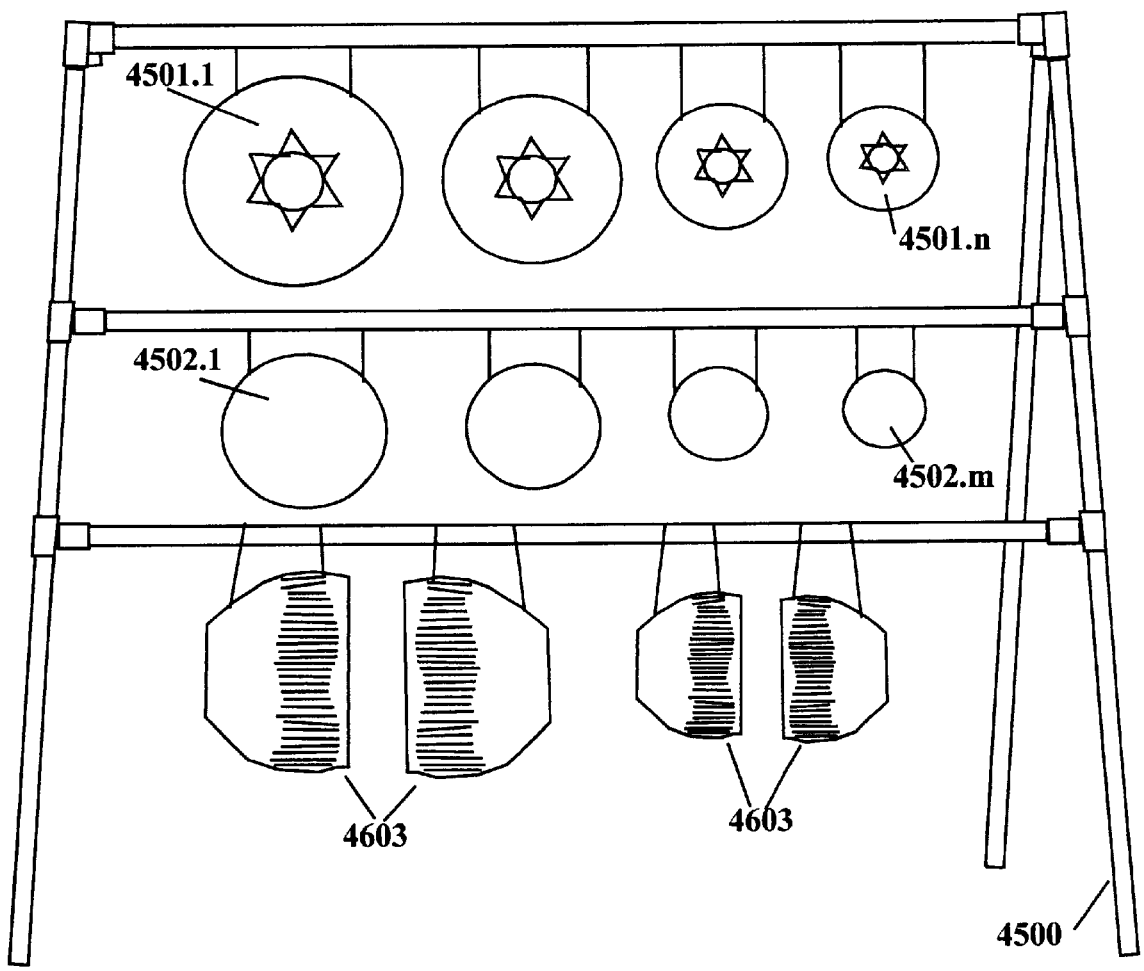
FIG. 45 shows example gong arrays as part of a one-hand or two-hand percussion instrument stand.

The invention provides for quality audio signal capture from these types of instruments because of their musical usefulness, the rich possibilities for signal processing their sounds, and the visual appeal of their playing in a performance situation. FIG. 44 shows how an optical pickup may be created for a suspended gong; this technique may also be used for many other types of metallophones and acoustic drum heads. In the example, a gong 4400 is supported by small ropes 4401a through holes 4401b or other means. Etched into, polished into, sprayed onto, adhered onto, etc. the gong 4400 is a reflective or refractive area 4404 which may be unstructured or may include a reflective pattern or refractive properties. One or more, typically two, light sources 4402a, 4402b, typically coherent and/or modulated, direct light beams 4403a, 4403b to the reflective or refractive area 4404. The materials, light sources, and geometry are arranged so that the return light path 4405 is modulated in amplitude and/or intensity when the gong vibrates at audio frequencies. Reflective or refractive light 4405 from the gong is directed at one or more light detectors 4406 which use the resulting light amplitude or intensity modulation to create an audio signal. Lowpass filters are used to remove subsonic signals resulting from the swaying of the gong. FIG. 45 shows an example metal bar which can be mounted so that extremes of impact displacement are relatively confined. In this arrangement the bar 4450 is suspended by small ropes 4451a through holes 4451b or other means. The vibration of the bar may be captured in a number of ways; illustrated are a similar optical sensor 4452, and electromagnetic pickup 4453 should the bar 4450 be ferromagnetic or have a ferromagnetic plating or attachment near the pickup, and a capacitive plate 4454 which can be used to measure the varying capacitance between the plate 4454 and the bar 4450 via wires 4455a, 4455b connected to the plate 4454 and a conducting support rope 4451a or other means. Similar methods may be employed for acoustic drum heads. Not shown is the case where a bar or tyne is tightly secured on one end; in this case not only may the bar be amplified by similar methods but also by a piezo sensor in the support as in the case of the Mbira discussed earlier.

It is noted that these pickup strategies all pick up localized vibrations from the metallophone. As with instrument strings, the produced timbre will vary widely with the selected pickup area. It is therefore provided for in the invention that multiple pickup areas may be used, permitting multi-channel signal processing to be applied to a single gong in a way like that described earlier for instrument strings.

FIG. 45 shows example gong arrays as part of a one-hand or two-hand percussion instrument stand 4500. The top tier of gongs 4501.1–4501.n in this example are shapely gongs such as the Indonesian gongs described earlier. The middle tier of gongs 4502.1–4502.m in this example are flat gong plates such as those found in Chinese percussion. Also shown in this example instrument are two sets of acoustic drums 4603 configured for one-hand rolls as described earlier for electronic pads; the vibration of the heads of these drums are captured as per the described methods for gongs and bars.

5 Alternative Audio and Control Signal Sources

Historically new instruments have been created through incorporation of not only newly developed technologies but also newly discovered phenomena. In this section recently available understanding of largely unrecognized or unutilized processes are adapted by the invention for use in generation audio and/or control signals.

5.1 Chemical Oscillations, Patterns, Waves, and Rhythms

The Belousov-Zhabotinskii reaction [Tyson] and many similar "non-equilibrium" chemical reactions exhibit oscillatory and animated pattern-forming wave propagation and mathematical chaos effects which can be visually and electrically monitored [Gray, Scott]. These behaviors are the result of nonlinear dynamics governing the evolving reactant concentrations varying within the mixture over time [Nicolis]. Varying types of electrodes can be used to measure component reactants independently. If multiple electrodes are used, differing but correlated waveforms are produced simultaneously, useful for both control and spatial timbre formation methods described later on. To some extent these reaction processes may also be controlled [Ruoff; Nagy-Ungvarai et. al.] via electric fields, reactant modulation, etc.—means that in fact can be controlled directly or indirectly by electrical signals. Chemical indicators may be used to visually enhance the observable contrast of pattern animation [Tyson; Orban et. al.]. The resulting animated patterns, which range from swirling spirals to complex tidal forms—remnants of 1960's animated hallucinogenic iconography—can be captured by video camera. The character of the patterns have visual and intuitive appeal and familiarity because they readily occur in biology, geology, and other parts of nature [Nicolis, Baras]. Populations of these chemical systems can be coupled by various means and as thus are observed to have rhythmic and turbulent behaviors [Kuramoto]. These various dynamical properties of non-equilibrium chemical reactions can be adapted to create a new exciting class of instrument entities and performing environments which are described herein.

5.1.1 Chemical Oscillators as Sound Sources

In their simplest form, these chemical reactions act largely as simple oscillators [Tyson; Gray, Scott]. The oscillations are the result of nonlinear dynamics governing the evolving reactant concentrations varying within the mixture over time and typically are in the form of slowly evolving limit cycles [Field, Noyes; Gray, Scott]. Each reactant-monitoring electrode then produces an oscillatory signal for the duration of the oscillatory concentration variation of that reactant.

In practice most oscillations occur at very slow rates, for example with a period of 40–60 seconds, and have a short life time, for example under a hundred cycles, unless reactants are refreshed. The design of wider ranges of chemical oscillators has been investigated [Epstein; Epstein] and in that it is conjectured that chemical oscillations may drive insect wing vibrations it may be possible to design triggered chemical oscillators that oscillate at audio rates with various oscillatory durations. Such chemical reactions, when electrically monitored, can be used directly as sound sources in the same manner as an electromagnetically-monitored or piezo-mechanically-monitored guitar string.

Less speculatively, recorded measurements of known slow short-lived oscillatory chemical reactions [Gray, Scott] may be captured and processed as "audio samples" which can be pitch-shifted and spliced for arbitrary duration with conventional audio sampling technology. Further, mathematical models of these oscillatory behaviors [Field, Noyes] can be numerically simulated and altered so as to change rate, duration, and other attributes [Wang, Nicolis] as per model-based audio synthesis. Such numerical models then add a new non-acoustic class of modeled elements to the well establish acoustically vibrating ones such as strings, pipes, tynes, membranes, etc., and as with the acoustic-based models, can be adapted and extended to create yet other new effects.

5.1.2 Chemical Patterns as a Dynamic Controller

The inherent time scales of visual and electrically measurable pattern evolution in most of the well-know non-equilibrium chemical reactions, along with their potential for direct and indirect electrical controllability, makes these non-equilibrium chemical reactions interesting candidates for the generation of control signals. The invention provides for the spatial patterns of these non-equilibrium chemical reactions to be measured and converted into control signals and potentially, with any of several chemical processes, to control via control signals and/or to video capture for display or recording. The invention provides that these measured control signals may be used to control any one or more of note events, signal processing, lighting, or special effects.

Figure 46:
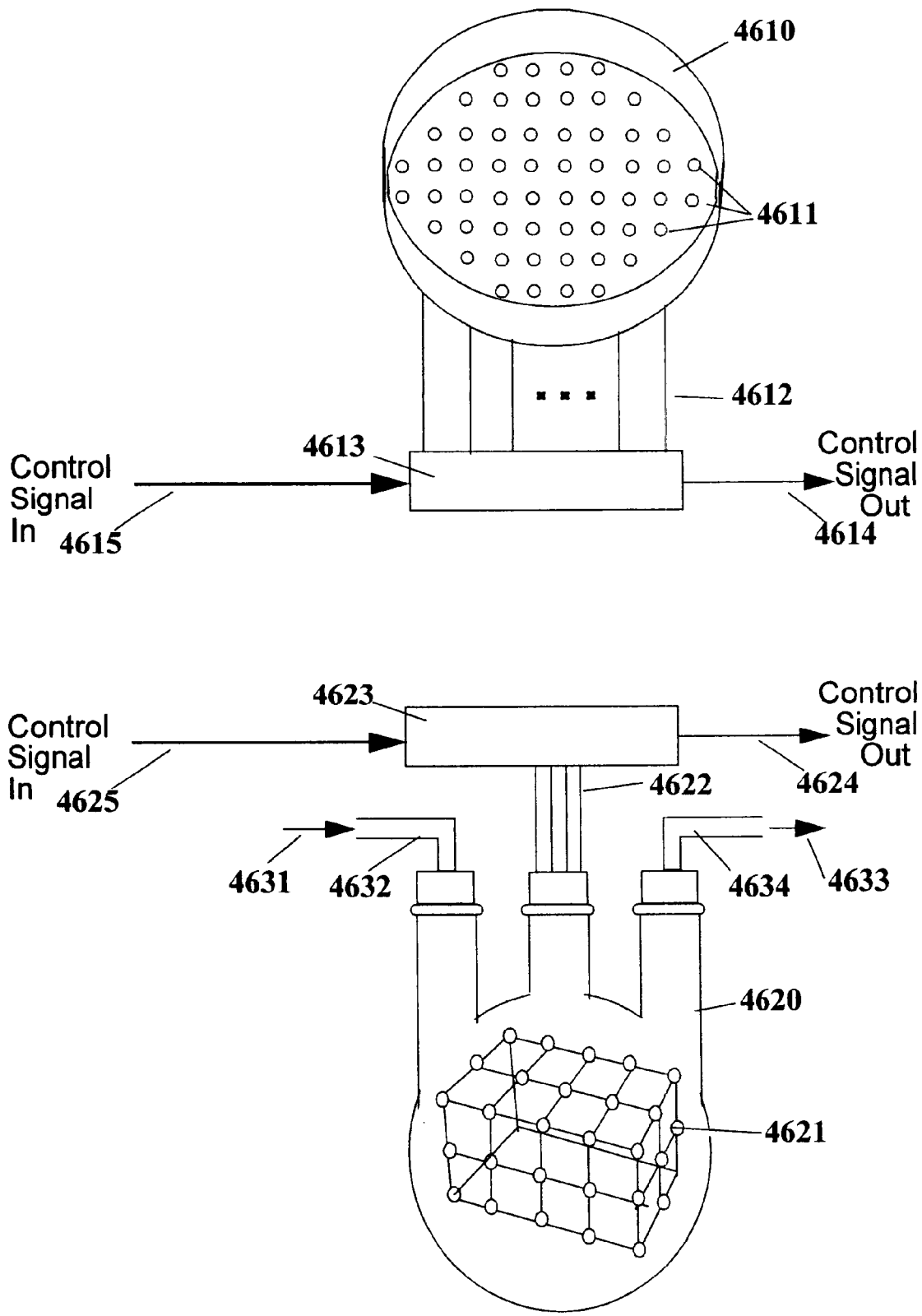
FIG. 46 illustrates spatial arrays of electrodes which may be used for measurement, as well as control, in two-dimensional and three-dimensional configurations.

The invention provides for spatial patterns of these non-equilibrium chemical reactions to be measured electronically by specific types of electrodes [Gray, Scott] and/or via a video camera combined with image analysis, parameter extraction, and control signal assignment. If electrodes are used, these may be of various types, including those responsive to variations in specific families of ion concentrations [Gray, Scott] as well as those used to measure electric fields, potential differences, electrical resistance, etc. These electrodes may be distributed spatially in one, two, or the dimensions. FIG. 46 illustrates spatial arrays of electrodes which may be used for measurement, as well as control, in two-dimensional and three-dimensional configurations. In an example two-dimensional configuration, a shallow vessel 4610 has its bottom surface fitted with a two-dimensional array of electrodes 4611 selected from among the types cited earlier. These electrodes connect by wires 4612 to interface electronics 4613 that extracts the measurement information, from this extracts parameters (potentially under stored program control), and then assigns these parameters (potentially under stored program control) to outgoing control signals 4614. Some of the electrodes 4611 may be measurement only, some may be control only, and some may be dual-use. Any control capabilities and/or stored program recall may be controlled by incoming control signals 4615. In an example three-dimensional configuration, a volume vessel 4620 has its bottom surface fitted with a three-dimensional array of electrodes 4621 selected from among the types cited earlier. These electrodes connect by wires 4622 to interface electronics 4623 that extracts the measurement information, from this extracts parameters (potentially under stored program control), and then assigns these parameters (potentially under stored program control) to outgoing control signals 4624. Some of the electrodes 4621 may be measurement only, some may be control only, and some may be dual-use. Any control capabilities and/or stored program recall may be controlled by incoming control signals 4625. Also illustrated in the three-dimensional example are an example reactant intake tube 4632 and example reactant outtake tube 4634 through which new reactants 4631 may be introduced and old reactants 4633 may be extracted; this arrangement can be used to vary the relative concentrations of chemicals in the vessel or maintain balance through reactant refreshing. The exchange rates and relative concentrations levels can be electrically controlled by conventional chemistry instrumentation means and thus the invention provides for these to be potentially controlled by incoming control signals. It is understood that multiple intakes and outtakes such as 4632, 4634 may be utilized, and that the intakes and outtakes may have interior spatial distribution structures within the vessel 4620. It is also understood that these methods would also be applicable for one-dimensional or two-dimensional arrangements and other vessel shapes such as dishes, tubes, etc.

Figure 47:
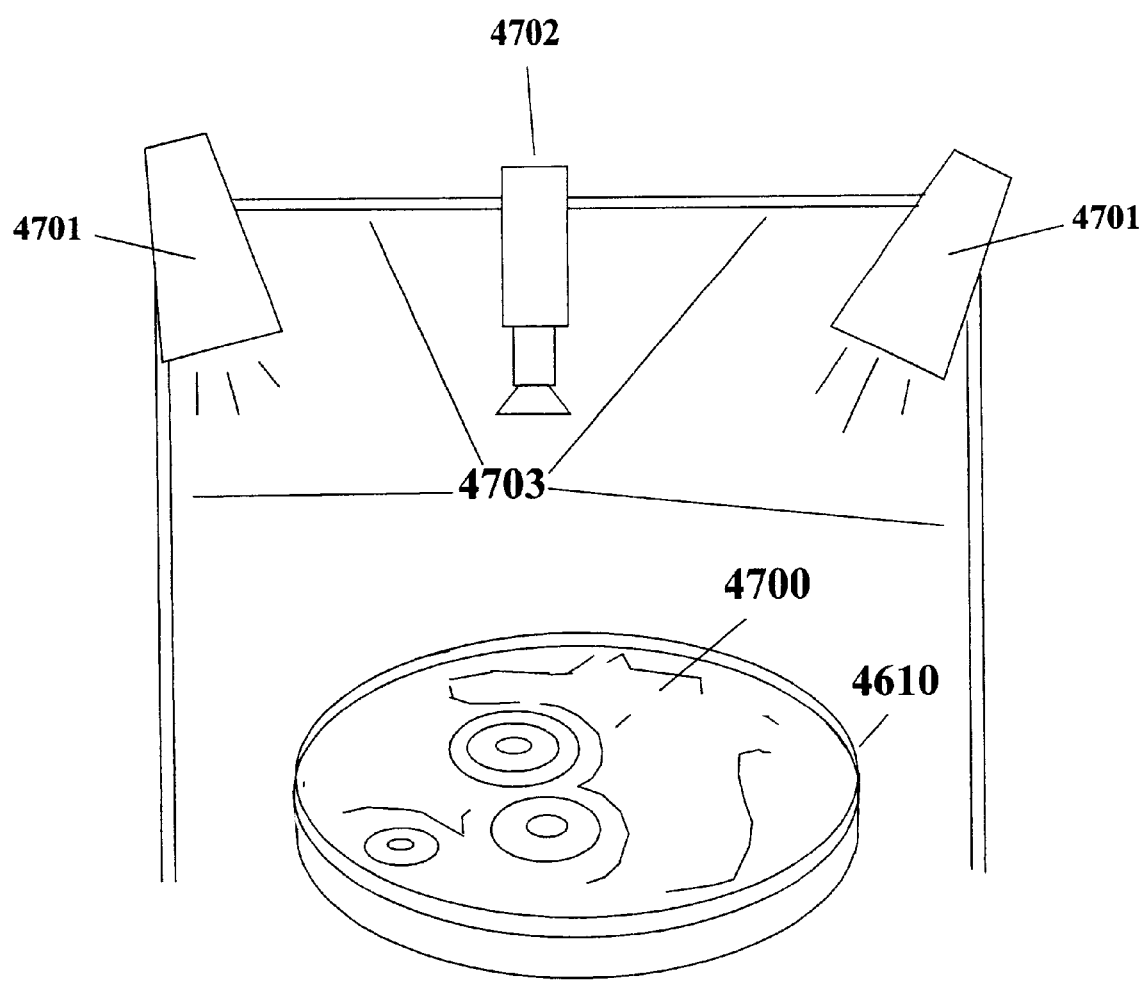
FIG. 47 shows an arrangement where evolving chemical patterns in the dish of FIG. 46 are illuminated with light sources and visually monitored by an overhead camera for any one or more of control extraction, visual display, or visual recording.

It is also possible to measure the evolving chemical patterns with a video camera, particularly when differentiating visual indicator compounds [Tyson; Orban et. al.] are introduced into the mixture. FIG. 47 shows an arrangement where evolving chemical patterns 4700 in the dish 4610 of FIG. 46 are illuminated with light sources 4701 and visually monitored by an overhead camera 4702; here the light sources and camera are supported by arbitrary stand methods 4703. The invention provides in particular for the video camera 4702 to be combined with simple to complex real-time image processing operations such as position threshold detection, edge detection location, pattern detection, pattern area measurement, pattern rate of change, etc. to derive a multitude of parameters which may be mapped into control signals. Because visual chemical indicators can be used to identify localized concentrations levels of specific chemicals, the aforementioned pattern recognition techniques may in some configurations conceptually be used in place of the potentially more costly chemical-measurement electrode arrays and supporting electronics.

The invention provides for the aforementioned arrangements to be used as an interactive chemical performance environment. Outgoing control signals generated by the spatial chemical patterns may be used to control any one or more of: note events, timbre modulation, lighting, and special effects. Incoming control signals provided by or extracted from audio signals, electronic instrument elements, real-time sequencers, actuators, video cameras, or body position indicators (gestures, dance, stage position) can be used to control the evolution and influence the shapes of the chemical patterns. Video of the patterns may be displayed on monitors or projected, via video projector, onto the stage area behind, above, or on one or more performers. The projected video image may be actual or processed by video signal processing (for example, changing color maps, contrast, solarization quantization thresholds, etc.) which in turn may be controlled by control signals generated in real-time by the performers. In this manner, one or more performers may interactively perform with music, sound, and visual effect with a non-equilibrium chemical reaction environment.

It is also possible to numerically or electronically simulate the chemical dynamics on a computer, generating similar types of control signals, visual output, and interactive control capabilities. This methodology is discussed in more detail. Because numerical and electronic simulation can generalize the process beyond physical limitations, in principal a broader range of interactive dynamics would be made possible by this method. However, the excitement and charm of interacting with a live chemical process is difficult to entirely replace with a computer program.

5.2 Photoacoustic Sources

Photoacoustic phenomena is a relatively new area of study. Although most of the gathered knowledge and work in progress is largely oriented to probably inapplicable areas relating to, for example, non-destructive testing, there are a few phenomena, such as light stimulated acoustic emissions and the modulation of light through vibrating transparent or translucent materials that can be developed for musical purposes [Lusher; Murphy et. al.; Bicanic, Dane]. The invention provides for the incorporation of these, particularly in that light can be used as part of performance and visually recorded material.

Figure 48:
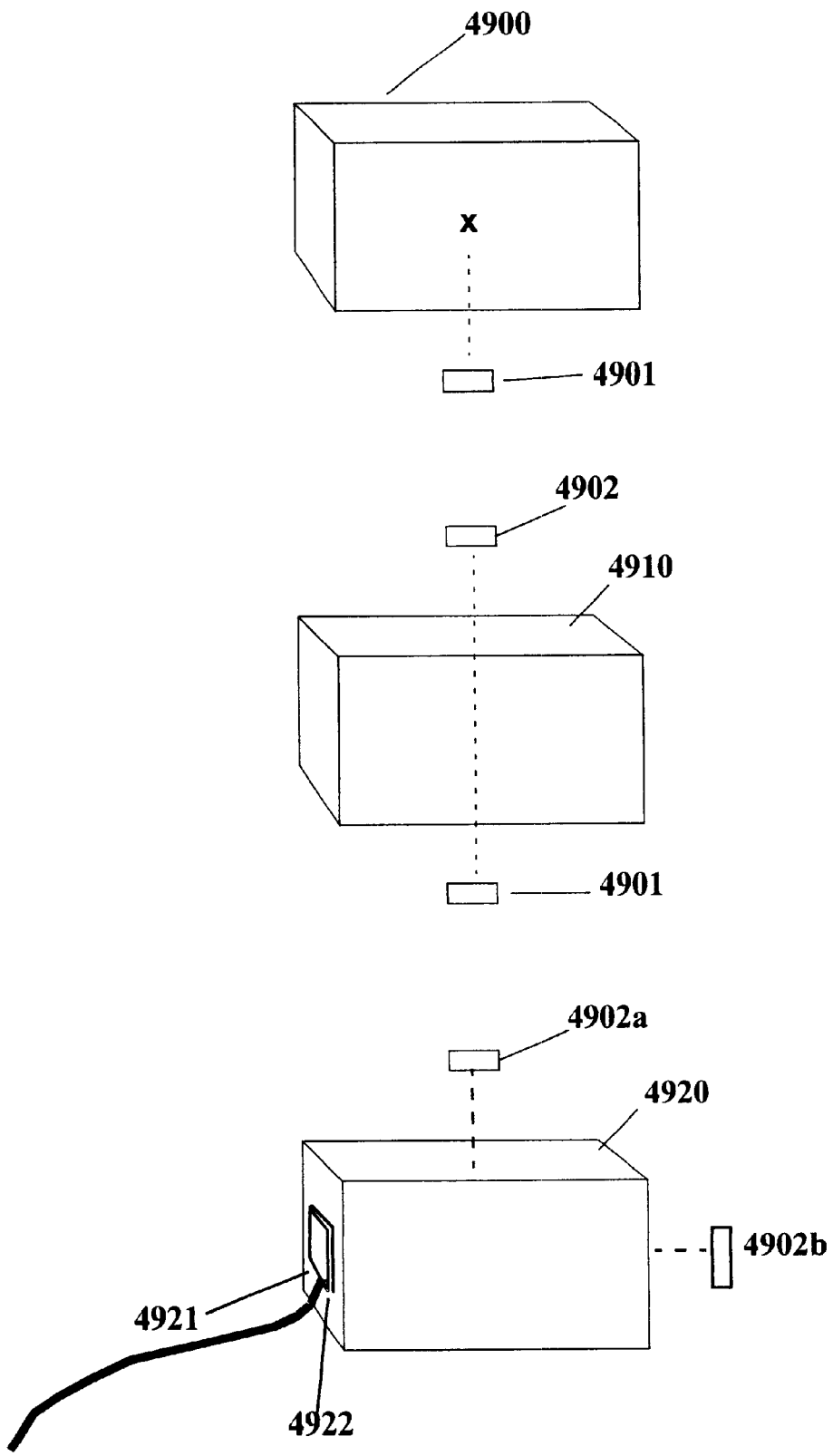
FIG. 48 illustrates example optical measurements of photoacoustic phenomena in applicable materials which may be converted to electrical signals and an example electro-acoustic measurement of photo-induced acoustic phenomena in applicable materials.

FIG. 48 illustrates example optical measurements of photoacoustic phenomena in applicable materials 4900, 4910 which may be converted to electrical signals, and an example electro-acoustic measurement of photo-induced acoustic phenomena in applicable materials 4920. Example photoacoustic materials 4900, 4910, 4920 may be in gas, crystal, liquid crystal, plastic, elastic, fluidic or other forms. For material 4900 which emits light in response to acoustic vibration, a light sensor 4901 may be used to recover the light emission event. For material 4910 which modulates light in response to acoustic vibration, a light sensor 4901 may be used to recover light provided by a light source 4902 which is directed through the material 4910. For material 4920 which emits acoustic vibration in response to light, an electro-acoustic sensor 4921 may be used to sense acoustic vibration emitted in response to one or more appropriately positioned light sources 4902a, 4902b.

In the above, it is noted that ultra-sonic vibration, even up to a few hundred Khz, is still potentially useful as these signals may be pitch-shifted or heterodyned down to audio ranges.

5.3 Electronic/numerical Dynamical System and Relational System Simulation

Electronic and/or numerical algorithm methods may be used to implement mathematical dynamical models including mechanical vibration, fluid mechanics, stellar evolution, biological processes, etc. as well as abstract non-equilibrium, fractal, and chaos process models. Such methods are already in place in the synthesis of musical sound vibration processes modeling conventional musical instruments, for example, in model-based sound synthesis as used in the Yahama VL1.

Because numerical and electronic simulation can generalize the process beyond physical limitations, in principal a broader range of interactive dynamics and real-time measurements of them would be possible as compared to that which could be obtained in the real-world under realistic conditions. Further, electronically or numerically modeled processes may be time-scaled so as to produce audio frequencies or more slowly evolving control signals. The invention provides for the use of such electronic and/or numerical algorithm method so as to implement mathematical dynamical models of adapted real-world or abstract processes. Incoming control signals can be used to select and/or affect the structure and/or parameters of the modeled dynamics and/or relations, and the modeled dynamics and/or relations may be used to create any one or more slowly varying outgoing control signals, visual image signals, or direct audio signals.

Examples of abstract processes may include interactive navigation through a fractal structure, the fractional integration of an audio frequency square wave as it evolves into triangle and parabolic waveforms, etc. Examples of real-world models rich in semiotic value for performance may include adaptations of interactive control of galactic interaction dynamics, language models, etc. as well as the use of literary plots, classical mythologies, etc. which have been used by composers for centuries (i.e., Monteverdi's Orfeo, Strauss' Electra, Stravinsky's Odepus Rex, etc.)

5.4 Environmental

Earlier instrument elements and instrument entities associated with environmental aspects of stages, rooms, and the outdoors were described. Examples of this include the tracking of the position and/or motion of performers, the tracking of artificial fog cloud migration, room internal and outdoor meteorology, and audience motion activity. As indicated in those discussions, these may be used, to the extent artistically applicable, to generate control signals for the control of note events, signal processing, lighting, and special effects.

6 Generalized Instrument Interfaces

Referring to FIG. 1, it is recalled that the invention provides for both instrument entities 100 and signal.routing, processing, and synthesis entities 120 to be fitted with compatible electrical interfaces, termed generalized instrument interfaces or (or more concisely, generalized interfaces) 110, which can exchange any of the following:

- incoming electrical power (111)
- outgoing control signals from switches, controls, keyboards, sensors, etc., typically in the form of MIDI messages but which may also include contact closure or other formats (112)
- control signals to lights, pyrotechnics, or other special effect elements within and/or attached to the instruments, said signals being either in the form of MIDI messages, contact closure, or other formats (113)
- outgoing audio signals from individual audio-frequency elements or groups of audio-frequency elements within the instruments (114)
- incoming excitation signals directed to individual audio-frequency elements or groups of audio-frequency elements within the instruments (115)
- outgoing video signals (such as NTSC, PAL, SECAM) or image signals sent from the instrument (116)
- incoming video signals (such as NTSC, PAL, SECAM) or image signals sent to the instrument for purposes such as display or as part of a visually controlled instrument (117).

The interfaces may be realized by any one or more of: connectors, cables, fibers, radio links, wireless optical links, etc., individually, in combinations, or in or sequences of these.

In most envisioned realizations this interface would be involve one or more connectors fitted with driving and/or receiving electronics, and the connectors on instrument entities 100 and signal routing, processing, and synthesis entities 120 would be connected by a plurality of wires in either balanced or unbalanced transmission mode. Alternatively one or more coax cables, fiber optic cables, radio links, wireless optical links, etc. may be used to replace part or all of the plurality of wires. Any of these approaches may use any of a variety of multiplexing techniques [frequency-modulated and/or phase-modulated and/or amplitude-modulated carrier, wavelength-division, time-division, carrier-less constellation synthesis (such as CAP), statistical, etc.) individually or in combination to reduce the number of partitioned physical signal channels (wires, fibers, radio channels, wavelengths, etc.].

When these generalized interfaces are realized via one or more physical cables (electrical, optical, etc.), some realizations may use a single connector for fully spanning generalized applications while other realizations may consist of an ensemble of connectors in a functional split so as to handle particular organization, expansion, and/or evolutionary needs.

Figure 49:
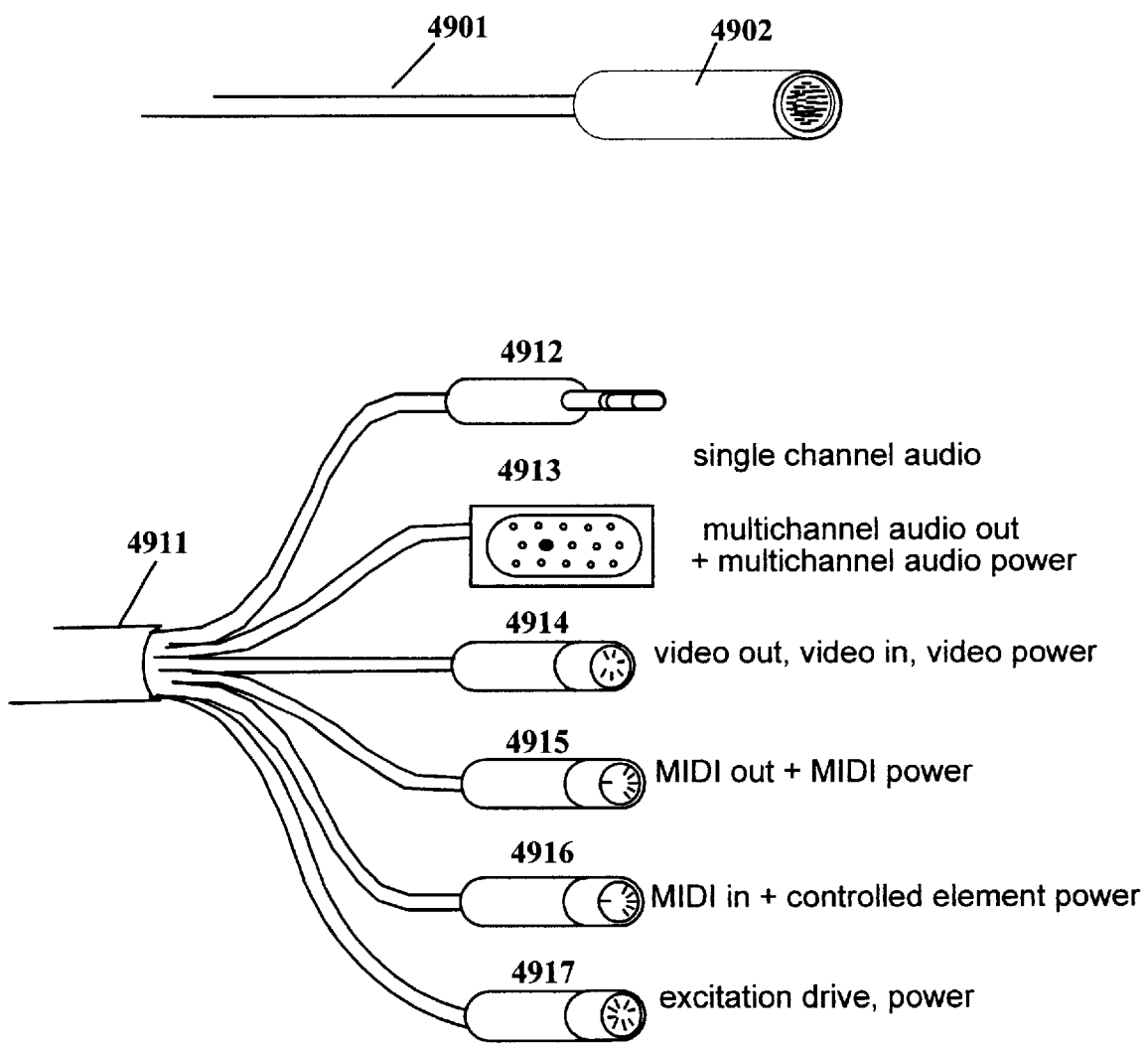
FIG. 49 shows how generalized interfaces can be built in whole or via separable parts which may be used selectively as needed or appropriate.

FIG. 49 shows how generalized interfaces can be built in whole or via separable parts which may be used selectively as needed or appropriate. In a single connector all-purpose approach, a single cable 4901 carries all the signals allowed for in the generalized interface up to a predefined number of maximum instances. Referring to FIG. 1, all instrument entities 100 and signal routing, processing, and synthesis entities 120 would provide mating connectors to that of 4902. In one implementation, the cable 4901 and connector 4902 provide a relatively large number of separate interconnecting wires, for example twenty to thirty. Alternatively, in a future preferred arrangement employing then low-cost standard signal multiplexing and/or directional multiplexing techniques, this cable 4901 could be a simple one or two fiber optic or coax cables potentially supplemented with two to three power conductors; alternatively, if any coax cables are used to carry signals they can also be used to simultaneously carry power on the same conductors. Further, if each instrument is able to provide its own power by means of wall plugs and/or batteries, the aforementioned implementations need not include any power carrying capabilities and associated conductors. In this arrangement it will be further possible to use radio and/or optical wireless channels to carry the signals among instrument entities 100 and signal routing, processing, and synthesis entities 120. In this arrangement then, a common multiplexed incoming and outgoing signal, potentially itself directionally multiplexed on the same channel, can be carried interchangeably by optical fiber, coax cable, wireless radio, or wireless optical transmission mediums.

Alternatively, it is possible to functionally partition the generalized interface into standardized component interfaces which may be served by separate connectors. A multi-connector "Hydra" cable can be used to provide selected groups of two or more of these standardized connectors, including a "fully-populated" Hydra cable with all the defined connectors. If only one connector of the several defined ones is needed, then a single connector cable may be used if desired; for this reason, it may be desirable to assign connectors to the functional partitions which are standardly available on mass-produced single connector cables. FIG. 49 shows an example of this arrangement. A fully-populated Hydra cable 4911 may include the following partition and assigned connectors:

Two "single-channel" group audio outputs (unbalanced, dedicated ground) 4912; for example, a TRS male plug.

Ten or twelve multi-channel audio outs (unbalanced, dedicated ground) and audio power 4913; for example a 13-pin DIN male or HDB 15-pin VGA male (with 14 pins actually populated and connector shells interconnected).

One video out channel and one video in channel (unbalanced, dedicated ground) and incoming video power 4914; 6-pin DIN male.

One balanced MIDI out channel and incoming MIDI power (on non-MIDI pins) 4915; 5-pin DIN male.

balanced MIDI in channel and incoming controlled element power (on non-MIDI pins) 4916; 5-pin DIN male.

Six excitation drive channels (unbalanced, dedicated ground) 4917; 8-pin DIN connector (only six pins need if the signal routing, processing, and synthesis entity 120 creates the relatively high-power drive signals, while eight pins allow provision of power to the instrument entity 100 for internal high-power signal generation).

Further, any connectors not served by a given Hydra cable and/or expansions to support additional channel-carrying needs may be supported with additional cables: It is understood that the aforementioned as explained and illustrated in FIG. 49 are merely examples; other arrangements are possible.

7 Signal Routing, Processing, and Synthesis

The general principals for the architecture of the signal routing, processing, and synthesis entity 120 as provided for by the invention include all or a significant number of the following:

flexible multi-channel handling of audio, control, and video signals a hierarchically modular control and control signal routing structure course to very fine-grain control signal routing (for example, in the context of MIDI, routing at the MIDI port level, routing the MIDI channel level, and routing at the individual note number and continuous controller number levels)

the incorporation of mixing in audio routing and message merging and polyadic operations in control signal routing control signal extraction from audio and/or video audio signal, control signal, and potentially video signal processing audio signal, control signal, and potentially video signal synthesis real-time control signal/event replay all under extensive real-time control.

7.1 Audio Signal Routing

Audio signal routing is provided for in the invention by both switching and mixing functions. Switching functions may be realized as stored program cross-bar switches. Mixing functions may be provided in the form of possible multiple-input multiple-output mixing matrices and an additional final mixing stage may include some dedicated signal processing functions. Mixing functions provided for in the invention are advantageously controlled in real-time by control signals.

Functional examples of the functionality provided for in said multiple-input, multiple output mixing matrices is that of the Sound Sculpture model Switchblade MIDI-controlled mixer (but empowered with a significantly larger number than two MIDI continuous controller inputs) or the Peavey PM-8128 (but provide with additional inputs and outputs). Functional examples of the functionality provided for in said final mixing is that of the Yahama DMP MIDI-controlled mixer models, particularly the DMP 9-16 (but with additional presets). In the invention, the mixing and switching functions are preferably an integrated component within a larger-scale hardware and software construct rather than an off-the-shelf module.

7.1.1 General Audio Switching and Mixing

Referring to FIGS. 1–2, input signals directed to audio routing and mixing may include the audio outputs from the instrument entities 100, outputs from audio signal processing elements 125, and audio signal synthesis elements 129a. Still referring to FIGS. 1–2, output signals directed from audio routing and mixing may include audio inputs to exciter elements within instrument entities 100, audio signal processing 125, control signal extraction 128*a*, and the overall audio outputs to amplification and/or recording facilities.

7.1.2 Multi-channel Audio Signal Handling

The invention provides for extensive support for and exploitation of multi-channel audio signals from instruments with multiple vibrating elements.

Figure 50:
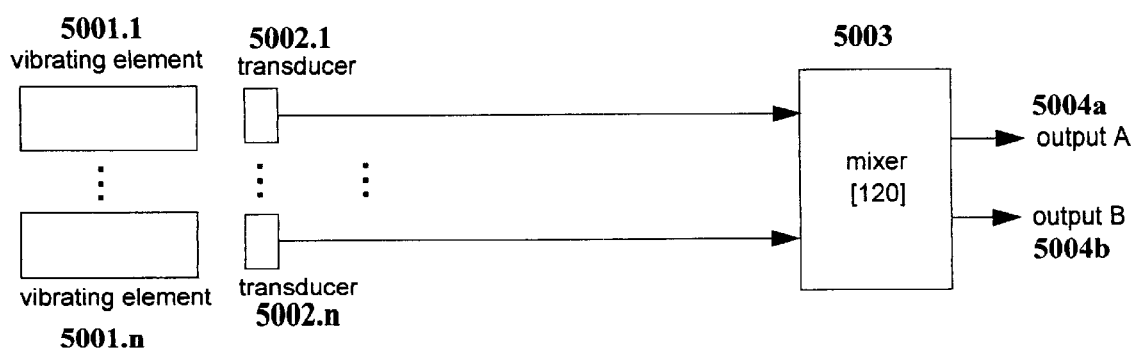
FIG. 50 shows multiple vibrational elements with multi-channel transducers applied directly to stereo or multi-channel mix-down.

Multi-channel transducers have been used in multiple-vibrating-element musical instruments; these uses appear to be confined to guitar synthesizer interfaces (as with the Boss GP-10), individual adjustment of each vibrating element mix level (as with the Gibson Chet Akins guitar), and creation of panned stereo mixes (Biax pickup, Passaic synthesizer interface, Turner string pan-pot guitar, Van Halen-endorsed guitar with right/left switches for each string). These similar approaches may be generalized by a common diagram. FIG. 50 shows multiple vibrational elements with multi-channel transducers applied directly to stereo or multi-channel mixdown. Each of a plurality of vibrating elements 5001.1–5001.*n* are is coupled by appropriate but separable means to each of a plurality of transducers 5002.1 5002.*n*, each producing electrical signals which are applied to either single channel or stereo mixing circuitry. In the case of the Gibson Chet Atkins electric-acoustic guitar, the mix is monaural and as such is equivalent to delivery only through output A 5004*a*, with no implementation of output B 5004*b*. In the case of the Biax pickup, the "pan" position in the stereo field is hard-set to either output A 5004*a* or output B 5004*b*. In the case of the Turner guitars, the "pan" position in the stereo field is set between output A 5004*a* or output B 5004*b* via adjustable potentiometers.

Figure 51:
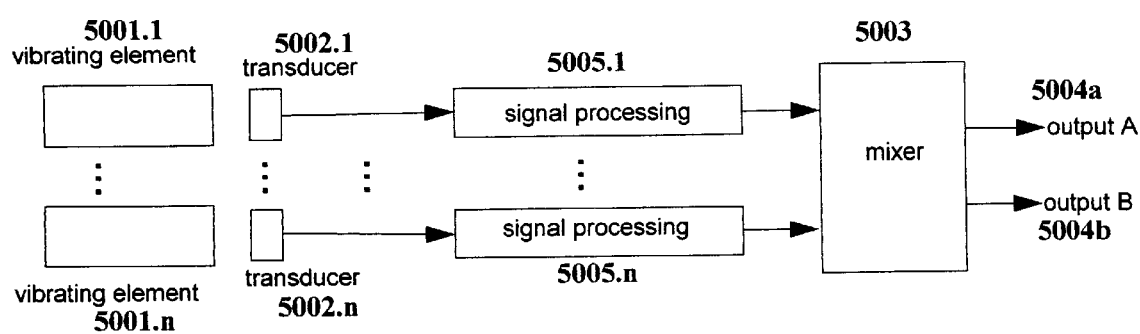
FIG. 51 shows multiple vibrational elements with multi-channel transducers and individual signal processing prior to mixing.

Specifically the invention provides for bringing the signals from multi-channel transducers 5002.1–5002.*n* to individual signal processing stages 5005.1–5005.*n* before mixing, allowing far more extensive capabilities to be created. FIG. 51 shows multiple vibrational elements with multi-channel transducers and individual signal processing prior to mixing. FIG. 51 highlights the functional signal processing distinction from existing commercial products generalized by FIG. 50. This relatively simple conceptual (though potentially hardware and/or software intensive) change makes a number of extraordinary things possible:

- Conventional pitch-shifting signal processing can be used on each string signal to create:
  - "generalized pedal steel guitars" (augmenting or replacing mechanical pedal tuning changers with pedal, lever, spring-wheel, optical, or other electronic controls determining pitch shift amount)
  - instantly retunable guitars (augmenting or replacing mechanical tuning changers such as the Hip-shot "Trilogy")
  - a true electronic simulation of so-called "multi-course" instruments (such as a 12-string guitar, mandolin, lute, etc.) where individual elements making up the "multi-course" are simulated using pitch shifting to create either octaves or slightly mis-tuned unisons
- multi-key, multi-modal Indian sitars; here drone and sympathetic strings can be electronically retuned while playing, allowing a more flexible and robust mix between Eastern (fixed tonality) and Western (modulating tonality) musical forms.
- multi-key, multi-modal African mbiras, African koras, Japanese kotos etc.; here fixed pitch vibrating elements (tynes, strings) can be electronically retuned while playing, allowing a more flexible and robust mix between Eastern (fixed tonality) and Western (modulating tonality) musical forms.
- spatial-spectral animated instruments where individual vibrating element sounds may be location modulated within a stereophonic or other spatial sound field (using low-frequency sweep chorusing, continuous autopanning, etc.).
- separate distortion circuits for each vibrating element, for example, to create:
  - powerful guitar chord sounds previously obtained only by multiple instruments or multi-track recording)
  - simulated sitar-bridge effects (using the methods to be described in conjunction with FIG. 39)
- finely frequency-equalized instruments where different frequency equalizations are applied to each vibrating element.
- mixed timbre instruments where different signal processing methods are applied to each vibrating element.

Figure 52:
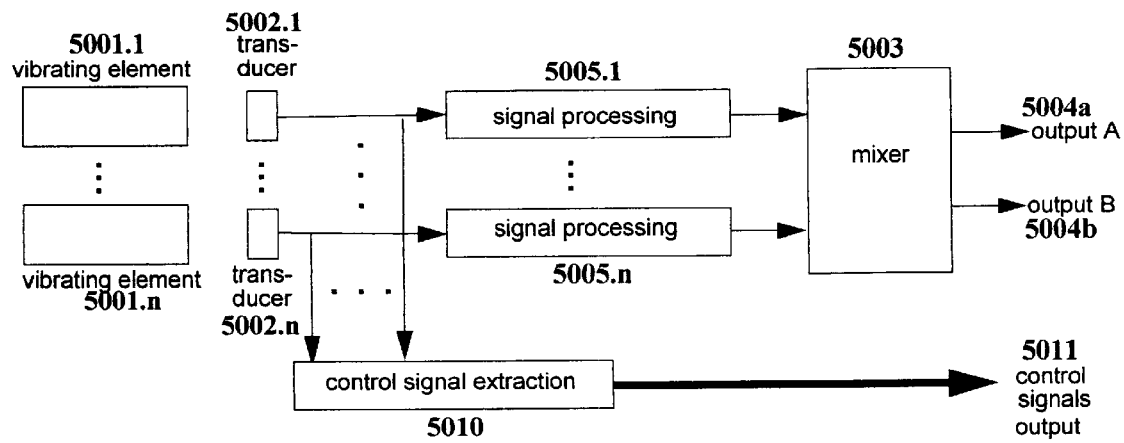
FIG. 52 shows addition of a control signal extraction element to the arrangement of FIG. 51.

(More recently, a functionally limited—although very technologically progressive version of the signal processing approach illustrated in FIG. 52 has since appeared in the Roland VG-1 COSM guitar emulation product.)

FIG. 52 shows addition of a control signal extraction element to the arrangement of FIG. 51. As shown in FIG. 52, the invention provides for signal outputs from the multi-channel transducer(s) to be fed in parallel to a control signal extractor 5010 so as to simultaneously issue control signals 5011 to any one or more of music synthesizers, signal processors, lighting, special effects, etc. The invention therein provides for an operating mode of control signal extraction where each individual vibrating element to have associated with it one or more individual control signals. The resulting system, then, can assign a given vibrating element to individual signal processing, individual synthesizer voice, or both in combination. This permits a basic conventual instrument structure (such as a guitar, violin, steel guitar, koto, or mbira) and essentially conventional playing techniques to control an unprecedented rich range of sounds. (Even more recently, Roland has since announced a cable fanout product allowing their VG-1 multi-channel signal processor to operate simultaneously with their GP-10 and related guitar to MIDI interface products.)

Further enhancements are also possible. For example:

- In practice it may be desirable to have a different number of signal processors than vibrating elements. For example:
  - in generalized steel guitars, only a few strings at a time may actually be candidates for pitch shifting
  - in spatial-spectral (panning, chorusing, etc.) animation, the actual number of animation channels need not match the number of vibrating elements
  - in a highly functional system, several signal processors may be used in parallel for one or more vibrating elements.

Figure 53:
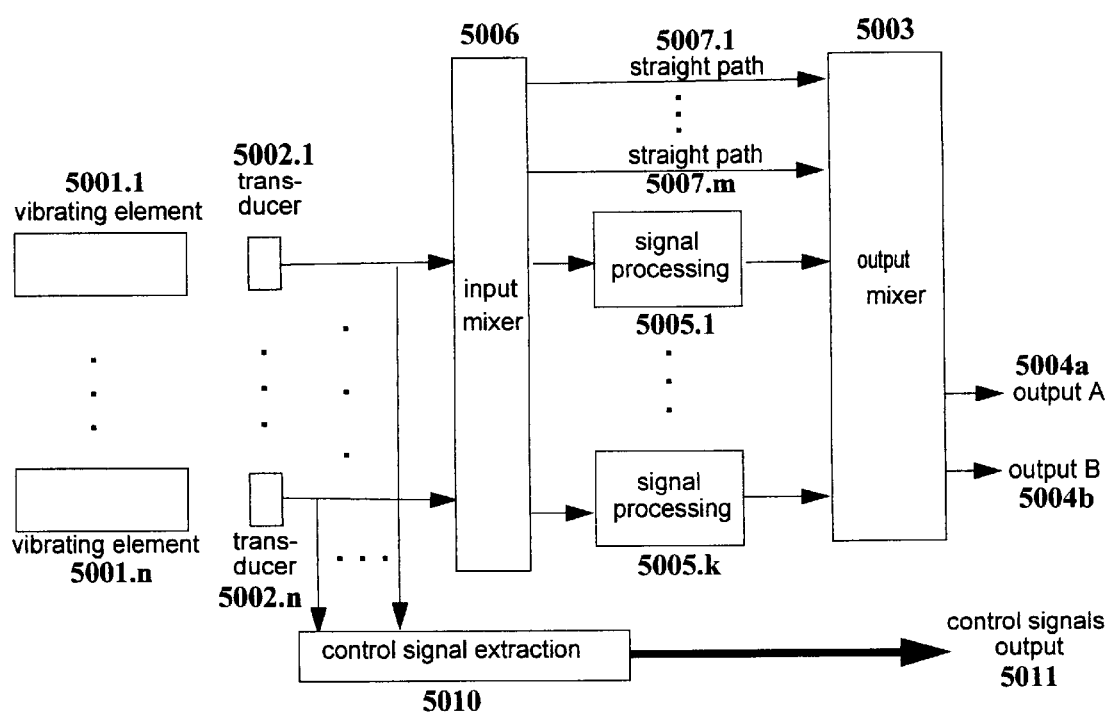
FIG. 53 shows partial mix-downs of vibrating element signals fed to a number of signal processors and straight-through paths in route to subsequent mix-down.

FIG. 53 shows partial mix-downs of vibrating element signals fed to a number of signal processors 5005.1–5005.*n* and straight-through paths 5007.1–5007.*m* en route to subsequent mix-down. The (pre-signal processing) input mixer 5006 is used to route and/or mix various multi-channel transducer signals to a structured and controllable multi-channel mix. Several variations of this arrangement are suggested by FIG. 53:

- there can be zero, one or more straight paths 5007.1–5007.*m*.
- there are a total of at least three signal processors 5005.1–5005.*n* and/or straight paths 5007.1–5007.*m* involved.

there is a minimum of one signal processor (or else the two mixers 5003 and 5006 functionally collapse into one, functionally resulting in the arrangement of FIG. 50).

although the interconnection details for connecting the synthesizer interface are shown, the synthesizer interface need not be included.

Figure 54:
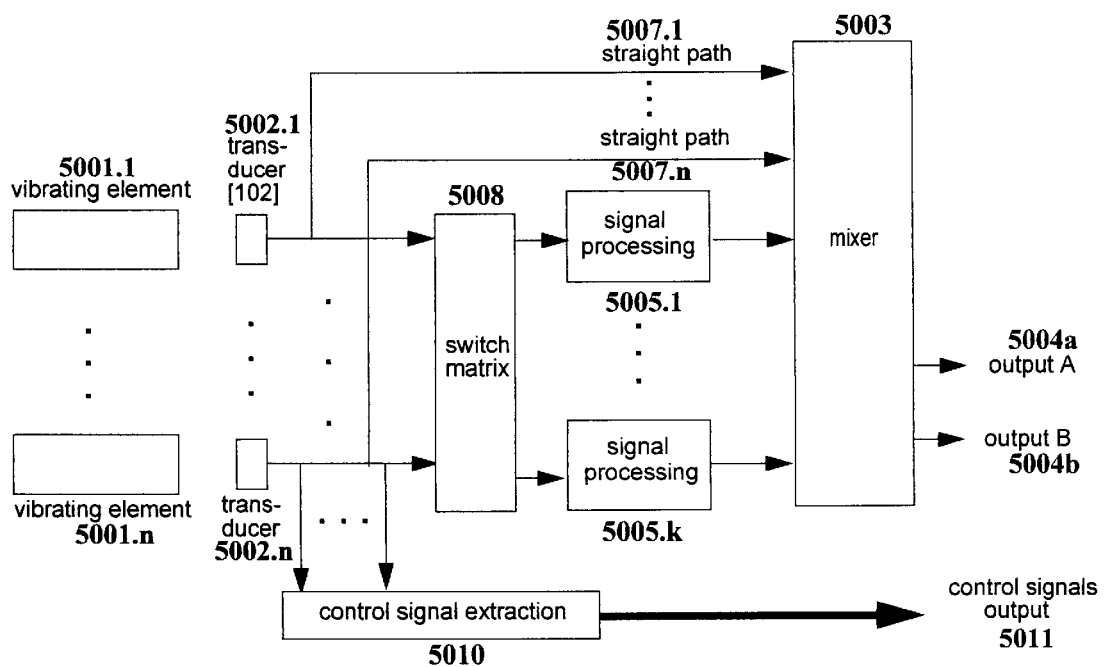
FIG. 54 shows a switch matrix assigning signals from vibrating elements to a number of signal processors en route to subsequent mix-down.

FIG. 54 shows another arrangement wherein a switching matrix 5008 is used in place of the input mixer 5008 to select which individual vibrating element 5001.1–5001.*n* signal is assigned to which signal processor 5005.1–5005.*k*. This arrangement is particularly relevant to the generalized retuning of certain vibrational elements, as in adapted pedal steel guitar and adapted sitar described earlier.

Figure 55:
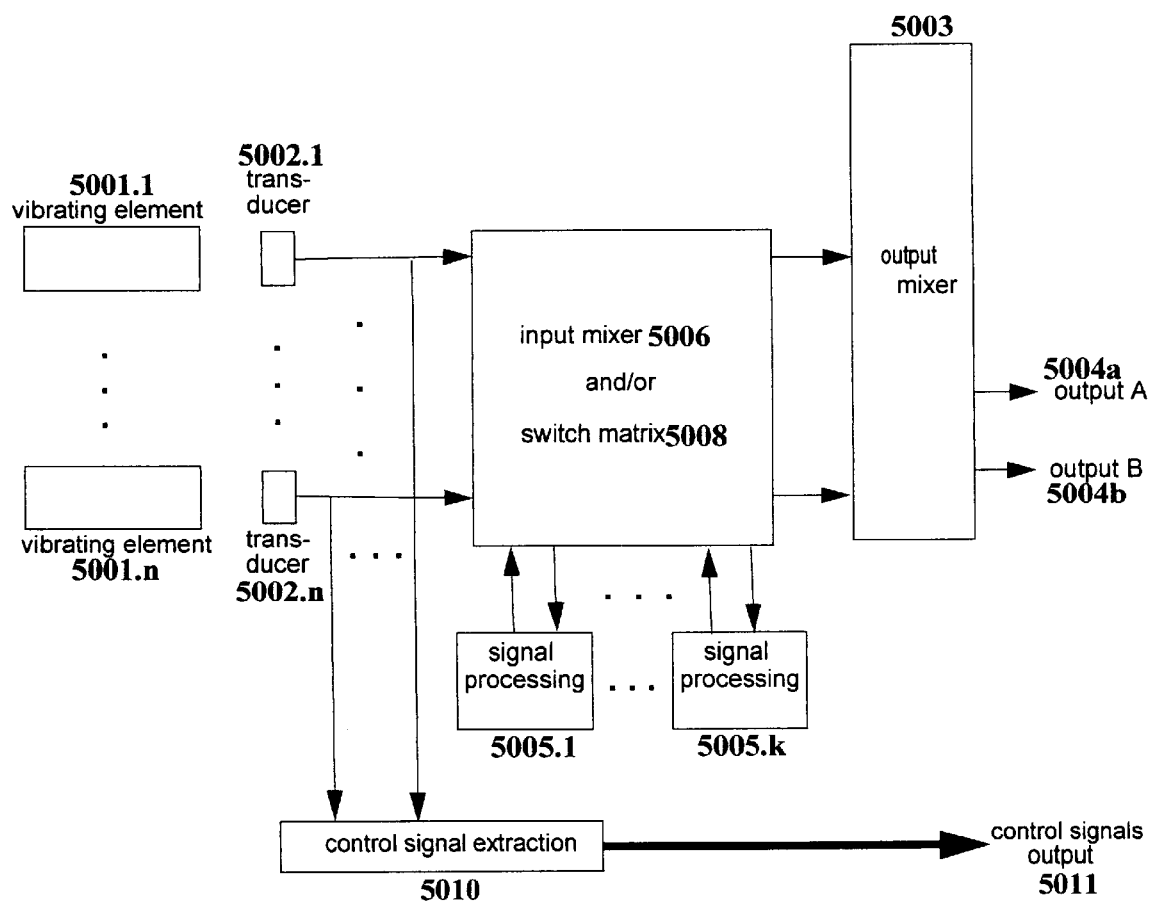
FIG. 55 shows a more flexible method for providing signal processors with vibrating element signals and other signal processor outputs via switch matrix, and additional partial mix-downs by replacing said switch matrix with a mixer.

The invention also provides for several signal processors to be pooled and used in various parallel, series, or other topological interconnections serving one or more vibrating elements. FIG. 55 shows a more flexible example method for providing signal processors with vibrating elements' signals and other signal processor outputs via switch matrix, and additional partial mix-downs by replacing said switch matrix 5008 with an input mixer 5006.

Figure 56:
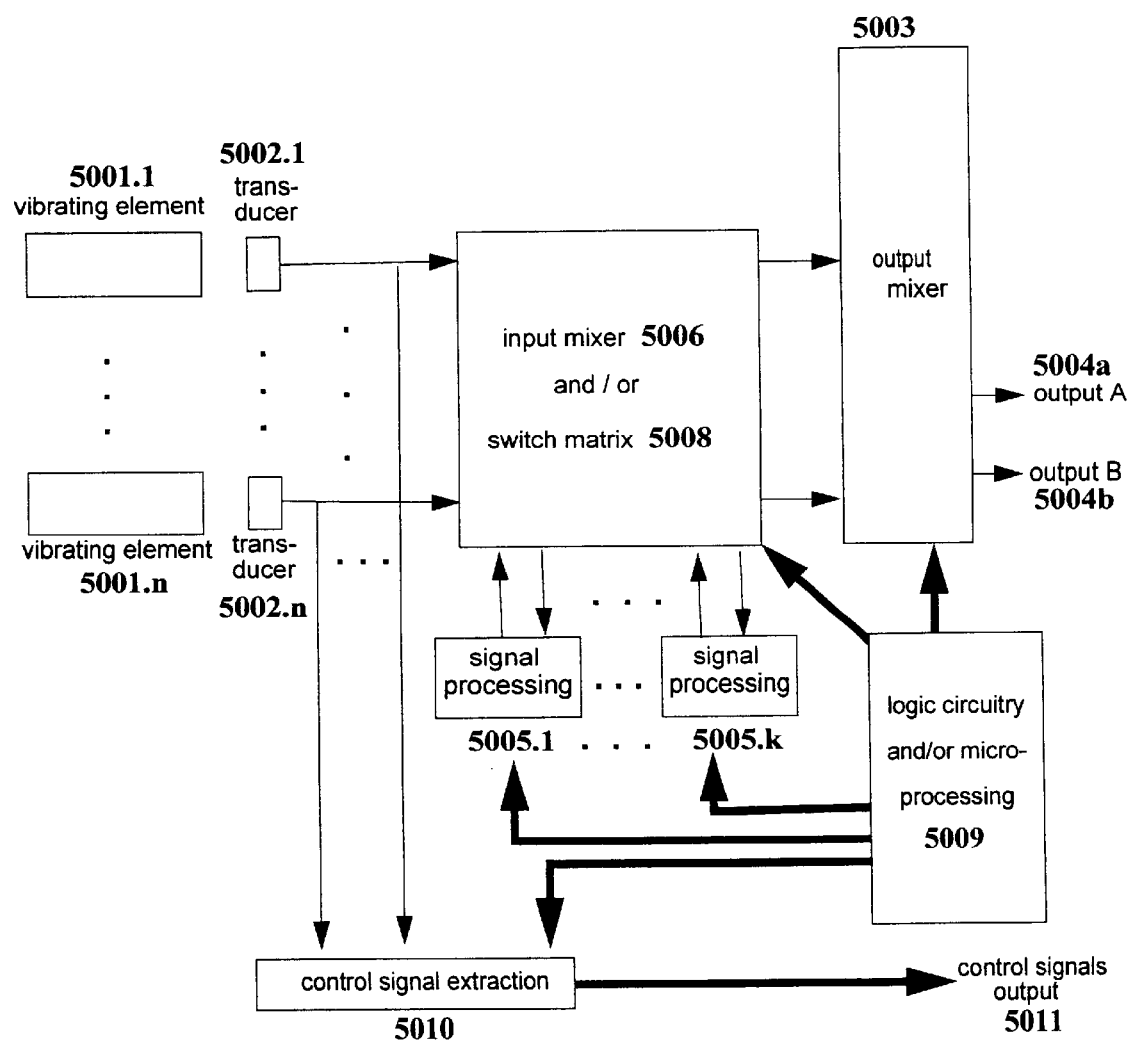
FIG. 56 shows configuration control of signal processors, mixers, and switch matrix, and synthesizer interfaces via logic circuitry and/or microprocessing.

The invention provides for any of the above systems to be integrated together into a common system sharing a common configuration preset storage and recall facility. FIG. 56 shows configuration control of signal processors, mixers, any switch matrix, and synthesizer interfaces via logic circuitry and/or microprocessing. As illustrated in FIG. 56, this is simply a matter of putting all or some combination of the mixers (5003 and/or 5006), switch matrices 5008, signal processors 5005.1–5005.*k*, and/or synthesizer interfaces, as relevant, under the control of logic circuitry and/or microprocessors 5009 which can provide such preset storage and recall functions.

By combining the multi-channel signal handling with excitation, not only can individual vibrating elements be assigned to various signal processing and synthesizer controlling roles, but also individual vibrating elements can now be assigned feedback modes where selected vibrating elements can sustain vibration as if they were bowed, in an electric-guitar feedback arrangement, etc. Further, through use of additional switching, signal processing can be added to the feedback loop as discussed earlier, but on an individual vibrational element basis. Finally, since feedback arrangements tend to emphasize higher harmonics of vibration, and the dynamics of the relative levels of the harmonic mix can be varied dramatically by touching elements or varying feedback characteristics (via signal processing in the excitation feedback loop), the invention provides for control signal extraction to be expanded to respond to details of the overtone content as discussed later.

Figure 57:
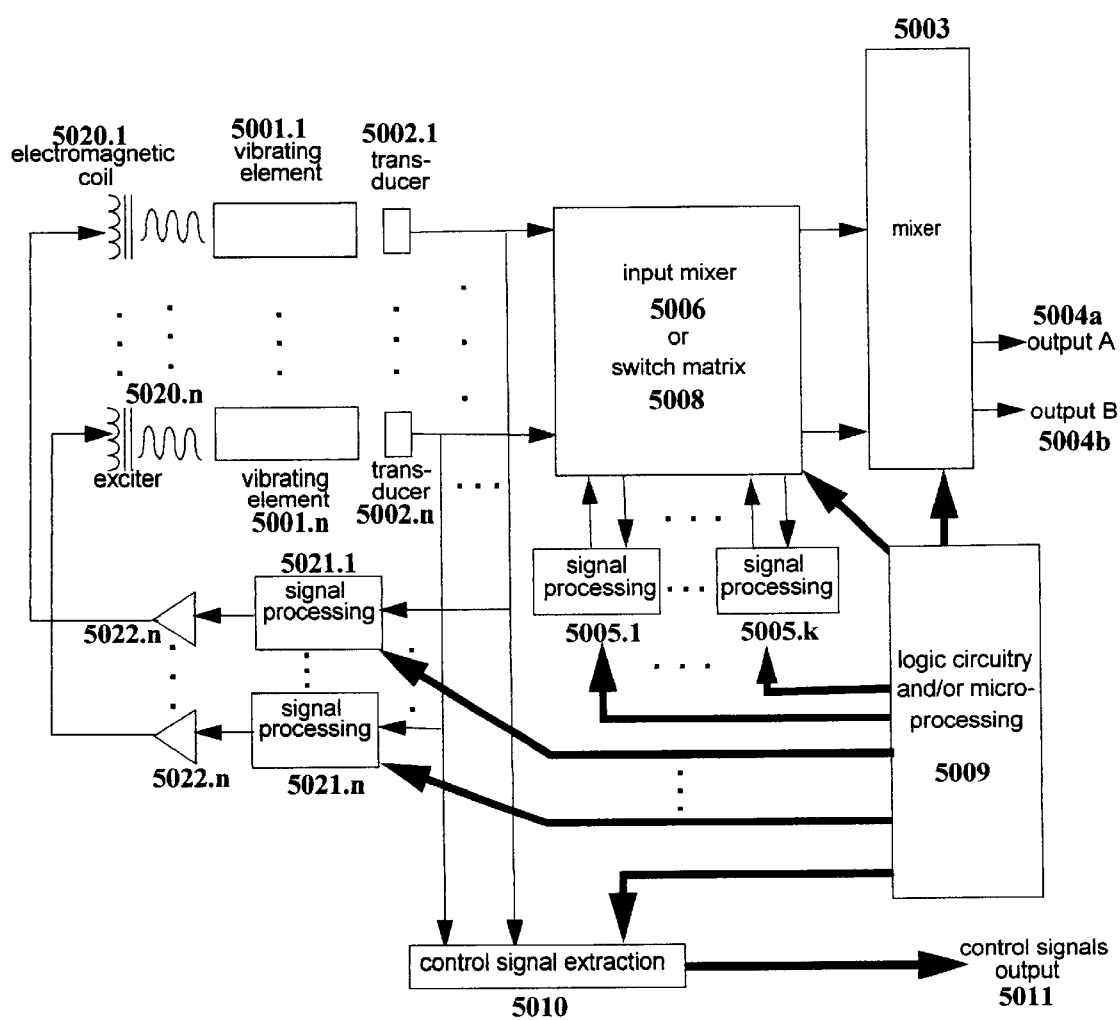
FIG. 57 shows a very general combined environment for multi-channel signal processing, mixing, excitation, and program control of overall configuration.

FIG. 57 shows a very general combined environment for multi-channel signal processing, mixing, excitation, and program control of overall configuration. In FIG. 57 the general combined environment incorporates a plurality of separate feedback loops for each vibrating element, each loop featuring a loop signal processor 5021.1–5021.*n* (which here could be as simple as a level control) which may be controlled by control signals as provided for in the invention. Many possible variations of this approach which may omit or simplify any of the elements shown in FIG. 57 can be realized; for example the signal processors 5005.1–5005.1*k* and 5021.1–5021.*n* may be pooled together in their association with mixers 5006 and/or switches 5008 with said mixers 5006 and/or switches 5008 sending signals to the excitation drive amplifiers 5022.1–5022.*n*.

7.2 Audio Signal Processing

Many of the audio signal processing elements cited as 125 (FIG. 1), 2211 (FIGS. 25–26), 5005.1–5005.*n*/*k* (FIGS. 51–57), and elsewhere in this document can be adequately realized by any number of the standard multi-function MIDI-controlled signal processing modules such as the Roland model RSP-550, Boss model SE-70, Ensoniq model DP/4, ART model SGE Mach-II, Digitech model GSP21, etc. In the invention, these signal processing functions are preferably an integrated component within a larger-scale hardware and software construct rather than an off-the-shelf module. The invention provides not only for the incorporation of these into the signal routing, processing, and synthesis entity 120 (FIGS. 1–2) in the ways described below but also for additional audio signal processing methods which are not commercially available and which are described below.

7.2.1 Spatially Distributed Timbre Construction

Because of the extensive biaural capabilities of human hearing, stereo and other multi-channel sound fields can be used to create a number of musically useful timbral construction ranging from the subtle to the powerful and the beautiful to the bombastic.

Examples of this, commonly found, are stereo-output chorus, stereo-output flangers, stereo-output reverb, stereo-output echos, etc.; but the spatial construction of timbres may be carried far beyond these simple and now commonplace effects. The following discussion explains some example techniques; the role and value of these techniques are developed further in subsequent material following that below.

7.2.1.1 Cross-channel Modulated Delay

Figure 58:
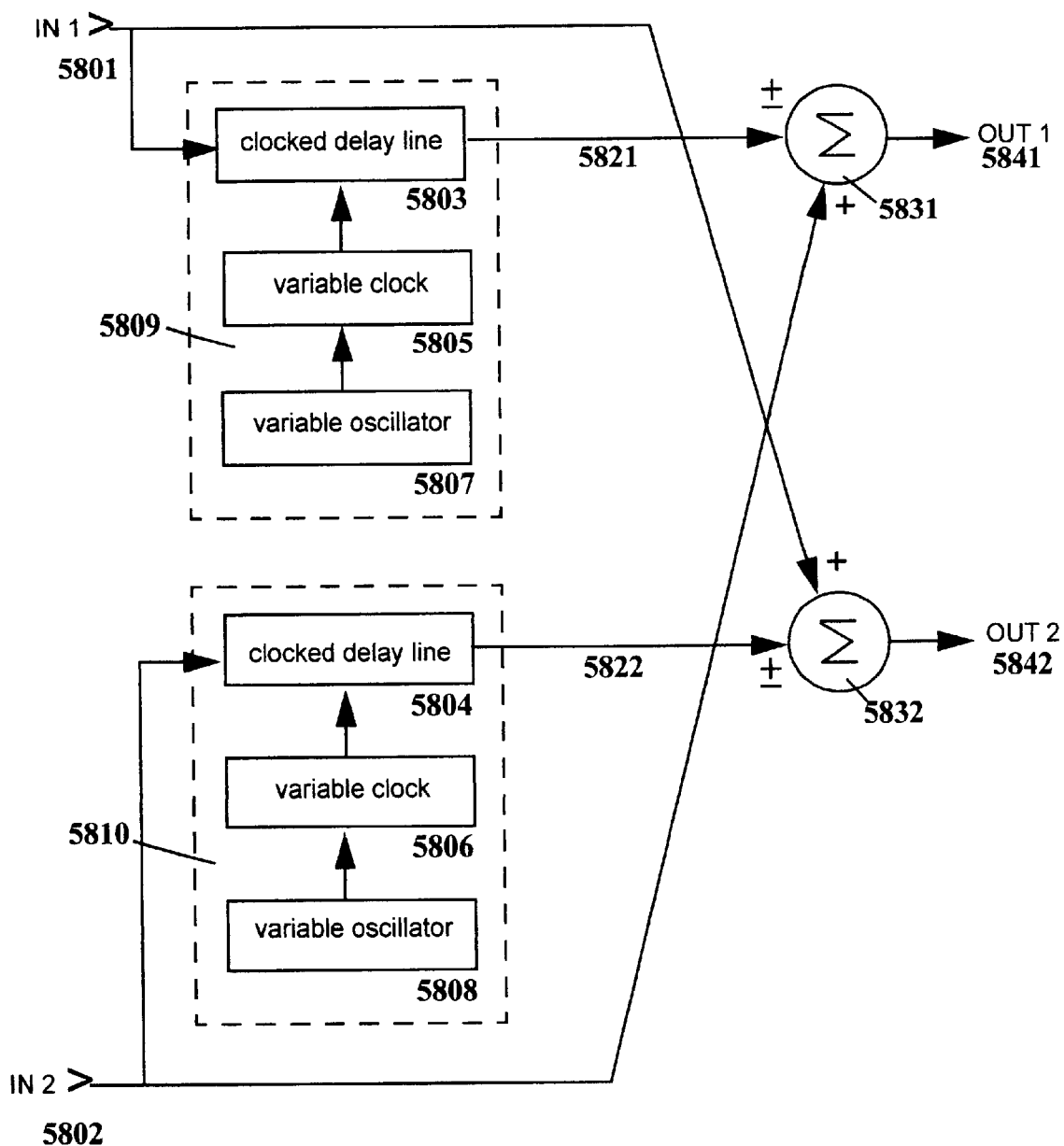
FIG. 58 shows a stereo-input, stereo output configuration of two monaural flange and/or chorus elements wherein the unaltered signal of each input channel is combined with a delay-modulated signal from the opposite channel.

The invention provides for methods to enhance, and to more significantly increase the depth of, a stereo signal set source whose components have similar but slightly different timbres, particularly if the timbres are time-varying. Examples of such stereo signal set sources include the stereo outputs of traditional choruses, flangers, reverbs, etc., a pair of signal distortion elements with different characteristics, two harmonized synthesizer voices or pitch-shifter outputs, the separate outputs of a single two-oscillator synthesizer voice, etc. FIG. 58 shows a stereo-input, stereo output configuration of two monaural flange and/or chorus elements wherein the unaltered signal of each input channel is combined with a delay-modulated signal from the opposite channel. Each input 5801, 5802 is presented to a dedicated delay-modulation element 5809, 5810 and a dedicated output channel summer 5831, 5832. Internally each delay-modulation element 5809, 5810 consists of a variable delay implemented in this example by changing the clock speed of a clocked delay line 5803, 5804 by means of a variable clock oscillator 5805, 5806. The speed of the clocking oscillator is controlled by a variable low-speed modulating "sweep" oscillator 5807, 5808. Since the sweep oscillator's output is periodic, it is possible to implement the clocked delay line 5803, 5804 not only by changing the sample rate but by loading fixed-rate samples into a ring buffer and reading out of the ring buffer at a rate set by the variable clock 5805, 5806. Other implementations of delay-modulation elements 5809, 5810 are also possible as known to those familiar with the art. The outputs 5821, 5822, respectively, of each delay-modulation element 5809, 5810 respectively, are directed to the summing elements 5832, 5833, respectively associated with the opposite unaltered input channel 5802, 5801, respectively, producing stereo outputs 5832, 5831. The delayed signals 5821, 5822, may be summed at the summing elements 5832, 5833 in additive, subtractive or other phaseshafted or phase-dispersed relationships. In a preferred implementation the two sweep oscillators 5807, 5808 operate at slightly different sweep frequencies and are free-running (unsynchronized) if possible.

(It is noted that a similar, restricted version of this has since been incorporated as one of the effector modes, namely "cross-over chorus", of the Korg model X5DR synthesizer module. In the Korg implementation, however, the two sweep oscillators 5807, 5808 have been replaced by a single sweep oscillator with two phase-locked quadrature, i.e., 90-degree phase difference, outputs.

It is noted the above arrangement may naturally be extended beyond stereo to accommodate additional input and/or output channels. The most general implementation would have N inputs, M outputs, N–1 variable speed swept delays, and M summers with N inputs summed with adjustable gains and/or phase relationships; simplifications of course are possible. One example application would include Mspeaker (i.e., M=4 for quadraphonic) amplification. Another example application with M=2 for stereo and N>2 similar signal sources would build an enhanced version of the sonic effect.

In the above it is noted that when pluralities of elements (for example, spatializer and distortion elements) are cited, the elements in the plurality need not be identical in their type and/or parameterized settings. Further, various parameters of each of the elements (modulation speed, modulation depths, relative amplitudes in audio mixes, etc.) may be advantageously controlled in real-time by control signals for expression (from instrument entities, foot controllers, etc.), further correlation with the signal source (for example, using envelope extraction control signals) or further levels of animated enhancement (employing additional sweep oscillators, envelope generators, etc.).

7.2.1.2 Multi-level Stereo Chorused Distortion of Monaural Sources

Figure 59:
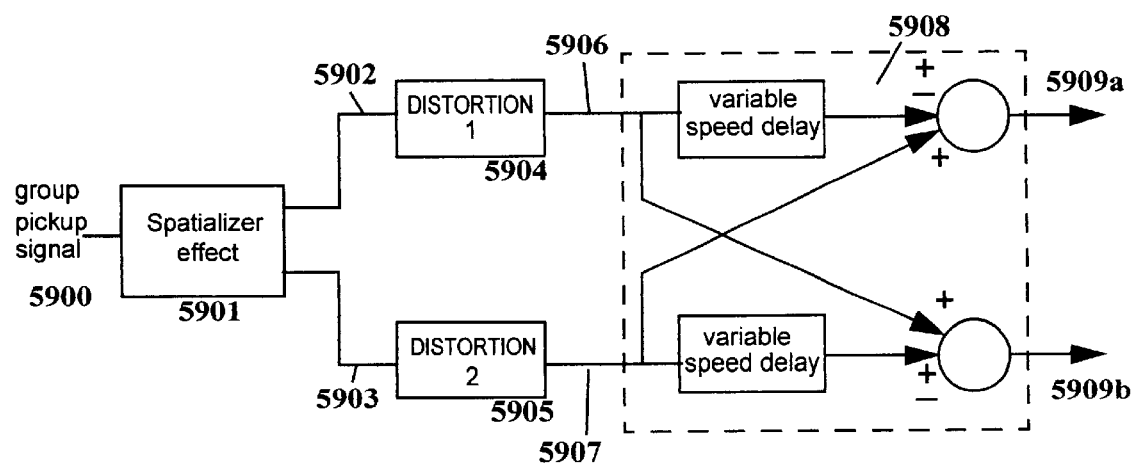
FIG. 59 illustrates a combination of a spatialized effect, two distortion elements, and a stereo (N=M=2) cross-channel modulated delay.

The invention provides for creating a similar-signal stereo signal set from two distortion sources and presenting it to cross-channel modulated delay to synergistically transform a relatively spectrally dull signal, particularly a time varying one, into a very rich powerful sound. FIG. 59 illustrates a combination of a spatialized effect, two distortion elements, and a stereo (N=M=2) cross-channel modulated delay. In this example arrangement, the input signal 5900, which may be from a group pickup as shown, individual vibrating element pickup, audio signal synthesis element, microphone, etc., is applied to a stereo-output spatializing effect 5901 such as a stereo output chorus, flanger, etc. The resulting stereo signals 5902, 5903 are applied to distortion elements 5904, 5905. Fluctuations in the waveshape of the applied stereo signals 5902, 5903 cause significant dynamic timbral shifts from the distortion elements 5904, 5905; such fluctuations in the applied stereo signal waveshape may originate from the original signal 5900, from any one or more of amplitude animation, phase animation, delay accumulation, dynamic waveshaping processes, etc. in the spatializer 5901, or both in combination. The distortion elements 5904, 5905 produce a rich similar-signal stereo signal set 5906, 5907 which is then presented to a N=M=2 cross-channel modulated delay, resulting in stereo output signals 5909a,5909b.

For a single input channel 5900, the invention provides for the expansion of such an arrangement to include additional processes to build an enhanced version of the sonic effect. For example, an N-output version of the spatializer 5901 (which may, for example, be implemented internally by two or more simpler spatializers in parallel, hierarchical, or other interconnection topologies) can be used in conjunction with N distortion elements in an N-input (N>2) M-output cross-channel modulated delay replacing 5908.

For multi-channel signal sources, the invention provides for each signal to be handled by a dedicated spatializer and several possible subsequent processing arrangements. As one example, assuming K input channels, selected outputs of each of the K spatializers may be mixed and presented to N (N being two or more) distortion elements which in turn are presented to an N input, M output cross-channel modulated delay replacing 5908. In another example, no pre-distortion mixing is used but rather each spatializer is provided with its own collection of two or more distortion elements; the collection of all outputs of these, which are of number J not equal to N, may be matrix-mixed to form N mixed outputs which are applied to an N input, M output cross-channel modulated delay replacing 5908. In another example, no pre-distortion mixing is used but rather each spatializer is provided with its own collection of two or more distortion elements; the collection of all outputs of these, which are of number N, may be directly applied to an N input, M output cross-channel modulated delay replacing 5908. Other arrangements similar in form and spirit are clearly possible.

In the above it is noted that when pluralities of elements (for example, spatializer and distortion elements) are cited, the elements in the plurality need not be identical in their type and/or parameterized settings. Further, various parameters of each of the elements (modulation speed, modulation depths, relative amplitudes in audio mixes, distortion parameters, etc.) may be advantageously controlled in real-time by control signals for expression (from instrument entities, foot controllers, etc.), further correlation with the signal source (for example, using envelope extraction control signals) or further levels of animated enhancement (employing additional sweep oscillators, envelope generators, etc.).

7.2.1.3 Location Modulation

Location modulation has been commercially available in the form of "auto-panning" where an audio source is periodically panned back and forth between two stereo outputs. The invention provides for limiting periodic auto-panning of monaural sources sounding in isolation to be typically most effective when the degree of panning is limited and the modulation rate is low (as extreme settings of modulation depth and speed are typically not as widely musically useful). Under these conditions in a stereo sound field a signal source takes on an animated character but yet is not so blatantly spectrally modified as it is in chorus and flanging effects. The invention also provides for wider ranges of depth and speed to be used in the context of multi-channel auto-panning, discussed next, and layered signal processing discussed below and already touched upon in the discussion associated with FIG. 39.

The invention provides for multi-channel versions of auto-panning. In layered signal processing, such as that discussed in the context of FIG. 39, auto-panning contributions work best within the invention if modulation sweep oscillators operate at different (typically only slightly different) modulation speeds. In the context of multi-channel signals provided by individual vibrating elements of an instrument entity 100, this unsynchronized configuration of modulation sweep oscillators can create inhomogeneous "bunching" effects when many modulation sweep oscillators take on identical or nearly-identical values in extreme ranges of the modulation sweep.

The invention provides for a much more homogeneous method for multi-channel periodic-sweep auto-panning, namely that of arranging the signal pan images in a phase-staggered constellation swept by a single modulating sweep oscillator. A simple example is that of stereo cross-panning where two input signals pan between stereo speakers in synchronized complementary directions. Another example is that of staggering the phases of a multiple phase output modulating sweep oscillator in some preassigned arrangement, such as offset from each other by a common phase-offset value. This may be used to pan the sounds from each individual vibrating element so that the individual panned sound images follow one another between two speakers. Similar methods can be used if there are more outputs (for example, quadraphonic, hexaphonic, octa-phonic etc. speaker installations aligned in a plane or in 3 dimensions); here N input, M output mixers can be controlled by one or more single or multiple-phase output modulating sweep oscillators.

Control-signal invoked transient "one-shot" panning effects may also be obtained from commercial mixer products that feature a fade-time transient between pre-programmed amplitude settings (such as the Yahama DMP series and Sound Sculpture Switchblade series). The invention provides for such transient effects to be used as a compositional element in music or a metaphorical or semiotic element in audio and/or audio-visual aspects of performance. In particular limited-duration panning trajectories of arbitrary nature, each affiliated with one of several individual sound sources, may be made to simultaneously and.or sequentially follow a predefined relative dynamical pattern. This can be used as a contrapuntal element in melody or abstract musical forms. It can also be used to create plot events in a composition or performance, such as in a musical composition, dance composition, or play concerning or involving the spatial interaction of bird sounds.

7.2.1.4 Other Spatially Distributed Timbre Methods

Several other aspects of the invention to be presented below in other contexts also may be used to create spatially-distributed timbral realizations; their use as general audio signal processing elements 129a in this fashion is provided for as part of the invention.

One aspect of the invention which may be used for spatially-distributed timbral realizations is: the two-input or multiple-input versions of the octave cross-product chain described later on in the context of audio signal synthesis waveshaping. As described there, this technique results in a number of parallel signal outputs with widely differing spectral contents and spectral animation features, and the animation features slow to a halt when all fundamental and overtone frequencies of the two input signals are brought into fixed integer and small integer-ratio multiplicative relationships. The aforementioned characteristics of the multiple outputs lend themselves to spatially-distributed timbral realizations since mixing of the outputs can partition the frequency content and animation features differently between final mix-down outputs. The invention provides for this method to be used as a signal processing technique. In one example usage, a pitch-shifter, swept variable delay, etc. is used to construct a derivative frequency and/or phase shifted signal (the characteristics of which may be controlled by control signals for expression) from an original signal. The original and derivative signals are then fed into the octave cross-product chain to produce often spectacular spatially-distributed timbral realizations.

Another aspect of the invention which may be used for spatially-distributed timbral realizations is multi-channel waveshaping where a signal source is provided to a plurality of waveshapers each of which may be controlled by control signals. Each waveshaper output may then have differing frequency content and animation features which thus lend themselves to spatially-distributed timbral realizations in a multi-channel (stereo, quadraphonic, etc.) partition or mix-down. Of particular interest is the use of hysteretic waveshaping, described later, which creates a wide range of spectral differences as the input waveform and/or hysteresis parameters change over time.

Another aspect of the invention which may be used for spatially-distributed timbral realizations is the use of later described layered audio signal processing methods. The invention does this by providing for each audio signal processing layer to be allocated a different proportion to each final mix-down output channel. These allocated mix proportions may be varied over time by control signals.

7.2.2 Multi-channel Audio Signal Handling

The invention provides for flexible homogeneous and inhomogeneous signal processing of multi-channel audio sources. Such multi-channel audio sources may for example include, referring to FIGS. 1–2, a multiple vibrating element instrument entity 100, multiple instances of audio signal synthesis elements 129a with single or multiple output-channels audio signal synthesis elements.

Several signal processing methods involving multi-channel signal sources have already been discussed thus far, particularly those in the previous few sub-sections. The invention further explicitly provides for dedicated, shared, or combined arrangements for audio signal processing elements within the signal routing, processing, and synthesis entities 100 as shown in FIGS. 53–57. In particular, each signal from a multi-channel source may be handled differently with at least some of these signals processed by one or more audio signal processing elements 129a of identical, similar, or differing function. Conceptually, the most flexible of these are embodiments where input mixing 5006 is used to share the inputs and outputs of a pooled collection of signal processors as in FIGS. 55–57. The audio signal processing elements 129a may be any one or more of conventional signal processing functions provided by commercial products (chorus, flange, reverb, distortion, delay, filtering, equalization, etc., individually or in combination) as well as any one or more of the invention's novel audio signal processing methods described thus far and below.

7.2.3 Bass Note Derivation

The invention provides for the derivation of bass notes from signal sources. This is particularly relevant in the invention where signals from selected vibrating elements are used to create bass notes. The created bass notes may be heard in parallel with the original pitch of the signal (each pitch may be subject to different signal processing) or in replacement of it. In many cases this completely eliminates the need for bass accompaniment in a performance situation at the potential expense of melodic freedom of the bass line.

The invention provides for at least three methods of bass note derivation which may be used individually or in combination.

One of these methods is the use of control signal extraction to derive note events to run a bass note audio synthesis element (for example, a conventional audio synthesizer module transposed down one or more octaves or other large interval). If the bass interval is not always to be fixed, pre-programmed note transpositions reflecting desired harmony and/or player-controlled changes in pitch-shift interval may be used individually or in combination. This audio synthesizer method allows a wide range of sounds to be used but can be limited in how the bass note expression can be controlled from the original signal source. One solution to this provided for by the invention is the use of overtone parameter tracking in the control signal extraction; these additional parameters may be used to shape the synthesized sound though varying parameters in the synthesis processes and/or by varying subsequence signal processing parameters.

Another of the methods is through the use of conventional pitch shifters. If the bass interval is not always to be fixed, so called "intelligent-harmony" pitch shifters (such as the Digitech model IP-33B) and or player-controlled changes in pitch-shift interval may be used individually or in combination. The use of pitch-shifting allows for nuances of the original signal source to be carried through but may suffer from delayed response, glitch, phasing, "Darth Varder," or other undesirable or limiting artifacts.

Yet another method, should the bass interval always be related to the source pitch by octaves, the invention provides for an adaptation of the novel octave divide method used in the Boss OC-2 "Octaver" pedal. Although this technology does have glitching and monophonic limitations as described below, it works very well in responding to amplitude envelope attributes of the signal source. As is evident from the publicly available published service note schematic and usage of the device, each octave signal is created by frequency dividing the original signal (for example by means of a toggle flip-flop), scaling its amplitude.by the instantaneous amplitude of the source signal (for example, through use of an envelope follower and a gain-control method), and combining this with a bit of the original signal to create a richer resulting overtone result. The unit suffers from the fact that harmonically rich signals often confuse the frequency dividers resulting in a very glitchy bass signal. Further, the method is monophonic; the playing of two notes at once processes only one bass signal, and usually an unusably unstable one. The invention provides for the glitch-free adaptation of the OC-2 technology to multiple vibrating element instruments by dedicating a specific low-pass filter and an allocated (or allocatable) OC-2 divider or divider chain to each selected vibrating element. In particular, the incoming individual vibrating element signal is low-pass filtered to greatly attenuate frequencies above the maximal fundamental frequency to be recognized by the arrangement (this maximal value may, in some circumstance be high enough to support unfretted string "chime" harmonics and the like). The combination of applying each instance OC-2 technology to a single vibrating element together with a highly emphasized fundamental frequency eliminates the glitching and monophonic limitations. The invention provides for a plurality of the described OC-2/filter arrangements, numbering for example three for a guitar, to be allocated to specific vibrating elements (fixed by design, selectable via stored program control, etc.). Further, the invention provides for the use of this technology should bass notes need to be non-octave in relation to the original signal: the nearest octave note can be generated by the OC-2/filter approach and an allocated pitch shifter may be used to make relatively smaller pitch changes, recognizing that smaller shift intervals tend to have less artifacts.

7.2.4 Layered Audio Signal Processing

Figure 60:
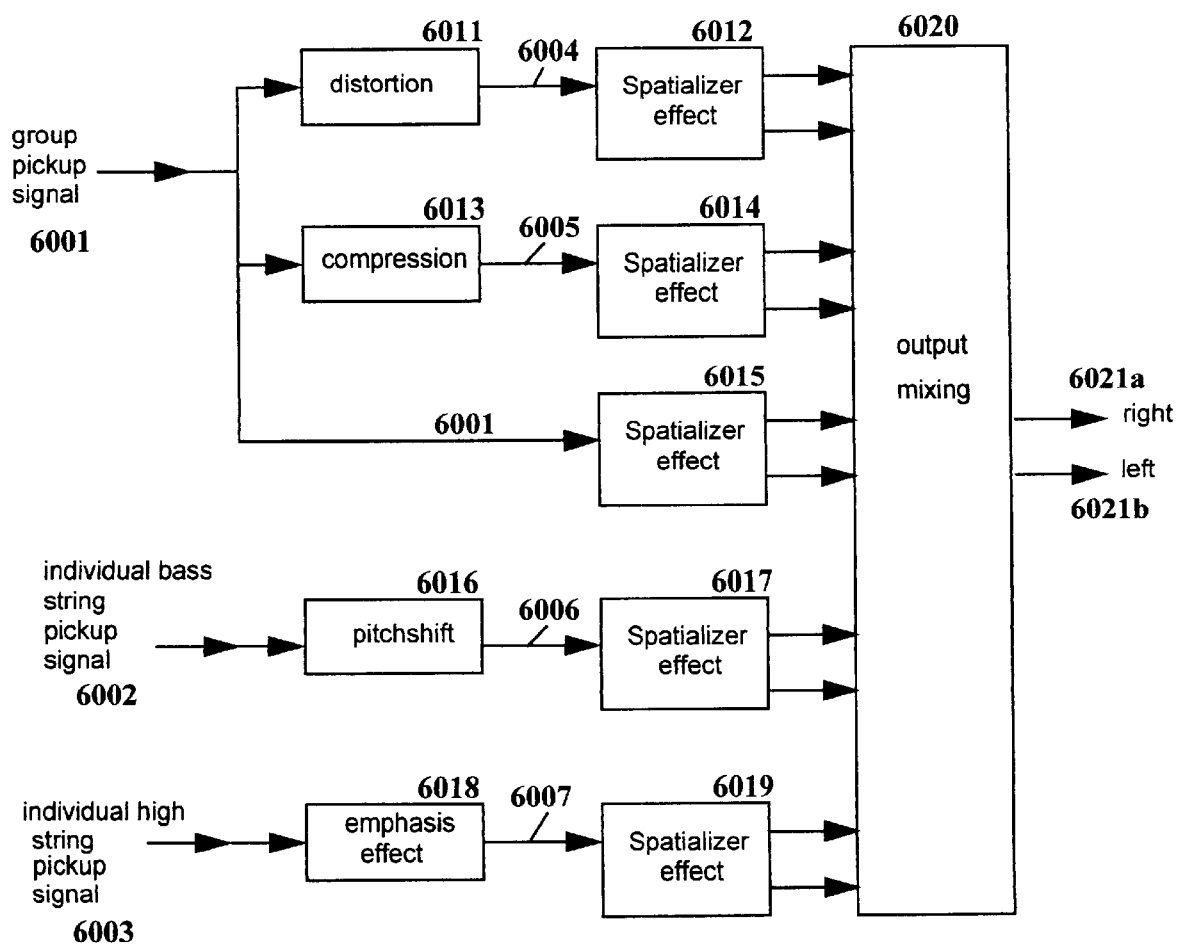
FIG. 60 illustrates examples of inhomogeneous layered signal processing which may be used as shown, with selected omissions, or as an archtype for similar constructions.

The invention provides for the layering of multiple audio signal processing paths driven from one or more shared sources and partitioned or mixed down to two or more output channels. Because this may be viewed as a superposition of several signal processing paths, this will be referred to as "layered audio signal processing." One example of this has already been presented in the discussion relating to FIG. 39; here each layer is responsible for emulating a separate sympathetic string effect. As each layer is in the FIG. 39 example essentially identical, the layers may be called "homogeneous." (Some examples of homogenous signal processing have since been devised, for example the "PentaChorus" preset of the Roland RSP-550 signal processing module.) In contrast to homogeneous layered signal processing, FIG. 60 illustrates separable examples of inhomogeneous layered signal processing. The examples of FIG. 60 may be used as shown, with selected omissions, or as an archtype for similar constructions as provided for in the invention. In one example a group pickup signal 6001 is applied to a distortion element 6011 and a compression element 6013. Each of the output's signals 6104, 6005 as well as the original signal are provided to separate spatializers 6012–6015 (for example, chorus, flange, reverb, etc.) which are then mixed down into a stereo signal 6021a, 6021b by an output mixer 6020. The invention provides for the substitution of any of the elements 6011, 6013, 6012–6015 with other types of audio signal processing elements as well as inclusion of additional layers. As expansion of the example, individual vibrating element signals from vibrating elements sharing the aforementioned group pickup can also be used to create additional layers. For example, an individual bass string signal 6002 (for example, the 5th and or 6th string of a guitar) may, in parallel, be processed by a pitch-shifter, OC-2/filter, etc. 6016 to create a bass note pitch signal 6006 which, in turn, may be presented to a separate spatializer 6017. Further, another individual string signal 6003 can be processed in a similar fashion but replacing the pitch-shifter with an emphasis effect for emphasizing a particular melody or note in a chord.

Because of the larger number of sonic sources that can be statically distributed in the sound field, the invention provides for the use of location modulation with a wider range of permissible modulation rates and modulation depths as extremal location modulation behavior is only part of the overall spatial sonic structure.

The invention also provides for the use of layered audio signal processing in the creation of spatially-distributed timbral realizations. One example of this would be providing a dedicated stereo chorus to each of the six individual string signals of a guitar as well as a seventh stereo chorus to the group pickup signal, setting each chorus sweep rate slightly differently and summing the seven stereo outputs into a single stereo mix; this is in fact an example adaptation of the principals illustrated in FIG. 60. Another example is that of the cross-product octave chain to be described later.

The invention provides for the use of waveshaping techniques, particularly those which can be varied in real-time by control signals and/or hysteretic waveshaping techniques, as signal processing elements. The invention also provides in general for the separate and/or coordinated control of parameters involved at each audio signal processing layer by means of general control signals.

7.2.5 Envelope-controlled Time and Pitch Modulation

The invention provides for the modulation of the delay time of a variable delay line by a control signal corresponding to the amplitude envelope of the delayed signal or an associated signal. This causes a tape-recorder speed instability effect correlated to the transient character of the reference signal amplitude envelope; more precisely the pitch changes with the time derivative of the amplitude envelope. The invention also provides for the substitution of a variable pitch shifter controlled by the time derivative of the same control signal; this arrangement produces roughly the same effect. In either implementation the control signal may be first warped by an emphasis non-linearity, control signal delay, and/or other processing functions. The result can be used in soloing as a climactic effect or in moderation for a transient enhancement. The invention also provides for envelope control of pitch-shifting without time-differentiating the control signal.

7.2.6 Resonant Distorting Delays

The invention provides for the sitar-like sympathetic/buzz emulation utilizing short high-resonant delays as described in association with FIG. 39 to be used as a more general signal processing element. This is particularly useful if parameters of the configuration, such as degrees of resonance, degrees of clipping, and modulation depths, can be varied in real-time by control signals.

7.2.7 Hysteretic Waveshaping and Distortion

Hysteresis occurs to some extent in overdriven tube amplifier output transformers due to the natural hysteretic properties of the materials used to make the transformer core. Hysteresis effects in waveform distortion can create valuable amplitude-varying. . . . The invention provides for generalized models of hysteresis to be used as a waveshaping technique, and as such a signal processing technique, with parameters of the hysteresis action variable in real-time via control signals.

Figure 61:
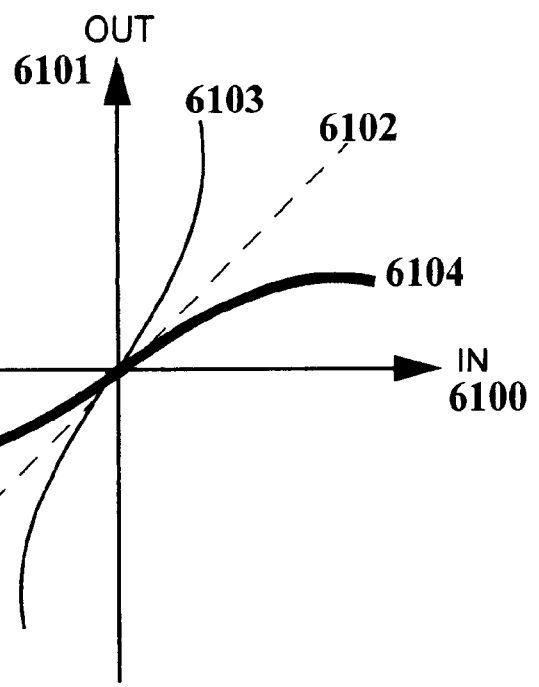
FIG. 61 illustrates an example of a generalized hysterisis model construction as provided for by the invention.
Figure 61:
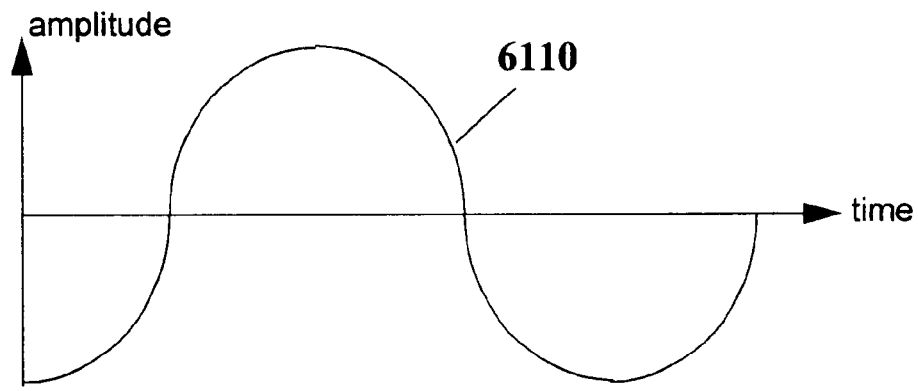
Figure 61:
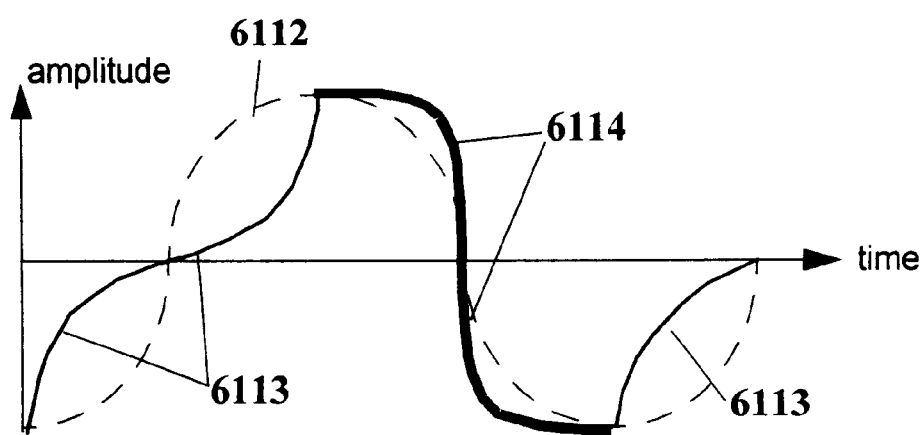

Traditional hysteresis curves for transformers, gears, pseudo-elastic deformation, etc. are well known (see for example [Visintin]. FIG. 61 illustrates an example of a generalized hysteresis model construction as provided for by the invention. The input/output graph shows example symmetric curves that are linear 6102, superlinear 6103, and sub-linear 6104 along with the time/amplitude oscillograph of an example applied waveform 6110. Other types of symmetric or non-symmetric nonlinearities may also be used. A time-derivative operation on the applied signal waveform 6110 followed by sign detection reveals whether the applied signal waveform is at any instant increasing or decreasing. As an example, the applied signal waveform 6110 would be applied to one non-linear warping function such as 6103, 6104 when increasing and the other when decreasing, resulting in the waveform made of segments 6113, 6114 rather than the waveform 6112 that would have been created by the linear curve 6102. In order to allow the applied input signal to vary in amplitude and still maintain continuity of the waveform, the invention provides for the warping non-linearities to be themselves adaptively scaled or otherwise altered based on amplitude information from the current and previous direction reversals, moving average of waveform area or waveform power, etc. The invention provides for aspects of the hysteresis process such as curve shapes and degrees of dependency on waveform history, to be varied in real-time by control parameters.

Hysteretic waveshaping can be of use in layered audio signal processing and spatially-distributed timbral realizations which have been described above.

7.3 Audio Signal Synthesis

Referring to FIGS. 1–2, the invention provides for the inclusion of audio signal processing elements 125 with the signal routing, processing, and synthesis entity 120. These may include conventional MIDI synthesizers, analog synthesis elements, or other technologies particular to the invention such as cross-product octave chains, hysteretic waveshaping, vowel sound synthesis, etc. The invention provides for as many parameters as possible to be variable in real-time by means of standardized control signal formats. The invention also provides for the synthesis of vibrating element feedback sounds controlled by control signals and pitch sampling as may be adapted from the Boss DF-2 "Distortion/Feedback" product.

7.3.1 Spatially Distributed Timbre Construction

It is possible to create spatially distributed timbre realizations as part of the audio synthesis process as well as by subsequent signal processing (cross-channel modulated delay, multi-layer chorused stereo distortion, phased multi-signal constellation location modulation, etc.) as described earlier. The invention provides for spatially distributed timbre realizations within synthesis by a variety of methods.

One method, found in many commercial synthesizer modules (such as the Korg M3-R, Korg X5DR, and Kawia K4-r, for example), is for the synthesizer voices themselves to involve multiple parallel oscillators and/or sample-players delivered in the stereo or other multi output form. This sub-section discusses two other methods provided for by the invention.

7.3.1.1 Cross-product Octave Chain

The many times aforementioned cross-product octave chain involves two or more octave divider chains whose corresponding outputs are multiplied together, with all resulting outputs summed together by a multiple output mix-down mixer. The cross-product technique results in a number of parallel signal outputs with widely differing spectral contents and spectral animation features, and the animation features slow to a halt when all fundamental and overtone frequencies of the two input signals are brought into fixed integer and small integer-ratio multiplicative relationships. The aforementioned characteristics of the multiple outputs lend themselves to spatially-distributed timbral realizations since mixing of the outputs can partition the frequency content and animation features differently between the final mixdown outputs. The invention provides for the incorporation of cross-product octave chains in audio single synthesis.

Figure 62:
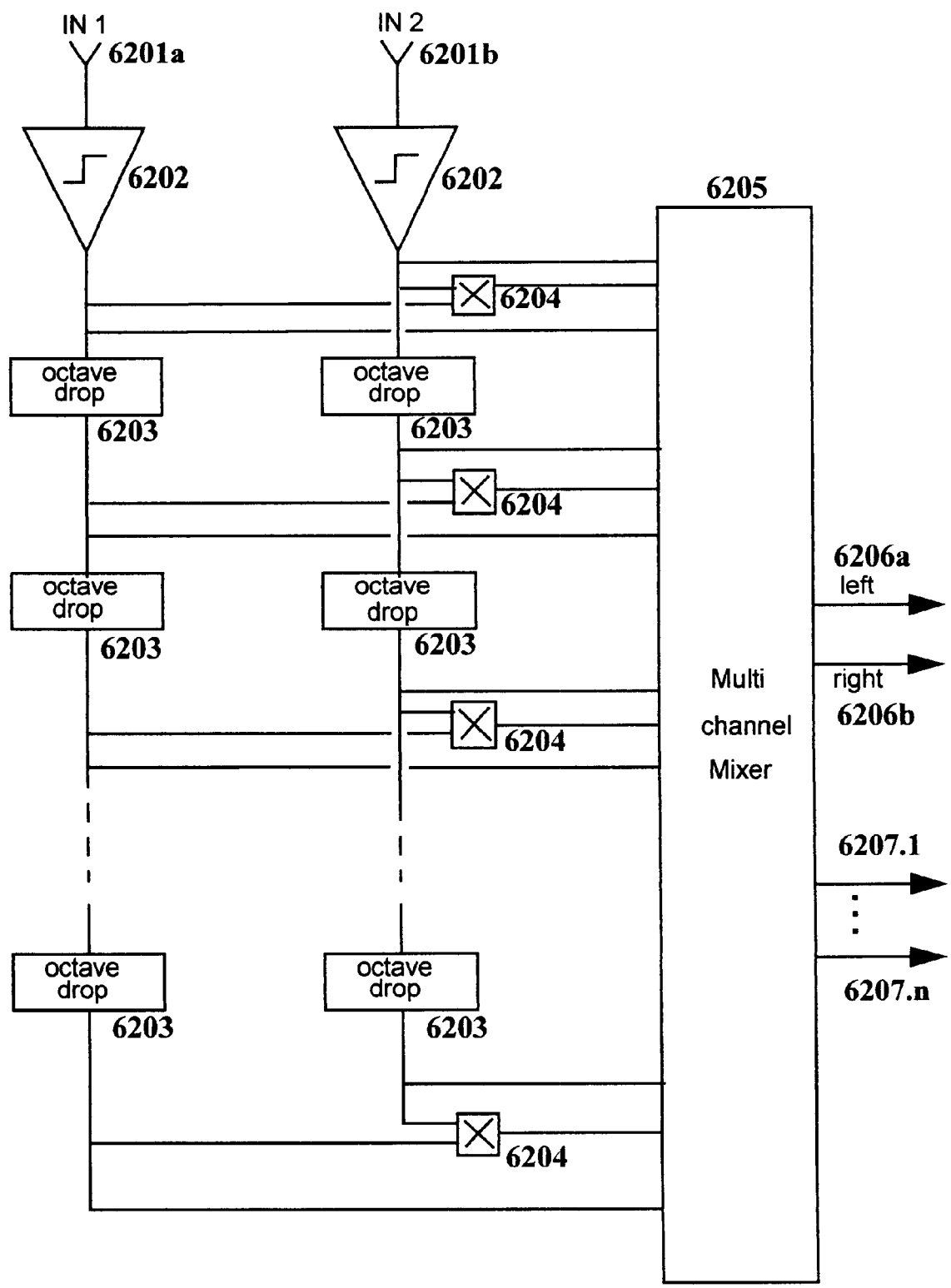
FIG. 62 shows an example implementation of a cross-product octave chain particularly suited to low cost implementation with logic chips or simple DSP program loops.

FIG. 62 shows an example implementation of a cross-product octave chain particularly suited to low cost implementation with logic chips or simple DSP program loops. Two input signals 6201a, 6201b are applied to optional comparators 6202 which convert the applied signals into two-value waveforms. These are applied to a chain of octave dropping elements 6203 which here can be implemented in isolation as a chain of toggle flip-flops and in aggregate as a binary counter. The depth of the chain can include many levels with three to six a useful number of levels. Each of the resulting output signals at corresponding levels are multiplied together by multipliers 6204. Signal analysis of the truth table for various logical operations show that for applied square waves an EXCLUSIVE-OR operation acts exactly as a unity-gain multiplication (while an AND function acts as a unity-gain multiplication added to half-amplitude versions of the two applied square waves), so the multipliers 6204 may be realized by EXCLUSIVE-OR operations. This amounts to less than $1US worth of chips in hardware and a small amount of code in software. All outputs are provided to an output mixer 6205 which produces at least stereo outputs 6206a, 6206b as well as potentially other mix-down outputs 6207.1–6207.n and which in a preferred embodiment may be adjusted in real-time by control signals.

The invention provides for alternate implementations, for example omitting the comparators 6202, implementing the octave drop functions 6203 with pitch shifters or OC-2/filter technology, and/or implementing the multipliers 6204 with VCAs or 4-quadrant multiplier operations. The invention also provides for expansions to include more than two octave chains.

In the context of audio signal synthesis, the applied signals 6201 a, 6201b may be generated by two oscillators within a single synthesizer voice; these oscillators may be relatively tuned in unison, octaves, or near-consonant intervals for basic operation, and one of the oscillators may be continuously swept through a range of pitches to create huge audio displays of pleasing spectral complexity.

7.3.1.2 Multi-channel Waveshaping

The invention also provides for spatially distributed timbre realizations through use of parallel or complementary modulations of a plurality of waveshaping operations by control signals. The outputs of the plurality of waveshapers are then mixed into a stereo or multi-channel output mix.

7.4 Control Signal Routing

The invention provides for extensive control capabilities and as such requires sophisticated control routing, processing, and stored program organization. The capabilities for this provided by the invention are described in the following subsections. To illustrate essential capabilities the discussion below is stated in terms of commonly appreciated MIDI messages and conventions, but the invention provides for these same capabilities to apply to other signal formats in digital, analog, contact closure, entirely software, etc. or any combination.

7.4.1 General Control Signal Switching and Merging

Referring to FIGS. 1–2, input signals directed to control routing and merging include the control outputs from the instrument entities 100 (including foot controllers), control signal extraction elements 128a, control signal processing elements 123, and control signal synthesis elements 129b. Still referring to FIGS. 1–2, output signals directed from control routing and merging include control inputs to instrument entities 100, all elements within the signal routing, processing, and synthesis entity 120 (probably excluding the power supply 121), as well as any external lighting and/or special effects control systems.

Using MIDI messages and conventions as a model, control signals may be carried through cables and subsystems in combinations of multiplexed formats (the sixteen MIDI channels plus the variety of message types) and space-division formats (multiple MIDI cables). In the MIDI context the invention provides for control signal routing at the MIDI port (i.e., MIDI cable) level, the MIDI channel level, and the message index (MIDI note numbers, MIDI Continuous Controller numbers, etc.) level. This same hierarchy of routing capabilities would also apply to non-MIDI control signal equivalents. The invention also provides for the processing of control signals at any of these levels.

The MidiTemp MIDI processor products are by far the most comprehensive commercial products known at this writing; they provide full-capability port level and channel level routing but only very limited capabilities at the message index level. Further, the invention provides for control switching and merging functions to preferably be an integrated component within a larger-scale hardware and software construct rather than an off-the-shelf module.

To aid in using control signals throughout the system, the invention also provides for visual indicators of control message value, such LED bar-graphs which may be accessed through control signal routing.

7.4.2 Multi-channel Control Signal and Stored Program Handling and Organization The invention provides for a flexible control and configuration hierarchy for signal routing, processing, and synthesis entities.

Figure 63:
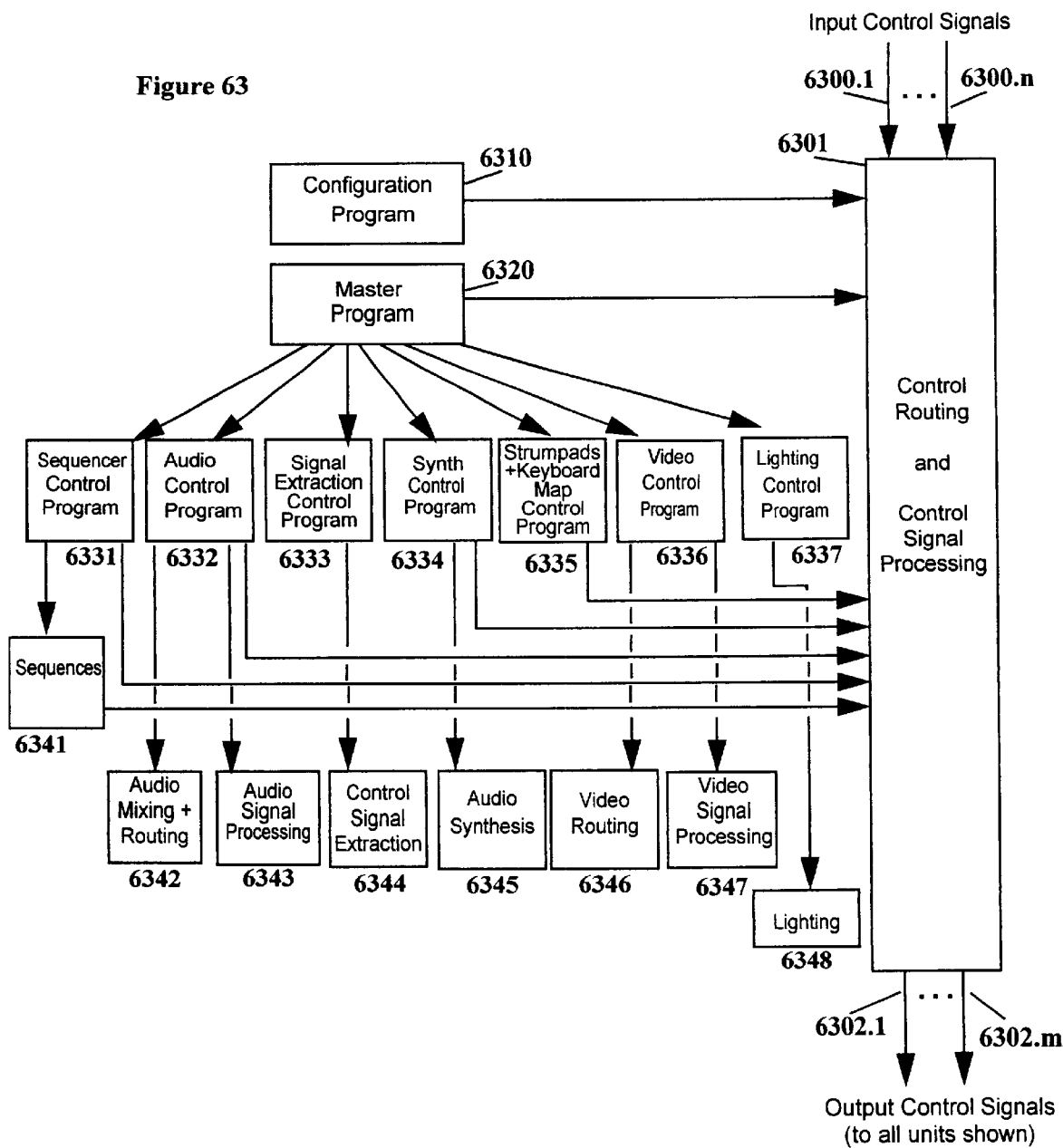
FIG. 63 illustrates an example flexible control and configuration hierarchy for control signal and stored program handling and organization.

FIG. 63 illustrates an example flexible control and configuration hierarchy for control signal and stored program handling and organization. In the Figure, all "program" entities (with the potential exception of the configuration program 6310) are stored programs which can be recalled up and swapped under the command of control signals (such as MIDI Program Change commands). Each stored program can in turn case the recall and/or swapping of other stored programs in accordance with those arrowed lines between pairs of programs as shown in FIG. 63.

Referring to FIG. 63, input control signals 6300.1–6300.$n$ from instrument entities, foot controllers, etc. are applied to a control signal routing and control signal processing environment 6301. The control signal routing and control signal processing environment 6301 may internally be decomposed into separate control signal routing and control signal processing elements or instead be integrated together in a common realization (as is common on many MIDI signal routing and handling products). The control signal routing and control signal processing environment 6301 then distributes output control signals 6302.1–6302.$m$ throughout the rest of the system, specifically all classes of elements depicted in FIG. 63, potentially including control aspects of itself. Among the elements receiving control signals is a configuration program 6310 which potentially provides simply a background environment defining specific ports, safeguards, and any common control distribution frameworks (point to point, broadcast, daisy-chain) should this be necessary. A variety of configuration programs 6310 may be made available for varying operational modes (for example stand-alone operation, ganged operation with one or more other signal routing, processing and synthesis entities, backup modes, diagnostic modes, etc. A more significant receptor of the output control signals 6302.1–6302.$m$ is the master program 6320. This stored program can change the configuration of the control signal routing and control signal processing environment 6301 as well as the choice of any of the subsystem stored control programs 6331–6337 affiliated with sequencing, audio, lighting, etc. These control programs in turn may change the configuration of the control signal routing and control signal processing environment 6301 (specifically 6331, 6332, 6334, 6335 are shown with this capability in FIG. 63) as well as the choice of any of the stored programs in the clusters of specific subsystem elements represented by 6342–6347 as well as the potentially external lighting subsystem element cluster 6348; specifically these stored program command paths are as indicated by the arrows in FIG. 63. Further, the sequencer control program calls up and potentially immediately initiates real-time control signal sequences 6341 some of which may also change the configuration of the control signal routing and control signal processing environment 6301 as indicated by the arrowed line in FIG. 63.

It is understood that FIG. 63 serves as an illustrative example and that the invention provides for other organizational structures of this flavor and spirit.

7.5 Control Signal Processing

The invention provides for control signal processing to be included so as to add extensive valuable control capabilities. For convenience these control signal processing operations are described in terms of MIDI; the invention provides for these capabilities in other control signal formats as well.

Monodic Operations:

intelligent harmony (note by note remapping, individually or in ranges of arbitrary size)

note-number to MIDI Continuous Controller values note-velocity to MIDI Continuous Controller values MIDI Continuous Controller values to note number messages MIDI Continuous Controller value transformed by fixed scaling and offset values MIDI Continuous Controller values (0–127) remapped to arbitrary mappings by point, by line segment, or by fitted curve segment MIDI Continuous Controller complementary value transformation (i.e., if received value is "x", transmitted value is "127–x")

message delay message value threshold tests resulting in the issuances of new messages message value threshold tests resulting in selected routing choices for the received message.

Polyadic Operations:

multiplication of MIDI Continuous Controller values scaling and offset of MIDI Continuous Controller values controlled by other MIDI Continuous Controller values MIDI Continuous Controller to Note number and Note velocity sequence detection in a received series of MIDI messages, potentially within a defined time window, resulting in a new issued message

7.6 Control Signal Extraction

The invention provides for the extraction and derivation of control signals from audio and video signals as described below

7.6.1 Audio Signal to MIDI Note Event

The invention provides for the conversion of received audio signals into note events as is standardly done in products such as the Roland GP-10, GM-70, and CP-40. The invention also provides for more advanced extractions and derivations as explained below.

7.6.1.1 Envelope Tracking to MIDI

The above conversions of received audio signals into note events as is standardly done in products such as the Roland GP-10, GM-70, and CP-40 have been limited to channel allocation, note number and note velocity. The invention provides for the real-time extraction of amplitude envelope information and its conversion to control signals. For example, the amplitude envelope may be used to control a signal processor or signal pan location. Because the amplitude envelope falls off in a typically exponential way over time while most control structures expect linear variation, the invention provides for one or more possible warpings of the envelope signal, such as logarithm or piece-wise linear constructs. Further, the invention also provides for high-pass, band-pass emphasis/notching, and low-pass filtering prior to parameter extraction so as to limit unwanted influence of audio signal transients at the initial execution of a vibrating element or audio synthesized note.

7.6.1.2 Control Signal Extract from Vibrating Element Overtones

The use of pitch-detecting interfaces for converting the pitched vibrations of individual vibrating elements into control signals for use with synthesizers or other musically-oriented signal processing has been in use for many years, particularly since shortly after the invention of the MIDI standard for electronic instrument control. However, such pitch-detecting interfaces have derived only the fundamental frequency and overall amplitude of the pitched vibrations of individual vibrating elements of an instrument. The use of filter banks for determining the energy in course frequency bands for the purposes of controlling musically-oriented signal processing (i.e., the so-called vocoder") is also known. However, the practice of determining the scale-accurate pitches and amplitudes of individual overtones for the purposes of controlling synthesizers or other musically-oriented signal processing is currently not known.

Current synthesizer interfaces (such the Boss GP-10 for guitars and the Zeta products for violins) typically only respond to the fundamental vibrating pitch and the overall amplitude. Further, amplitude responses in these current synthesizer interfaces typically only respond to the amplitude at the initial attack of a note and the event where the amplitude of the sustained vibration falls below a certain threshold.

The invention provides for an expansion of traditional synthesizer control interfaces for vibrating elements so as to respond to the pitches and amplitudes of higher-order overtone vibrations and issue control signals based on these. By expanding the response of traditional synthesizer interfaces for vibrating elements to include continuous time response to fundamental and overtone amplitudes as well as pitches, far more expressive control over synthesized sound via tracking of vibrating elements can be obtained. For example, plucking or bowing a string in varying locations can be used to control signal processing parameters.

Traditionally, synthesizer interfaces for vibrating elements capture pitch (based on fundamental frequency of vibration) and amplitude, initially when a vibrating element is excited and in some cases as pitch and/or even amplitude changes dynamically. However, this can be expanded to include responses to various higher-order (non-fundamental) harmonics or other modes of vibration. It is important to note that such a feature can add tremendous control over conventional synthesizer sound production in general situations where vibrating elements are used to control the synthesis of the sound; this is true somewhat in guitars, but much more so in wind and bowed instruments. In using a vibrating element feedback excitation arrangement for guitars, for example, this type of control signal extraction may be especially expressive as the feedback process can create widely-varying harmonic content when hands touch vibrating elements in feedback excitation or by varying the excitation feedback characteristics (via signal processing within the feedback loop). Because of the dynamic overtone characteristics of exciting vibrating elements in feedback loops, it is of interest to expand traditional synthesizer interfaces for vibrating elements to respond to the pitches and amplitudes of these higher-order overtone vibrations. The significant synergistic value of the combination of vibrating element excitation and overtone tracking control signal extraction are also recognized as part of the invention.

Figure 64:
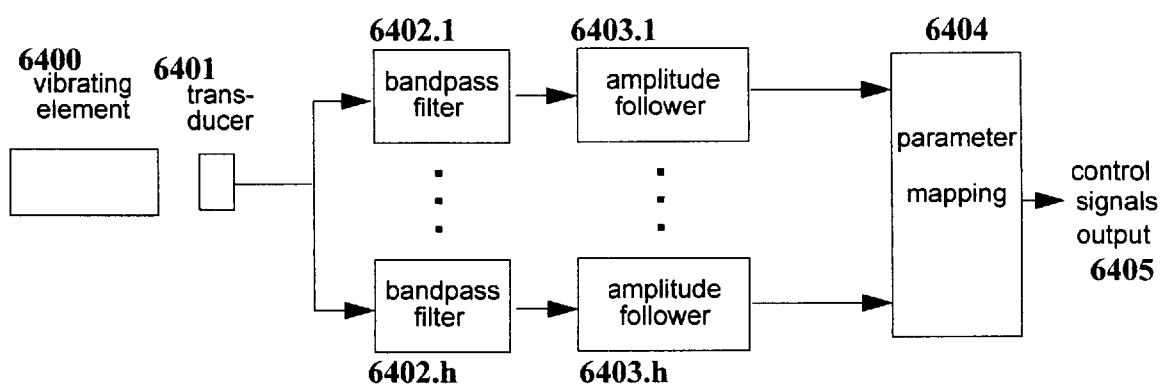
FIG. 64 shows an example method for the generation of control signals from fundamental and overtone information in a signal from a vibrating element of fixed known pitch.

There are various ways to accomplish such overtone tracking. In general, it is much easier for instruments whose elements vibrate at fixed pitches with a known overtone series. In these instruments, the overtone frequencies of a given vibrating element are also known in advance. FIG. 64 shows an example method for the generation of control signals from fundamental and overtone information in a signal from a vibrating element of fixed known pitch. If the pitch is both fixed and known, the signal from each vibrating element can be filtered by a suite of band-pass filters 6402.1–6402.1$h$, each separately tuned to the known frequency of an individual mode of vibration for that particular element. The output of each filter can be fed to a dedicated amplitude follower 6403.1–6403.$h$. Each amplitude follower output can be used to create a separate parameter which can be assigned to an outgoing control signal 6405 via parameter mapping operation 6404.

Figure 65:
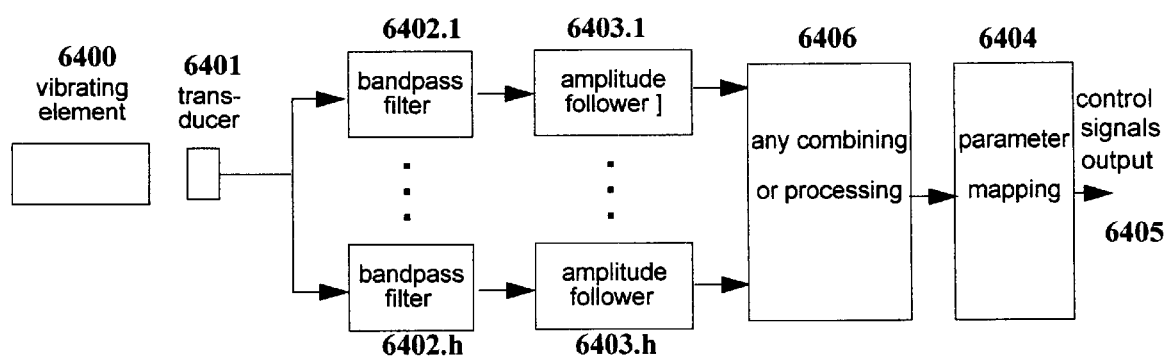
FIG. 65 shows combining and/or processing fundamental and overtone information obtained from a vibrating element signal prior to parameter extraction.

The invention provides for the combining and/or processing of fundamental and overtone information in creating yet other derived control signals. FIG. 65 shows combining and/or processing of fundamental and overtone information obtained from a vibrating element signal prior to parameter assignment to control signals. As shown in FIG. 65, the outputs of groups of amplitude detectors associated with a given vibrating element can be combined and/or processed 6406 before mapping to final parameters prior to control signal assignment. For example, different weighted sums can be used to control the amplitude of a synthesized signal (say a uniform averaging, or sum-of-squares averaging) than would be used to control the cut-off frequency of a subtractive filter (here, weighting the higher modes of vibration more strongly would make the synthesis mimic the vibrating element's harmonic balance; weighting the lower more strongly would make the synthesis complement the vibrating element's harmonic balance, etc.).

In the case where the vibrating elements do not vibrate at a fixed pitch but still obey a known overtone relationship, a slightly more involved version of the same mechanism can also be used. Note that such an implementation is hardly limited to feedback systems and could be used in general guitar and violin synthesizer interfaces for new depths of performance control. In addition, because variation in overtone series dynamics is an essential factor in singing and in percussion instruments, such a technology opens important new doors for synthesizer overtone-nuance tracking for voice and percussion instruments. In singing in particular, the relative amplitudes of the first three harmonics (largely the first two, actually) determine the choice of sung vowel; as a result, this technology allows synthesizers to track the formants of vowel production in the human voice.

Figure 66:
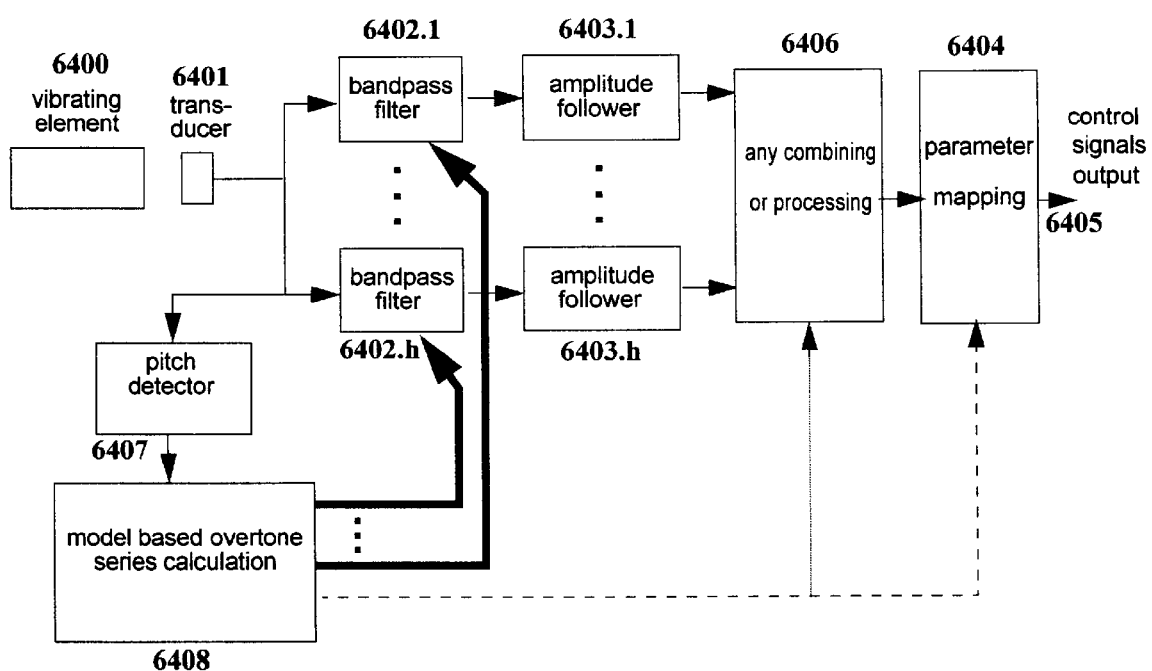
FIG. 66 shows an example implementation of an adaptive method for tracking overtones for a variable-pitch vibrating element with known overtone series.

FIG. 66 shows an example implementation of an adaptive method for tracking overtones for a variable-pitch vibrating element with known overtone series. The method is largely the same as the fixed-pitch case, but with some added steps. The additional steps employed are to first use a traditional pitch detector 6407 (as used with conventional MIDI guitar/violin/voice interfaces) to determine the fundamental pitch, then use this pitch information plus an overtone series model of the vibrating element 6400 to position the frequencies of the individual band-pass filters 6402.1–6402.h and amplitude followers 6403.1–6403.h.

In a preferred implementation of this approach, the detected pitch information provided by the pitch detector 6407 is fed to a model-based overtone series calculator 608. The model-based overtone series calculator 155 generates the control signals required to individually center each of the plurality of band-pass filters 6402.1–6402.h. The model-based overtone series calculator 6408 is also used to generate overtone frequency information for use in any combining or processing of the extracted overtone amplitude information and in the parameter mapping 6404 to final output control signals.

7.6.2 Pluck Direction to MIDI

The invention provides for the extraction of plucking direction (as on an instrument string) of arbitrary vibrating element and creating a control signal from it. Core technologies for detecting pluck direction typically include separate analysis of the signals from a 2-coil humbuck pickup and have been implemented in products by Biax and Passaic. Passaic also implemented a method for deriving a control parameter from where a string was plucked between the bridge and the neck. The invention provides for these extraction functions to be included in the available control extraction capabilities.

7.6.3 Video Motion and Feature Extraction

The invention provides for the extraction of parameters from provided video signals as described earlier and creating control signals from them. Methods for implementing this have been described earlier, including simple timing tests and video frame grabs analyzed by dedicated systems or personal computer software. The invention also provides for implementations using emerging motion tracking and image decomposition methodologies under development for widespread adoption in digital video compression standards such as MPEG-4 (see for example [Hara; Bormans].

7.6.4 Control Signal Pattern Recognition

The invention provides for the recognition of control signal patterns. Since the result is yet another control signal, this has been treated earlier in the context of control signal processing.

7.7 Dynamic Control Signal Synthesis

The invention provides for the synthesis of dynamic control signals such as low-frequency sweep oscillators, particularly those whose parameters may be controlled in real-time by other control signals. Since an envelope generator trigger is also a control signal, the generation of control signal envelopes and slews are also included in this category and are provided for by the invention.

7.7.1 MIDI-controlled Low-frequency Control Oscillators Ensembles

Low-frequency sweep oscillators, or LFOs, have roles throughout the invention and have been discussed earlier. In some types of functions implemented by specific elements, such as chorus and flangers, the LFO may be hard associated with the element. The invention provides for this as well as the remote positioning of the LFO function outside the element in the case where several elements may be coordinated with the same LFO. In other types of functions, such as location modulation, it may be best to control existing elements such as mixers with control signals from external LFOs.

The invention provides for a plurality of control signal LFOs to be available. The LFOs may be part of a comprehensive system or a separate module which can be manufactured and sold for other uses; such a product would be naturally served by at least MIDI output and input, but may also include at least one analog input and/or output. The LFOs provided for by the invention include multiple phase output capabilities as well as selections of a variety of waveforms, frequency settings, amplitude settings and offset settings, all of which may be varied in real-time by yet other control signals. Further, the invention provides for these parameters to be available under selectable stored program control which may be chosen by control signals. Finally, the invention provides for global effects across groups of LFOs, such as timing slew of parameter changes, global scaling, global offsets, etc. These may also include more complex organizations such as may be require for two-dimensional and three-dimensional location modulation and the custom construction or sampling of LFO waveforms.

Figure 67:
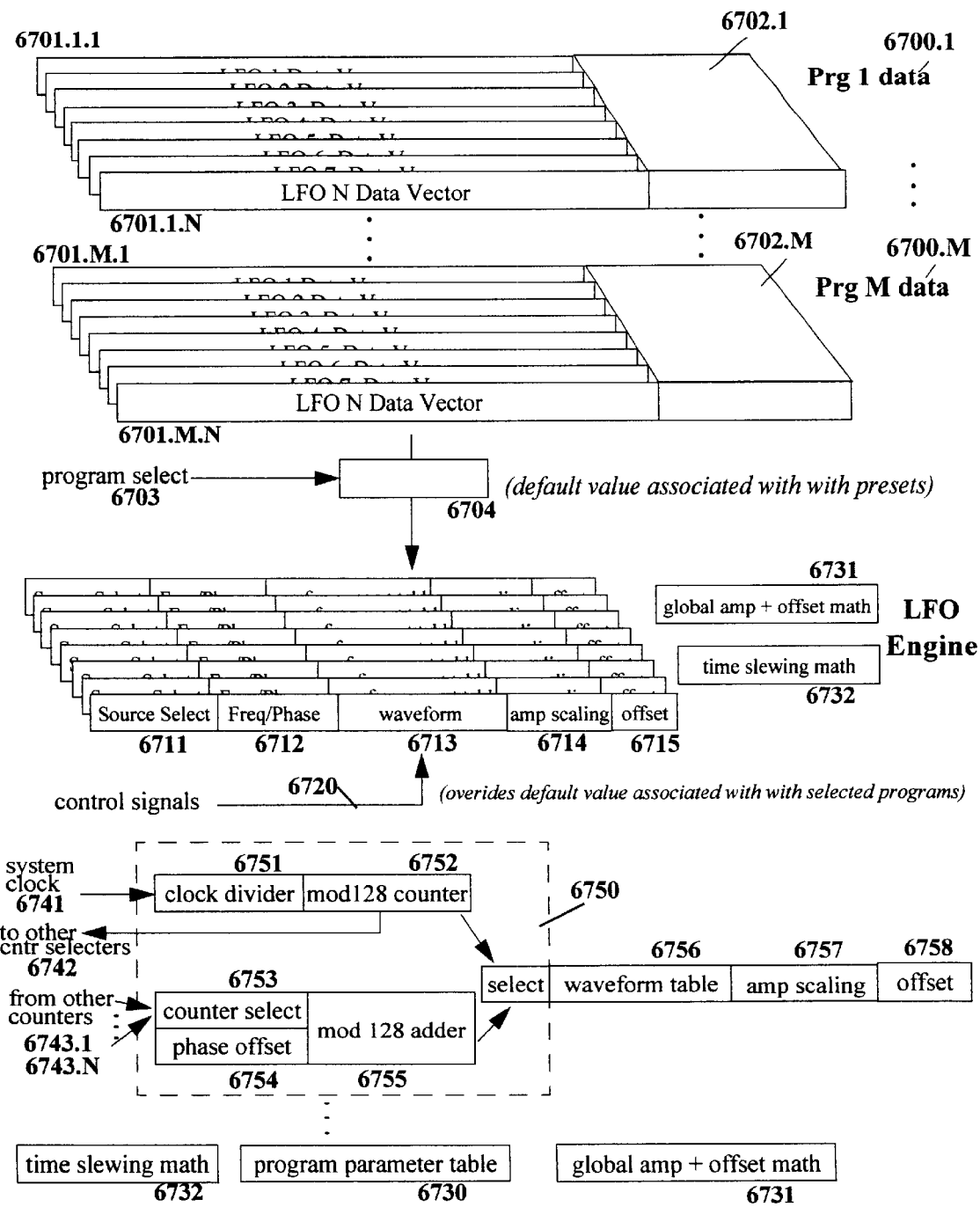
FIG. 67 illustrates an example approach wherein a plurality of LFOs with features as prescribed by the invention may be implemented.

FIG. 67 illustrates an example approach wherein a plurality of LFOs with features as prescribed by the invention may be implemented. Program data for M different stored programs may be stored in M data structures 6700.1–6700.M; these may include specific LFO parameters 6701.1.1–6701.M.N for N LFOs. The data structures may also include global information 6702.1–6702.M pertaining to groups of LFOs. A received control signal and/or panel control may be used to designate the selected program 6703 which is recalled and implemented 6704 as a set of default vaules subject to real-time change by other control signals. The LFO data vector structure for each LFO includes a source of select information 6711 for choosing whether a given output operates as an independent LFO or as a slave to another LFO specified here (and in so doing becomes a multiple phase output for the chosen source oscillator). Another part 6712 of the LFO data vector provides a frequency setting if the LFO is independent and a phase setting if slaved; should integer-ratio phase-locking be implmeneted, this part of the data structure may be reorganized to include relative frequency and phase settings with respect to the selected master LFO. Another part 6713 of the LFO data vector provides selected waveform information, including reference to any user sampled LFO waveforms. Another two parts 6714, 6715 of the LFO data vector provide respectively amplitude scaling and offset settings. Additional information, such as the outgoing MIDI channel and MIDI Continuous Controller number to be used and what incoming MIDI Continuous Controller messages on what MIDI channel are used to control the aforementioned LFO settings. The global part of the data 6731, 6732 provides global information for specific settings of global amplitude, offset, parameter, time slew, etc. pertaining to specific groups of LFOs. The selected information is presented to the LFO engine for execution, The LFO engine in the example implements an independent LFO by dividing 6751 a system clock signal 6741 by a number determined by the frequency setting 6712. The divided clock signal runs a counter 6752 (here a 128 step counter is illustrated, although higher resolution may be desired). Should the LFO be instead designated, via the information 6711, to be slave to another LFO, the counter of that master LFO is accessed 6753 and the phase offset information 6712 is used to create a phase offset value which is provided together with the accessed counter value to an modular adder 6755 which produces the resulting phase-shifted version of the master LFO count value. The resulting counting sequence produced by this section 6750 is used as the address for a waveform lookup table 6756 and/or algorithm; the resulting generated periodic signal is then scaled 6757 according to 6714 and offset in amplitude 6758 by information 6715. The resulting waveforms can be post-processed to provide global amplitude and offset features, or, alternative, mathematical transformations 6731 may be provided on the information 6714, 6715 before executing it in the LFO engine in elements 6757, 6758.

7.7.2 Controlled Slews, Ramp, and Envelope Generator Elements

The invention provides for slew limiters, ramp generators, and envelope generators whose trigger and various parameters may be varied in real-time by control signals. Slew limiters limit the rate of change of a control signal to a maximal range which may be set as a parameter and advantageously varied by control signals. Ramp generators are simplified envelope generators triggered by control signals which ramp between two or more discrete values or the entire control signal range and do so according selected types of dynamics (linear over time, exponential over time, etc.); the parameters here may be set and advantageously varied by control signals. Envelope generators offer more complex transient waveforms, typically including at least attack, decay, sustain, and release; more complex envelope features including more breakpoints, delays, and segment curve shapes may also be provided. The parameters here may be set and advantageously varied by control signals.

7.8 Lighting Effects and Video Display

The invention provides for extensive control of lighting via control signals. Some aspects of lighting as provided for by the invention are described in the sub-sections below.

7.8.1 Light Types

The invention provides for extensive control of lighting via control signals. Some aspects of lighting as provided for by the invention are described in the sub-sections below.

7.8.1.1 Traditional Fixed

Figure 68:
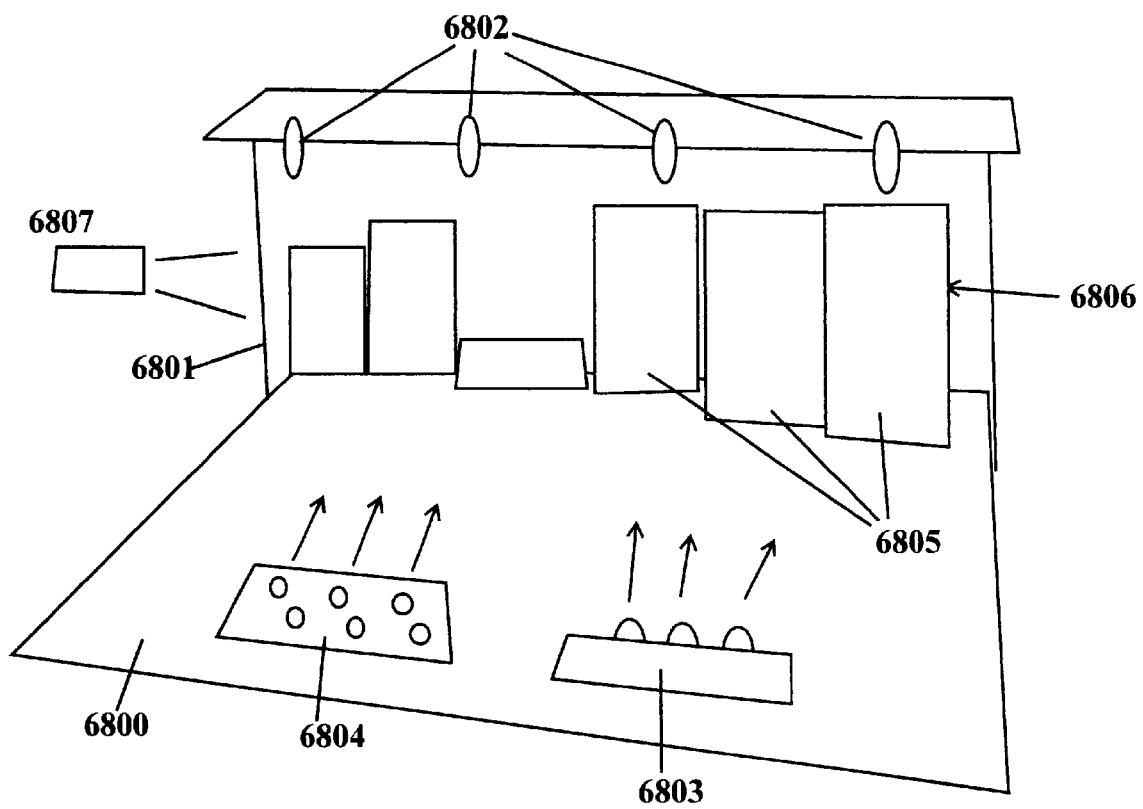
FIG. 68 illustrates traditional stage lighting elements including over-heads, farthrow, foot, back, floor.

The invention provides for traditional fixed lighting arrangements as shown in FIG. 68. These may include any one or more of overhead lights 6802, far-throw lights 6807, foot lights 6803, floor lights aimed upward or at angles 6804, backlights 6806 behind equipment and risers 6805 and backdrops 6801.

7.8.1.2 Movable

The invention provides for movable lighting controlled in real-time via control signals. Such lighting can be implemented by attaching lights to motorized pan/tilt heads as used for video cameras.

7.8.1.3 Instrument Lighting

Figure 69:
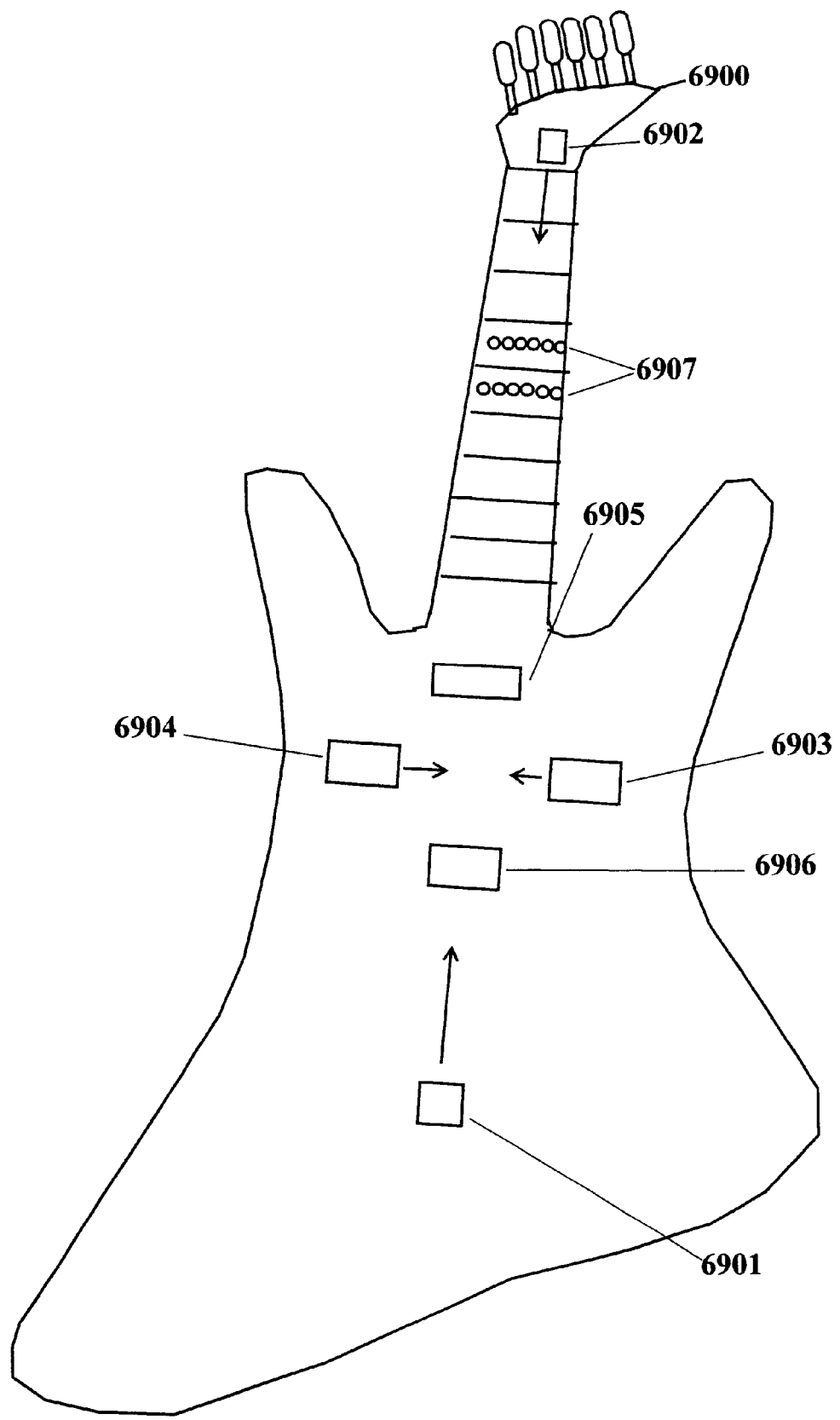
FIG. 69 illustrates example instrument lighting.

The invention provides for lighting on instrument entities which may be operated via control signals. FIG. 69 shows examples of lighting for a guitar 6900 from the bridge 6901, neck 6902, above 6904 and below 6903 the picking area, all aimed at illumination effects for the hands. Also shown are lights aimed at the audience in the pickup areas 6905, 6906 and fret areas 6907, any of which may be aggregate as in 6905, 6906 or split out separately for each string as in 6907.

7.8.1.4 Light Sculptures

Figure 70:
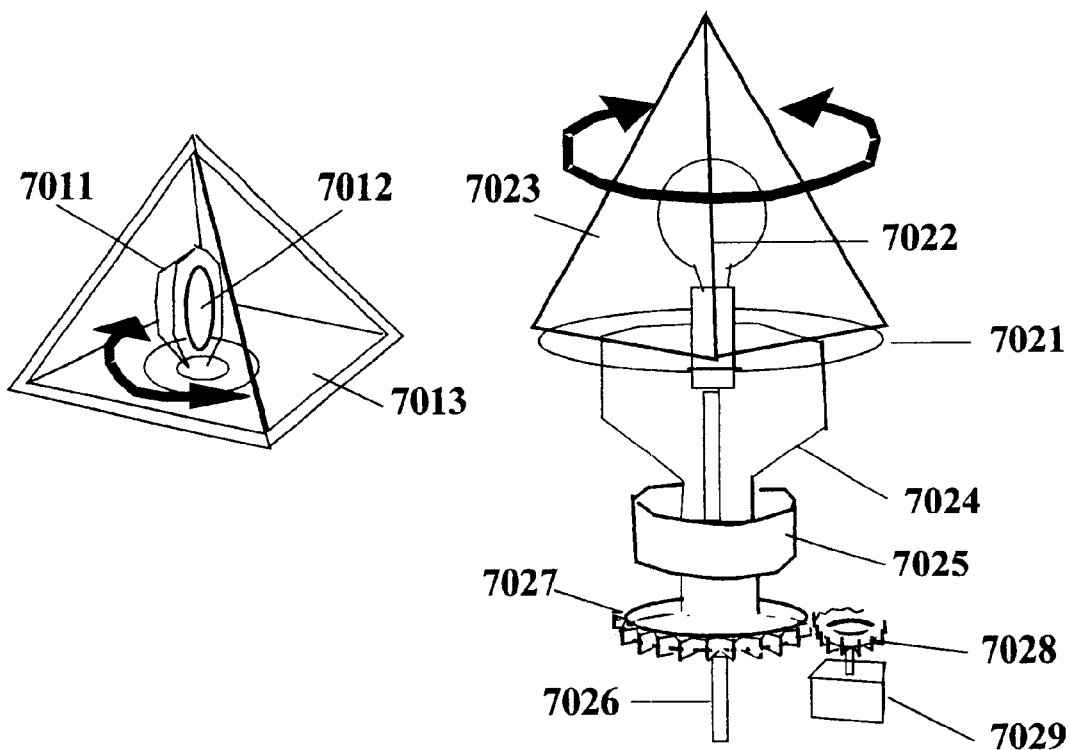
FIG. 70 illustrates example rotating speaker emulation light sculptures.
Figure 70:
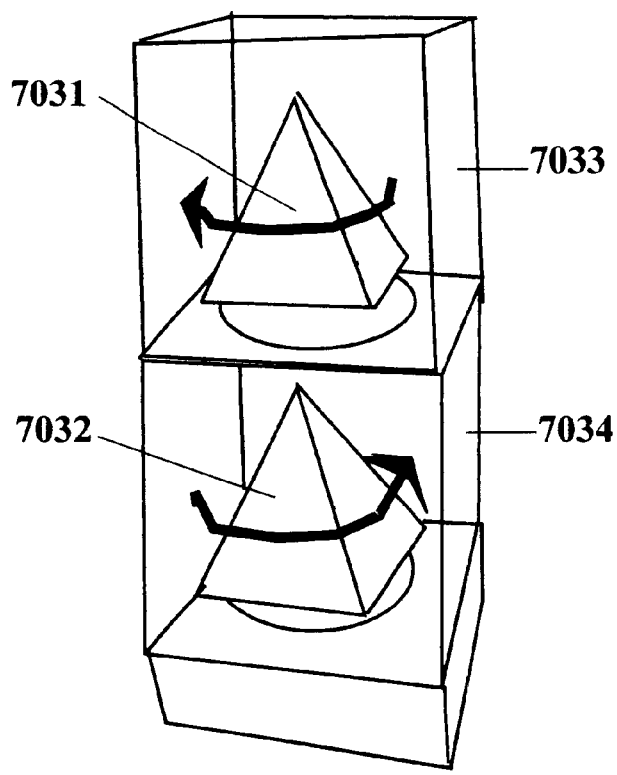

The invention provides for light sculptures under control of control signals. FIG. 70 shows rotating speaker emulation light sculptures. In one implementation a rotating reflective beacon 7011 reflects gathered light from a bulb 7012 and projects it on to a translucent concealing cover 7013 attached to, in this case, a pyramid frame. An alternate arrangement where the translucent outer structure 7023 itself rotates is also shown about a fixed light bulb 7022 whose cable 7026 fits through the bearings 7024, 7025 of a rotating turntable 7021,7024 driven by geared 7027, 7028 motor arrangement. The mechanism just described is exploded for explanation and in fact may be readily collapsed by standard means so as to permit two rotating pyramids 7031 7032 to be stacked in transparent cubes 7033, 7034. The motor speed and direction can be controlled by control signals and arranged to operate in synchronization with rotating speaker simulations in audio signal processing elements.

Figure 71:
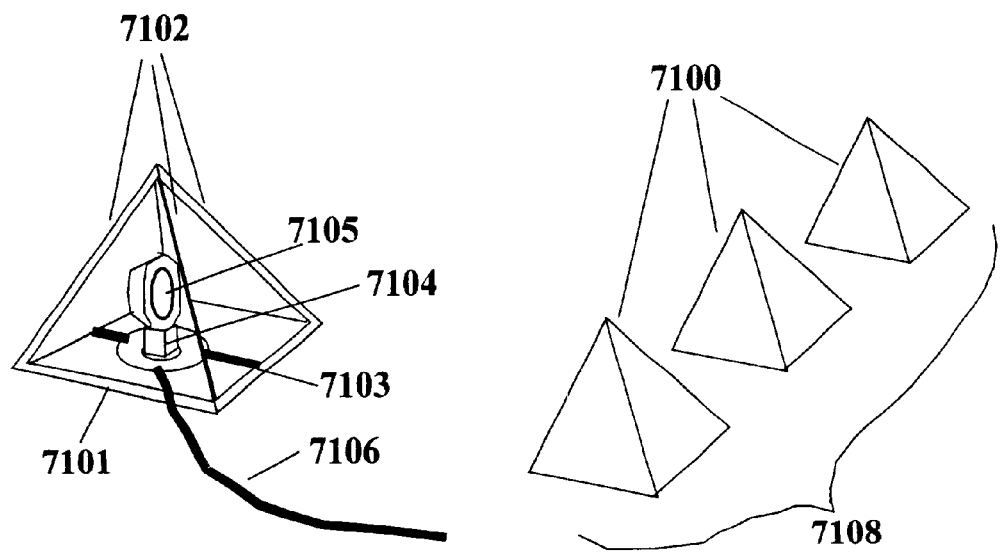
FIG. 71 illustrates light pyramid arrays and light columns arrays.
Figure 71:
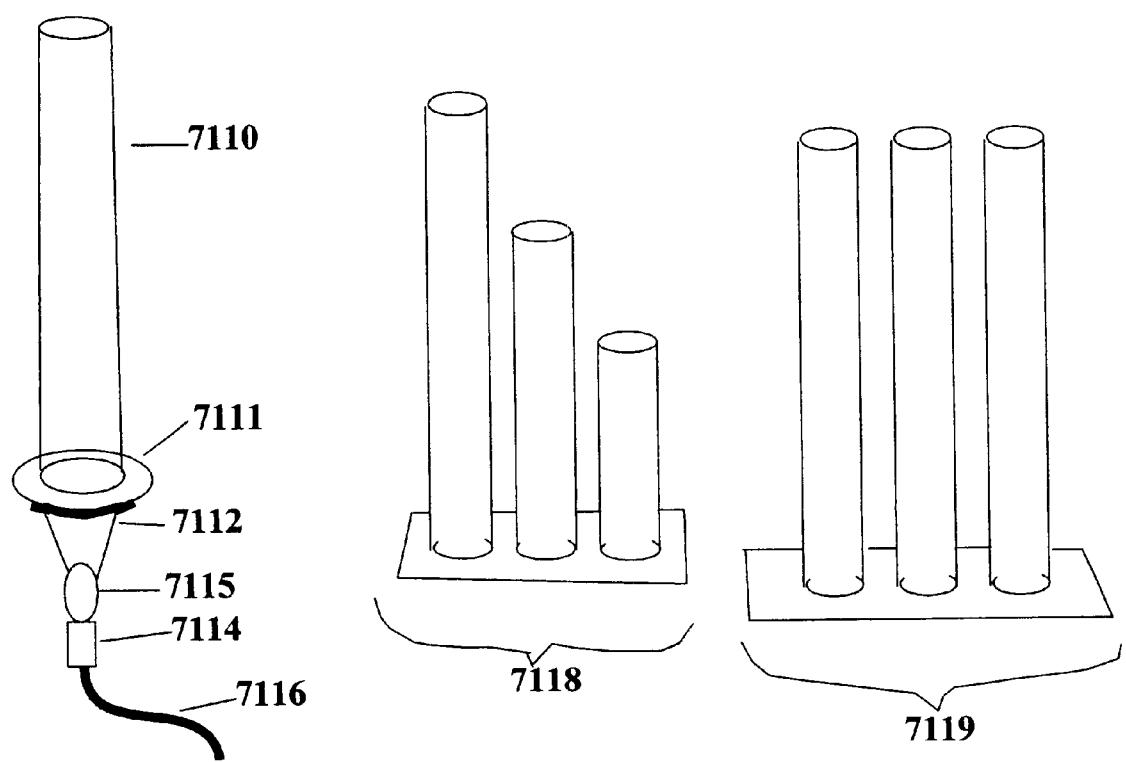

FIG. 71 shows light pyramids 7100 made of similar elements 7101–7106, typically without reflectors or directional bulbs, which may be arranged in arrays 7108. Also shown are light column arrays suggestive of organ pipes 7118 or instrument strings 7119. These light columns may be built with standard lamps and reflectors 7112, 7114, 7115, colored gels 7111 and light transmitting and scattering rods 7110.

Also provided for by the invention are controlled ionize gas turbulence sculptures; these may be used with or without associated video ameras.

7.8.2 General Lighting Control

The invention provides for lights to be used in scene change modes or modulated by control signals according to:

animation sequences and subsequence events instrument activity timbre qualities

Special Instrument lighting effects include:

audience shock events animation sequences string activity, note following, orchestration following

7.8.3 Video Signal Routing

Referring to FIGS. 1–2, input signals directed to video routing include the video outputs from the instrument entities 100, video signal processing elements 127, video signal synthesis elements 129*a*, and external video feeds from, for example, miscellaneous stage cameras, VCRs, etc. Still referring to FIGS. 1–2, output signals directed from video routing include video inputs to instrument entities 100, video signal processing 127, control signal extraction 128*a*, and overall video outputs to one or more of any displays, projectors, and/or recording facilities.

7.8.4 Video Signal Processing

Video signal processing as provided for by the invention would include overlays, wipes, fades, blends, solarizations, geometric warping, etc, as much as possible under the control of control signals. Interesting effects provided for by the invention include the switching, wiping, blending, fading, warping, etc. of various video signals for display in performance and/or recording under the control of instrument note and amplitude envelope signals.

7.8.5 Video Display

Figure 72:
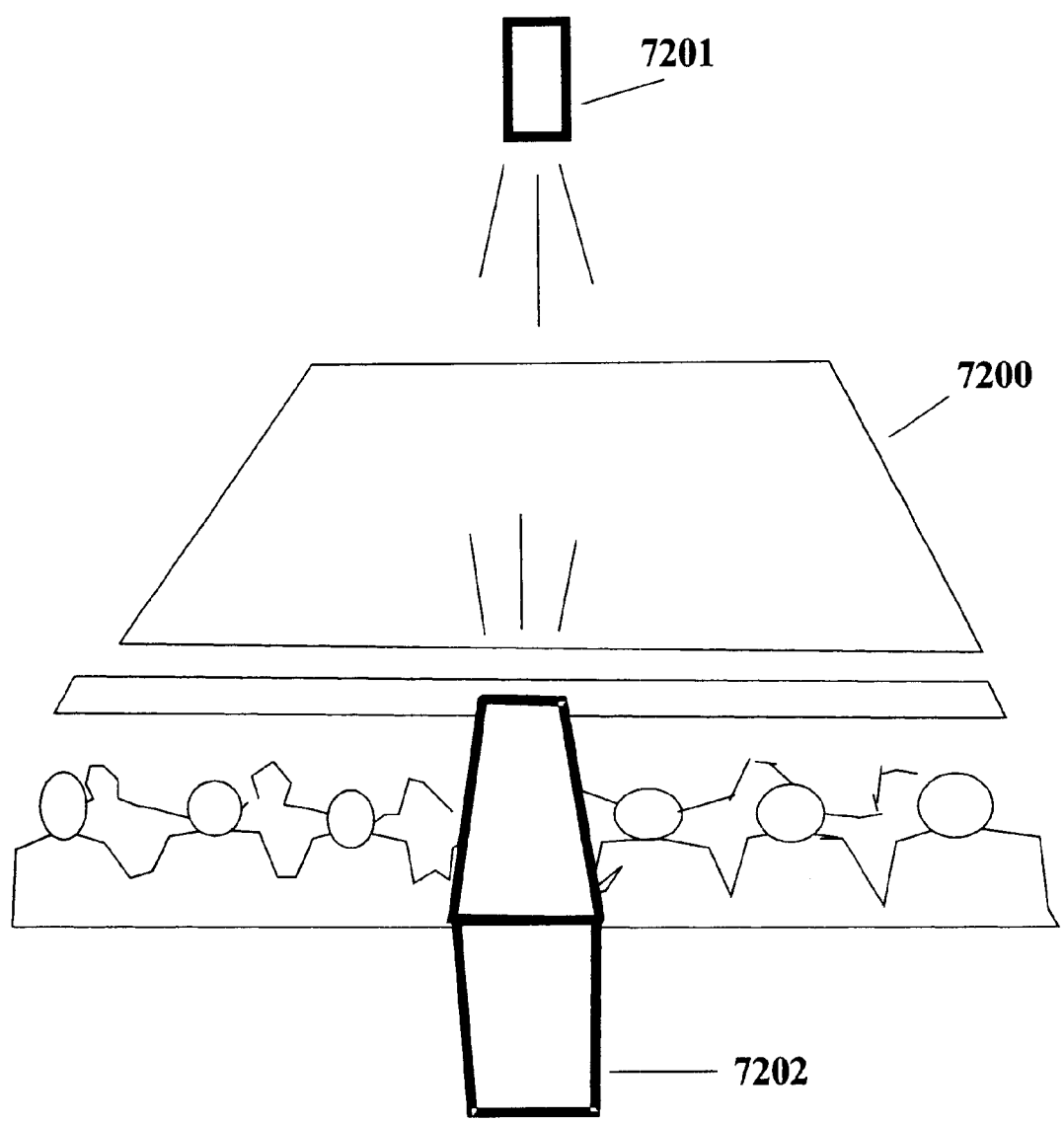
FIG. 72 illustrate stage video projection arrangements.

FIG. 72 shows how the invention provides for video projection to be used to shine down 7201 on the stage 7200, shine horizontally 7202 on to performers or backdrops. The invention also provides for video projectors to be shined on the audience. The invention also provides for The invention provides for movable cameras controlled in real-time via control signals using motorized pan/tilt heads as well as motorized zoom/focus lenses.)

7.8.6 Video Signal Synthesis

The invention provides for video signal synthesis would include real-time generation of text message screens, text overlays, vector and raster graphic drawings, vector and raster graphic overlays, and animations affiliated with numerical dynamics simulation. The invention also provides for pre-stored video frames, playback of video clips, and playback of prestored vector and raster graphics animations. The invention provides for these to be controlled by standardized control signals, such as MIDI, and as such would typically involve both stored program control and parameterized control. These functions may be realized with a conventional personal computer fitted with video card and MIDI interface as well as by dedicated hardware.

8 Example Envisioned Applications

A few example envisioned applications of the invention are now provided.

8.1 Add-on Modules for Existing Instruments

This gives rise to a whole new marketplace for new instruments, instrument retrofit kits, and music signal processor units which can interact with external amplifiers, signal processing, and MIDI synthesizer units.

8.2 Creation of Enhanced Electronic Vibrating Element Instruments

With the first technique described within this patent, the more traditional acoustically-excited "controlled feedback" effects can easily be obtained, via electromagnetic excitation, with standard parts. Specialization of the parts can provide additional features. The technique can also be applied to any instrument where sound is produce by vibrating ferromagnetic material, e.g., African mbiras, violins, xylophones, etc.

With the second technique described in this patent, conventional signal processing can be used on each string signal to create "generalized pedal steel guitars," multimodal Indian sitars (where drone and sympathetic strings can be electronically retuned while playing), spatially animated string sounds within a stereophonic or spatial sound field, and mixed timbre instruments where different signal processing methods are applied to each string. The technique can also be applied to any instrument where vibration of individual sound-producing elements can be electronically captured by isolated transducers (electromagnetic, optical, Hall-effect, etc.), such as nylon-stringed instruments, marimbas, African mbiras, violins, etc.

By combining these two new techniques with appropriate signal processing, a very powerful environment for multi-stringed electronic instruments can be created. Individual strings can be singled out for feedback operation while others operate without feedback, and all strings can be electronically pitch-shifted as needed in a performance. The results allow a performer a greater degree of polyphonic control, using mechanical (neck, frets, fingers, picks, movable tailpieces, pedal tuning changers, etc.) or electronic means for both string excitation and pitch control, with individual string outputs available for synthesizer interfaces.

Any to all of the above can be built into an individual instrument. Alternatively, an instrument interface can be created and most signal processing can be remotely located from the instrument, connecting to it via this interface. If this interface is standardized across multiple instruments, then common signal processing equipment environment can be used across a wide variety of instruments (metal-stringed and nylon-stringed guitars, basses, violins, steel guitars, sitars, mbiras, etc.). This gives rise to a whole new marketplace for new instruments, instrument retrofit kits, and music signal processor units which can interact with external amplifiers, signal processing, and MIDI synthesizer units.

All publications and patent applications mentioned in this specification are herein incorporated by reference to the same extent as if each individual publication or patent application was specifically and individually indicated to be incorporated by reference. The invention now being fully described, it will be apparent to one of ordinary skill in the art that many changes and modifications can be made thereto without departing from its spirit or scope.

References Cited

The following references are cited in this patent application using the format of the first one or two authors last name(s) within square brackets"[ ]", multiple references within a pair of square brackets separated by semicolons ";"

[Bicanic] Bicanic, Dane, ed. *Photoacoustic and Photothermal Phenomena III*, Vol. 69, Springer-Verlag, Berlin Heidelberg, 1992.

[Ronse] Ronse, Christian and Devijver, Pierre A., *Connected Components in Binary Images: the Detection Problem*, John Wiley & Sons Inc. New York, 1984.

[Viberg] Viberg, Mats, *Subspace Fitting Concepts in Sensor Array Processing*, Linkoping Studies in Science and Technology. Dissertations No. 27 Linkoping, Sweden 1989.

[Shapiro] Shapiro, Larry S, *Affine Analysis of Image Sequences*, Cambridge University Press, 1995.

[Appelman] Appelman, D. Ralph, *The Science of Vocal Pedagogy, Theory and Applications*, Indiana University Press, Bloomington, 1967.

[Murphy] Murphy, Aamodt, Spicer and Royce (eds.) *Photoacoustic and Photothermal Phenomena II*, Vol. 62, Springer-Verlag, Berlin Heidelberg, 1990.

[Winckel] Winckel, Fritz, *Music Sound, and Sensation: A Modern Exposition*, Dover, N.Y., 1967.

[Hara] Hara, Yoshiko "Matsushita demos multilayer MPEG-4 compression", *Electronic Engineering Times*, Apr. 19, 1999.

[Lusher] Lusher, E. (unk) "Photoacoustic effect: principles and applications: proceedings of the First International Conference on the Photoacoustics," Vieweg, 1984.

[Wang] Wang, X-J, and Nicolis, G. "Bifurcation Phenomena in Coupled Chemical Oscillators: Normal Form Analysis and Numerical Simulations", *Physica* 26D (1987) 140-155 North-Holland, Amsterdam.

[Kuramoto] Kuramoto, Yoshiki, "Rhythms and Turbulence in Populations of Chemical Oscillators", *Physica* 106A (1981) 128-143 North-Holland.

[Epstein] Epstein, Irving R, "New Chemical Oscillators", *Non-Equilibrium Dynamics in Chemical Systems*, Springer-Verlag, Berlin/Heidelberg 1984.

[Gray] Gray, Peter, and Scott, Stephen K, *Chemical Oscillations and Instabilities*, Clarendon Press, Oxford 1990.

[Epstein] Epstein, "The Search for New Chemical Oscillators," in *Chemical Instabilities*, Nicolis and Baras (eds.), D. Reidel Publishing, Dordrecht/Boston/Lancaster, 1984.

[Nicolis] Nicolis, G and Baras, F (eds.), *Chemical Instabilities*, D. Reidel Publishing, Dordrecht/Boston/Lancaster.

[Tyson] Tyson, John J., *The Belousov-Zhabotinskii Reaction*, Springer-Verlag, Berlin/Heidelberg.

[Nicolis] Nicolis, G., "Nonlinear Phenomena in Chemistry", *Introduction to Non-linear Science*, Cambridge University Press, Great Britain 1995.

[Orban] Orban, M., Kurin-Csorgei, K., Zhabotinsky, A, and Epstein, I, "New Indicators for Visualizing Pattern Formation in Uncatalyzed Bromate Oscillatory Systems", *J. Am. Chem. Soc.* 1998, 120, 1146–1150.

[Field] Field, Richard J., and Noyes, Richard M "Oscillations in Chemical Systems IV Limit Cycle Behavior in a Model of a Real Chemical Reaction" *J. Chem. Physics* Vol. 60 No. Mar. 5, 1974.

[Nagy-Ungvarai] Nagy-Ungvarai, Z. and Hess, Benno "Control of Dynamic Pattern Formation in the Belousov-Zhabotinsky Reaction" *Physica D* (1991) North-Holland.

[Ruoff] Ruoff, P. "How Bromate Oscillators Are Controlled", *Am. Chem. Society* 1988.

[Bormans] Bormans, Jan "MPEG-4 systems need specialized CPUs", *Electronic Engineering Times*, Jan. 25, 1999.

[Visintin] Visintin, A (ed.), *Models of Hysteresis*, Longman Scientific & Technical, Harlow, England, 1993.

What is claimed is:

1. A system for generating control signals to control audio, visual and control systems based on the processing of image and sensor array data, the system comprising:
    a source of at least one data array comprising pixel data, wherein each of an array of said pixel data includes at least one data value;
    at least one processor for processing said array of pixel data;
    an algorithm and/or circuitry for extracting pattern information from said array of pixel data, wherein said pattern information defines at least one pattern selected from the group consisting of:
        a pattern boundaries;
        pattern geometric coordinates;
        geometric weighted moments defined by pixel data within a pattern;
        pattern classifications,
    wherein the extracted pattern information is used to create said control signals.

2. The system of claim 1 wherein the source of said at least one data array is a pressure sensor array.

3. The system of claim 2 wherein said pressure sensor array is attached to the key of a musical instrument keyboard.

4. The system of claim 1 wherein the source of said at least one data array is a video camera.

5. The system of claim 1 wherein data comprising said at least one data array is obtained from a source selected from the group consisting of:
    a chemical sensor array;
    an environmental sensor array;
    a body sensor array.

6. The system of claim 1 wherein the process for generating said control signals from the extracted pattern information is variably defined.

7. The system of claim 6 wherein a plurality of variably defined generation processes are stored and recalled.

8. The system of claim 1 wherein said control signals include note on/off events.

9. The system of claim 1 wherein said control signals indicate a presence of said pattern classifications extracted within said at least one data array.

10. The system of claim 1 wherein said control signals include location-tracking information for patterns extracted within said at least one data array.

11. A method for generating control signals to control audio, visual and control systems based on the processing of image and sensor array data, said method comprising:
    detecting a source of at least one data array comprising pixel data, wherein each of an array of said pixel data includes at least one data value;
    processing said array of pixel data utilizing at least one processor;
    extracting pattern information from said array of pixel data utilizing an algorithm and/or circuitry, wherein said pattern information defines at least one pattern selected from the group consisting of:
        pattern boundaries;
        pattern geometric coordinates;
        geometric weighted moments defined by pixel data within a pattern;
        pattern classifications,
    wherein the extracted pattern information is used to create said control signals.

12. The method of claim 11 wherein the process for generating said control signals from the extracted pattern information is variably defined.

13. The method of claim 12 wherein a plurality of variably defined generation processes are stored and recalled.

14. The method of claim 11 wherein said control signals include note on/off events.

15. The method of claim 11 wherein said control signals indicate a presence of said pattern classifications extracted within said at least one data array.

16. The method of claim 11 wherein said control signals include location-tracking information for patterns extracted within said at least one data array.

* * * * *